United States Patent
Shimizu et al.

(10) Patent No.: US 11,843,832 B2
(45) Date of Patent: *Dec. 12, 2023

(54) BROADCAST RECEIVING APPARATUS

(71) Applicant: MAXELL, LTD., Kyoto (JP)

(72) Inventors: Takuya Shimizu, Kyoto (JP);
Kazuhiko Yoshizawa, Kyoto (JP);
Yasunobu Hashimoto, Kyoto (JP);
Nobuo Masuoka, Kyoto (JP); Nobuaki Kabuto, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/840,796

(22) Filed: Jun. 15, 2022

(65) Prior Publication Data

US 2022/0312076 A1 Sep. 29, 2022

Related U.S. Application Data

(63) Continuation of application No. 17/236,031, filed on Apr. 21, 2021, now Pat. No. 11,395,042, which is a
(Continued)

(30) Foreign Application Priority Data

Sep. 12, 2016 (JP) ................................. 2016-177312
Sep. 12, 2016 (JP) ................................. 2016-177430
(Continued)

(51) Int. Cl.
*H04N 21/4627* (2011.01)
*H04N 5/913* (2006.01)
(Continued)

(52) U.S. Cl.
CPC ........ *H04N 21/4627* (2013.01); *H04H 60/18* (2013.01); *H04N 5/775* (2013.01);
(Continued)

(58) Field of Classification Search
CPC .... H04N 21/4627; H04N 5/775; H04N 5/913; H04N 21/43635; H04N 21/440263; H04N 21/4405; H04N 2005/91328; H04H 60/18
See application file for complete search history.

(56) References Cited

U.S. PATENT DOCUMENTS

2001/0005236 A1 6/2001 Nakada et al.
2006/0230322 A1 10/2006 Okazaki
(Continued)

FOREIGN PATENT DOCUMENTS

JP 2001-186486 A 7/2001
JP 2003-234999 A 8/2003
(Continued)

OTHER PUBLICATIONS

Digital Transmission Licensing Administrator, DTCP2 Presentation to CPTWG Jan. 27, 2016.
(Continued)

*Primary Examiner* — Sumaiya A Chowdhury
(74) *Attorney, Agent, or Firm* — Mattingly & Malur, PC

(57) ABSTRACT

A digital broadcast receiving apparatus capable of executing a function with a higher added value is provided. A broadcast receiving apparatus configured to receive contents includes: a receiving unit configured to receive the contents; an interface through which the contents received by the receiving unit are outputted; and a control unit configured to control an output state of the contents from the interface. The control unit is configured to determine an output state of the contents from the interface in accordance with a combination of control information indicating a copy control state of the contents, control information for specifying whether protection is required or not when the contents are to be outputted, information indicating resolution of video of the contents, and information indicating transmission characteristics of the video of the contents, which are received by the receiving unit together with the contents.

15 Claims, 60 Drawing Sheets

Related U.S. Application Data continuation of application No. 16/331,996, filed as application No. PCT/JP2017/030114 on Aug. 23, 2017, now Pat. No. 11,019,399.

(30) Foreign Application Priority Data

| | | |
|---|---|---|
| Sep. 13, 2016 | (JP) | 2016-178172 |
| Sep. 13, 2016 | (JP) | 2016-178241 |
| Oct. 21, 2016 | (JP) | 2016-206543 |
| Oct. 24, 2016 | (JP) | 2016-207443 |
| Oct. 25, 2016 | (JP) | 2016-208361 |
| Oct. 26, 2016 | (JP) | 2016-209319 |
| Oct. 27, 2016 | (JP) | 2016-210678 |
| Oct. 28, 2016 | (JP) | 2016-211795 |
| Oct. 31, 2016 | (JP) | 2016-212509 |
| Nov. 1, 2016 | (JP) | 2016-214010 |
| Nov. 2, 2016 | (JP) | 2016-214928 |
| Nov. 4, 2016 | (JP) | 2016-215839 |

(51) Int. Cl.
| | |
|---|---|
| *H04H 60/18* | (2008.01) |
| *H04N 5/775* | (2006.01) |
| *H04N 21/4363* | (2011.01) |
| *H04N 21/4402* | (2011.01) |
| *H04N 21/4405* | (2011.01) |

(52) U.S. Cl.
CPC ....... *H04N 5/913* (2013.01); *H04N 21/43635* (2013.01); *H04N 21/4405* (2013.01); *H04N 21/440263* (2013.01); *H04N 2005/91328* (2013.01)

(56) References Cited

U.S. PATENT DOCUMENTS

| | | | |
|---|---|---|---|
| 2008/0052536 A1* | 2/2008 | Shimizu | H04N 21/4334 375/E7.009 |
| 2011/0157470 A1 | 6/2011 | Tsuruga et al. | |
| 2013/0230296 A1 | 9/2013 | Yun et al. | |
| 2016/0150180 A1* | 5/2016 | Kozuka | H04N 9/8042 386/254 |
| 2016/0163356 A1 | 6/2016 | De Haan et al. | |
| 2018/0302663 A1 | 10/2018 | Yoshizawa et al. | |

FOREIGN PATENT DOCUMENTS

| | | |
|---|---|---|
| JP | 2006-295344 A | 10/2006 |
| JP | 2009-076154 A | 4/2009 |
| JP | 2010-130600 A | 6/2010 |
| JP | 2010-141757 A | 6/2010 |
| JP | 2011-139191 A | 7/2011 |
| JP | 2012-029326 A | 2/2012 |
| JP | 2014-39285 A | 2/2014 |
| JP | 2016-82498 A | 5/2016 |
| JP | 2016-144072 A | 8/2016 |
| JP | 2016-528800 A | 9/2016 |
| WO | 2015/007910 A1 | 1/2015 |
| WO | 2015/194102 A1 | 12/2015 |

OTHER PUBLICATIONS

International Search Report of PCT/JP2017/030114 dated Nov. 21, 2017.
Japanese Office Action received in corresponding Japanese Application No. 2016-178172 dated Jan. 21, 2020.
Japanese Office Action received in corresponding Japanese Application No. 2016-177430 dated Jan. 21, 2020.
Japanese Office Action received in corresponding Japanese Application No. 2016-210678 dated Mar. 17, 2020.
Japanese Office Action received in corresponding Japanese Application No. 2020-124210 dated Nov. 10, 2020.
Japanese Office Action received in corresponding Japanese Application No. 2020-124205 dated Nov. 10, 2020.
Japanese Office Action received in corresponding Japanese Application No. 2020-136548 dated Nov. 17, 2020.
Japanese Office Action received in corresponding Japanese Application No. 2020-136549 dated Nov. 17, 2020.
Japanese Office Action received in corresponding Japanese Application No. 2016-178241 dated Nov. 17, 2020.
Japanese Office Action received in corresponding Japanese Application No. 2016-208361 dated Dec. 15, 2020.

* cited by examiner (*AU: ACCESS UNIT)

(*TMCC: Transmission and Multiplexing Configuration Control)

FIG. 5A

| Table Name | Outline of Function |
|---|---|
| Network Information Table for TLV (TLV-NIT) | Transmitting information that correlates information of a transmission path such as a modulation frequency with a broadcasting program in TLV packet transmission |
| Address Map Table (AMT) | Transmitting information that correlates a service identifier for identifying a broadcasting program number with an IP packet |
| Table Set by Provider | |

FIG. 5B

| Descriptor Name | Outline of Function |
|---|---|
| Service List Descriptor | Describing a list of sub-channels and types of the sub-channels |
| Satellite Delivery System Descriptor | Describing physical conditions for a satellite transmission path |
| System Management Descriptor | Distinguishing broadcasting and non-broadcasting |
| Network Name Descriptor | Describing a network name |
| Descriptor Set by Provider | |

FIG. 6A

| Message Name | Outline of Function |
|---|---|
| Package Access (PA) Message | Serving as an entry point for MMT-SI and transmitting MMT-SI table |
| M2 Section Message | Transmitting section extension format of MPEG-2 Systems |
| CA Message | Transmitting information related to conditional access method |
| M2 Short Section Message | Transmitting section short format of MPEG-2 Systems |
| Data Transmission Message | Transmitting a table related to data transmission |
| Message Set by Provider | |

*FIG. 6B*

| Table Name | Outline of Function |
|---|---|
| MMT Package Table (MPT) | Providing package configuration information such as a list of assets and locations thereof |
| Package List Table (PLT) | Presenting a list of IP data flows for transmitting PA messages of MMT packages provided as a broadcasting service, packet IDs, and IP data flows for transmitting IP services |
| Layout Configuration Table (LCT) | Correlating layout information for presentation with layout numbers |
| Entitlement Control Message (ECM) | Transmitting common information made up of program information (program data, a descrambling key, etc.) and control information |
| Entitlement Management Message (EMM) | Transmitting personal information including contract information of individual subscribers and a work key for decoding encoded common information |
| CA Table (MH) (Conditional Access Table) | Transmitting a descriptor related to conditional access method |
| Download Control Message (DCM) | Transmitting key-related information including a key for decoding a transmission path code for downloading |
| Download Management Message (DMM) | Transmitting key-related information including a download key for decoding encoded DCM |
| MH-Event Information Table (MH-EIT) | Transmitting program-related information such as program name, broadcasting date, and details of program |
| MH-Application Information Table (MH-AIT) | Transmitting dynamic control information related to application and additional information necessary for execution of the application |
| MH-Broadcaster Information Table (MH-BIT) | Providing information of broadcasters present on the network |
| MH-Software Download Trigger Table (MH-SDTT) | Transmitting download announcement information such as a service ID, schedule information, and the type of a receiver to be updated |
| MH-Service Description Table (MH-SDT) | Transmitting information related to a sub-channel such as the name of the sub-channel and the name of a broadcaster |
| MH-Time Offset Table (MH-TOT) | Transmitting current date/time and offset time between the actual time and display time to human system |
| MH-Common Data Table (MH-CDT) | Transmitting data such as logo mark of provider that is necessary for receivers in common and is assumed to be stored in a non-volatile memory |
| Data Directory Management (DDM) Table | Providing directory configuration of files making up an application |
| Data Asset Management (DAM) Table | Providing the configuration of MPU in an asset and version information of each MPU |
| Data Content Configuration (DCC) Table | Providing configuration information of files as data contents |
| Event Message Table (EMT) | Transmitting information related to event message |
| Table Set by Provider | |

FIG. 6C

| Descriptor Name | Outline of Function |
|---|---|
| Asset Group Descriptor | Providing a relation of an asset group and priority in the group |
| Event Package Descriptor | Providing the corresponding relation between an event representing a program and a package |
| Background Color Specifying Descriptor | Specifying the background color of the rearmost plane in layout specification |
| MPU Presentation Region Specifying Descriptor | Providing the location of presentation of MPU |
| MPU Timestamp Descriptor | Providing the time of presentation of MPU |
| Dependency Relation Descriptor | Providing asset IDs for assets dependent on each other |
| Access Control Descriptor | Identifying the conditional access method |
| Scramble Method Descriptor | Identifying a scramble subsystem |
| Message Authentication Method Descriptor | Identifying a message authentication method |
| Emergency Information Descriptor (MH) | Providing description of information and functions necessary as emergency warning signal |
| MH-MPEG-4 Audio Descriptor | Describing basic information for specifying coding parameters of an MPEG-4 audio stream |
| MH-MPEG-4 Audio Extension Descriptor | Describing a profile, level, and specific setting of coding method of an MPEG-4 audio stream |
| MH-HEVC Video Descriptor | Describing basic coding parameters for a video stream (HEVC stream) defined in ITU-T Recommendation H.265 and ISO/IEC 23008-2 |
| MH-Link Descriptor | Describing link with another sub-channel |
| MH-Event Group Descriptor | Describing information on grouping of a plurality of events |
| MH-Service List Descriptor | Describing a list of sub-channels and their types |
| MH-Short Format Event Descriptor | Describing a program name and a brief description of the program |
| MH-Extension Format Event Descriptor | Describing detailed information of a program |
| Video Component Descriptor | Describing parameters and descriptions for a video signal among program element signals |
| MH-Stream Identifying Descriptor | Identifying individual program element signals |
| MH-Content Descriptor | Describing the genre of a program |
| MH-Parental Rate Descriptor | Describing an age-based viewing restriction |
| MH-Audio Component Descriptor | Describing parameters for an audio signal among program element signals |
| MH-Target Area Descriptor | Describing a target area |
| MH-Series Descriptor | Describing series information across a plurality of events |
| MH-SI Transmission Parameter Descriptor | Describing SI transmission parameters (cycle group, retransmission cycle, etc.) |
| MH-Broadcaster Name Descriptor | Describing the name of a broadcaster |
| MH-Service Descriptor | Describing the name of a sub-channel and the name of a provider thereof |
| IP Data Flow Descriptor | Describing information of an IP data flow included in a service |

FIG. 6D

| Descriptor Name | Outline of Function |
|---|---|
| MH-CA Startup Descriptor | Describing information related to start of a CAS program having a conditional access function |
| MH-Type Descriptor | Indicating the type of a file transmitted by an application transmission method |
| MH-Info Descriptor | Describing information related to MPU or an item |
| MH-Expire Descriptor | Describing the expiration date of an item |
| MH-Compression Type Descriptor | Indicating a compression algorithm for an item to be transmitted in a compressed form and the number of bytes of the item before compression |
| MH-Data Coding Method Descriptor | Identifying a data coding method |
| UTC-NPT Reference Descriptor | Transmitting information of the relation between NPT and UTC |
| Event Message Descriptor | Transmitting general information related to event messages |
| MH-Local Time Offset Descriptor | Describing an offset time between the actual time (e.g., UTC + 9 hours) and display time to human system when a daylight saving time system is implemented |
| MH-Component Group Descriptor | Describing information on grouping of a plurality of components |
| MH-Logo Transmission Descriptor | Describing pointing to a character string for a simplified logo and a logo in a CDT format |
| MPU Extension Timestamp Descriptor | Providing a time to decode an access unit in MPU |
| MPU Download Contents Descriptor | Describing property information of contents downloaded using MPU |
| MH-Network Download Contents Descriptor | Describing property information of contents downloaded through network |
| MH-Application Descriptor | Describing information of an application |
| MH-Transmission Protocol Descriptor | Specifying a transmission protocol and describing location information of an application depending on the transmission protocol |
| MH-Simplified Application Location Descriptor | Describing the details of an acquisition source of an application |
| MH-Application Boundary Authority Setting Descriptor | Describing setting of an application boundary and setting of an authority for access to broadcasting resources for each region (URL) |
| MH-Startup Priority Information Descriptor | Describing the startup priority of an application |
| MH-Cache Information Descriptor | Describing information of cache control for saving resources making up an application in a cache |
| MH-Probability-Applied Delay Descriptor | Describing setting of a delay time by which the time of execution of application control is probabilistically delayed |
| Link Destination PU Descriptor | Describing information of a presentation unit to be link destination |
| Lock Cache Specifying Descriptor | Describing specification of a file to be cached and locked |
| Unlock Cache Specifying Descriptor | Describing specification of a file to be unlocked |
| Descriptor Set by Provider | |

FIG. 11A

| DATA STRUCTURE OF MH-TOT | NUMBER OF BITS | DATA NOTATION |
|---|---|---|
| MH-Time_Offset_Table(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     JST_time | 40 | bslbf |
|     reserved | 4 | bslbf |
|     descriptors_loop_length | 12 | uimsbf |
|     for(i=0; i<N; i++){ | | |
|         descriptor() | | |
|     } | | |
|     CRC_32 | 32 | rpchof |
| } | | |

FIG. 11B

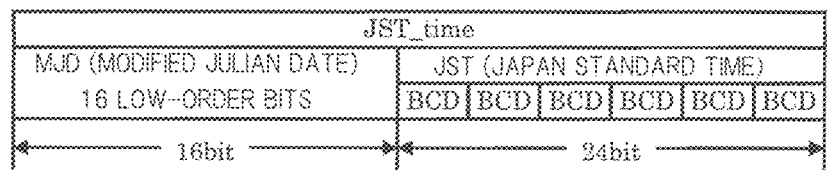

FIG. 12

FIRST CALCULATION METHOD (MJD IS EQUAL TO OR LARGER THAN 32768)

$Y' = int[(MJD - 15078.2) / 365.25]$
$M' = int\{[MJD - 14956.1 - int(Y' \times 365.25)] / 30.6001\}$
$D = MJD - 14956 - int(Y' \times 365.25) - int(M' \times 30.6001)$

BUT, WHEN M'=14 OR 15, K=1
      WHEN M'≠14 AND 15, K=0

$Y = Y' + K$
$M = M' - 1 - K \times 12$

Y: NUMBER OF YEARS COUNTED FROM YEAR OF 1900
M: MONTH
D: DAY

SECOND CALCULATION METHOD (MJD IS SMALLER THAN 32768)

$Y' = int[(MJD + 65536) - 15078.2) / 365.25]$
$M' = int\{[(MJD + 65536) - 14956.1 - int(Y' \times 365.25)] / 30.6001\}$
$D = (MJD + 65536) - 14956 - int(Y' \times 365.25) - int(M' \times 30.6001)$

BUT, WHEN M'=14 OR 15, K=1
      WHEN M'≠14 AND 15, K=0

$Y = Y' + K$
$M = M' - 1 - K \times 12$

Y: NUMBER OF YEARS COUNTED FROM YEAR OF 1900
M: MONTH
D: DAY

*FIG. 13A*

| CONFIGURATION OF NTP FORMAT | NUMBER OF BITS | DATA NOTATION |
|---|---|---|
| Network_Time_Protocol_Data(){ | | |
|     leap_indicator | 2 | uimsbf |
|     version | 3 | uimsbf |
|     mode | 3 | uimsbf |
|     stratum | 8 | uimsbf |
|     poll | 8 | uimsbf |
|     precision | 8 | uimsbf |
|     root_delay | 32 | uimsbf |
|     root_dispersion | 32 | uimsbf |
|     reference_identification | 32 | uimsbf |
|     reference_timestamp | 64 | uimsbf |
|     origin_timestamp | 64 | uimsbf |
|     receive_timestamp | 64 | uimsbf |
|     transmit_timestamp | 64 | uimsbf |
| } | | |

*FIG. 13B*

| DATA STRUCTURE OF MPU TIMESTAMP DESCRIPTOR | NUMBER OF BITS | DATA NOTATION |
|---|---|---|
| MPU_Timestamp_Descriptor(){ | | |
|     descriptor_tag | 16 | uimsbf |
|     descriptor_length | 8 | uimsbf |
|     for(i=0; i<N; i++){ | | |
|         mpu_sequence_number | 32 | uimsbf |
|         mpu_presentation_time | 64 | uimsbf |
|     } | | |
| } | | |

*FIG. 13C*

| DATA STRUCTURE OF TIME INFORMATION IN TMCC EXTENSION INFORMATION REGION | NUMBER OF BITS | DATA NOTATION |
|---|---|---|
| TMCC_Time_Information (){ | | |
|     reserved | 6 | bslbf |
|     common_time_indicator | 1 | bslbf |
|     extended_payload_indicator | 1 | bslbf |
|     if(common_time_indicator==0){ | | |
|         time_flag | 16 | bslbf |
|         for(i=0; i<16; i++){ | | |
|             delta | 32 | simsbf |
|             transmit_timestamp | 64 | uimsbf |
|         } | | |
|     } | | |
|     if(common_time_indicator==1){ | | |
|         reserved | 16 | bslbf |
|         delta | 32 | simsbf |
|         transmit_timestamp | 64 | uimsbf |
|     } | | |
|     next_extended_payload_indicator | 16 | uimsbf |
| } | | |

FIG. 15A

| DATA STRUCTURE OF TLV-NIT | NUMBER OF BITS | DATA NOTATION |
|---|---|---|
| TLV_Network_Information_Table(){ | | |
|     table_id | 8 | uimsbf |
|     section_syntax_indicator | 1 | bslbf |
|     '1' | 1 | bslbf |
|     '11' | 2 | bslbf |
|     section_length | 12 | uimsbf |
|     network_id | 16 | uimsbf |
|     '11' | 2 | bslbf |
|     version_number | 5 | uimsbf |
|     current_next_indicator | 1 | bslbf |
|     section_number | 8 | uimsbf |
|     last_section_number | 8 | uimsbf |
|     reserved_future_use | 4 | bslbf |
|     network_descriptors_length | 12 | bslbf |
|     for(i=0; i<N; i++){ | | |
|         descriptor() | | |
|     } | | |
|     reserved_future_use | 4 | bslbf |
|     TLV_stream_loop_length | 12 | uimsbf |
|     for(i=0; i<N; i++){ | | |
|         tlv_stream_id | 16 | uimsbf |
|         original_network_id | 16 | uimsbf |
|         reserved_future_use | 4 | bslbf |
|         tlv_stream_descriptors_length | 12 | uimsbf |
|         for(j=0; j<M; j++){ | | |
|             descriptor() | | |
|         } | | |
|     } | | |
|     CRC_32 | 32 | rpchof |
| } | | |

FIG. 15B

| DATA STRUCTURE OF SATELLITE DELIVERY SYSTEM DESCRIPTOR | NUMBER OF BITS | DATA NOTATION |
|---|---|---|
| Satellite_Delivery_System_Descriptor(){ | | |
|     descriptor_tag | 8 | uimsbf |
|     descriptor_length | 8 | uimsbf |
|     frequency | 32 | bslbf |
|     orbital_position | 16 | bslbf |
|     west_east_flag | 1 | bslbf |
|     polarisation | 2 | bslbf |
|     modulation | 5 | bslbf |
|     symbol_rate | 28 | bslbf |
|     FEC_inner | 4 | bslbf |
| } | | |

FIG. 15C

| DATA STRUCTURE OF SERVICE LIST DESCRIPTOR | NUMBER OF BITS | DATA NOTATION |
|---|---|---|
| Service_List_Descriptor(){ | | |
|     descriptor_tag | 8 | uimsbf |
|     descriptor_length | 8 | uimsbf |
|     for(i=0; i<N; i++){ | | |
|         service_id | 16 | uimsbf |
|         service_type | 8 | uimsbf |
|     } | | |
| } | | |

FIG. 15D

| DATA STRUCTURE OF AMT | NUMBER OF BITS | DATA NOTATION |
|---|---|---|
| Address_Map_Table(){ | | |
|     table_id | 8 | uimsbf |
|     section_syntax_indicator | 1 | bslbf |
|     '1' | 1 | bslbf |
|     '11' | 2 | bslbf |
|     section_length | 12 | uimsbf |
|     table_id_extension | 16 | uimsbf |
|     '11' | 2 | bslbf |
|     version_number | 5 | uimsbf |
|     current_next_indicator | 1 | bslbf |
|     section_number | 8 | uimsbf |
|     last_section_number | 8 | uimsbf |
|     num_of_service_id | 10 | uimsbf |
|     reserved_future_use | 6 | bslbf |
|     for(i=0; i<num_of_service_id; i++){ | | |
|         service_id | 16 | uimsbf |
|         ip_version | 1 | bslbf |
|         reserved_future_use | 5 | bslbf |
|         service_loop_length | 10 | uimsbf |
|         if(ip_version=='0'){ | | |
|             src_address_32 | 32 | bslbf |
|             src_address_mask_32 | 8 | uimsbf |
|             dst_address_32 | 32 | bslbf |
|             dst_address_mask_32 | 8 | uimsbf |
|         } | | |
|         else if(ip_version=='1'){ | | |
|             src_address_128 | 128 | bslbf |
|             src_address_mask_128 | 8 | uimsbf |
|             dst_address_128 | 128 | bslbf |
|             dst_address_mask_128 | 8 | uimsbf |
|         } | | |
|         for(j=0; j<M; j++){ | | |
|             private_data_byte | 8 | bslbf |
|         } | | |
|     } | | |
|     CRC_32 | 32 | rpchof |
| } | | |

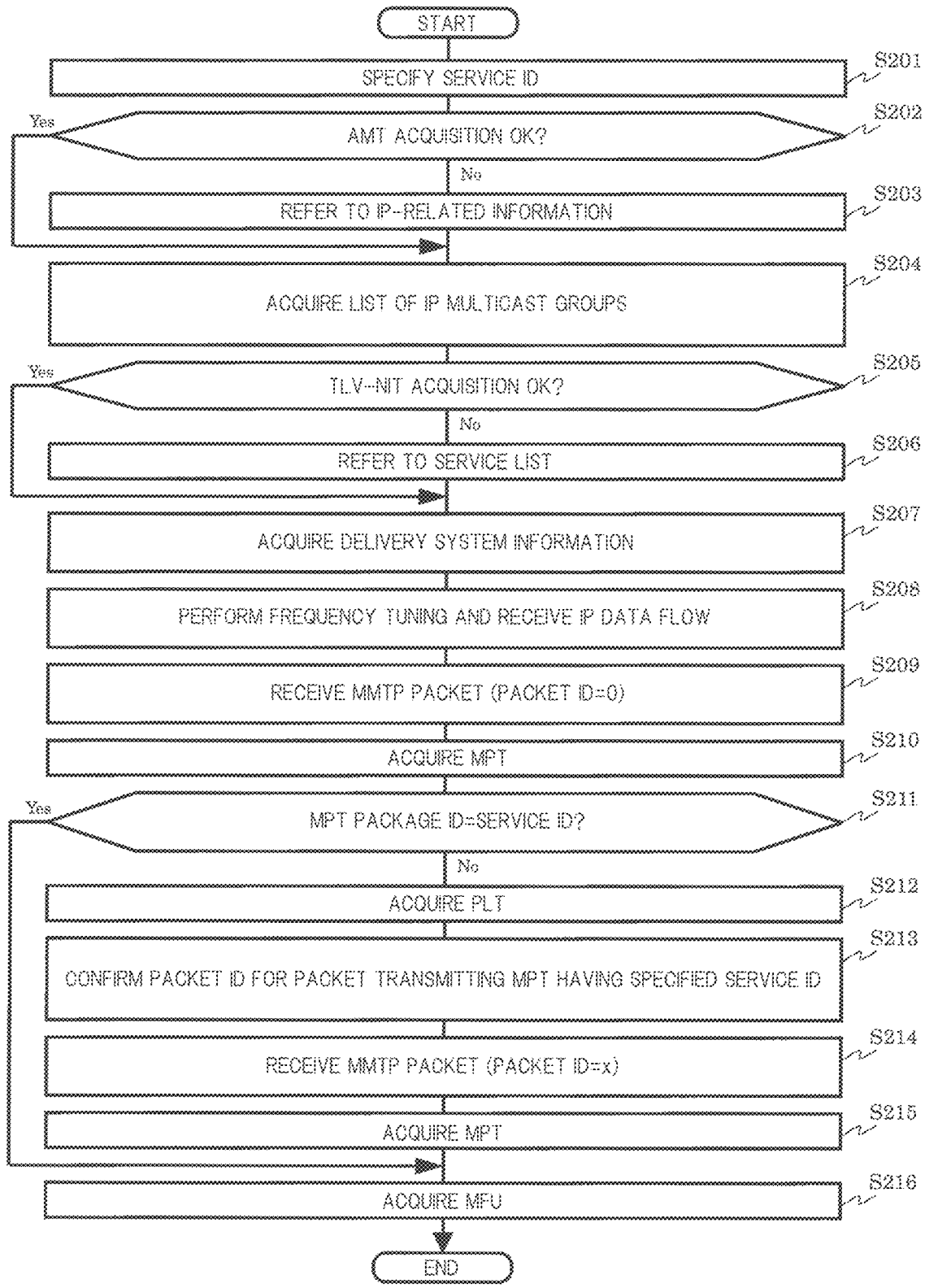

FIG. 17

| DATA STRUCTURE OF MPT | NUMBER OF BITS | DATA NOTATION |
|---|---|---|
| MMT_Package_Table(){ | | |
|     table_id | 8 | uimsbf |
|     version | 8 | uimsbf |
|     length | 16 | uimsbf |
|     reserved | 6 | bslbf |
|     MPT_mode | 2 | bslbf |
|     MMT_package_id_length | 8 | uimsbf |
|     for(i=0; i<N; i++){ | | |
|         MMT_package_id_byte | 8 | bslbf |
|     } | | |
|     MPT_descriptors_length | 16 | uimsbf |
|     for(i=0; i<N; i++){ | | |
|         MPT_descriptors_byte | 8 | bslbf |
|     } | | |
|     number_of_assets | 8 | uimsbf |
|     for(i=0; i<N; i++){ | | |
|         identifier_type | 8 | uimsbf |
|         asset_id_scheme | 32 | uimsbf |
|         asset_id_length | 8 | uimsbf |
|         for(j=0; j<M; j++){ | | |
|             asset_id_byte | 8 | uimsbf |
|         } | | |
|         asset_type | 32 | char |
|         reserved | 7 | bslbf |
|         asset_clock_relation_flag | 1 | bslbf |
|         location_count | 8 | uimsbf |
|         for(j=0; j<M; j++){ | | |
|             MMT_general_location_info() | | |
|         } | | |
|         asset_descriptors_length | 16 | uimsbf |
|         for(j=0; j<M; j++){ | | |
|             asset_descriptors_byte | 8 | bslbf |
|         } | | |
|     } | | |
| } | | |

FIG. 18

| DATA STRUCTURE OF LCT | NUMBER OF BITS | DATA NOTATION |
|---|---|---|
| Layout_Configuration_Table(){ | | |
|     table_id | 8 | uimsbf |
|     version | 8 | uimsbf |
|     length | 16 | uimsbf |
|     number_of_loop | 8 | uimsbf |
|     for(i=0; i<N; i++){ | | |
|         layout_number | 8 | uimsbf |
|         device_id | 8 | uimsbf |
|         number_of_region | 8 | uimsbf |
|         for(j=0; j<M; j++){ | | |
|             region_number | 8 | uimsbf |
|             left_top_pos_x | 8 | uimsbf |
|             left_top_pos_y | 8 | uimsbf |
|             right_down_pos_x | 8 | uimsbf |
|             right_down_pos_y | 8 | uimsbf |
|             layer_order | 8 | uimsbf |
|         } | | |
|     } | | |
|     descriptor() | | |
| } | | |

FIG. 19C

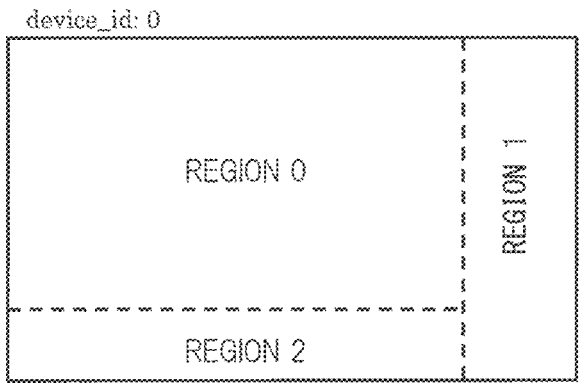

LAYOUT NUMBER: 2
(REGION 1 AND REGION 2 ARE IN FRONT OF REGION 0)

| number_of_loop | 1 |
|---|---|
| layout_number | 2 |
| device_id | 0 |
| number_of_region | 3 |
| region_number | 0 |
| left_top_pos_x | 0 |
| left_top_pos_y | 0 |
| right_down_pos_x | 100 |
| right_down_pos_y | 100 |
| layer_order | 0 |
| region_number | 1 |
| left_top_pos_x | 80 |
| left_top_pos_y | 0 |
| right_down_pos_x | 100 |
| right_down_pos_y | 100 |
| layer_order | 1 |
| region_number | 2 |
| left_top_pos_x | 0 |
| left_top_pos_y | 80 |
| right_down_pos_x | 80 |
| right_down_pos_y | 100 |
| layer_order | 1 |

FIG. 19D

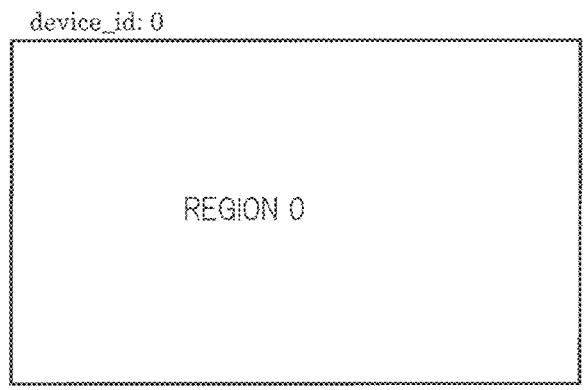

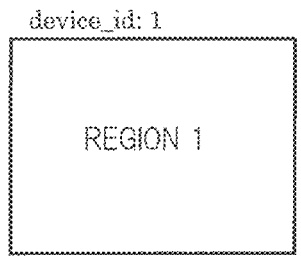

LAYOUT NUMBER: 3

| number_of_loop | 2 |
|---|---|
| layout_number | 3 |
| device_id | 0 |
| number_of_region | 1 |
| region_number | 0 |
| left_top_pos_x | 0 |
| left_top_pos_y | 0 |
| right_down_pos_x | 100 |
| right_down_pos_y | 100 |
| layer_order | 0 |
| layout_number | 3 |
| device_id | 1 |
| number_of_region | 1 |
| region_number | 1 |
| left_top_pos_x | 0 |
| left_top_pos_y | 0 |
| right_down_pos_x | 100 |
| right_down_pos_y | 100 |
| layer_order | 0 |

FIG. 21

| DATA STRUCTURE OF MH-EIT | NUMBER OF BITS | DATA NOTATION |
|---|---|---|
| MH-Event_Information_Table(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     service_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     tlv_stream_id | 16 | uimsbf |
|     original_network_id | 16 | uimsbf |
|     segment_last_section_number | 8 | uimsbf |
|     last_table_id | 8 | uimsbf |
|     for(i=0; i<N; i++){ | | |
|         event_id | 16 | uimsbf |
|         start_time | 40 | bslbf |
|         duration | 24 | uimsbf |
|         running_status | 3 | uimsbf |
|         free_CA_mode | 1 | bslbf |
|         descritors_loop_length | 12 | uimsbf |
|         for(j=0; j<M; j++){ | | |
|             descriptor() | | |
|         } | | |
|     } | | |
|     CRC_32 | 32 | rpchof |
| } | | |

FIG. 22C (A) WITH NETWORK CONNECTION (B) WITHOUT NETWORK CONNECTION

FIG. 23
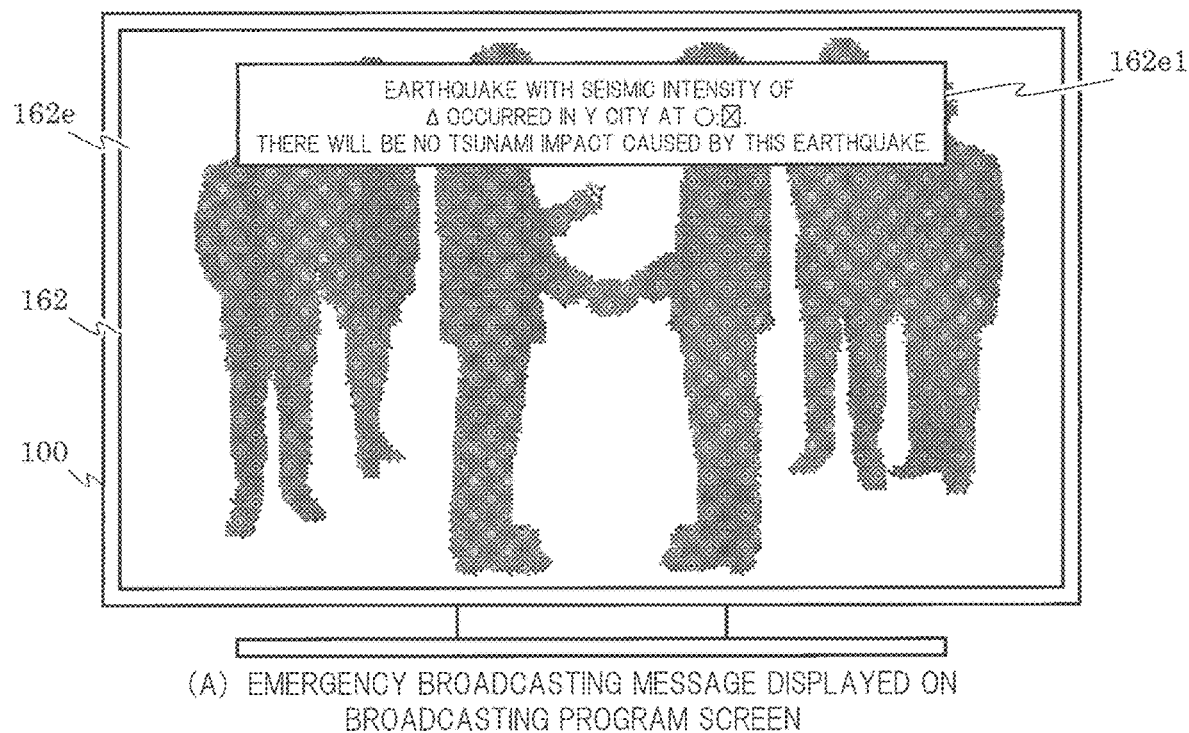
(A) EMERGENCY BROADCASTING MESSAGE DISPLAYED ON BROADCASTING PROGRAM SCREEN
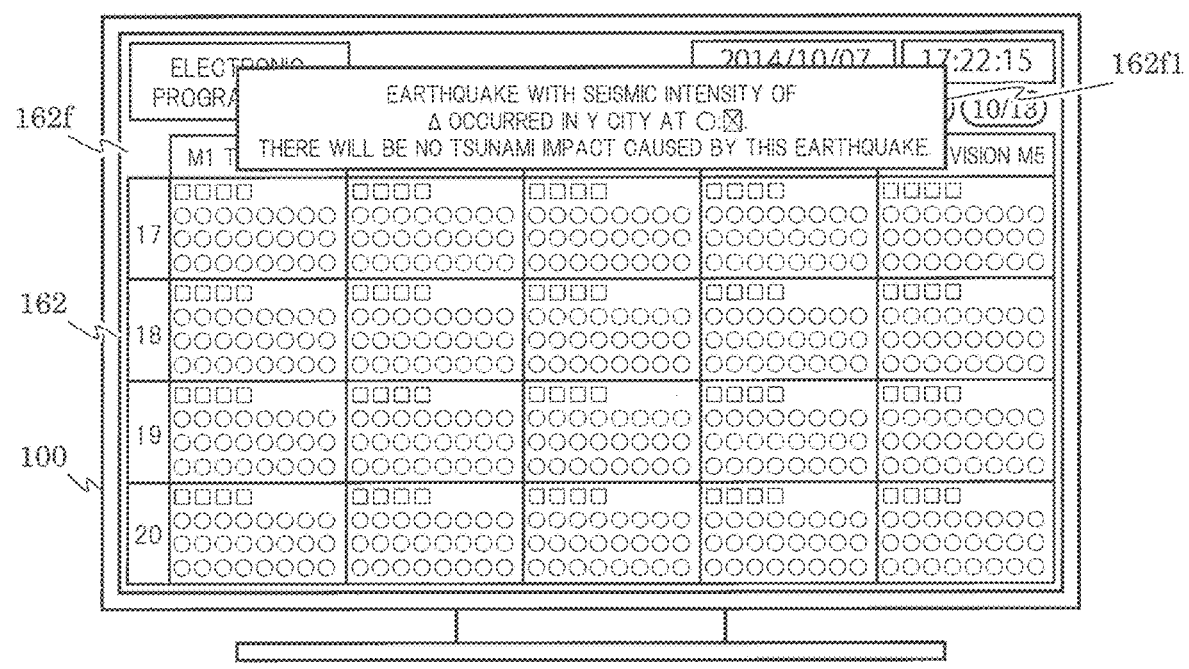
(B) EMERGENCY BROADCASTING MESSAGE DISPLAYED ON EPG SCREEN FIG. 25
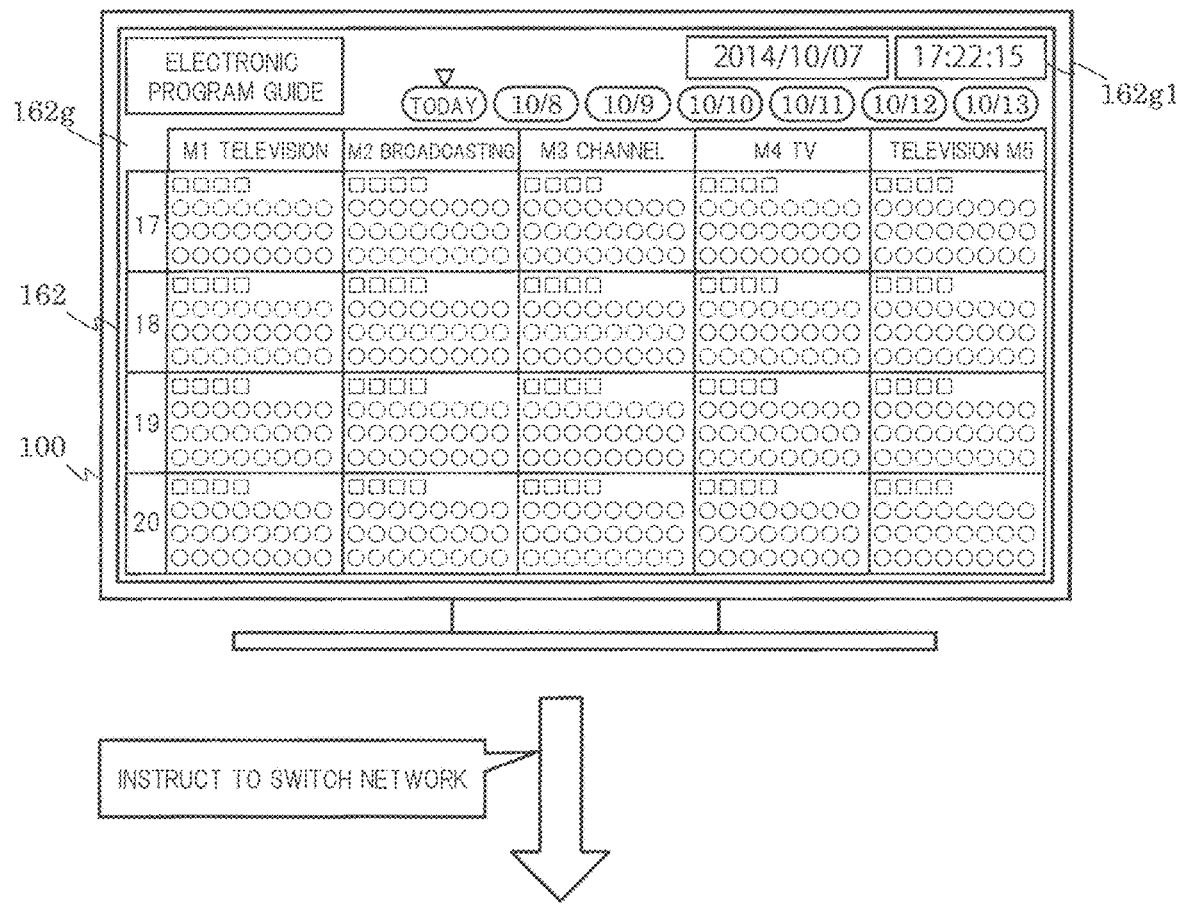
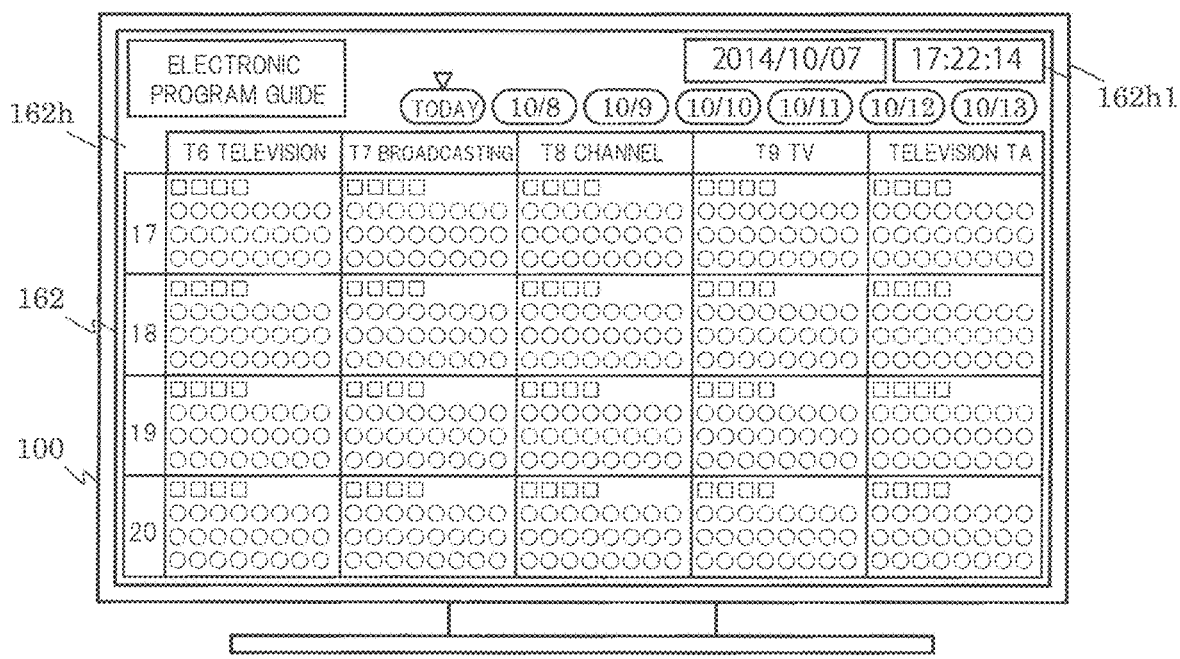

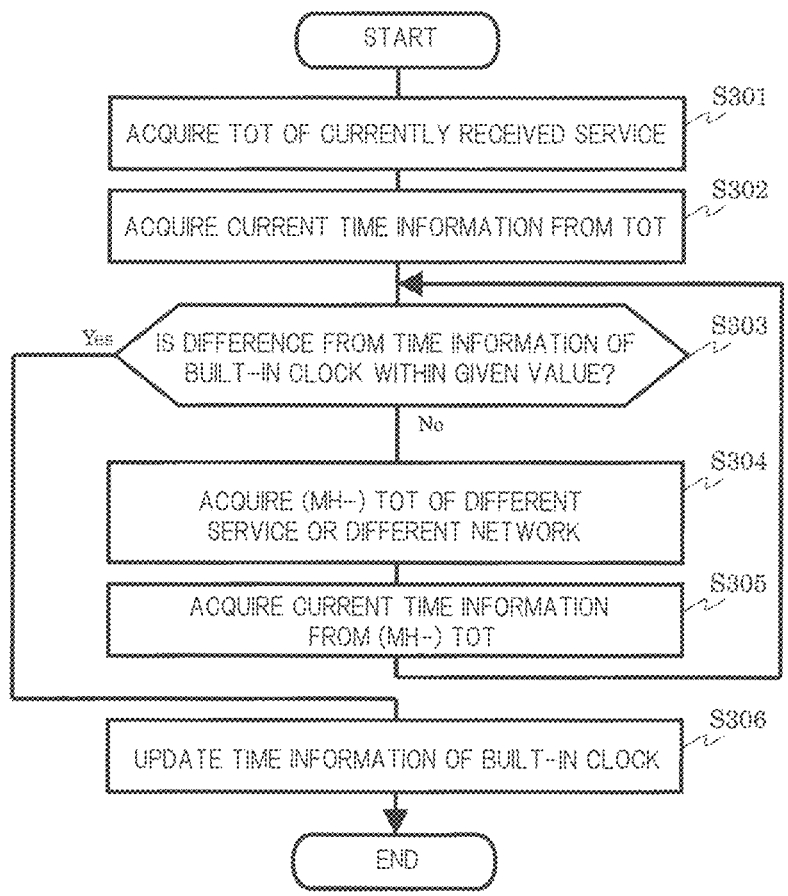

FIG. 27A
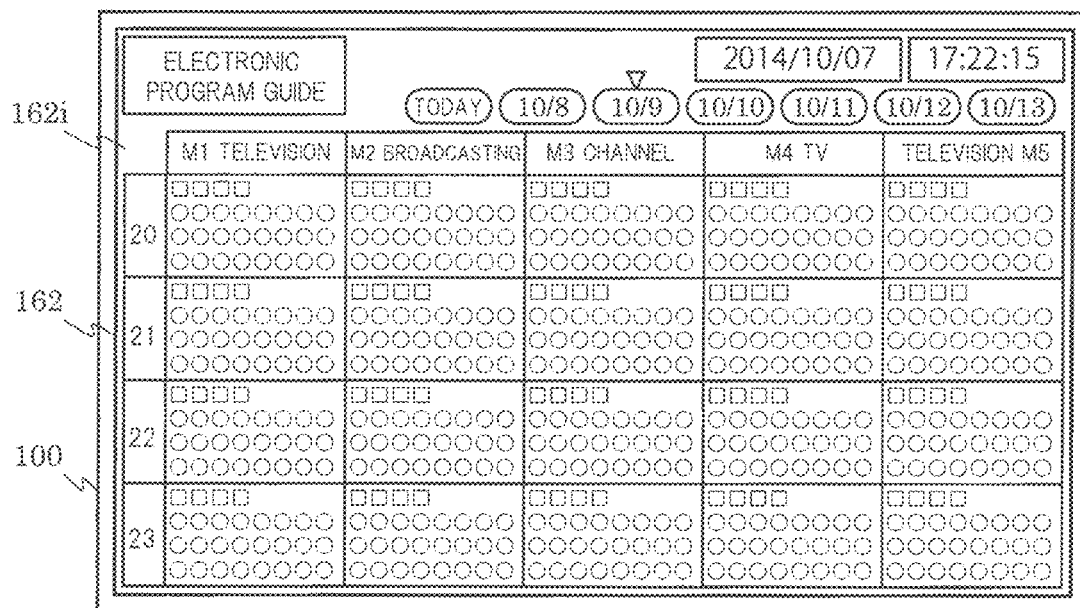
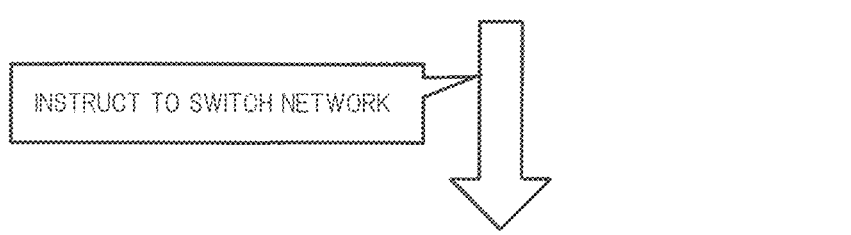
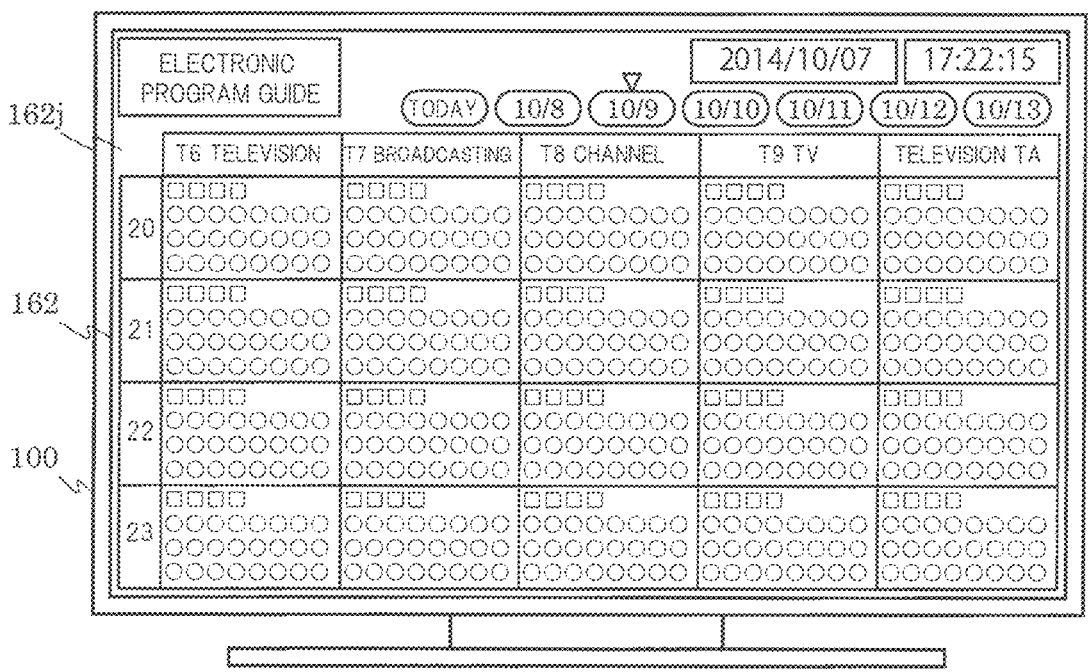

| DATA STRUCTURE OF CONTENTS INFORMATION DESCRIPTOR | NUMBER OF BITS | DATA NOTATION |
|---|---|---|
| Content_Information_Descriptor(){ | | |
|     descriptor_tag | 16 | uimsbf |
|     descriptor_length | 8 | uimsbf |
|     component_tag | 16 | uimsbf |
|     reserved_future_use | 4 | bslbf |
|     content_type | 4 | uimsbf |
|     '111111' | 6 | bslbf |
|     source_primaries_rx | 10 | uimsbf |
|     '111111' | 6 | bslbf |
|     source_primaries_ry | 10 | uimsbf |
|     '111111' | 6 | bslbf |
|     source_primaries_gx | 10 | uimsbf |
|     '111111' | 6 | bslbf |
|     source_primaries_gy | 10 | uimsbf |
|     '111111' | 6 | bslbf |
|     source_primaries_bx | 10 | uimsbf |
|     '111111' | 6 | bslbf |
|     source_primaries_by | 10 | uimsbf |
|     '11' | 2 | bslbf |
|     source_white_point_x | 14 | uimsbf |
|     '11' | 2 | bslbf |
|     source_white_point_y | 14 | uimsbf |
|     source_luminance_max | 16 | uimsbf |
|     source_luminance_min | 16 | uimsbf |
|     if(content_type==0 \|\| content_type==1){ | | |
|         num_of_scene | 8 | uimsbf |
|         for(i==0; i<num_of_scene; i++){ | | |
|             scene_start_time | 40 | bslbf |
|             scene_duration | 24 | uimsbf |
|             max_light_level_of_content | 16 | uimsbf |
|             max_frame_ave_light_level | 16 | uimsbf |
|         } | | |
|     } | | |
|     else if(content_type==2 \|\| content_type==3){ | | |
|         max_light_level_of_frame | 16 | uimsbf |
|         frame_average_light_level | 16 | uimsbf |
|     } | | |
|     reserved_future_use | 4 | bslbf |
|     EOTF_identification | 4 | uimsbf |
| } | | |

FIG. 29B

| content_type | MEANING |
|---|---|
| 0 | VIDEO REPRODUCTION (RECORDED PROGRAM, ETC.) |
| 1 | VIDEO REPRODUCTION (RECORDED PROGRAM, ETC.) COMPATIBLE WITH HDR |
| 2 | CAMERA OUTPUT (LIVE BROADCASTING PROGRAM, ETC.) |
| 3 | CAMERA OUTPUT (LIVE BROADCASTING PROGRAM, ETC.) COMPATIBLE WITH HDR |
| 4-15 | RESERVE FOR FUTURE USE |

| EOTF_identification | MEANING |
|---|---|
| 0 | BT.709 (8 bits) |
| 1 | RESERVE FOR FUTURE USE |
| 2 | BT.2020 (10 bits) |
| 3 | BT.2020 (12 bits) |
| 4 | SMPTE2084 (12 bits) |
| 5-15 | RESERVE FOR FUTURE USE |

FIG. 32

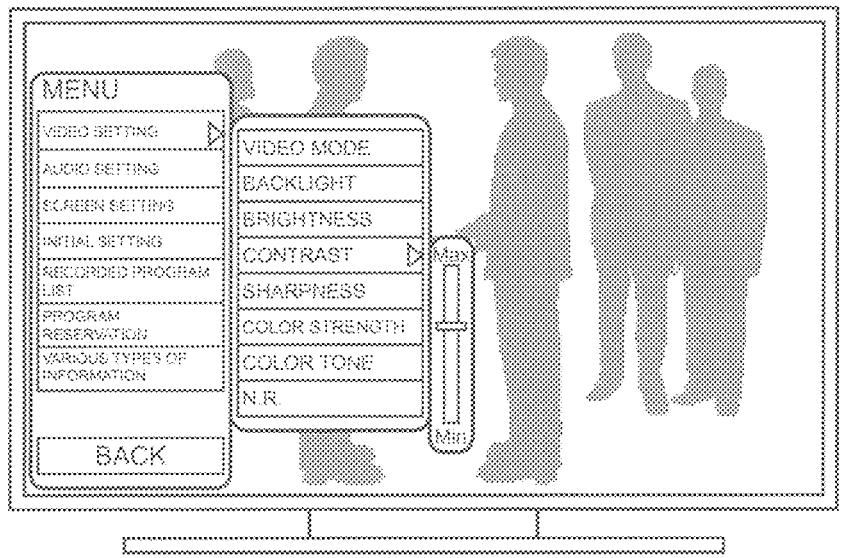

FIG. 33A

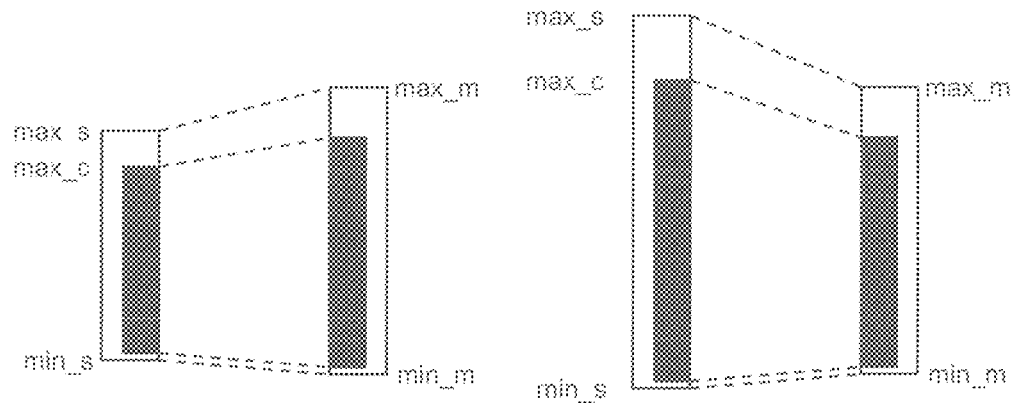

max_s: MAXIMUM LUMINANCE OF SOURCE EQUIPMENT (source_luminance_max)
min_s: MINIMUM LUMINANCE OF SOURCE EQUIPMENT (source_luminance_min)
max_c: MAXIMUM LIGHT LEVEL OF CONTENTS (max_light_level_of_content)
max_m: MAXIMUM LUMINANCE OF BROADCAST RECEIVING APPARATUS
 (MONITOR UNIT)
min_m: MINIMUM LUMINANCE OF BROADCAST RECEIVING APPARATUS
 (MONITOR UNIT)

WHITE RECTANGLE: LUMINANCE REPRESENTATION RANGE OF SOURCE
 EQUIPMENT / BROADCAST RECEIVING APPARATUS
 (MONITOR UNIT)
BLACK RECTANGLE: LUMINANCE REPRESENTATION RANGE OF VIDEO CONTENTS

- source_primaries_R[x,y], G[x,y], B[x,y]
- white_point_x, y
- max_source_mastering_luminance    ( in units of 1 cd/m²    Max 65,535 cd/m² )
- min_source_mastering_luminance    ( in units of 0.0001 cd/m²  Max 6.5535 cd/m² )
- Maximum_Content_Light_Level       ( in units of 1 cd/m²    Max 65,535 cd/m² )
- Maximum_Frame-average_Light_Level ( in units of 1 cd/m²    Max 65,535 cd/m² )
- Light Level Status

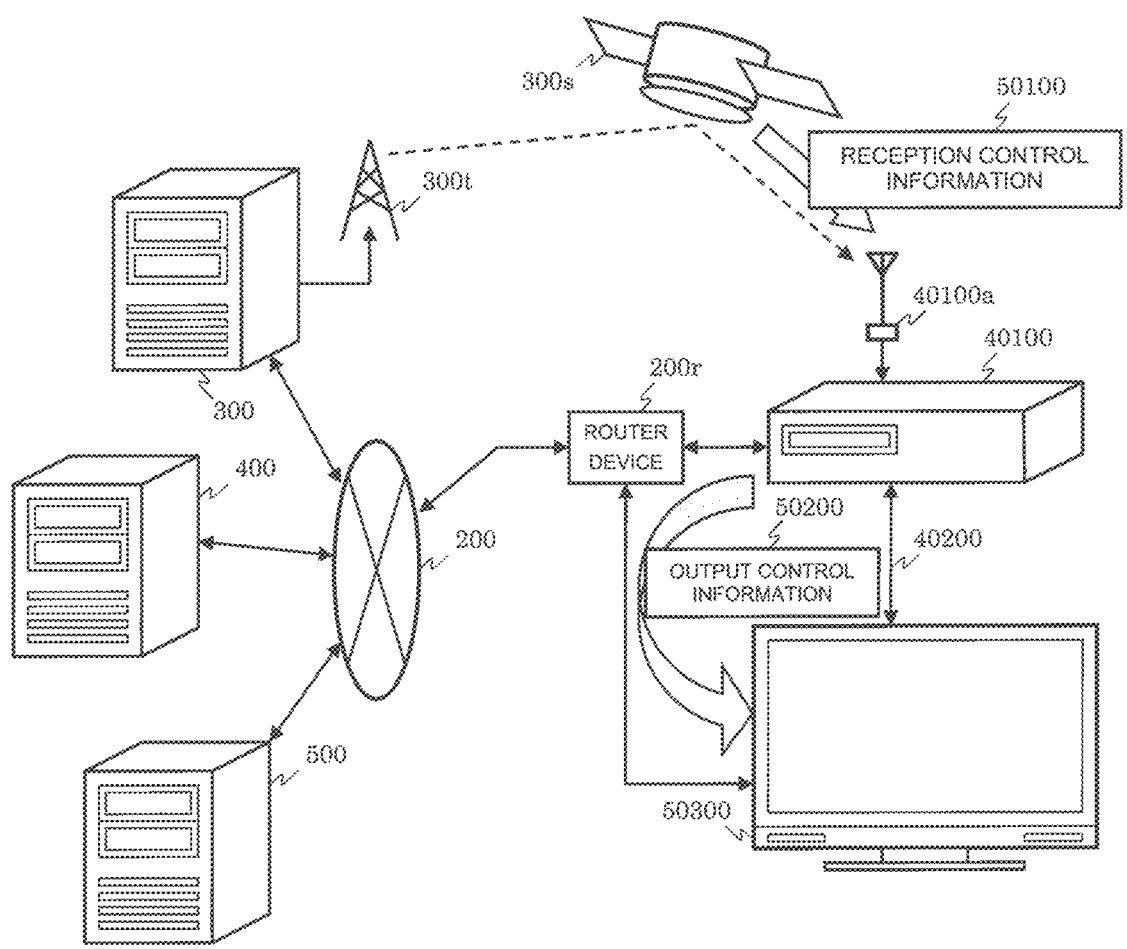

FIG. 39

| OUTPUT CONTROL INFORMATION | VALUE AND MEANING OF FLAGS |
|---|---|
| "L2-Only" Flag | "0": Indicating that any contents protection including DTCP-IP (L1 level contents protection) and DTCP2 (L2 level contents protection) can be applied. |
| | "1": Indicating that contents protection (e.g., L2 level contents protection such as DTCP2) with higher level than that of DTCP-IP (L1 level contents protection) is required. |
| "EI" Flag | "0": Indicating that contents are "Non-Enhanced Image". |
| | "1": Indicating that contents are "Enhanced Image". |
| | Here, "Enhanced Image" means contents that have video in which pixel number exceeds 1920 x 1080 or which has a color space (e.g., HDR such as BT.2020 and SMPTE2084) exceeding a color space of HD level (SDR such as BT.709). |
| | Here, "Non-Enhanced Image" means contents that have video with HD video quality or less (e.g., video in which pixel number is 1920 x 1080 or less and video has color space of HD level (SDR such as BT.709)). |
| "HDR" Flag | "0": Indicating contents of video that may be converted from HDR to SDR. |
| | "1": Indicating contents of video for which conversion from HDR to SDR is inhibited. |
| "SDO" Flag (Abbreviation of Standard Digital Output) | "0": Indicating that only with L2 level contents protection the contents can be re-outputted in case of "Enhanced Image", but the contents can be re-outputted with L1 level contents protection in a case where "Enhanced Image" is converted into "Non-Enhanced Image". |
| | "1": Indicating that both L1 level contents protection and L2 level contents protection can re-output regardless of whether contents are "Enhanced Image" or "Non-Enhanced Image". |

FIG. 40

| DESCRIPTOR NAME | OUTLINE OF FUNCTION |
|---|---|
| CONTENTS COPY CONTROL DESCRIPTOR | Indicating control information regarding digital copy of contents or maximum transmission rate. |
| CONTENTS USAGE CONTROL DESCRIPTOR | Describing control information regarding storage and output of contents. |

FIG. 41A

| DATA STRUCTURE OF CONTENTS COPY CONTROL DESCRIPTOR | NUMBER OF BITS | DATA NOTATION |
|---|---|---|
| Content_Copy_Control_Descriptor(){ | | |
|     descriptor_tag | 16 | uimsbf |
|     descriptor_length | 8 | uimsbf |
| | | |
|     digital_recording_control_data | 2 | bslbf |
|     maximum_bit_rate_flag | 1 | bslbf |
|     component_control_flag | 1 | bslbf |
|     reserved_future_use | 4 | bslbf |
|     reserved_future_use | 8 | bslbf |
| | | |
|     if(maximum_bit_rate_flag==1){ | | |
|         maximum_bitrate | 8 | uimsbf |
|     } | | |
|     if(component_control_flag==1){ | | |
|         component_control_length | 8 | uimsbf |
|         for(i=0; i<N; i++){ | | |
|             component_tag | 16 | uimsbf |
|             digital_recording_control_data | 2 | bslbf |
|             maximum_bitrate_flag | 1 | bslbf |
|             reserved_future_use | 5 | bslbf |
|             reserved_future_use | 8 | bslbf |
| | | |
|             if(maximum_bitrate_flag==1){ | | |
|                 maximum_bitrate | 8 | uimsbf |
|             } | | |
|         } | | |
|     } | | |
| } | | |

FIG. 41B

| DIGITAL COPY CONTROL INFORMATION | MEANING |
|---|---|
| 00 | COPIABLE WITHOUT ANY CONSTRAINT CONDITION |
| 01 | PROVIDER DEFINITION |
| 10 | COPIABLE ONLY FOR ONE GENERATION |
| 11 | COPY PROHIBITION |

FIG. 42

| DATA STRUCTURE OF CONTENTS USAGE CONTROL DESCRIPTOR | NUMBER OF BITS | DATA NOTATION |
|---|---|---|
| Content_Usage_Control_Descriptor(){ | | |
|     descriptor_tag | 16 | uimsbf |
|     descriptor_length | 8 | uimsbf |
|     remote_view_mode | 1 | bslbf |
|     copy_restriction_mode | 1 | bslbf |
|     image_constraint_token | 1 | bslbf |
|     reserved_future_use | 5 | bslbf |
|     reserved_future_use | 3 | bslbf |
|     retention_mode | 1 | bslbf |
|     retention_state | 3 | bslbf |
|     encryption_mode | 1 | bslbf |
|     for(i=0; i<N; i++){ | | |
|         reserved_future_use | 8 | bslbf |
|     } | | |
| } | | |

FIG. 43

| COMBINATION | RECEPTION CONTROL INFORMATION | | | | IP INTERFACE OUTPUT CONTROL | | | | | | |
|---|---|---|---|---|---|---|---|---|---|---|---|
| | DIGITAL COPY CONTROL INFORMATION digital_recording_control_data | CONTENTS USAGE CONTROL DESCRIPTOR encryption_mode | VIDEO RESOLUTION | TRANSMISSION CHARACTERISTICS (EOTF) IDENTIFICATION INFORMATION | TYPE OF CONTENTS PROTECTION | COPY CONTROL STATE | ENCRYPTION STATE | OUTPUT CONTROL INFORMATION WHEN TO PROTECT BY DTCP2 | | | |
| | | | | | | | | "L2-Only" Flag | "B" Flag | "HDR" Flag | "SDO" Flag |
| 1 | COPIABLE WITHOUT ANY CONSTRAINT CONDITION | NOT PROTECT | CONTENTS WITH OVER 2K OR 2K OR LESS | HDR/SDR | PROTECTION NOT REQUIRED (DTCP1/2 PERMISSION) | COPY FREE IN CASE OF DTCP1/2 | NONE | (0 IN CASE OF DTCP2) | (0 OR 1 IN CASE OF DTCP2) | (0 IN CASE OF DTCP2) | (1 IN CASE OF DTCP2) |
| 2 | COPIABLE WITHOUT ANY CONSTRAINT CONDITION | PROTECT | CONTENTS WITH OVER 2K | HDR | DTCP2 | EPN (ENCRYPTION STATE) | ENCRYPTION | 0 | 1 | 0 | 0 |
| 3 | COPIABLE WITHOUT ANY CONSTRAINT CONDITION | PROTECT | CONTENTS WITH 2K OR LESS | HDR | DTCP2 | EPN (ENCRYPTION STATE) | ENCRYPTION | 0 | 1 | 0 | 0 |
| 4 | COPIABLE WITHOUT ANY CONSTRAINT CONDITION | PROTECT | CONTENTS WITH OVER 2K | SDR | DTCP2 | EPN (ENCRYPTION STATE) | ENCRYPTION | 0 | 1 | - | 0 |
| 5 | COPIABLE WITHOUT ANY CONSTRAINT CONDITION | PROTECT | CONTENTS WITH 2K OR LESS | SDR | DTCP1 | EPN (ENCRYPTION STATE) | ENCRYPTION | - | - | - | - |
| 6 | COPIABLE ONLY FOR ONE GENERATION | PROTECT OR NOT | CONTENTS WITH OVER 2K | HDR | DTCP2 | Copy One Generation | ENCRYPTION | 0 | 1 | 0 | 0 |
| 7 | COPIABLE ONLY FOR ONE GENERATION | PROTECT OR NOT | CONTENTS WITH 2K OR LESS | HDR | DTCP2 | Copy One Generation | ENCRYPTION | 0 | 1 | 0 | 0 |
| 8 | COPIABLE ONLY FOR ONE GENERATION | PROTECT OR NOT | CONTENTS WITH OVER 2K | SDR | DTCP2 | Copy One Generation | ENCRYPTION | 0 | 1 | - | 0 |
| 9 | COPIABLE ONLY FOR ONE GENERATION | PROTECT OR NOT | CONTENTS WITH 2K OR LESS | SDR | DTCP1 | Copy One Generation | ENCRYPTION | - | - | - | - |
| 10 | COPY PROHIBITION | PROTECT OR NOT | CONTENTS WITH OVER 2K | HDR | DTCP2 | Copy Never | ENCRYPTION | 0 | 1 | 0 | 0 |
| 11 | COPY PROHIBITION | PROTECT OR NOT | CONTENTS WITH 2K OR LESS | HDR | DTCP2 | Copy Never | ENCRYPTION | 0 | 1 | 0 | 0 |
| 12 | COPY PROHIBITION | PROTECT OR NOT | CONTENTS WITH OVER 2K | SDR | DTCP2 | Copy Never | ENCRYPTION | 0 | 1 | - | 0 |
| 13 | COPY PROHIBITION | PROTECT OR NOT | CONTENTS WITH 2K OR LESS | SDR | DTCP1 | Copy Never | ENCRYPTION | - | - | - | - |

FIG. 44

| COMBINATION | RECEPTION CONTROL INFORMATION | | CONVERTING PROCESS IN RECEIVER | | | IP INTERFACE OUTPUT CONTROL | | | | | |
|---|---|---|---|---|---|---|---|---|---|---|---|
| | DIGITAL COPY CONTROL INFORMATION digital_recording_control_data | CONTENTS USAGE CONTROL DESCRIPTOR encryption_mode | VIDEO RESOLUTION AFTER CONVERSION | TRANSMISSION CHARACTERISTICS (EOTF) IDENTIFICATION INFORMATION | TYPE OF CONTENTS PROTECTION | COPY CONTROL STATE | ENCRYPTION STATE | OUTPUT CONTROL INFORMATION WHEN TO PROTECT BY DTCP2 | | | |
| | | | | | | | | "L2-Only" Flag | "0" Flag | "HDR" Flag | "SDO" Flag |
| 1 | COPIABLE WITHOUT ANY CONSTRAINT CONDITION | NOT PROTECT | CONTENTS WITH OVER 2K OR 2K OR LESS | HDR/SDR | PROTECTION NOT REQUIRED (DTCP1/2 PERMISSION) | (COPY FREE IN CASE OF DTCP1/2) | NONE | (0 IN CASE OF DTCP2) | (0 OR 1 IN CASE OF DTCP2) | (0 IN CASE OF DTCP2) | (1 IN CASE OF DTCP2) |
| 2 | COPIABLE WITHOUT ANY CONSTRAINT CONDITION | PROTECT | CONTENTS WITH OVER 2K | HDR | DTCP2 | EPN (ENCRYPTION STATE) | ENCRYPTION | 0 | 1 | 0 | 0 |
| 3 | COPIABLE WITHOUT ANY CONSTRAINT CONDITION | PROTECT | CONTENTS WITH 2K OR LESS | HDR | DTCP2 | EPN (ENCRYPTION STATE) | ENCRYPTION | 0 | 1 | 0 | 0 |
| 4 | COPIABLE WITHOUT ANY CONSTRAINT CONDITION | PROTECT | CONTENTS WITH OVER 2K | SDR | DTCP2 | EPN (ENCRYPTION STATE) | ENCRYPTION | 0 | 1 | - | 0 |
| 5 | COPIABLE WITHOUT ANY CONSTRAINT CONDITION | PROTECT | CONTENTS WITH 2K OR LESS | SDR | DTCP1 | EPN (ENCRYPTION STATE) | ENCRYPTION | - | - | - | - |
| 6 | COPIABLE ONLY FOR ONE GENERATION | PROTECT OR NOT | CONTENTS WITH OVER 2K | HDR | DTCP2 | Copy One Generation | ENCRYPTION | 0 | 1 | 0 | 0 |
| 7 | COPIABLE ONLY FOR ONE GENERATION | PROTECT OR NOT | CONTENTS WITH 2K OR LESS | HDR | DTCP2 | Copy One Generation | ENCRYPTION | 0 | 1 | 0 | 0 |
| 8 | COPIABLE ONLY FOR ONE GENERATION | PROTECT OR NOT | CONTENTS WITH OVER 2K | SDR | DTCP2 | Copy One Generation | ENCRYPTION | 0 | 1 | - | 0 |
| 9 | COPIABLE ONLY FOR ONE GENERATION | PROTECT OR NOT | CONTENTS WITH 2K OR LESS | SDR | DTCP1 | Copy One Generation | ENCRYPTION | - | - | - | - |
| 10 | COPY PROHIBITION | PROTECT OR NOT | CONTENTS WITH OVER 2K | HDR | DTCP2 | Copy Never | ENCRYPTION | 0 | 1 | 0 | 0 |
| 11 | COPY PROHIBITION | PROTECT OR NOT | CONTENTS WITH 2K OR LESS | HDR | DTCP2 | Copy Never | ENCRYPTION | 0 | 1 | 0 | 0 |
| 12 | COPY PROHIBITION | PROTECT OR NOT | CONTENTS WITH OVER 2K | SDR | DTCP2 | Copy Never | ENCRYPTION | 0 | 1 | - | 0 |
| 13 | COPY PROHIBITION | PROTECT OR NOT | CONTENTS WITH 2K OR LESS | SDR | DTCP1 | Copy Never | ENCRYPTION | - | - | - | - |

FIG. 45A

| COMBINATION | RECEPTION CONTROL INFORMATION | | | OUTPUT-TIME STATE | | | IP INTERFACE OUTPUT CONTROL | | OUTPUT CONTROL INFORMATION WHEN TO PROTECT BY DTCP2 | | | |
|---|---|---|---|---|---|---|---|---|---|---|---|---|
| | DIGITAL COPY CONTROL INFORMATION digital_recording_control_data | CONTENTS USAGE CONTROL DESCRIPTOR encryption_mode | CONTENTS USAGE CONTROL DESCRIPTOR copy_restriction_mode | ACCUMULATION CONTROL STATE | VIDEO RESOLUTION AT OUTPUT | TRANSMISSION CHARACTERISTICS AT OUTPUT | TYPE OF CONTENTS PROTECTION | COPY CONTROL STATE | ENCRYPTION STATE | "L2-Only" Flag | "EI" Flag | "HDR" Flag | "SDO" Flag |
| 1 | COPIABLE WITHOUT ANY CONSTRAINT CONDITION | NOT PROTECT | Don't Care | ACCUMULATE WITHOUT RESTRICTION OF COPY AND NOT PROTECT encryption_mode | CONTENTS WITH OVER 2K OR 2K OR LESS | HDR/SDR | PROTECTION NOT REQUIRED (DTCP1/2 PERMISSION) | (COPY FREE IN CASE OF DTCP1/2) | NONE | (0 IN CASE OF DTCP2) | (0 OR 1 IN CASE OF DTCP2) | (0 IN CASE OF DTCP2) | (1 IN CASE OF DTCP2) |
| 2 | COPIABLE WITHOUT ANY CONSTRAINT CONDITION | PROTECT | Don't Care | ACCUMULATE WITHOUT RESTRICTION OF COPY AND PROTECT encryption_mode | CONTENTS WITH OVER 2K | HDR | DTCP2 | EPN (ENCRYPTION STATE) | ENCRYPTION | 0 | 1 | 0 | 0 |
| 3 | COPIABLE WITHOUT ANY CONSTRAINT CONDITION | PROTECT | Don't Care | ACCUMULATE WITHOUT RESTRICTION OF COPY AND PROTECT encryption_mode | CONTENTS WITH 2K OR LESS | HDR | DTCP2 | EPN (ENCRYPTION STATE) | ENCRYPTION | 0 | 1 | 0 | 0 |
| 4 | COPIABLE WITHOUT ANY CONSTRAINT CONDITION | PROTECT | Don't Care | ACCUMULATE WITHOUT RESTRICTION OF COPY AND PROTECT encryption_mode | CONTENTS WITH OVER 2K | SDR | DTCP2 | EPN (ENCRYPTION STATE) | ENCRYPTION | 0 | 1 | - | 0 |
| 5 | COPIABLE WITHOUT ANY CONSTRAINT CONDITION | PROTECT | Don't Care | ACCUMULATE WITHOUT RESTRICTION OF COPY AND PROTECT encryption_mode | CONTENTS WITH 2K OR LESS | SDR | DTCP1 | EPN (ENCRYPTION STATE) | ENCRYPTION | - | - | - | - |

FIG. 45B

| COMBINATION | RECEPTION CONTROL INFORMATION | | | OUTPUT-TIME STATE | | | IP INTERFACE OUTPUT CONTROL | | OUTPUT CONTROL INFORMATION WHEN TO PROTECT BY DTCP2 | | | |
|---|---|---|---|---|---|---|---|---|---|---|---|---|
| | DIGITAL COPY CONTROL INFORMATION digital_recording_control_data | CONTENTS USAGE CONTROL DESCRIPTOR encryption_mode | CONTENTS USAGE CONTROL DESCRIPTOR copy_restriction_mode | ACCUMULATION CONTROL STATE | VIDEO RESOLUTION AT OUTPUT | TRANSMISSION CHARACTERISTICS AT OUTPUT | TYPE OF CONTENTS PROTECTION | COPY CONTROL STATE | ENCRYPTION STATE | "L2-Only" Flag | "EI" Flag | "HDR" Flag | "SDO" Flag |
| 6 | COPIABLE ONLY FOR ONE GENERATION | PROTECT OR NOT | COPIABLE ONLY FOR ONE GENERATION | RE-COPY PROHIBITION | CONTENTS WITH OVER 2K | HDR | DTCP2 | When to output and view: No More Copies / When to move: Move | ENCRYPTION | 0 | 1 | 0 | 0 |
| 7 | COPIABLE ONLY FOR ONE GENERATION | PROTECT OR NOT | COPIABLE ONLY FOR ONE GENERATION | RE-COPY PROHIBITION | CONTENTS WITH 2K OR LESS | HDR | DTCP2 | When to output and view: No More Copies / When to move: Move | ENCRYPTION | 0 | 1 | 0 | 0 |
| 8 | COPIABLE ONLY FOR ONE GENERATION | PROTECT OR NOT | COPIABLE ONLY FOR ONE GENERATION | RE-COPY PROHIBITION | CONTENTS WITH OVER 2K | SDR | DTCP2 | When to output and view: No More Copies / When to move: Move | ENCRYPTION | 0 | 1 | 0 | 0 |
| 9 | COPIABLE ONLY FOR ONE GENERATION | PROTECT OR NOT | COPIABLE ONLY FOR ONE GENERATION | RE-COPY PROHIBITION | CONTENTS WITH 2K OR LESS | SDR | DTCP1 | When to output and view: No More Copies / When to move: Move | ENCRYPTION | 1 | – | – | – |

FIG. 45C

| COMBINATION | RECEPTION CONTROL INFORMATION | | | OUTPUT-TIME STATE | | | | | OUTPUT CONTROL INFORMATION WHEN TO PROTECT BY DTCP2 | | | |
|---|---|---|---|---|---|---|---|---|---|---|---|---|
| | DIGITAL COPY CONTROL INFORMATION digital_recording_control_data | CONTENTS USAGE CONTROL DESCRIPTOR encryption_mode | CONTENTS USAGE CONTROL DESCRIPTOR copy_restriction_mode | ACCUMULATION CONTROL STATE | VIDEO RESOLUTION AT OUTPUT | TRANSMISSION CHARACTERISTICS AT OUTPUT | TYPE OF CONTENTS PROTECTION | IP INTERFACE OUTPUT CONTROL | | OUTPUT CONTROL | | |
| | | | | | | | | COPY CONTROL STATE | ENCRYPTION STATE | "L2-Only" Flag | "EI" Flag | "HDR" Flag | "SDO" Flag |
| 10 | COPIABLE ONLY FOR ONE GENERATION | PROTECT OR NOT | COPIABLE FOR RESTRICTED NUMBER | COPIABLE FOR RESTRICTED NUMBER | CONTENTS WITH OVER 2K | HDR | DTCP2 | When to output and view: No More Copies When to move: Move | ENCRYPTION | 0 | 1 | 0 | 0 |
| 11 | COPIABLE ONLY FOR ONE GENERATION | PROTECT OR NOT | COPIABLE FOR RESTRICTED NUMBER | COPIABLE FOR RESTRICTED NUMBER | CONTENTS WITH 2K OR LESS | HDR | DTCP2 | When to output and view: No More Copies When to move: Move | ENCRYPTION | 0 | 1 | 0 | 0 |
| 12 | COPIABLE ONLY FOR ONE GENERATION | PROTECT OR NOT | COPIABLE FOR RESTRICTED NUMBER | COPIABLE FOR RESTRICTED NUMBER | CONTENTS WITH OVER 2K | SDR | DTCP2 | When to output and view: No More Copies When to move: Move | ENCRYPTION | 0 | 1 | 1 | 0 |
| 13 | COPIABLE ONLY FOR ONE GENERATION | PROTECT OR NOT | COPIABLE FOR RESTRICTED NUMBER | COPIABLE FOR RESTRICTED NUMBER | CONTENTS WITH 2K OR LESS | SDR | DTCP1 | When to output and view: No More Copies When to move: Move | ENCRYPTION | 1 | 1 | 1 | 1 |

FIG. 45D

| COMBINATION | RECEPTION CONTROL INFORMATION | | | OUTPUT-TIME STATE | | | IP INTERFACE OUTPUT CONTROL | | | OUTPUT CONTROL INFORMATION WHEN TO PROTECT BY DTCP2 | | | |
|---|---|---|---|---|---|---|---|---|---|---|---|---|---|
| | DIGITAL COPY CONTROL INFORMATION digital_recording_control_data | CONTENTS USAGE CONTROL DESCRIPTOR encryption_mode | CONTENTS USAGE CONTROL DESCRIPTOR copy_restriction_mode | ACCUMULATION CONTROL STATE | VIDEO RESOLUTION AT OUTPUT | TRANSMISSION CHARACTERISTICS AT OUTPUT | TYPE OF CONTENTS PROTECTION | COPY CONTROL STATE | ENCRYPTION STATE | "L2-Only" Flag | "EI" Flag | "HDR" Flag | "SDO" Flag |
| 14 | COPY PROHIBITION | PROTECT OR NOT | Don't Care | Temporarily accumulate | CONTENTS WITH OVER 2K | HDR | DTCP2 | When to output and view: No More Copies Move Prohibited | ENCRYPTION | 0 | 1 | 0 | 0 |
| 15 | COPY PROHIBITION | PROTECT OR NOT | Don't Care | Temporarily accumulate | CONTENTS WITH 2K OR LESS | HDR | DTCP2 | When to output and view: No More Copies Move Prohibited | ENCRYPTION | 0 | 1 | 0 | 0 |
| 16 | COPY PROHIBITION | PROTECT OR NOT | Don't Care | Temporarily accumulate | CONTENTS WITH OVER 2K | SDR | DTCP2 | When to output and view: No More Copies Move Prohibited | ENCRYPTION | 0 | 1 | 1 | 0 |
| 17 | COPY PROHIBITION | PROTECT OR NOT | Don't Care | Temporarily accumulate | CONTENTS WITH 2K OR LESS | SDR | DTCP1 | When to output and view: No More Copies Move Prohibited | ENCRYPTION | - | - | - | - |

BROADCAST RECEIVING APPARATUS

TECHNICAL FIELD

The present invention relates to a broadcast receiving apparatus.

BACKGROUND ART

One of extended functions of the digital broadcasting service is data broadcasting in which digital data is transmitted by broadcast waves to display various types of information such as weather forecasts, news, and recommended TV programs. Many types of television receivers capable of receiving data broadcasting have already been on the market, and a lot of techniques for receiving data broadcasting including the technique disclosed in Patent Document 1 listed below have been released to the public.

RELATED ART DOCUMENTS

Patent Documents

Patent document 1: Japanese Unexamined Patent Application Publication No. 2001-186486

SUMMARY OF THE INVENTION

Problems to be Solved by the Invention

In association with the recent changes in the contents distribution environment, various functional extensions have been demanded for the television receivers. In particular, there are a lot of demands for the distribution of contents and cooperated applications using a broadband network environment such as the Internet and demands for the video contents with higher resolution and higher definition. However, no matter how the data broadcasting receiving function that the current television receiver has is utilized or extended, it is difficult to provide a high-value added television receiver capable of satisfying the above-mentioned demands.

It is an object of the present invention to provide a broadcast receiving apparatus capable of executing a function with a higher added value.

Means for Solving the Problem

Techniques described in claims are used as means for solving the problem described above.

As one example, a broadcast receiving apparatus configured to receive contents, the broadcast receiving apparatus including: a receiving unit configured to receive the contents; an interface through which the contents received by the receiving unit are outputted; and a control unit configured to control an output state of the contents from the interface, wherein the control unit is configured to determine an output state of the contents from the interface in accordance with a combination of control information indicating a copy control state of the contents, control information for specifying whether protection is required or not when the contents are to be outputted, information indicating resolution of video of the contents, and information indicating transmission characteristics of the video of the contents, which are received by the receiving unit together with the contents, wherein the control unit is configured to execute a control to apply output protection to the contents when the contents are outputted from the interface in a case where the control information indicating the copy control state of the contents indicates that there is copy restriction or in a case where the control information for specifying whether protection is required or not when the contents are to be outputted indicates that protection is required on output, and wherein the control unit is configured to change a level of the output protection in accordance with a combination of the information indicating resolution of the video of the contents and the information indicating transmission characteristics of the video of the contents is used.

Effects of the Invention

It is possible to provide a broadcast receiving apparatus capable of executing a function with a higher added value by using the technique of the present invention.

BRIEF DESCRIPTIONS OF THE DRAWINGS

FIG. 5A is a list of tables used for TLV-SI of the broadcasting system;

FIG. 5B is a list of descriptors used for TLV-SI of the broadcasting system;

FIG. 6A is a list of messages used for MMT-SI of the broadcasting system;

FIG. 6B is a list of tables used for MMT-SI of the broadcasting system;

FIG. 6C is a list (1) of descriptors used for MMT-SI of the broadcasting system;

FIG. 6D is a list (2) of descriptors used for MMT-SI of the broadcasting system;

FIG. 11A is a diagram showing a data structure of an MH-TOT of the broadcasting system;

FIG. 11B is a diagram showing a format of a JST_time parameter of the broadcasting system;

FIG. 12 is a diagram showing a method of calculating the current date from MJD of the broadcast receiving apparatus according to the first embodiment;

FIG. 13A is a diagram showing a configuration of an NTP format of the broadcasting system;

FIG. 13B is a diagram showing a data structure of an MPU timestamp descriptor of the broadcasting system;

FIG. 13C is a diagram showing a data structure of time information in a TMCC extension information region of the broadcasting system;

FIG. 15A is a diagram showing a data structure of a TLV-NIT of the broadcasting system;

FIG. 15B is a diagram showing a data structure of a satellite delivery system descriptor of the broadcasting system;

FIG. 15C is a diagram showing a data structure of a service list descriptor of the broadcasting system;

FIG. 15D is a diagram showing a data structure of an AMT of the broadcasting system;

FIG. 16 is an operation sequence diagram at the time of channel selection of the broadcast receiving apparatus according to the first embodiment;

FIG. 17 is a diagram showing a data structure of an MPT of the broadcasting system;

FIG. 18 is a diagram showing a data structure of an LCT of the broadcasting system;

FIG. 19C is a diagram showing still another example of layout assignment to a layout number based on the LCT;

FIG. 19D is a diagram showing still another example of layout assignment to a layout number based on the LCT;

FIG. 21 is a diagram showing a data structure of an MH-EIT of the broadcasting system;

FIG. 22C is a screen display diagram of an EPG screen of the broadcast receiving apparatus according to the first embodiment;

FIG. 23 is a screen display diagram at the time of displaying an emergency warning broadcasting message of the broadcast receiving apparatus according to the first embodiment;

FIG. 25 is an explanatory diagram of inconsistent display of current time at the time of switching broadcasting services;

FIG. 26A is an explanatory diagram of an operation of selection control of a reference source of current time information according to the second embodiment;

FIG. 26B is an operation sequence diagram of an update process of current time information according to the second embodiment;

FIG. 27A is a screen display diagram of an EPG screen of the broadcast receiving apparatus according to the second embodiment;

FIG. 27B is a screen display diagram of an EPG screen of the broadcast receiving apparatus according to the second embodiment;

FIG. 29A is a diagram showing a data structure of a contents information descriptor of a broadcasting system;

FIG. 29B is an explanatory diagram of meaning of content types in the contents information descriptor of the broadcasting system;

FIG. 32 is an explanatory diagram of image quality adjustment items of the broadcast receiving apparatus according to the third embodiment;

FIG. 33A is an explanatory diagram of a converting process of luminance levels of the broadcast receiving apparatus according to the third embodiment;

FIG. 38 is a system configuration diagram of a broadcast communication system according to a fifth embodiment;

FIG. 39 is an explanatory diagram of one example of output control information according to the fifth embodiment;

FIG. 40 is an explanatory diagram of one example of reception control information according to the fifth embodiment;

FIG. 41A is an explanatory diagram of one example of the reception control information according to the fifth embodiment;

FIG. 41B is an explanatory diagram of one example of the reception control information according to the fifth embodiment;

FIG. 42 is an explanatory diagram of one example of the reception control information according to the fifth embodiment;

FIG. 43 is an explanatory diagram of one example of a process of determining output protection for contents according to the fifth embodiment;

FIG. 44 is an explanatory diagram of one example of a process of determining output protection for contents according to the fifth embodiment; and FIGS. 45A-45D are an explanatory diagram of one example of a process of determining output protection for contents according to the fifth embodiment.

DETAILED DESCRIPTION OF PREFERRED EMBODIMENTS

Hereinafter, embodiments of the present invention will be described with reference to the drawings.

First Embodiment

[System Configuration]

Figure 1:
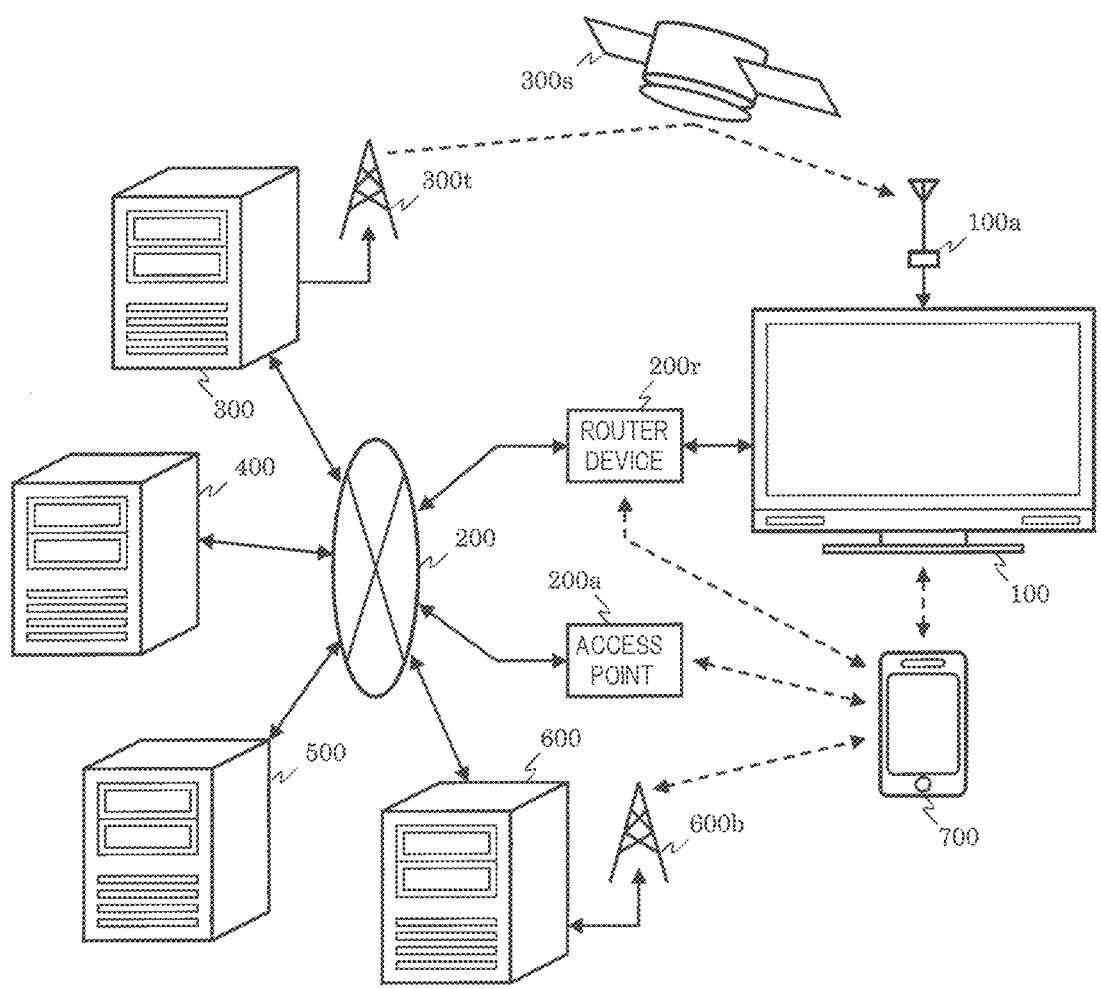
FIG. 1 is a system configuration diagram showing an example of a broadcast communication system including a broadcast receiving apparatus according to a first embodiment.

FIG. 1 is a system configuration diagram showing an example of a broadcast communication system including a broadcast receiving apparatus according to the present embodiment. The broadcast communication system of the present embodiment includes a broadcast receiving apparatus 100, an antenna 100a, a broadband network such as the Internet 200, a router device 200r, an access point 200a, a radio tower 300t and a broadcast satellite (or communication satellite) 300s of a broadcast station, a broadcast station server 300, a service provider server 400, an other application server 500, a mobile phone communication server 600, a base station 600b of a mobile phone communication network, and a portable information terminal 700.

The broadcast receiving apparatus 100 receives broadcast waves transmitted from the radio tower 300t via the broadcast satellite (or communication satellite) 300s and the antenna 100a. Alternatively, the broadcast receiving apparatus 100 may receive broadcast waves transmitted from the radio tower 300t directly from the antenna 100a without passing through the broadcast satellite (or communication satellite) 300s. In addition, the broadcast receiving apparatus 100 can be connected to the Internet 200 via the router device 200r, and thus can perform data transmission and reception through the communication with server devices and other communication equipment on the Internet 200.

The router device 200r is connected to the Internet 200 through wired communication, to the broadcast receiving apparatus 100 through wired or wireless communication, and to the portable information terminal 700 through wireless communication. The wireless communication may be established by Wi-Fi (registered trademark) or the like. This allows the server devices and other communication equipment on the Internet 200, the broadcast receiving apparatus 100, and the portable information terminal 700 to perform data transmission and reception between one another via the router device 200r. Note that the communication between the broadcast receiving apparatus 100 and the portable information terminal 700 may be performed as direct communication by BlueTooth (registered trademark), NFC (Near Field Communication) or the like without passing through the rooter 200r.

The radio tower 300t is a broadcasting facility of the broadcast station and transmits broadcast waves including coded data of broadcasting programs, subtitle information, other applications, general-purpose data, and the like. The broadcast satellite (or communication satellite) 300s is a relay device that receives broadcast waves transmitted from the radio tower 300t of the broadcast station, performs frequency conversion and the like as appropriate, and then transmits the radio waves to the antenna 100a connected to the broadcast receiving apparatus 100. In addition, the broadcast station has the broadcast station server 300. The broadcast station server 300 can store metadata such as broadcasting programs (video contents, etc.) and the titles, IDs, summaries, casts, broadcasting dates and the like of the broadcasting programs, and provide the video contents and metadata to a service provider based on a contract. Note that the video contents and metadata may be provided to the service provider through an API (Application Programming Interface) in the broadcast station server 300.

The service provider server 400 is a server device prepared by the service provider, and can provide various services cooperated with broadcasting programs distributed from the broadcast station. In addition, the service provider server 400 stores, manages, and distributes video contents and metadata delivered from the broadcast station server 300 and various contents, applications and the like cooperated with the broadcasting programs. In addition, the service provider server 400 further has a function of searching for deliverable contents, applications and the like and presenting a list of them in response to an inquiry from the television receiver and the like. Note that the storage, management, and distribution of the contents and metadata and those of the applications may be performed by different server devices. The broadcast station and the service provider may be the same or different from each other. A plurality of service provider servers 400 may be prepared for different services. In addition, the broadcast station server 300 may be provided with the functions of the service provider server 400.

The other application server 500 is a publicly known server device that stores, manages, and distributes other general applications, operating programs, contents, data, and the like. A plurality of other application servers 500 may be provided on the Internet 200.

The mobile phone communication server 600 is connected to the Internet 200 and is further connected to the portable information terminal 700 via the base station 600b. The mobile phone communication server 600 manages telephone communication (telephone call) and data transmission and reception performed by the portable information terminal 700 through the mobile phone communication network, and allows the portable information terminal 700 to perform data transmission and reception through the communication with server devices and other communication equipment on the Internet 200. The communication between the base station 600b and the portable information terminal 700 may be performed by W-CDMA (Wideband Code Division Multiple Access: registered trademark), GSM (Global System for Mobile Communications: registered trademark), LTE (Long Term Evolution), or other communication methods.

The portable information terminal 700 has a function of telephone communication (telephone call) and data transmission and reception through the mobile phone communication network and a function of wireless communication through Wi-Fi (registered trademark) or the like. The portable information terminal 700 can be connected to the Internet 200 via the router device 200r or the access point 200a or via the base station 600b and the mobile phone communication server 600 on the mobile phone communication network, and thus can perform data transmission and reception through the communication with server devices and other communication equipment on the Internet 200. The access point 200a is connected to the internet 200 through wired communication and is further connected to the portable information terminal 700 through wireless communication. The wireless communication may be established by Wi-Fi (registered trademark) or the like. Note that the communication between the portable information terminal 700 and the broadcast receiving apparatus 100 may be performed via the access point 200a, the Internet 200, and the router device 200r or via the base station 600b, the mobile phone communication server 600, the Internet 200, and the router device 200r.

[Outline of MMT Method]

The broadcast receiving apparatus 100 shown in FIG. 1 is a television receiver that supports MMT (MPEG Media Transport) as a media transport method for transmitting video and audio data, in place of TS (Transport Stream) defined in the MPEG (Moving Picture Experts Group)-2 system (hereinafter, "MPEG2-TS") mainly adopted by conventional digital broadcasting systems. The broadcast receiving apparatus 100 may be a television receiver supporting both MPEG2-TS and MMT.

MPEG2-TS has a characteristic of multiplexing video and audio components and the like making up a program, in a single stream together with control signals and clocks. Since the components are treated as single stream with the inclusion of clocks, MPEG2-TS is suitable for the transmission of single contents through a single transmission path with an ensured transmission quality, and thus has been adopted by many conventional digital broadcasting systems. On the other hand, because of the functional limitations of MPEG2-TS for the recent changes in the contents distribution environment including the diversification of contents, diversification of equipment using contents, diversification of transmission paths through which contents are distributed, and diversification of contents accumulation environment, MMT has been established as a new media transport method.

Figure 2A:
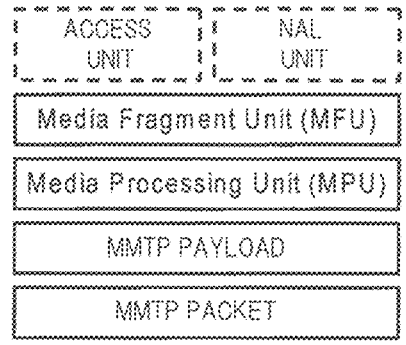
FIG. 2A is an explanatory diagram of an outline of a coded signal in an MMT.
Figure 2B:
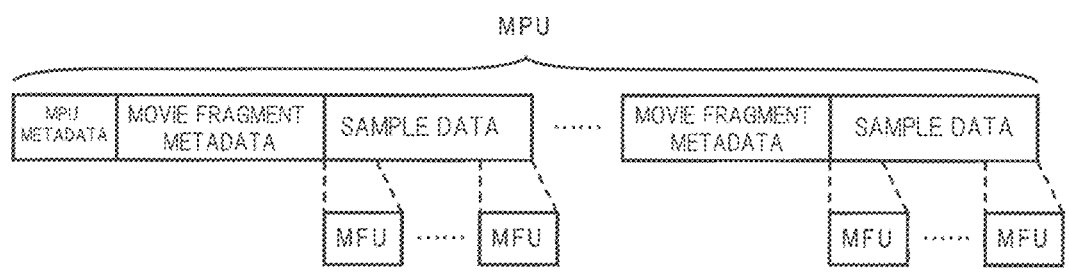
FIG. 2B is a configuration diagram of an MPU in MMT.

FIG. 2A shows an example of an outline of a coded signal in MMT of the present embodiment. As shown in FIG. 2A, MMT of the present embodiment has an MFU (Media Fragment Unit), an MPU (Media Processing Unit), an MMTP (MMT Protocol) payload, and an MMTP packet as elements making up the coded signal. The MFU is a format at the time of transmitting video, audio, and the like, and may be configured in units of NAL (Network Abstraction Layer) unit or access unit. The MPU may be configured of MPU metadata including information related to the overall configuration of the MPU, movie fragment metadata including information of coded media data, and sample data that is coded media data. Further, MFU can be extracted from the sample data. Further, in the case of media such as video components and audio components, presentation time and decoding time may be specified in units of MPU or access unit. FIG. 2B shows an example of a configuration of the MPU.

Figure 2C:
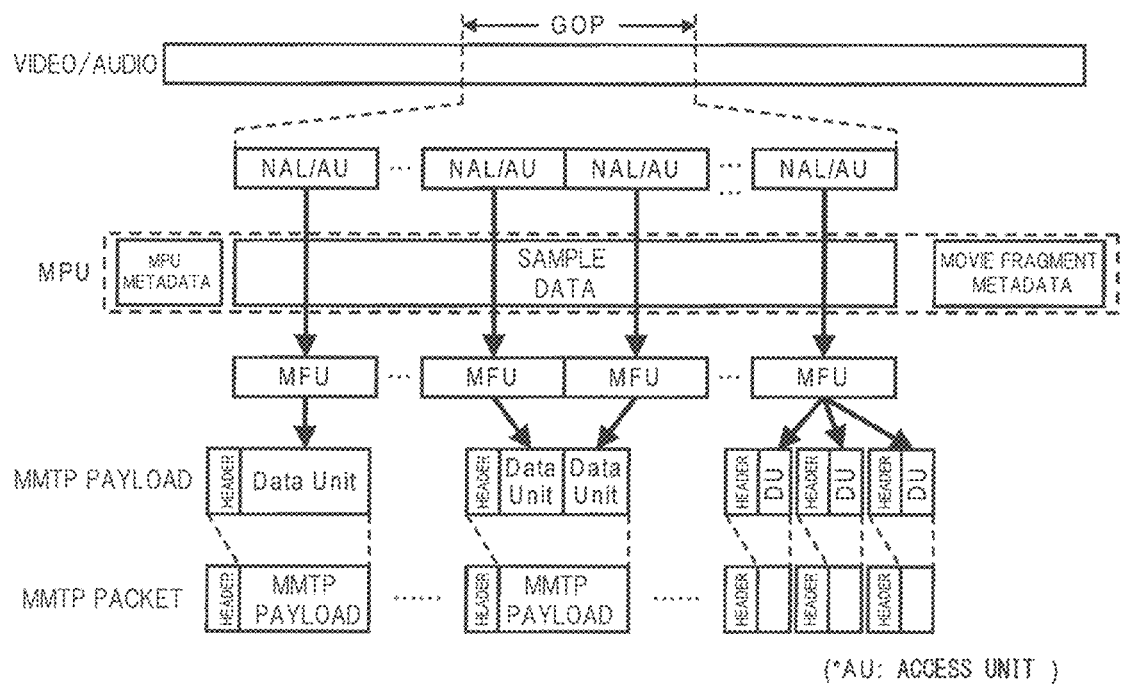
FIG. 2C is a configuration diagram of an MMTP packet in the MMT.

The MMTP packet is configured of a header and an MMTP payload, and transmits control information of the MFU and MMT. The MMTP payload has a payload header corresponding to contents (data unit) stored in a payload section. FIG. 2C shows an example of an outline of a process of making the MFU from video and audio signals, storing the MFU in the MMTP payload, and then creating the MMTP packet. In the case of a video signal that is coded using inter-frame prediction, the MPU is desirably configured in units of GOP (Group of Pictures). In addition, when the size of MFU to be transmitted is small, a single MFU may be stored in a single payload section, or a plurality of MFUs may be stored in a single payload section. In addition, when the size of MFU to be transmitted is large, a single MFU may be divided and then stored in a plurality of payload sections. In order to recover a packet loss on a transmission path, the MMTP packet may be protected by such techniques as AL-FEC (Application Layer Forward Error Correction) and ARQ (Automatic Repeat Request).

The broadcasting system of the present embodiment uses MPEG-H HEVC (High Efficiency Video Coding) as a video coding method, and uses MPEG-4 AAC (Advanced Audio Coding) or MPEG-4 ALS (Audio Lossless Coding) as an audio coding method. Coded data of video, audio, and the like of broadcasting programs that are coded by the methods described above is formatted into MFU or MPU, stored in an MMTP payload, encapsulated in an MMTP packet, and then transmitted in the form of an IP (Internet Protocol) packet. In addition, data contents related to broadcasting programs may also be formatted into MFU or MPU, stored in an MMTP payload, encapsulated in an MMTP packet, and then transmitted in the form of an IP packet. Four types of data contents transmission methods are prepared, which include a subtitle/caption transmission method used for data steaming synchronous with broadcasting, an application transmission method used for data transmission asynchronous with broadcasting, an event message transmission method used for synchronous/asynchronous message notification to applications operating on the television receiver, and a general-purpose data transmission method for synchronous/asynchronous transmission of other general-purpose data.

Figure 3A:
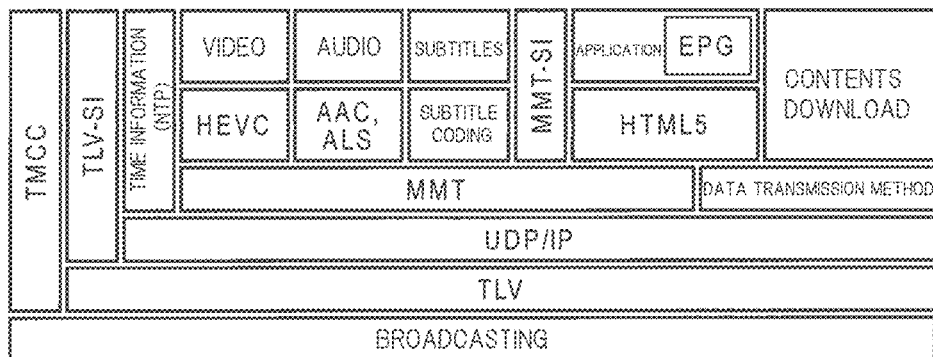
FIG. 3A is a conceptual diagram of a protocol stack for a broadcasting system using the MMT.
Figure 3B:
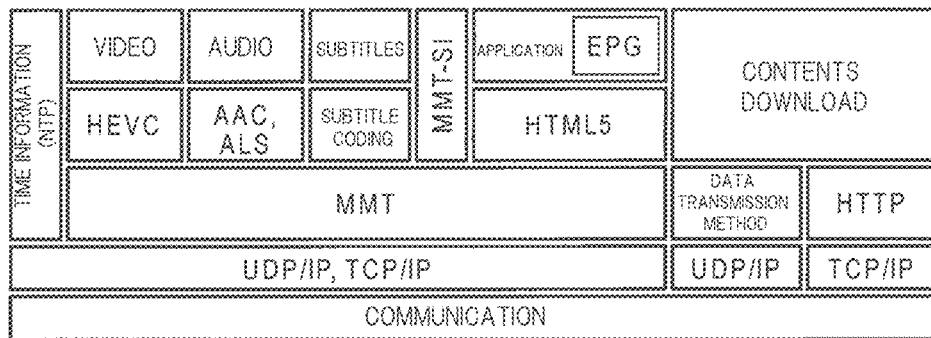
FIG. 3B is a conceptual diagram of a protocol stack for the communication line in the broadcasting system.

In the transmission of MMTP packets, UDP/IP (User Datagram Protocol/Internet Protocol) is used for the broadcast transmission path, and UDP/IP or TCP/IP (Transmission Control Protocol/Internet Protocol) is used for the communication line. Further, TLV (Type Length Value) multiplexing is used in the broadcast transmission path for efficient transmission of IP packets. Examples of protocol stack for the broadcasting system of the present embodiment are shown in FIGS. 3A and 3B. FIG. 3A shows an example of a protocol stack for the broadcast transmission path, and FIG. 3B shows an example of a protocol stack for the communication line.

The broadcasting system of the present embodiment provides a scheme for transmitting two types of control information, that is, MMT-SI (MMT-Signaling Information) and TLV-SI (TLV-Signaling Information). MMT-SI is control information indicating the configuration of a broadcasting program and the like. This control information is formatted into an MMT control message, stored in an MMTP payload, encapsulated in an MMTP packet, and then transmitted in the form of an IP packet. TLV-SI is control information related to IP packet multiplexing, and provides information for channel selection and correspondence information of IP addresses and services.

Further, even the broadcasting system using the MMT transmits time information in order to provide an absolute time. Note that component presentation time is indicated for each TS based on different clocks in the MPEG2-TS, while component presentation time is indicated based on the coordinated universal time (UTC) in the MMT. This scheme allows a terminal device to display components transmitted from different transmission points through different transmission paths in synchronization. IP packets conforming to an NTP (Network Time Protocol) are used for providing the UTC.

[Control Information of Broadcasting System Using MMT]

Figure 4:
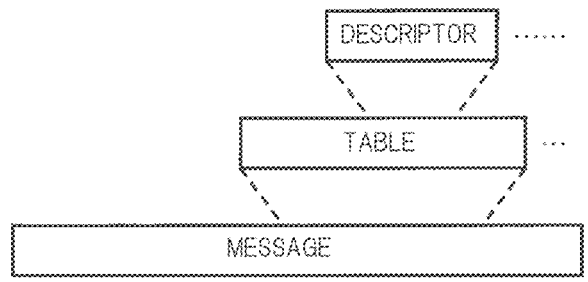
FIG. 4 is a layered configuration diagram of control information used in a broadcasting system.

As described above, in the broadcasting system compatible with the broadcast receiving apparatus 100 of the present embodiment, TLV-SI related to a TLV multiplexing method for multiplexing IP packets and MMT-SI related to MMT which is a media transport method are prepared as the control information. TLV-SI provides information with which the broadcast receiving apparatus 100 demultiplexes IP packets multiplexed in the broadcast transmission path. TLV-SI is composed of a "table" and a "descriptor". The "table" is transmitted in a section format, and the "descriptor" is placed in the "table". MMT-SI is transmission control information indicating the information related to configuration of an MMT package and broadcasting services. MMT-SI has a three-layer structure composed of a "message" layer storing "table" and "descriptor", a "table" layer having an element and property that indicate specific information, and a "descriptor" layer indicating more detailed information. An example of the layer structure of the control information used in the broadcasting system of the present embodiment is shown in FIG. 4.

<Tables Used for TLV-SI>

FIG. 5A shows a list of "tables" used for TLV-SI of the broadcasting system compatible with the broadcast receiving apparatus 100 of the present embodiment. In the present embodiment, the following tables are used as "tables" of TLV-SI.

(1) TLV-NIT

A network information table for TLV (TLV-NIT) provides information related to the physical configuration of a TLV stream transmitted through a network and indicates the characteristics of the network.

(2) AMT

An address map table (AMT) provides a list of multicast groups of IP packets making up respective services transmitted through the network.

(3) Table Set by Provider

Other tables set uniquely by the service provider and the like may be prepared.

<Descriptors Used for TLV-SI>

FIG. 5B shows a list of "descriptors" included in TLV-SI of the broadcasting system compatible with the broadcast receiving apparatus 100 of the present embodiment. In the present embodiment, the following descriptors are used as "descriptors" of TLV-SI.

(1) Service List Descriptor

A service list descriptor provides a list of services classified by service identifications and service types.

(2) Satellite Delivery System Descriptor

A satellite delivery system descriptor indicates physical conditions for a satellite transmission path.

(3) System Management Descriptor

A system management descriptor is used to distinguish broadcasting from non-broadcasting.

(4) Network Name Descriptor

A network name descriptor describes a network name with character codes.

(5) Descriptor Set by Provider

Other descriptors set uniquely by the service provider and the like may be prepared.

<Messages Used for MMT-SI>

FIG. 6A shows a list of "messages" used for MMT-SI of the broadcasting system compatible with the broadcast receiving apparatus 100 of the present embodiment. In the present embodiment, the following messages are used as "messages" of MMT-SI.

(1) PA Message

A package access (PA) message is used to transmit various tables.

(2) M2 section message

An M2 section message is used to transmit section extension format of the MPEG-2 Systems.

(3) CA Message

A CA message is used to transmit a table for identifying a conditional access method.

(4) M2 Short Section Message

An M2 short section message is used to transmit section short format of the MPEG-2 Systems.

(5) Data Transmission Message

A data transmission message is a message storing a table related to data transmission.

(6) Message Set by Provider

Other messages set uniquely by the service provider and the like may be prepared.

<Tables Used for MMT-SI>

FIG. 6B shows a list of "tables" used for MMT-SI of the broadcasting system compatible with the broadcast receiving apparatus 100 of the present embodiment. A table is control information having an element and property that indicate specific information. A table is stored in a message and is encapsulated in an MMTP packet to be transmitted. Note that a message that stores a table may be determined in accordance with the type of the table. In the present embodiment, the following tables are used as "tables" of MMT-SI.

(1) MPT

An MMT package table (MPT) provides package configuration information such as a list of assets and locations of assets on the network. An MPT may be stored in a PA message.

(2) PLT

A package list table (PLT) presents a list of IP data flows for transmitting PA messages of MMT packages provided as a broadcasting service, packet IDs, and IP data flows for transmitting IP services. A PLT may be stored in a PA message.

(3) LCT

A layout configuration table (LCT) is used to correlate layout information for presentation with layout numbers. An LCT may be stored in a PA message.

(4) ECM

An entertainment control message (ECM) is common information made up of program information and control information, and delivers key information for descrambling and others. An ECM may be stored in an M2 section message.

(5) EMM

An entitlement management message (EMM) is used to transmit personal information including contract information for individual subscribers and key information for decoding ECM (common information). An EMM may be stored in an M2 section message.

(6) CAT (MH)

A conditional access table (CA table (CAT)) (MH) is used to store a descriptor for identifying a conditional access method. A CAT (MH) may be stored in a CA message.

(7) DCM

A download control message (DCM) transmits key-related information including a key for decoding a transmission path code for downloading. A DCM may be stored in an M2 section message.

(8) DMM

A download management message (DMM) transmits key-related information including a download key for decoding an encoded DCM. A DMM may be stored in an M2 section message.

(9) MH-EIT

An MH-event information table (MH-EIT) is time-series information related to events included in each service. An MH-EIT may be stored in an M2 section message.

(10) MH-AIT

An MH-application information table (MH-AIT) stores all the information related to applications and startup conditions required for applications. An MH-AIT may be stored in an M2 section message.

(11) MH-BIT

An MH-broadcaster information table (MH-BIT) is used to provide information of broadcasters present on the network. An MH-BIT may be stored in an M2 section message.

(12) MH-SDTT

An MH-software download trigger table (MH-SDTT) is used to provide download announcement information. An MH-SDTT may be stored in an M2 section message.

(13) MH-SDT

An MH-service description table (MH-SDT) has a suitable indicating a service included in a specific TLV stream and transmits information related to a sub-channel such as a name of sub-channel and a name of a broadcaster. An MH-SDT may be stored in an M2 section message.

(14) MH-TOT

An MH-time offset table (MH-TOT) transmits JST time and date (Modified Julian Date) information. An MH-TOT may be stored in an M2 short section message.

(15) MH-CDT

An MH-common data table (MH-CDT) is used to transmit common data, which should be stored in a non-volatile memory, in a section format to all receivers that receive the MH-CDT. An MH-CDT may be stored in an M2 section message.

(16) DDM Table

A data directory management (DDM) table provides a directory configuration of files making up an application in order to separate a file configuration of the application from a configuration for file transmission. A DDM table may be stored in a data transmission message.

(17) DAM Table

A data asset management (DAM) table provides a configuration of MPU in an asset and version information of each MPU. A DAM table may be stored in a data transmission message.

(18) DCC Table

A data content configuration (DCC) table provides configuration information of files as data contents in order to achieve flexible and effective cache control. A DCC table may be stored in a data transmission message.

(19) EMT

An event message table (EMT) is used to transmit information related to an event message. An EMT may be stored in an M2 section message.

(20) Table Set by Provider

Other tables set uniquely by the service provider and the like may be provided.

<Descriptors Used for MMT-SI>

FIGS. 6C and 6D show lists of "descriptors" included in MMT-SI of the broadcasting system compatible with the broadcast receiving apparatus 100 of the present embodiment. A descriptor is control information that provides more detailed information, and is included in a table. Note that a table in which a descriptor is included may be determined in accordance with the type of the descriptor. In the present embodiment, the following descriptors are used as "descriptors" of MMT-SI.

(1) Asset Group Descriptor

An asset group descriptor provides a relation of an asset group and a priority in the group. An asset group descriptor may be included in the MPT.

(2) Event Package Descriptor

An event package descriptor provides a correlation between an event, which represents a program, and a package. An event package descriptor may be included in MH-EIT stored in an M2 section message to be transmitted.

(3) Background Color Specifying Descriptor

A background color specifying descriptor provides a background color of a rearmost plane in layout specification. A background color specifying descriptor may be included in LCT.

(4) MPU Presentation Region Specifying Descriptor

An MPU presentation region specifying descriptor provides a location of presentation of MPU. An MPU presentation region specifying descriptor may be included in the MPT.

(5) MPU Timestamp Descriptor

An MPU timestamp descriptor indicates the time of presentation of the first access unit in the presentation order in the MPU. An MPU timestamp descriptor may be included in the MPT.

(6) Dependency Relation Descriptor

A dependency relation descriptor provides asset IDs for assets dependent on each other. A dependency relation descriptor may be included in the MPT.

(7) Access Control Descriptor

An access control descriptor provides information for identifying the conditional access method. An access control descriptor may be included in the MPT or CAT (MH).

(8) Scramble Method Descriptor

A scramble method descriptor provides information for identifying a target to be encoded at the time of scrambling and a type of an encoding algorithm. A scramble method descriptor may be included in the MPT or CAT (MH).

(9) Message Authentication Method Descriptor

A message authentication method descriptor provides information for identifying a message authentication method when message authentication is performed. A message authentication method descriptor may be included in the MPT or CAT (MH).

(10) Emergency Information Descriptor (MH)

An emergency information descriptor (MH) is used when emergency warning broadcasting is performed. An emergency information descriptor (MH) may be included in the MPT.

(11) MH-MPEG-4 Audio Descriptor

An MH-MPEG-4 audio descriptor is used to describe basic information for specifying coding parameters of an audio stream defined in ISO/IEC 14496-3 (MPEG-4 audio). An MH-MPEG-4 audio descriptor may be included in the MPT.

(12) MH-MPEG-4 Audio Extension Descriptor

An MH-MPEG-4 audio extension descriptor is used to describe a profile, level, and specific setting to a coding method of an MPEG-4 audio stream. An MH-MPEG-4 audio extension descriptor may be included in the MPT.

(13) MH-HEVC Video Descriptor

An MH-HEVC video descriptor is used to describe basic coding parameters for a video stream (HEVC stream) defined in ITU-T Recommendation H.265 and ISO/IEC 23008-2. An MH-HEVC video descriptor may be included in the MPT.

(14) MH-Link Descriptor

An MH-link descriptor identifies a service that is provided when a viewer demands additional information related to a specific matter described in a program arrangement information system. An MH-link descriptor may be included in the MPT, MH-EIT, MH-SDT, and the like.

(15) MH-Event Group Descriptor

An MH-event group descriptor is used to indicate that a plurality of events form a group when these events are related to one another. An MH-event group descriptor may be included in MH-EIT.

(16) MH-Service List Descriptor

An MH-service list descriptor provides a list of services classified by service identifications and service types. An MH-service list descriptor may be included in MH-BIT.

(17) MH-Short Format Event Descriptor An MH-short format event descriptor represents an event name and a short description of the event in a text format. An MH-short format event descriptor may be included in MH-EIT.

(18) MH-Extension Format Event Descriptor

An MH-extension format event descriptor is added to an MH-short format event descriptor, and provides a detailed description of an event. An MH-extension format event descriptor may be included in MH-EIT.

(19) Video Component Descriptor

A video component descriptor provides parameters and description for a video component, and is used also for expressing an elementary stream in a text format. A video component descriptor may be included in the MPT or MH-EIT.

(20) MH-Stream Identifying Descriptor

An MH-stream identifying descriptor is used to attach a label to a component stream for a service so that descriptive contents indicated by a video component descriptor in MH-EIT can be referred to with the label. An MH-stream identifying descriptor may be included in the MPT.

(21) MH-Content Descriptor

An MH-content descriptor indicates the genre of an event. An MH-content descriptor may be included in MH-EIT.

(22) MH-Parental Rate Descriptor

An MH-parental rate descriptor indicates age-based viewing restriction, and is used to extend the range of restriction based on other restriction conditions. An MH-parental rate descriptor may be included in the MPT or MH-EIT.

(23) MH-Audio Component Descriptor

An MH-audio component descriptor provides parameters for an audio elementary stream, and is used also for expressing the elementary stream in a text format. An MH-audio component descriptor may be included in the MPT or MH-EIT.

(24) MH-Target Area Descriptor

An MH-target area descriptor is used to describe a target area of a program or some streams making up the program. An MH-target area descriptor may be included in the MPT.

(25) MH-Series Descriptor

An MH-series descriptor is used to identify a series program. An MH-series descriptor may be included in MH-EIT.

(26) MH-SI Transmission Parameter Descriptor

An MH-SI transmission parameter descriptor is used to indicate SI transmission parameters. An MH-SI transmission parameter descriptor may be included in MH-BIT.

(27) MH-Broadcaster Name Descriptor

An MH-broadcaster name descriptor describes a name of a broadcaster. An MH-broadcaster name descriptor may be included in MH-BIT.

(28) MH-Service Descriptor

An MH-service descriptor expresses a name of a sub-channel and a name of a provider of the sub-channel in character code together with a service type. An MH-service descriptor may be included in MH-SDT.

(29) IP Data Flow Descriptor

An IP data flow descriptor provides information of IP data flow making up a service. An IP data flow descriptor may be included in MH-SDT.

(30) MH-CA Startup Descriptor

An MH-CA startup descriptor describes startup information for starting a CAS program on a CAS board. An MH-CA startup descriptor may be included in the MPT or CAT (CA).

(31) MH-Type Descriptor

An MH-Type descriptor indicates a type of a file transmitted by an application transmission method. An MH-Type descriptor may be included in a DAM table.

(32) MH-Info Descriptor

An MH-Info descriptor describes information related to MPU or an item. An MH-Info descriptor may be included in a DAM table.

(33) MH-Expire Descriptor

An MH-Expire descriptor describes an expiration date of an item. An MH-Expire descriptor may be included in a DAM table.

(34) MH-Compression Type Descriptor

An MH-Compression Type descriptor states that an item to be transmitted is compressed, and indicates a compression algorithm for the compression and the number of bytes of the item before the compression. An MH-Compression Type descriptor may be included in a DAM table.

(35) MH-Data Coding Method Descriptor

An MH-data coding method descriptor is used to identify a data coding method. An MH-data coding method descriptor may be included in the MPT.

(36) UTC-NPT Reference Descriptor

A UTC-NPT reference descriptor is used to transmit a relation between NPT (Normal Play Time) and UTC. A UTC-NPT reference descriptor may be included in EMT.

(37) Event Message Descriptor

An event message descriptor transmits information generally related to event messages. An event message descriptor may be included in EMT.

(38) MH-Local Time Offset Descriptor

An MH-local time offset descriptor is used to provide a given offset value to actual time (e.g., UTC+9 hours) and display time to a human system when a daylight saving time system is implemented. An MH-local time offset descriptor may be included in MH-TOT.

(39) MH-Component Group Descriptor

An MH-component group descriptor defines and identifies a combination of components in an event. An MH-component group descriptor may be included in MH-EIT.

(40) MH-Logo Transmission Descriptor

An MH-logo transmission descriptor is used to describe pointing to a character string for a simplified logo and a logo in a CDT format. An MH-logo transmission descriptor may be included in MH-SDT.

(41) MPU Extension Timestamp Descriptor

An MPU extension timestamp descriptor provides a time to decode an access unit in MPU. An MPU extension timestamp descriptor may be included in the MPT.

(42) MPU Download Contents Descriptor

An MPU download contents descriptor is used to describe property information of contents that are downloaded using MPU. An MPU download contents descriptor may be included in MH-SDTT.

(43) MH-Network Download Contents Descriptor

An MH-network download contents descriptor is used to describe property information of contents that are downloaded through the network. An MH-network download contents descriptor may be included in MH-SDTT.

(44) MH-Application Descriptor

An MH-application descriptor describes information of an application. An MH-application descriptor may be included in an MH-AIT.

(45) MH-Transmission Protocol Descriptor

An MH-transmission protocol descriptor is used to specify a transmission protocol for broadcasting, communication, and the like, and to provide location information of an application depending on the transmission protocol. An MH-transmission protocol descriptor may be included in the MH-AIT.

(46) MH-Simplified Application Location Descriptor

An MH-simplified application location descriptor provides the detailed description of an acquisition source of an application. An MH-simplified application location descriptor may be included in the MH-AIT.

(47) MH-Application Boundary Authority Setting Descriptor

An MH-application boundary authority setting descriptor provides a description for setting an application boundary and setting an authority for access to broadcasting resources for each region (URL). An MH-application boundary authority setting descriptor may be included in the MH-AIT.

(48) MH-Startup Priority Information Descriptor

An MH-startup priority information descriptor provides a description for specifying a startup priority of an application. An MH-startup priority information descriptor may be included in the MH-AIT.

(49) MH-Cache Information Descriptor

An MH-cache information descriptor provides a description used for cache control in a case where resources making up an application are saved in a cache when reuse of the application is assumed. An MH-cache information descriptor may be included in the MH-AIT.

(50) MH-Probability-Applied Delay Descriptor

An MH-probability-applied delay descriptor provides a description for delaying the time of execution of application control by a delay time set probabilistically, with the expectation that server access loads for acquiring the application are to be dispersed. An MH-probability-applied delay descriptor may be included in the MH-AIT.

(51) Link Destination PU Descriptor

A link destination PU descriptor describes another presentation unit (PU) to which a presentation unit may possibly make transition. A link destination PU descriptor may be included in a DCC table.

(52) Lock Cache Specifying Descriptor

A lock cache specifying descriptor describes a description for specifying a file to be cached and locked in a presentation unit. A lock cache specifying descriptor may be included in a DCC table.

(53) Unlock Cache Specifying Descriptor

An unlock cache specifying descriptor provides a description for specifying a file to be unlocked among locked files in a presentation unit. An unlock cache specifying descriptor may be included in a DCC table.

(54) Descriptor Set by Provider

Other descriptors set uniquely by the service provider and the like may be prepared.

<Relation Between Data Transmission and Control Information in MMT Method>

Here, the relation between data transmission and typical tables in the broadcasting system compatible with the broadcast receiving apparatus 100 of the present embodiment will be described with reference to FIG. 6E.

The broadcasting system compatible with the broadcast receiving apparatus 100 of the present embodiment can perform data transmission through a plurality of routes such as TLV streams transmitted through the broadcast transmission path and IP data flows transmitted through the communication line. A TLV stream includes TLV-SI such as a TLV-NIT and an AMT and an IP data flow which is a data flow of IP packets. The IP data flow includes a video asset including a series of video MPUs and an audio asset including a series of audio MPUs. Similarly, the IP data flow may include a subtitle asset including a series of subtitle MPUs, a caption asset including a series of caption MPUs, and a data asset including a series of data MPUs. These various assets are associated in units of "package" by the MPT (MMT package table) which is stored in a PA message to be transmitted. Specifically, these assets are associated by describing a package ID (corresponding to "MMT_package_id_byte" parameter which will be shown later in FIG. 17) and asset IDs (corresponding to "asset_id_byte" parameter which will be shown later in FIG. 17) for respective assets included in the package, in the MPT.

Figure 6E:
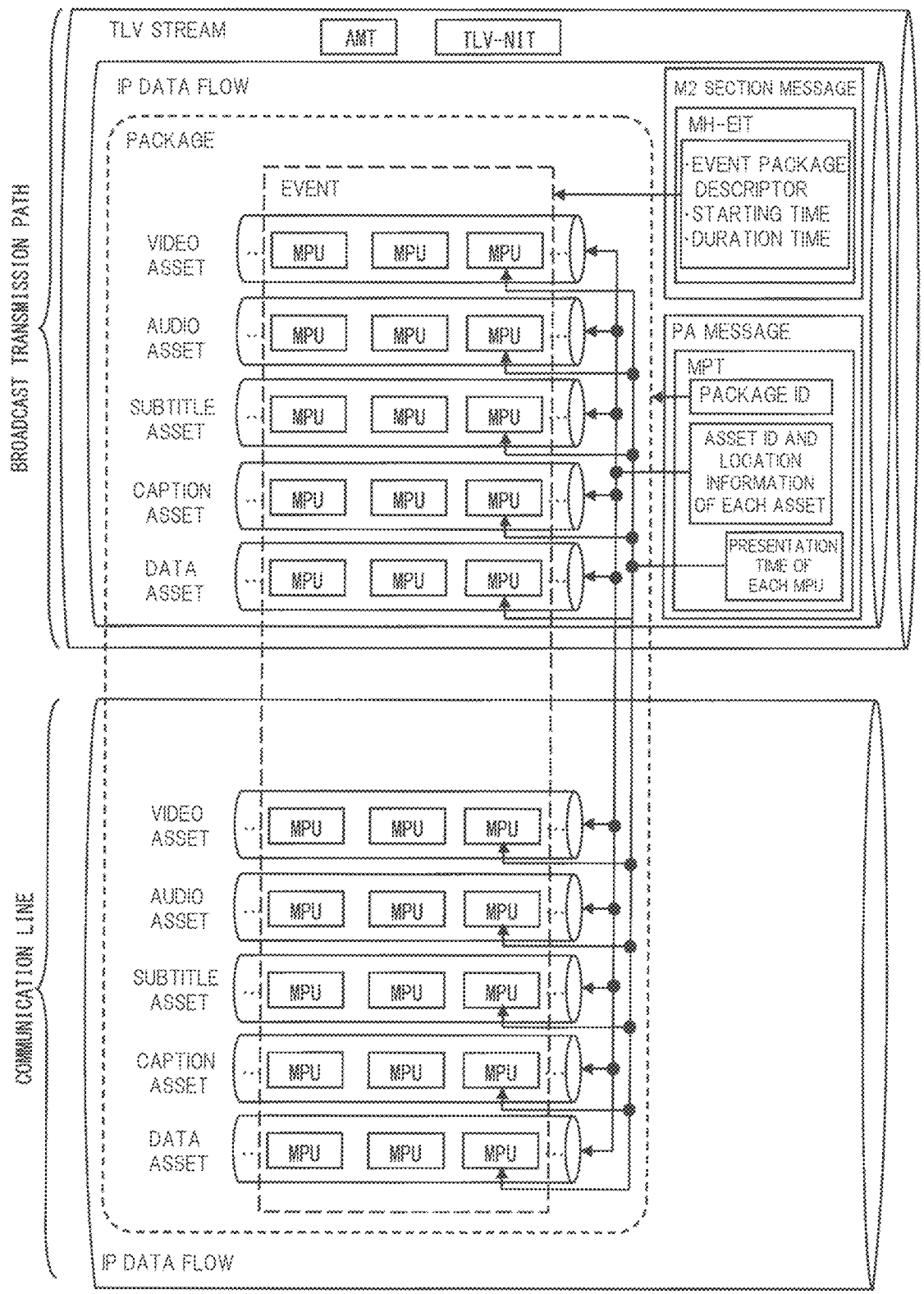
FIG. 6E is a diagram showing the relation between data transmission and each table in the broadcasting system.

The assets making up a package may be limited to assets in a TLV stream, but may include assets transmitted by an IP data flow through the communication line as shown in FIG. 6E. This is made possible by providing location information (corresponding to "MMT_general_location_info( )" which will be shown later in FIG. 17) of the assets included in the package in the MPT so that the broadcast receiving apparatus 100 of the present embodiment can know the reference destination of each asset. Specifically, by changing the value of an "MMT_general_location_infonolocation_type" parameter which is included in the location information, the broadcast receiving apparatus 100 can refer to various pieces of data transmitted through various transmission routes including:

(1) data multiplexed in the same IP data flow as the MPT (location_type=0x00);
(2) data multiplexed in an IPv4 data flow (location_type=0x01);
(3) data multiplexed in an IPv6 data flow (location_type=0x02);
(4) data multiplexed in a broadcasting MPEG2-TS (location_type=0x03);
(5) data multiplexed in an MPEG2-TS format in an IP data flow (location_type=0x04); and
(6) data located by a specified URL (location_type=0x05).

Among the above reference destinations, (1) is, for example, an IP data flow that is received in the form of a digital broadcasting signal received by a tuner/demodulating unit 131 of the broadcast receiving apparatus 100 to be described later with reference to FIG. 7A. When the MPT is included also in an IP data flow on the side of a communication line and is transmitted, the reference destination of (1) may be changed to an IP data flow received by a LAN communication unit 121 to be described later through the communication line. Further, (2), (3), (5), and (6) described above are IP data flows received by the LAN communication unit 121 to be described later through the communication line. In addition, (4) described above can be used when to refer to the data multiplexed in MPEG2-TS received by the receiving function of receiving digital broadcasting signals transmitted by the MPEG2-TS method on the basis of location information ("MMT_general_location_info( )") of the MPT included in a digital broadcasting signal transmitted by the MMT method, in the case of the broadcast receiving apparatus having both of a receiving function of receiving digital broadcasting signals transmitted by the MMT method and a receiving function of receiving digital broadcasting signals transmitted by the MPEG2-TS method, like a broadcast receiving apparatus 800 of a second embodiment to be descried later with reference to FIG. 24.

Note that the data making up the "package" is specified in the above-described manner, and a series of data grouped in a unit of "package" are treated as a "service" unit for digital broadcasting in the broadcasting system compatible with the broadcast receiving apparatus 100 of the present embodiment.

Moreover, presentation time information of each MPU specified by the MPT (corresponding to "mpu_presentation_time" parameter to be shown later in FIG. 13B) is described in the MPT, and a plurality of MPUs specified by the MPT can be presented (displayed or output) in conjunction with each other by using the presentation time information, with reference to a clock based on the NTP which is time information expressed by the UTC notation. Presentation control of various data using the clock based on the NIP will be described later.

The data transmission method of the present embodiment shown in FIG. 6E further includes a concept of "event". "Event" is a concept representing a so-called "program" handled by MH-EIT included in an M2 section message to be transmitted. Specifically, in the "package" indicated by an event package descriptor stored in the MH-EIT, a series of data included in a period between a start time (corresponding to a "start_time" parameter to be described later in FIG. 21) stored in the MH-EIT and the end of a duration time (corresponding to a "duration" parameter to be described later in FIG. 21) are data included in the concept of "event". The MH-EIT can be used for various processes performed in units of "event" (e.g., process of creating a program guide, process of controlling timer recording and viewing reservation, process of protecting copy rights such as temporary data storage, etc.) in the broadcast receiving apparatus 100 of the present embodiment.

[Hardware Configuration of Broadcast Receiving Apparatus]

Figure 7A:
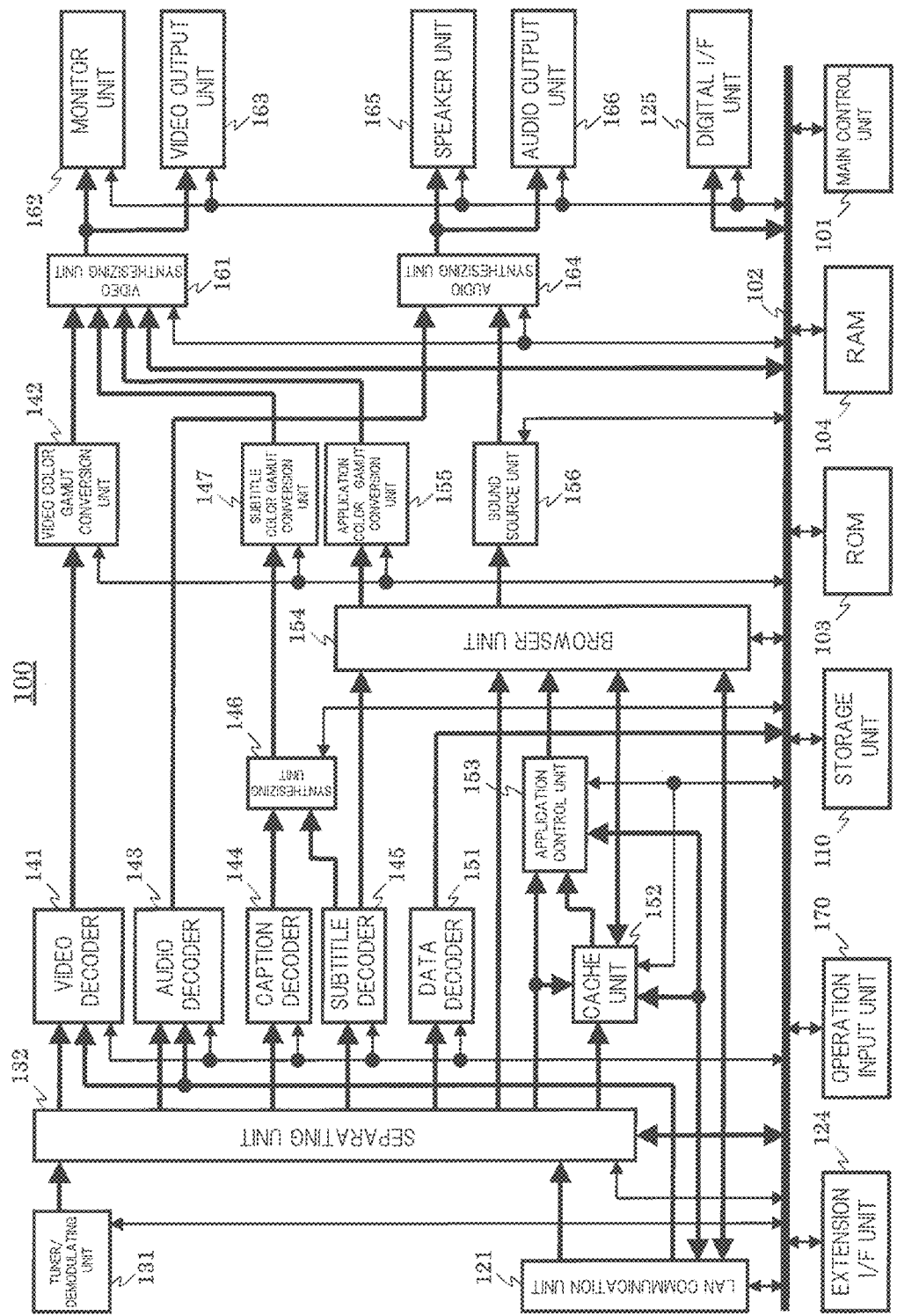
FIG. 7A is a block diagram of the broadcast receiving apparatus according to the first embodiment.

FIG. 7A is a block diagram showing an example of an internal configuration of the broadcast receiving apparatus 100. The broadcast receiving apparatus 100 includes a main control unit 101, a system bus 102, a ROM 103, a RAM 104, a storage (accumulation) unit 110, the LAN communication unit 121, an extension interface unit 124, a digital interface unit 125, the tuner/demodulating unit 131, a separating unit 132, a video decoder 141, a video color gamut conversion unit 142, an audio decoder 143, a caption decoder 144, a subtitle decoder 145, a subtitle synthesizing unit 146, a subtitle color gamut conversion unit 147, a data decoder 151, a cache unit 152, an application control unit 153, a browser unit 154, an application color gamut conversion unit 155, a sound source unit 156, a video synthesizing unit 161, a monitor unit 162, a video output unit 163, an audio synthesizing unit 164, a speaker unit 165, an audio output unit 166, and an operation input unit 170.

The main control unit 101 is a microprocessor unit that controls the whole of the broadcast receiving apparatus 100 in accordance with a predetermined operating program. The system bus 102 is a data communication path through which data is exchanged between the main control unit 101 and each of operating blocks in the broadcast receiving apparatus 100.

The ROM (Read Only Memory) 103 is a non-volatile memory storing a basic operating program such as operating system and other operating programs, and is provided as, for example, a rewritable ROM such as an EEPROM (Electrically Erasable Programmable ROM) and a flash ROM. The ROM 103 may store operation set values necessary for the operation of the broadcast receiving apparatus 100. The RAM (Random Access Memory) 104 serves as a work area used when the basic operating program and other operating programs are executed. The ROM 103 and the RAM 104 may be integrated with the main control unit 101. Further, apart of the memory region of the storage (accumulation) unit 110 may be used as the ROM 103 instead of providing the ROM 103 having the independent configuration shown in FIG. 7A.

The storage (accumulation) unit 110 stores the operating programs and operation set values of the broadcast receiving apparatus 100 and personal information of the user of the broadcast receiving apparatus 100. In addition, the storage (accumulation) unit 110 can store an operating program downloaded through the Internet 200 and various data created by the operating program. Further, the storage (accumulation) unit 110 can store such contents as moving images, still images, and sounds that are acquired from broadcast waves or downloaded through the Internet 200. A part of the memory region of the storage (accumulation) unit 110 may be used to substitute for a part or the whole of the function of the ROM 103. Further, the storage (accumulation) unit 110 needs to retain the stored information even when power is not supplied to the broadcast receiving apparatus 100 from an external power source. Therefore, the storage (accumulation) unit 110 is provided as, for example, a non-volatile semiconductor element memory such as a flash ROM or an SSD (Solid State Driver) or a magnetic disk drive such as an HDD (Hard Disc Drive).

Note that the operating programs stored in the ROM 103 and the storage (accumulation) unit 110 can be added, updated and functionally extended by a downloading process from server devices on the Internet 200.

The LAN (Local Area Network) communication unit 121 is connected to the Internet 200 via the router device 200r, and transmits and receives data to and from server devices and other communication equipment on the Internet 200. Further, the LAN communication unit 121 acquires an MMT data string (or part of it) of a program transmitted through the communication line. The LAN communication unit 121 may be connected to the router device 200r through wired communication or wireless communication such as Wi-Fi (registered trademark). The LAN communication unit 121 has a coding circuit, a decoding circuit, and the like. In addition, the broadcast receiving apparatus 100 may further include other communication units such as a BlueTooth (registered trademark) communication unit, an NFC communication unit, and an infrared communication unit.

The tuner/demodulating unit 131 receives broadcast waves transmitted from the radio tower 300t via the antenna 100a, and tunes to (selects) a channel giving a service that the user wishes to have, under the control by the main control unit 101. Further, the tuner/demodulating unit 131 demodulates a received broadcasting signal to acquire an MMT data string. Although the example of FIG. 7A shows the configuration in which the broadcast receiving apparatus 100 has one tuner/demodulating unit, the broadcast receiving apparatus 100 may be configured to have a plurality of tuner/demodulating units for the purpose of simultaneously displaying a plurality of screens or recording a program on a different channel.

The separating unit 132 is an MMT decoder, and distributes a video data string, an audio data string, a caption data string, a subtitle data string, and the like which are real-time presentation elements to the video decoder 141, the audio decoder 143, the caption decoder 144, the subtitle decoder 145, and the like, respectively, based on a control signal included in an MMT data string inputted to the separating unit 132. Data inputted to the separating unit 132 may be an MMT data string transmitted through the broadcast transmission path to the tuner/demodulating unit 131 and demodulated therein or an MMT data string transmitted through the communication line to the LAN communication unit 121. Further, the separating unit 132 reproduces a multimedia application and filed data which is an element making up the multimedia application, and stores them temporarily in the cache unit 152. In addition, the separating unit 132 extracts and outputs general-purpose data to the data decoder 151 in order to use it for the streaming of data used by a player that presents data other than video, audio, and subtitle or for the streaming of data for an application. Further, the separating unit 132 may perform control such as error correction, access restriction, and the like on the input MMT data string under the control by the main control unit 101.

The video decoder 141 decodes a video data string input from the separating unit 132 and outputs video information. The video color gamut conversion unit 142 performs a color space converting process on the video information decoded in the video decoder 141 when necessary, in preparation for a video synthesizing process in the video synthesizing unit 161. The audio decoder 143 decodes an audio data string input from the separating unit 132 and outputs audio information. Further, for example, streaming data of an MPEG-DASH (MPEG-Dynamic Adaptive Streaming over HTTP) format or the like acquired from the Internet 200 through the LAN communication unit 121 may be inputted to the video decoder 141 and the audio decoder 143. A plurality of video decoders 141, video color gamut conversion units 142, audio decoders 143, and the like may be provided in order to simultaneously decode a plurality of kinds of video data strings and audio data strings.

The caption decoder 144 decodes a caption data string input from the separating unit 132 and outputs caption information. The subtitle decoder 145 decodes a subtitle data string input from the separating unit 132 and outputs subtitle information. The caption information output from the caption decoder 144 and the subtitle information output from the subtitle decoder 145 are subjected to a synthesizing process in the subtitle synthesizing unit 146 and then subjected to a color space converting process in the subtitle color gamut conversion unit 147 when necessary, in preparation for the video synthesizing process in the video synthesizing unit 161. In the present embodiment, among services presented simultaneously with the video of a broadcasting program and provided mainly as text information, a service related to the video contents is referred to as subtitle, while a service other than that is referred to as caption. When these services are not distinguished from each other, they are collectively referred to as subtitle.

The browser unit 154 presents a multimedia application file and filed data making up the multimedia application file, which are acquired from the cache unit 152 or a server device on the Internet 200 through the LAN communication unit 121, in accordance with an instruction of the application control unit 153, which interprets control information included in an MMT data string and control information acquired from a server device on the Internet 200 through the LAN communication unit 121. Note that the multimedia application file may be, for example, an HTML (Hyper Text Markup Language) document or BML (Broadcast Markup Language) document. The application information output from the browser unit 154 is subjected to a color space converting process in the application color gamut conversion unit 155 when necessary, in preparation for the video synthesizing process in the video synthesizing unit 161. Further, the browser unit 154 causes the sound source unit 156 to reproduce application audio information.

The video synthesizing unit 161 receives video information output from the video color gamut conversion unit 142, subtitle information output from the subtitle color gamut conversion unit 147, application information output from the application color gamut conversion unit 155, and the like, and performs a selection process and/or a superposition process as appropriate. The video synthesizing unit 161 has a video RAM (not shown), and the monitor unit 162 and the like are driven based on video information and the like inputted to the video RAM. Further, the video synthesizing unit 161 performs a scaling process and a superposing process of EPG (Electronic Program Guide) screen information created based on information such as MH-EIT included in MMT-SI when necessary under the control by the main control unit 101. The monitor unit 162 is, for example, a display device such as liquid crystal panel, and offers the video information subjected to the selection process and/or superposition process in the video synthesizing unit 161, to the user of the broadcast receiving apparatus 100. The video output unit 163 is a video output interface that outputs the video information subjected to the selection process and/or superposition process in the video synthesizing unit 161.

Figure 7B:
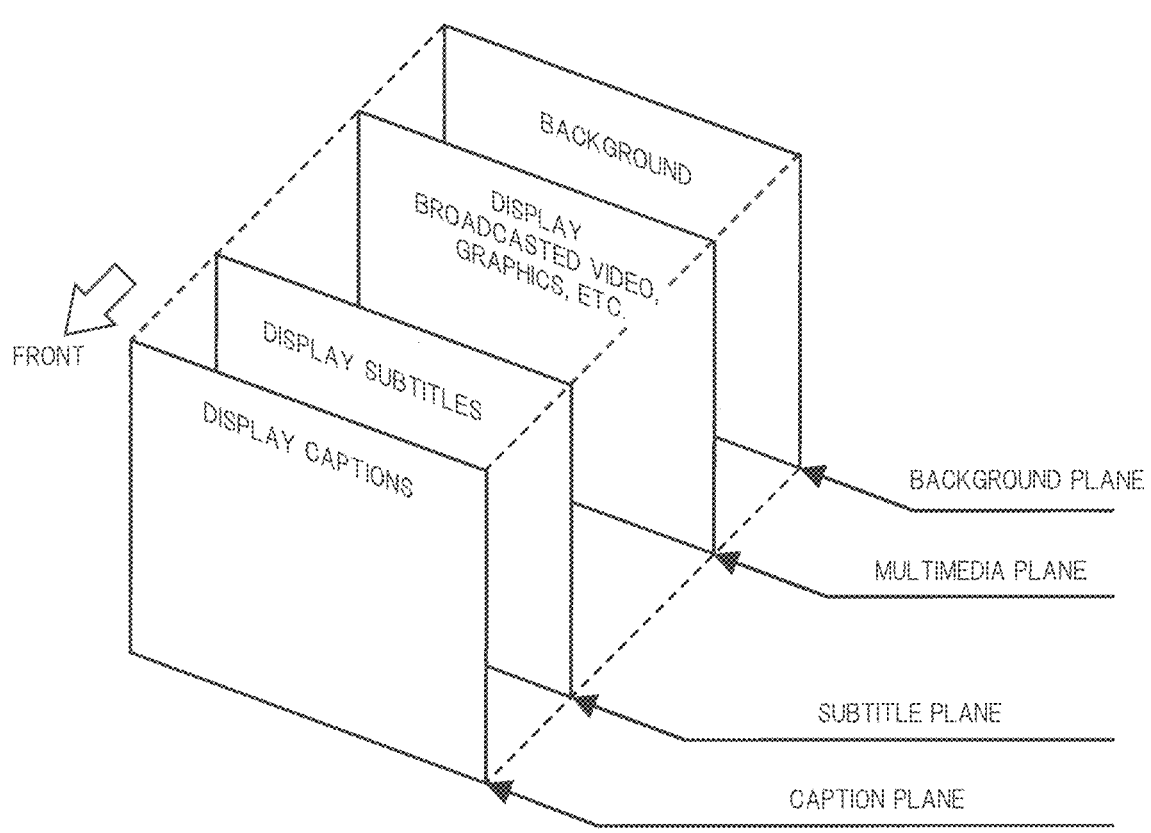
FIG. 7B is a configuration diagram of a logical plane structure of a presentation function of the broadcast receiving apparatus according to the first embodiment.

Note that the presentation function of the broadcast receiving apparatus 100 of the present embodiment has a logical plane structure for displaying a multimedia service in accordance with the intention of the service provider. FIG. 7B shows an example of a configuration of the logical plane structure that the presentation function of the broadcast receiving apparatus 100 of the present embodiment has. In the logical plane structure, a caption plane that displays captions is located on the forefront layer, a subtitle plane that displays subtitles is located on the second layer, a multimedia plane that displays broadcast video, multimedia application or synthesized video thereof is located on the third layer, and a background plane is located on the rearmost layer. The subtitle synthesizing unit 146 and the video synthesizing unit 161 draw the caption information on the caption plane, the subtitle information on the subtitle plane, and the video information, application information, and the like on the multimedia plane. Further, background color is drawn on the background plane based on an LCT included in MMT-SI. Note that it is also possible to provide a plurality of multimedia planes on the third layer in accordance with the number of video decoders 141. However, even when a plurality of multimedia planes is provided, application information and the like output from the application color gamut conversion unit 155 are displayed only on the multimedia plane located on the forefront layer.

The audio synthesizing unit 164 receives audio information output from the audio decoder 143 and application audio information reproduced in the sound source unit 156, and performs a selection process and/or a mixing process as appropriate. The speaker unit 165 offers audio information subjected to the selection process and/or mixing process in the audio synthesizing unit 164 to the user of the broadcast receiving apparatus 100. The audio output unit 166 is an audio output interface that outputs the audio information subjected to the selection process and/or mixing process in the audio synthesizing unit 164.

The extension interface unit 124 is a group of interfaces for extending the function of the broadcast receiving apparatus 100, and is configured of an analog video and audio interface, a USB (Universal Serial Bus) interface, a memory interface, and the like in the present embodiment. The analog video and audio interface receives analog video and audio signals from external video and audio output devices, and outputs analog video and audio signals to external video and audio input devices. The USB interface is connected to a PC and the like and transmits and receives data to and from the PC and the like. An HDD may be connected to the USB interface to record broadcasting programs and contents. A keyboard and other USB devices may also be connected to the USB interface. A memory card and other memory media are connected to the memory interface to transmit and receive data to and from them.

The digital interface unit 125 is an interface that outputs or receives coded digital video data and/or digital audio data. The digital interface unit 125 can output an MMT data string acquired by the demodulation in the tuner/demodulating unit 131, an MMT data string acquired through the LAN communication unit 121, or mixed data of the MMT data strings as it is. Further, the MMT data string input from the digital interface unit 125 may be controlled to be inputted to the separating unit 132. It is also possible to output the digital contents stored in the storage (accumulation) unit 110 via the digital interface unit 125 or store the digital contents to the storage (accumulation) unit 110 via the digital interface unit 125.

The digital interface unit 125 is provided as a DVI terminal, HDMI (registered trademark) terminal, or Displayer Port (registered trademark) terminal, and thus outputs and receives data in the format compliant with DVI specifications, HDMI specifications, or Displayer Port specifications. Alternatively, the digital interface unit 125 may output or receive data in a serial data format conforming to IEEE 1394 specifications and the like. Further, the digital interface unit 125 may be configured as an IP interface that performs the digital interface output via hardware such as Ethernet (registered trademark) and wireless LAN. In such a case, the digital interface unit 125 and the LAN communication unit 121 may share the hardware configuration.

The operation input unit 170 is an instruction input unit on which operation instructions to the broadcast receiving apparatus 100 are input. In the present embodiment, the operation input unit 170 is configured of a remote control receiving unit that receives commands transmitted from a remote controller and operation keys in which button switches are arranged (not shown), or may be configured of either the remote control receiving unit or the operation keys. Alternatively, the operation input unit 170 may be substituted by a touch panel overlaid on the monitor unit 162 or by a keyboard and others connected to the extension interface unit 124. The remote controller (not shown) may be substituted by the portable information terminal 700 having a remote control command transmission function.

Note that, when the broadcast receiving apparatus 100 is a television receiver or the like as mentioned above, the video output unit 163 and the audio output unit 166 are not essential constituent elements of the present invention. Further, the broadcast receiving apparatus 100 is not limited to a television receiver, but may be an optical disc drive recorder such as DVD (Digital Versatile Disc) recorder, a magnetic disk drive recorder such as an HDD recorder, or an STB (Set Top Box). The broadcast receiving apparatus 100 may also be a PC (Personal Computer), a tablet terminal, a navigation device, a game machine, and the like having a digital broadcast receiving function and a broadcasting/communication cooperation function. When the broadcast receiving apparatus 100 is the DVD recorder, the HDD recorder, STB, or the like, the broadcast receiving apparatus 100 does not have to be provided with the monitor unit 162 and the speaker unit 165. In such a case, the operation similar to that of the broadcast receiving apparatus 100 of the present embodiment is possible by connecting an external monitor and an external speaker to the video output unit 163, the audio output unit 166, or the digital interface unit 125.

[System Configuration for Clock Synchronization/Presentation Synchronization in Broadcast Receiving Apparatus]

Figure 7C:
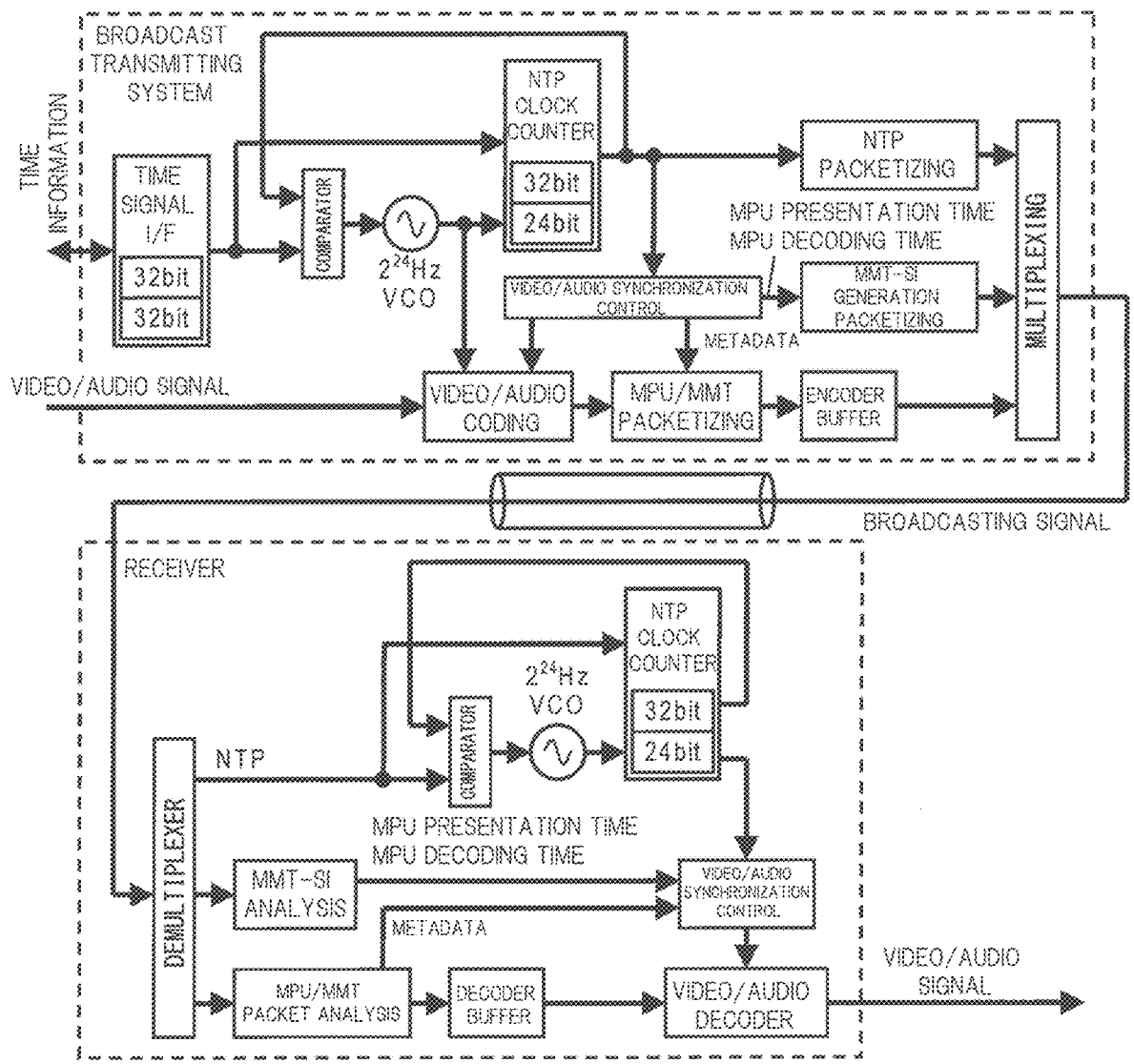
FIG. 7C is a system configuration diagram for clock synchronization/presentation synchronization in the broadcast receiving apparatus according to the first embodiment.

FIG. 7C shows an example of a system configuration for clock synchronization/presentation synchronization in the broadcasting system compatible with the broadcast receiving apparatus 100 of the present embodiment. In the broadcasting system of the present embodiment, UTC expressed in a 64-bit-length NTP timestamp format is transmitted from the broadcast transmitting system to the receiver (broadcast receiving apparatus 100 of the present embodiment). In the NTP timestamp format, "second or more" of UTC is expressed by 32 bits, and "less than second" is also expressed by 32 bits. In practice, however, it is difficult to reproduce one second in 32-bit precision. For this reason, for example, a clock with a frequency of "24th power of 2" Hz (about 16.8 MHz) may be used as a system clock for video system synchronization and a system clock for operating a timepiece conforming to the NTP as shown in FIG. 7C. Considering the fact that the frequency of a system clock adopted in a conventional broadcasting system is 27 MHz and the hardware configuration of the receiver can be simplified, it is desirable that a clock whose frequency is exponentiation of 2 ranging from "24th power of 2" to "28th power of 2" is adopted as the system clock.

When the frequency of the system clock is set to exponentiation of 2 ranging from "24th power of 2" to "28th power of 2" in the broadcast transmitting system and the receiver as described above, 4 to 8 low-order bits in the NTP timestamp format transmitted from the broadcast transmitting system to the receiver, the low-order bits being not referred to by a PLL (Phase Locked Loop) system for reproducing the system clock or the timepiece conforming to the NTP, may be fixed to "0" or "1". Namely, when the frequency of the system cock is "$n^{th}$ power of 2" Hz (n=24 in FIG. 7C), "32-n" low-order bits in the NIP timestamp format may be fixed to "0" or "1". Alternatively, the receiver may perform the process without regard for the "32-n" low-order bits in the NTP timestamp format.

When receiving time information in the NTP format, the broadcast transmitting system builds the PLL system with a 32+n bit counter including VCO (Voltage Controlled Oscillator) with a frequency of "$n^{th}$ power of 2" Hz, thereby providing a transmission system clock that synchronizes with the time information given from outside. Further, the broadcast transmitting system causes the overall signal processing units to operate in synchronization with the system clock of "$n^{th}$ power of 2" Hz. In addition, the broadcast transmitting system periodically transmits the output of the transmission system clock as time information in the NTP-length format to the receiver through the broadcast transmission path.

The receiver receives the time information in the NTP-length format through the broadcast transmission path and reproduces a reception system clock by the PLL system including the VCO with the frequency of "$n^{th}$ power of 2" Hz in the same manner as the broadcast transmitting system. As a result, the reception system clock works in synchronization with the transmission system clock of the broadcast transmitting system. Further, by operating the signal processing system of the receiver in synchronization with the system clock of "$n^{th}$ power of 2" Hz, clock synchronization between the broadcast transmitting system and the receiver can be achieved, and thus the stable signal reproduction can be achieved. Further, decoding time and presentation time in units of presentation of video and audio signals are set based on the time information in the NTP format in the broadcast transmitting system. Here, an MPU timestamp descriptor to be described later with reference to FIG. 13B is stored in the MPT which is stored in a PA message transmitted by a broadcasting signal. In the MPU timestamp descriptor shown in FIG. 13B, an "mpu_sequence_number (MPU sequence number)" parameter indicates a sequence number for an MPU that describes a timestamp, and an "mpu_presentation_time (MPU presentation time)" parameter indicates the presentation time of the MPU in the 64-bit NTP timestamp format. Thus, the receiver can control timing of presenting (displaying or outputting) video signals, audio signals, subtitles, captions, and the like for each of MPUs by referring to the MPU timestamp descriptor stored in the MPT.

In the case of paying attention to the above-described control of decoding timing and presentation timing of video and audio signals in units of presentation, synchronization of video and audio signals can be ensured by a clock with a frequency of about "16th power of 2" Hz (about 65.5 KHz). In this case, it is not necessary to refer to 16 low-order bits in an NTP timestamp format described in an MPU timestamp descriptor or the like. Namely, when a clock of "$m^{th}$ power of 2" Hz, which is generated by dividing the frequency of system clock, is used for the control of decoding timing and presentation timing, it is not necessary to refer to "32-m" low-order bits in an NTP timestamp format described in an MPU timestamp descriptor or the like. Thus, the "32-m" low-order bits in the NTP timestamp format described in the MPU timestamp descriptor or the like may be fixed to "0" or "1".

[Software Configuration of Broadcast Receiving Apparatus]

Figure 7D:
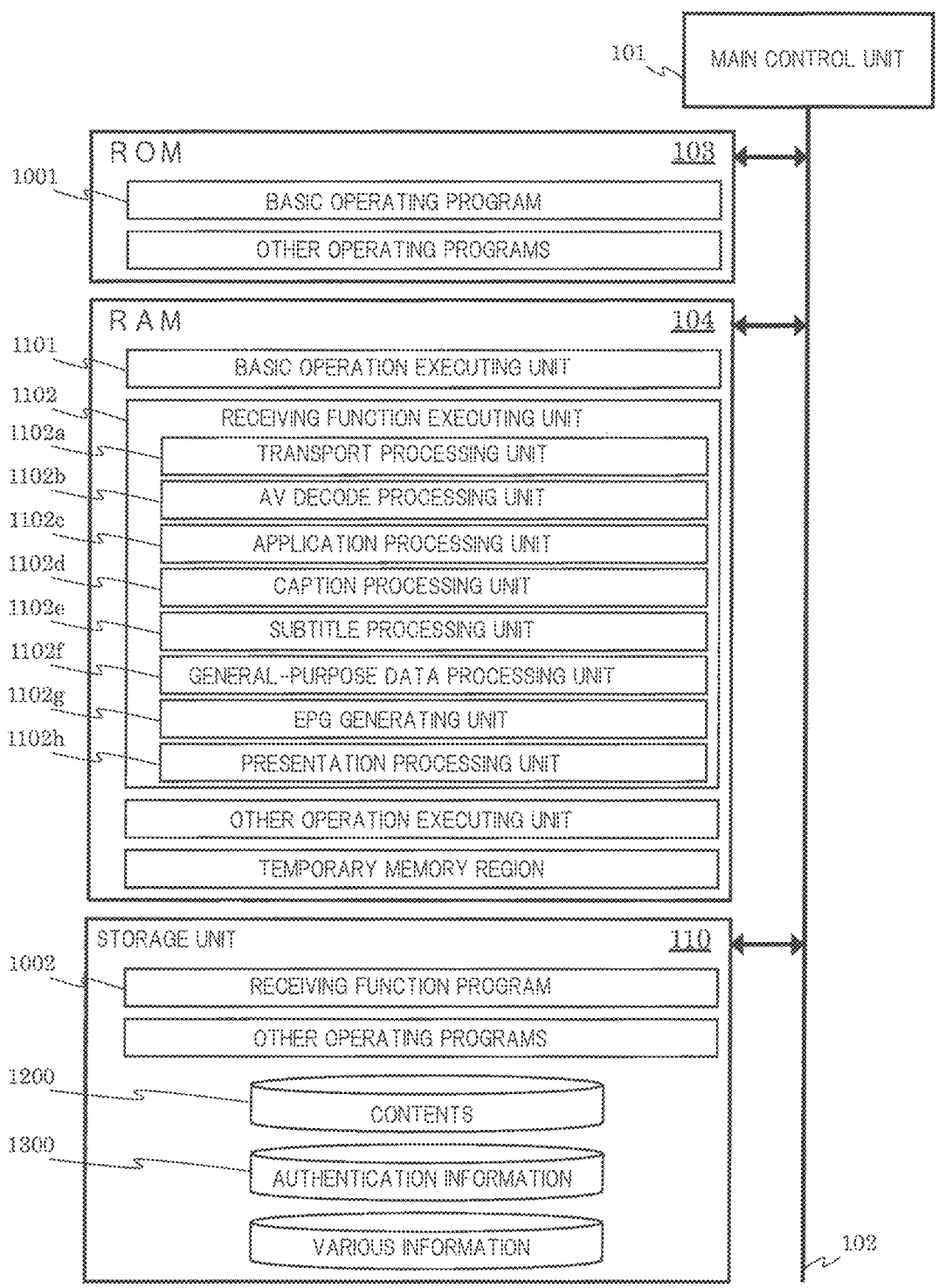
FIG. 7D is a software configuration diagram of the broadcast receiving apparatus according to the first embodiment.

FIG. 7D is a software configuration diagram of the broadcast receiving apparatus 100 of the present embodiment, and shows respective software configurations of the ROM 103, the RAM 104, and the storage (accumulation) unit 110. In the present embodiment, the ROM 103 stores a basic operating program 1001 and other operating programs, and the storage (accumulation) unit 110 stores a receiving function program 1002 and other operating programs. Further, the storage (accumulation) unit 110 includes a contents memory region 1200 storing such contents as moving images, still images, and sounds, an authentication information memory region 1300 storing authentication information and the like needed when access is made to an external portable terminal or server device, and a various information memory region storing other various types of information.

The basic operating program 1001 stored in the ROM 103 is loaded onto the RAM 104, and the loaded basic operating program is executed by the main control unit 101 to configure a basic operation executing unit 1101. Similarly, the receiving function program 1002 stored in the storage (accumulation) unit 110 is loaded onto the RAM 104, and the loaded receiving function program is executed by the main control unit 101 to configure a receiving function executing unit 1102. Further, the RAM 104 has a temporary memory region that temporarily saves data created at execution of each operating program when necessary.

In the following, for simpler description, a process in which the main control unit 101 loads the basic operating program 1001 from the ROM 103 onto the RAM 104 and executes the basic operating program 1001 to control each operating block is described simply as a process in which the basic operation executing unit 1101 performs control of each operating block. The same applies also to the description of other operating programs.

The receiving function executing unit 1102 controls each operating block of the broadcast receiving apparatus 100 to reproduce video and audio components transmitted by the broadcasting system of the present embodiment. In particular, a transport processing unit 1102a mainly controls the MMT decoder function of the separating unit 132, and distributes a video data string, audio data string, and the like separated from an MMT data string to corresponding decode processing units, respectively. An AV decode processing unit 1102b mainly controls the video decoder 141, the audio decoder 143, and the like. An application processing unit 1102c mainly controls the cache unit 152, the application control unit 153, the browser unit 154, and the sound source unit 156. A caption processing unit 1102d mainly controls the caption decoder 144. A subtitle processing unit 1102e mainly controls the subtitle decoder 145. A general-purpose data processing unit 1102f mainly controls the data decoder 151. An EPG generating unit 1102g interprets the descriptive contents of an MH-EIT and others included in MMT-SI to generate an EPG screen. A presentation processing unit 1102h mainly controls the video color gamut conversion unit 142, the subtitle synthesizing unit 146, the subtitle color gamut conversion unit 147, the application color gamut conversion unit 155, the video synthesizing unit 161, and the audio synthesizing unit 164 based on the logical plane structure.

The above-described operating programs may be stored in advance in the ROM 103 and/or the storage (accumulation) unit 110 at the time of product shipment, or may be acquired from the other application server 500 and others on the Internet 200 through the LAN communication unit 121 after the product shipment. Alternatively, the operating programs stored in a memory card, optical disc, and the like may be acquired through the extension interface unit 124 and others.

[Configuration of Broadcast Station Server]

Figure 8:
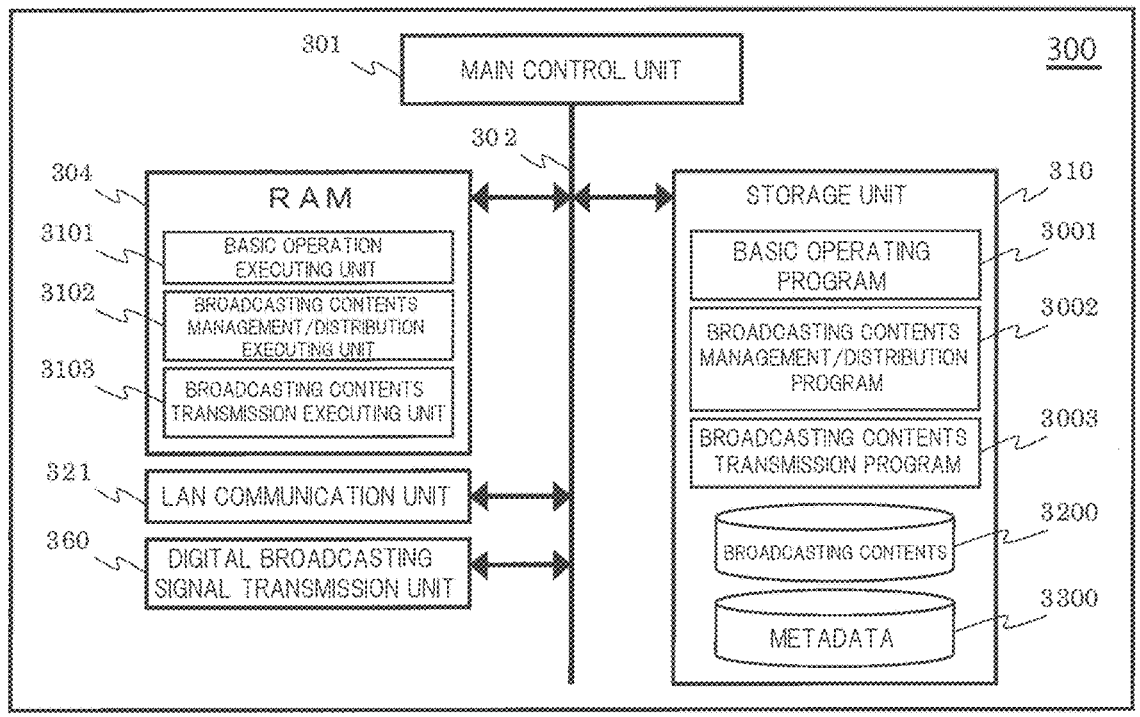
FIG. 8 is a block diagram of a broadcast station server according to the first embodiment.

FIG. 8 is a block diagram showing an example of an internal configuration of the broadcast station server 300. The broadcast station server 300 includes a main control unit 301, a system bus 302, a RAM 304, a storage unit 310, a LAN communication unit 321, and a digital broadcasting signal transmission unit 360.

The main control unit 301 is a microprocessor unit that controls the whole of the broadcast station server 300 in accordance with a predetermined operating program. The system bus 302 is a data communication path through which data is exchanged between the main control unit 301 and each of operating blocks in the broadcast station server 300. The ROM 304 serves as a work area used when each operating program is executed.

The storage unit 310 stores a basic operating program 3001, a broadcasting contents management/distribution program 3002, and a broadcasting contents transmission program 3003, and includes a broadcasting contents memory region 3200 and a metadata memory region 3300. The broadcasting contents memory region 3200 stores the contents of broadcasting programs and others broadcasted by the broadcast station. The metadata memory region 3300 stores metadata such as the titles, IDs, summaries, casts, and broadcasting dates of the broadcasting programs and copy control information related to program contents.

Further, the basic operating program 3001, the broadcasting contents management/distribution program 3002, and the broadcasting contents transmission program 3003 stored in the storage unit 310 are loaded onto the RAM 304, and the respective loaded programs are executed by the main control unit 301 to configure a basic operation executing unit 3101, a broadcasting contents management/distribution executing unit 3102, and a broadcasting contents transmission executing unit 3103.

In the following, for simpler description, a process in which the main control unit 301 loads the basic operating program 3001 from the storage unit 310 onto the RAM 304 and executes the basic operating program 3001 to control each operating block is described simply as a process in which the basic operation executing unit 3101 performs control of each operating block. The same applies also to the description of other operating programs.

The broadcasting contents management/distribution executing unit 3102 performs management of the contents of broadcasting programs stored in the broadcasting contents memory region 3200 and the metadata stored in the metadata memory region 3300, and performs control when the contents of broadcasting programs and metadata are delivered to a service provider based on a contract. Further, when delivering the contents of broadcasting programs and metadata to the service provider, the broadcasting contents management/distribution executing unit 3102 may perform a process of authenticating the service provider server 400 based on the contract when necessary.

The broadcasting contents transmission executing unit 3103 manages a time schedule and others when transmitting an MMT data string, which includes the contents of broadcasting programs accumulated in the broadcasting contents memory region 3200, and the titles and IDs of broadcasting programs and copy control information of program contents accumulated in the metadata memory region 3300, from the radio tower 300t via the digital broadcasting signal transmission unit 360.

The LAN communication unit 321 is connected to the Internet 200, and communicates with the service provider server 400 and others on the Internet 200. The LAN communication unit 321 has a coding circuit, a decoding circuit, and the like. The digital broadcasting signal transmission unit 360 modulates an MMT data string composed of a video data string, audio data string, program data string, and the like of the contents of broadcasting programs accumulated in the broadcasting contents memory region 3200, and transmits the modulated data string as the digital broadcast waves through the radio tower 300t.

[Configuration of Service Provider Server]

Figure 9:
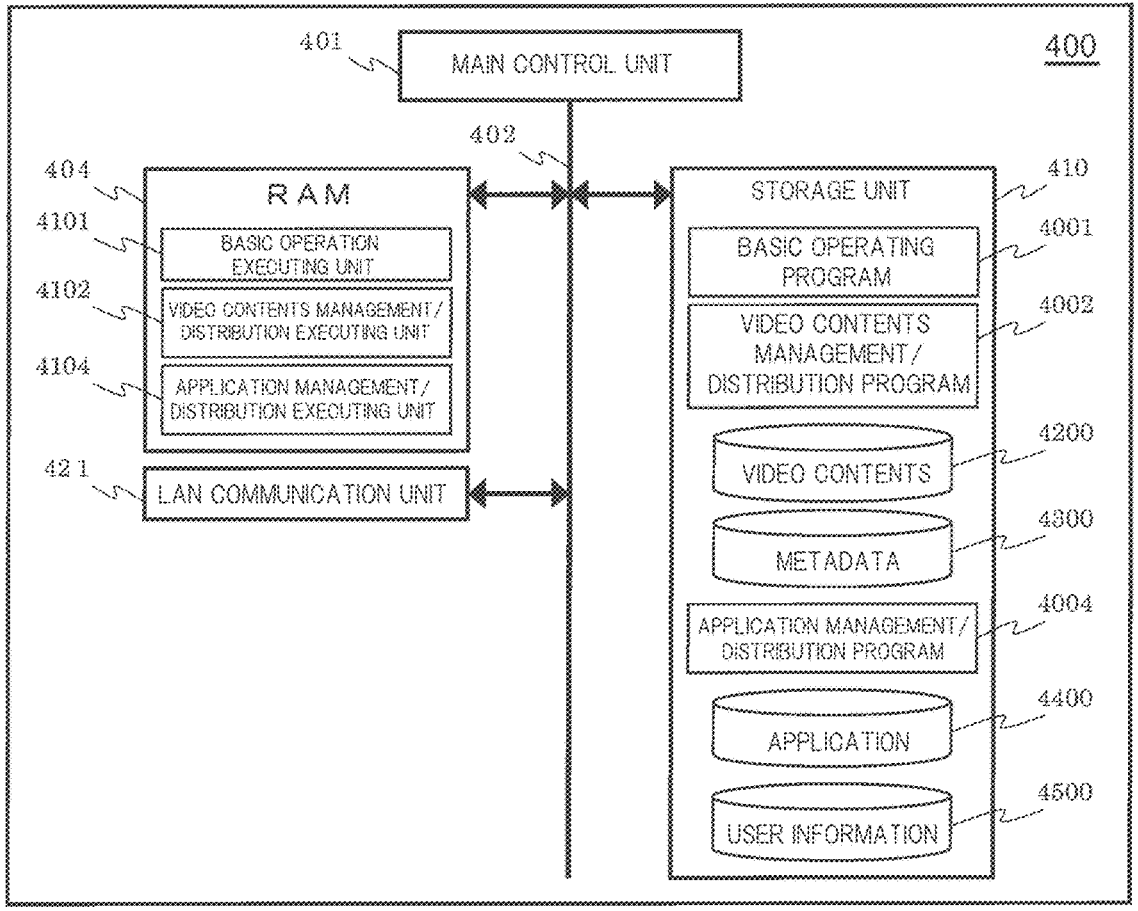
FIG. 9 is a block diagram of a service provider server according to the first embodiment.

FIG. 9 is a block diagram showing an example of an internal configuration of the service provider server 400. The service provider server 400 includes a main control unit 401, a system bus 402, a RAM 404, a storage unit 410, and a LAN communication unit 421.

The main control unit 401 is a microprocessor unit that controls the whole of the service provider server 400 in accordance with a predetermined operating program. The system bus 402 is a data communication path through which data is exchanged between the main control unit 401 and each of operating blocks in the service provider server 400. The ROM 404 serves as a work area that is used when each operating program is executed.

The storage unit 410 stores a basic operating program 4001, a video contents management/distribution program 4002, and an application management/distribution program 4004, and includes a video contents memory region 4200, a metadata memory region 4300, an application memory region 4400, and a user information memory region 4500. The video contents memory region 4200 stores the contents of broadcasting programs provided from the broadcast station server 300 as video contents, and stores video contents and the like created by the service provider. The metadata memory region 4300 stores metadata provided from the broadcast station server 300 and metadata related to video contents created by the service provider. The application memory region 4400 stores various applications and others for distributing the services cooperated with broadcasting programs in response to demands from television receivers. The user information memory region 4500 stores information (personal information, authentication information, etc.) related to a user who is permitted to access the service provider server 400.

Further, the basic operating program 4001, the video contents management/distribution program 4002, and the application management/distribution program 4004 stored in the storage unit 410 are loaded onto the RAM 404, and the respective loaded basic operating program, video contents management/distribution program, and application management/distribution program are executed by the main control unit 401 to configure a basic operation executing unit 4101, a video contents management/distribution executing unit 4102, and an application management/distribution executing unit 4104.

In the following, for simpler description, a process in which the main control unit 401 loads the basic operating program 4001 stored in the storage unit 410 onto the RAM 404 and executes the basic operating program 4001 to control each operating block is described simply as a process in which the basic operation executing unit 4101 performs control of each operating block. The same applies also to description of other operating programs.

The video contents management/distribution executing unit 4102 acquires the contents and others of broadcasting programs and metadata from the broadcast station server 300, manages video contents and others and metadata stored in the video contents memory region 4200 and the metadata memory region 4300, and controls distribution of the video contents and others and metadata to television receivers. Further, when distributing the video contents and others and metadata to the television receivers, the video contents management/distribution executing unit 4102 may perform a process of authenticating the television receivers when necessary. Further, the application management/distribution executing unit 4104 manages applications stored in the application memory region 4400 and controls distribution of the applications in response to demands from the television receivers. Further, when distributing the applications to the television receivers, the application management/distribution executing unit 4104 may perform a process of authenticating the television receivers when necessary.

The LAN communication unit 421 is connected to the Internet 200, and communicates with the broadcast station server 300 on the Internet 200 and the broadcast receiving apparatus 100 via the router device 200r. The LAN communication unit 421 includes a coding circuit, a decoding circuit, and the like.

[Hardware Configuration of Portable Information Terminal]

Figure 10A:
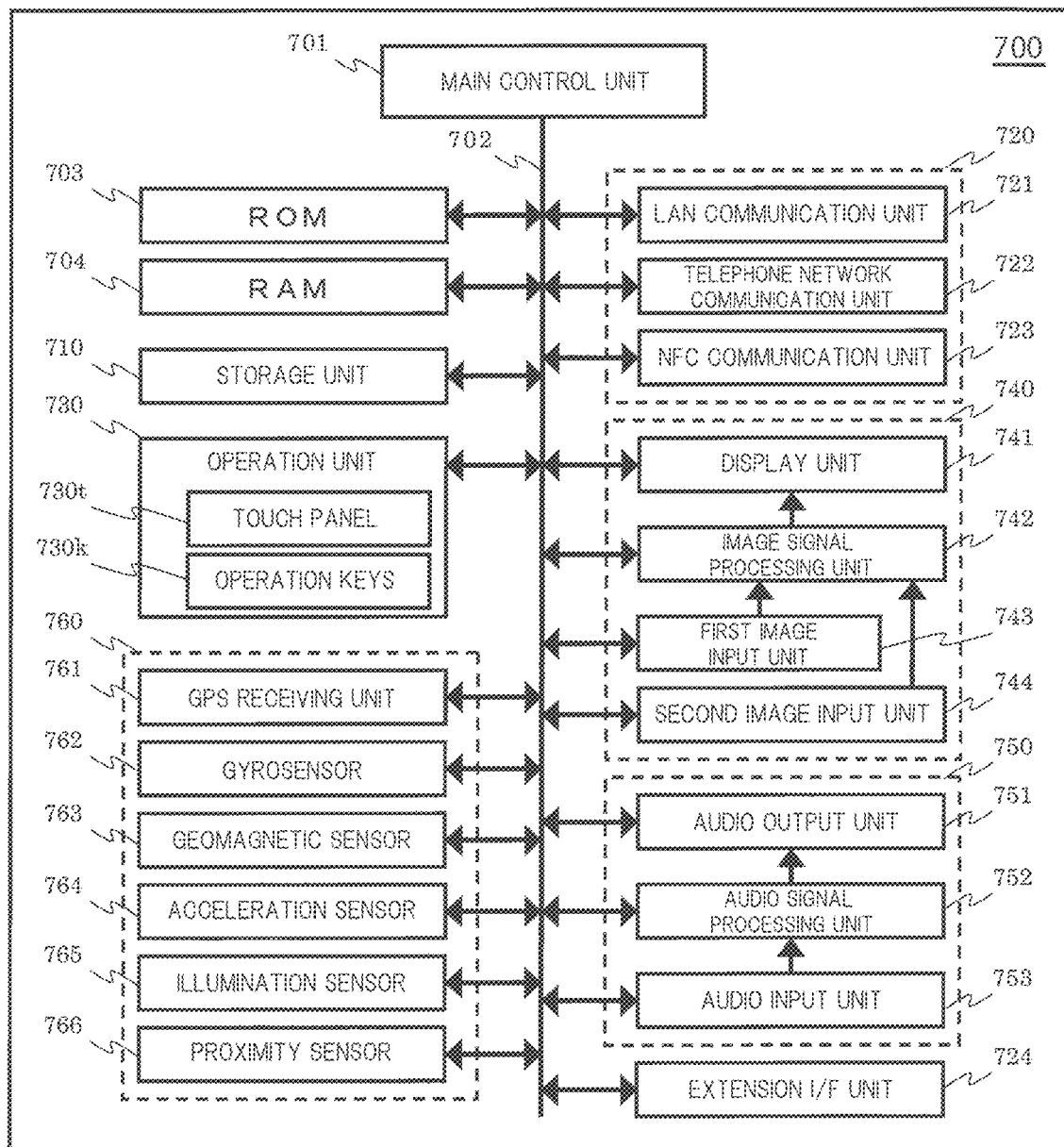
FIG. 10A is a block diagram of a portable information terminal according to the first embodiment.

FIG. 10A is a block diagram showing an example of an internal configuration of the portable information terminal 700. The portable information terminal 700 includes a main control unit 701, a system bus 702, a ROM 703, a RAM 704, a storage unit 710, a communication processing unit 720, an extension interface unit 724, an operation unit 730, an image processing unit 740, an audio processing unit 750, and a sensor unit 760.

The main control unit 701 is a microprocessor unit that controls the whole of the portable information terminal 700 in accordance with a predetermined operating program. The system bus 702 is a data communication path through which data is exchanged between the main control unit 701 and each of operating blocks in the portable information terminal 700.

The ROM 703 is a memory storing a basic operating program such as operating system and other operating programs, and is provided as, for example, a rewritable ROM such as EEPROM and flash ROM. The RAM 704 serves as a work area used when the basic operating program and other operating programs are executed. The ROM 703 and the RAM 704 may be integrated with the main control unit 701. Further, apart of the memory region of the storage unit 710 may be used as the ROM 703 instead of providing the ROM 703 having the independent configuration shown in FIG. 10A.

The storage unit 710 stores the operating programs and operation set values of the portable information terminal 700 and personal information of the user of the portable information terminal 700. In addition, the storage unit 710 can store an operating program downloaded through the Internet 200 and various data created by the operating program. Further, the storage unit 710 can store such contents as moving images, still images, and sounds that are downloaded through the Internet 200. Apart of the memory region of the storage unit 710 may be used to substitute for a part or the whole of the function of the ROM 703. Further, the storage unit 710 needs to retain the stored information even when power is not supplied to portable information terminal 700 from an external power source. Therefore, the storage unit 710 is provided as, for example, a non-volatile semiconductor element memory such as flash ROM or SSD or a magnetic disk drive such as an HDD.

Note that the operating programs stored in the ROM 703 and the storage unit 710 can be added, updated and functionally extended by the downloading process from server devices on the Internet 200.

The communication processing unit 720 includes a LAN communication unit 721, a mobile phone network communication unit 722, and an NFC communication unit 723. The LAN communication unit 721 is connected to the Internet 200 via the router device 200r and the access point 200a, and transmits and receives data to and from server devices and other communication equipment on the Internet 200. The LAN communication unit 721 is connected to the router device 200r and the access point 200a through wireless communication such as Wi-Fi (registered trademark). The mobile phone network communication unit 722 performs telephone communication (telephone call) and data transmission and reception through wireless communication with the base station 600b on the mobile phone communication network. The NFC communication unit 723 communicates wirelessly with the corresponding reader/writer when located in proximity to the reader/writer. The LAN communication unit 721, the mobile phone network communication unit 722, and the NFC communication unit 723 each have a coding circuit, a decoding circuit, an antenna, and the like. The communication processing unit 720 may further includes other communication units such as a BlueTooth (registered trademark) communication unit and an infrared communication unit.

The extension interface unit 724 is a group of interfaces for extending the function of the portable information terminal 700, and is configured of a video and audio interface, a USB interface, a memory interface, and the like in the present embodiment. The video and audio interface receives video and audio signals from external video and audio output devices, and outputs video and audio signals to external video and audio input devices. The USB interface is connected to a PC and others and transmits and receives data to and from the PC and others. A keyboard and other USB devices may also be connected to the USB interface. A memory card and other memory media are connected to the memory interface to transmit and receive data to and from them.

The operation unit 730 is an instruction input unit that inputs operation instructions to the portable information terminal 700. In the present embodiment, the operation unit 730 is composed of a touch panel 730t overlaid on a display unit 741 and operation keys 730k in which button switches are arranged. The operation unit 730 may be composed of either the touch panel 730t or the operation keys 730k. The portable information terminal 700 may be operated using a keyboard or the like connected to the extension interface unit 724, or may be operated using a separate terminal device connected through wired communication or wireless communication. Namely, the portable information terminal 700 may be operated through instructions from the broadcast receiving apparatus 100. Further, the display unit 741 may be provided with the above-described touch panel function.

The image processing unit 740 includes the display unit 741, an image signal processing unit 742, a first image input unit 743, and a second image input unit 744. The display unit 741 is, for example, a display device such as liquid crystal panel, and offers image data processed in the image signal processing unit 742 to the user of the portable information terminal 700. The image signal processing unit 742 has a video RAM (not shown), and the display unit 741 is driven based on image data inputted to the video RAM. Further, the image signal processing unit 742 has a function of performing processes of converting formats, superposing a menu and other OSD (On Screen Display) signals, and others when necessary. Each of the first image input unit 743 and the second image input unit 744 is a camera unit that inputs image data of surroundings or a target object by converting light input through a lens into electrical signals by using an electronic device such as a CCD (Charge Coupled Device) and CMOS (Complementary Metal Oxide Semiconductor) sensor.

The audio processing unit 750 includes an audio output unit 751, an audio signal processing unit 752, and an audio input unit 753. The audio output unit 751 is a speaker, and offers an audio signal processed in the audio signal processing unit 752 to the user of the portable information terminal 700. The audio input unit 753 is a microphone, and converts the voice of the user and others into audio data to input it to the portable information terminal 700.

The sensor unit 760 is a group of sensors that detect the state of the portable information terminal 700, and includes a GPS receiving unit 761, a gyro sensor 762, a geomagnetic sensor 763, an acceleration sensor 764, an illuminance sensor 765, and a proximity sensor 766 in the present embodiment. These sensors make it possible to detect the location, tilt, angle, and motion of the portable information terminal 700, and the brightness and the proximity of an object around the portable information terminal 700. The portable information terminal 700 may further include other sensors such as a pressure sensor in addition to these sensors.

The portable information terminal 700 may be provided as a cellular phone, a smartphone, or a tablet terminal, or may be provided as a PDA (Personal Digital Assistants), a notebook PC, or the like. Alternatively, the portable information terminal 700 may be provided as a digital still camera, a video camera capable of taking moving pictures, a portable game machine, a navigation device, or other portable digital devices.

The configuration example of the portable information terminal 700 shown in FIG. 10A includes a number of constituent elements that are not essential to the present embodiment such as the sensor unit 760, but even the configuration that does not include such constituent elements does not impair the effect of the present embodiment. The portable information terminal 700 may further include additional constituent elements (not shown) such as a digital broadcast receiving function and an electronic money settlement function.

[Software Configuration of Portable Information Terminal]

Figure 10B:
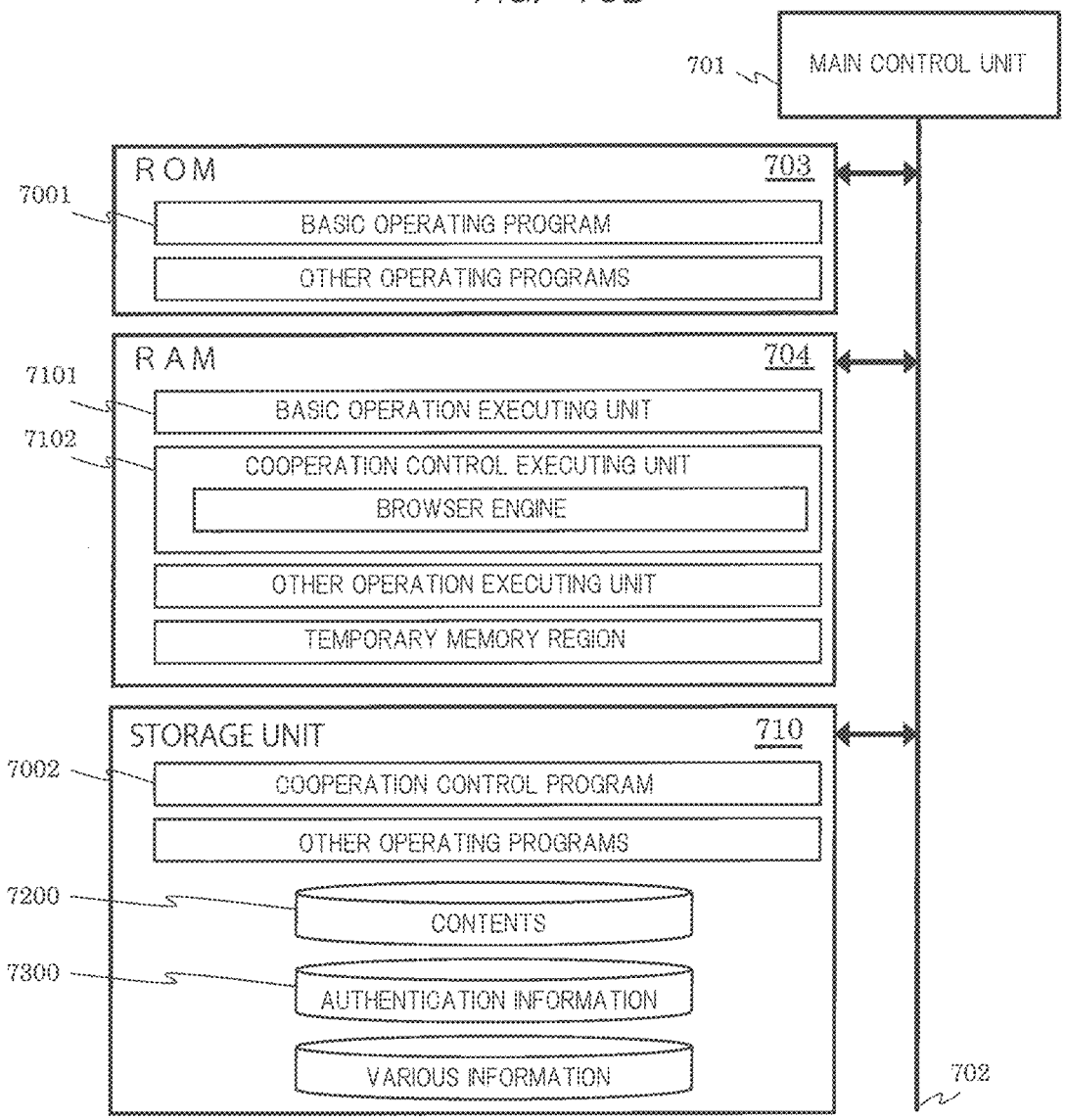
FIG. 10B is a software configuration diagram of the portable information terminal according to the first embodiment.

FIG. 10B is a software configuration diagram of the portable information terminal 700 of the present embodiment, and shows respective software configurations of the ROM 703, the RAM 704, and the storage unit 710. In the present embodiment, the ROM 703 stores a basic operating program 7001 and other operating programs, and the storage unit 710 stores a cooperation control program 7002 and other operating programs. Further, the storage unit 710 includes a contents memory region 7200 storing such contents as moving images, still images, and sounds, an authentication information memory region 7300 storing authentication information and others needed when access is made to the television receiver or each server device, and a various information memory region storing other various types of information.

The basic operating program 7001 stored in the ROM 703 is loaded onto the RAM 704, and the loaded basic operating program is executed by the main control unit 701 to configure a basic operation executing unit 7101. Similarly, the cooperation control program 7002 stored in the storage unit 710 is loaded onto the RAM 704, and the loaded cooperation control program 7002 is executed by the main control unit 701 to configure a cooperation control executing unit 7102.

Further, the RAM 704 has a temporary memory region that temporarily saves data created at execution of each operating program when necessary.

In the following, for simpler description, a process in which the main control unit 701 loads the basic operating program. 7001 from the ROM 703 onto the RAM 704 and executes the basic operating program 7001 to control each operating block is described simply as a process in which the basic operation executing unit 7101 performs control of each operating block. The same applies also to the description of other operating programs.

The cooperation control executing unit 7102 manages device authentication, connection, data transmission and reception, and the like when the portable information terminal 700 performs operations cooperated with the television receiver. Further, the cooperation control executing unit 7102 has a browser engine function for executing an application cooperated with the television receiver.

The above-described operating programs may be stored in advance in the ROM 703 and/or the storage unit 710 at the time of product shipment, or may be acquired from the other application server 500 and others on the Internet 200 through the LAN communication unit 721 or the mobile phone network communication unit 722 after the product shipment. Alternatively, the operating programs stored in a memory card, optical disc, and the like may be acquired through the extension interface unit 724 and others.

[Time Management of Broadcast Receiving Apparatus]

The broadcast receiving apparatus of the present embodiment has two types of time management functions. The first time management function is the time management function based on the NTP, which has been already described above with reference to FIG. 7C. The second time management function is a time management function based on an MH-TOT, and is the time managed based on time information transmitted by the MH-TOT described in FIG. 6B.

FIG. 13A shows an example of a configuration of time information transmitted in the NTP format. FIG. 13B shows an example of the data structure of the above-described MPU timestamp descriptor. A "reference_timestamp" parameter, "transmit_timestamp" parameter, and the like in the NTP format represent time data in the NTP-length format with a 64-bit length, and an "mpu_presentation_time" parameter in the MPU timestamp descriptor also represents time data in the NTP timestamp format with a 64-bit length. In the time data in the NTP-length format and the time data in the NTP timestamp format, "second or more" of UTC is expressed by 32 bits, and "less than second" is also expressed by 32 bits. Namely, the time information in the NTP format can transmit the time information up to "less than second". Further, since the time information in the NTP format is expressed by the UTC notation, it is compatible with NTP data included in a signal received through the communication line (e.g., signal received by the LAN communication unit 121 of FIG. 7A) as shown in FIG. 3(B), unlike the clock management in the conventional digital broadcasting.

In contrast, the information transmitted by the MH-TOT is as follows. The broadcast receiving apparatus 100 can acquire the current date and Japan Standard Time through the MH-TOT. FIG. 11A shows an example of the data structure of the MH-TOT. The broadcast receiving apparatus 100 can acquire the current date and current time from a "JST_time" parameter included in the MH-TOT. As shown in FIG. 11B, the "JST_time" parameter includes the information of 16 lower-order bits of coded data of the current date based on the Modified Julian Date (MJD) and the information of 24 bits representing the Japan Standard Time (JST) with 6 blocks of 4-bit binary-coded decimal (BCD). The current date can be calculated by performing a given calculation on the 16-bit coded data of the MJD. The 6 blocks of 4-bit binary-coded decimal are made up of 2 blocks of 4-bit binary-coded decimal that represent "hour" with a two-digit decimal number, next 2 blocks of 4-bit binary-coded decimal that represent "minute" with a two-digit decimal number, and last 2 blocks of 4-bit binary-coded decimal that represent "second" with a two-digit decimal number.

Thus, the difference between time information based on the NTP and time information based on the MH-TOT is that the NTP is the information expressed in the UTC notation that covers time units up to "less than second" as described above, while the information based on the MH-TOT is the information expressed in the JST notation that covers time units up to "second".

In the broadcast receiving apparatus 100 of the present embodiment, the time management function based on the NTP that is the time information expressed in the UTC notation is used for the synchronization in decoding process and display process of broadcasting signal contents including video, audio, subtitles, and captions, and other presentation data, and thus it is possible to achieve a highly accurate synchronization process. Further, by referring to time information expressed in the UTC notation instead of time information based on clocks of the broadcast station, it is also possible to perform the synchronization in decoding process and display process between broadcasting signal contents received by broadcasting signals including video, audio, subtitles, captions, and other data and data received through the communication line including video, audio, subtitles, and captions, and other data.

In addition, in the broadcast receiving apparatus 100 of the present embodiment, the time management function based on the "JST_time" including the 24-bit information expressed by 6 blocks of 4-bit binary-coded decimal in the MH-TOT may be used for performing each of the process of presenting the current time to the user and the process handling the MH-event information table (MH-EIT) described in FIG. 6B. In general, in the process of presenting the current time to the user, the broadcast receiving apparatus is rarely required to have the accuracy to the extent of less than "second". Each piece of time information in the MH-event information table (MH-EIT) is stored as 24-bit information composed of 6 blocks of 4-bit binary-coded decimal, expressing "hour", "minute", and "second" with two-digit decimal numbers, like the EIT for conventional digital broadcasting that is transmitted by the MPEG2-TS method. For this reason, the time management function based on the MH-TOT of the broadcast receiving apparatus 100 of the present embodiment easily matches with a process using the MH-EIT. The process using the MH-EIT includes, specifically, a process of creating a program guide (to be described later), a process of controlling timer recording and viewing reservation, a process of protecting copy rights such as temporary data storage, and the like. This is because each of these processes is rarely required to have the accuracy to the extent of less than "second", and the accuracy covering up to time unit "second" is enough.

Further, the process of creating a program guide, the process of controlling timer recording and viewing reservation, and the process of protecting copy rights such as temporary data storage are functions incorporated even in a receiver of the conventional digital broadcasting system using the MPEG2-TS method. Accordingly, if the broadcasting system of the present embodiment is configured in such a way as to execute the time management process compatible with the time management function of the conventional digital broadcasting system using the MPEG2-TS method in performing the process of creating a program guide, the process of controlling timer recording and viewing reservation, the process of protecting copy rights such as temporary data storage, and others, it becomes unnecessary to separately design process algorithms for these processes (process of creating a program guide, process of controlling timer recording and viewing reservation, process of protecting copy rights such as temporary data storage, etc.) when the broadcast receiving apparatus having both of a receiving function of digital broadcasting by the conventional MPEG2-TS method and a receiving function of digital broadcasting by the MMT method is configured, and the cost is thus reduced.

Further, even in a receiver that does not have the receiving function of digital broadcasting by the conventional MPEG2-TS method but has only the receiving function of digital broadcasting by the MMT method, algorithms for the function incorporated in the receiver of digital broadcasting system using the conventional MPEG2-TS method can be applied without creating new algorithms for the processes of creating a program guide, controlling timer recording and viewing reservation, protecting copy rights such as temporary data storage, and the like, and thus the development with less cost is possible.

Consequently, with the configuration in which the time management function based on the "JST_time" parameter in the MH-TOT is used for performing these processes (process of creating a program guide, process of controlling timer recording and viewing reservation, process of protecting copy rights such as temporary data storage, etc.), even the broadcast receiving apparatus for the digital broadcasting by the MMT method is made highly compatible with the broadcasting system using the conventional broadcasting method, and therefore can be provided at low cost.

As describe above, the broadcast receiving apparatus 100 of the present embodiment has the time management function using two types of time information different in accuracy from each other. One time information is expressed in the notation consistent with the conventional digital broadcasting system, while the other time information has higher resolution power than the one time information. Using the latter time information for the process of synchronizing contents data of broadcasting signals achieves the information presentation process more accurate than that in the conventional broadcasting system, and using the former time information for the processes of creating a program guide, controlling timer recording and viewing reservation, protecting copy rights such as temporary data storage, and others allows the broadcast receiving apparatus to be provided at low cost.

Therefore, the broadcast receiving apparatus 100 of the present embodiment has the two types of time management function described above, and it is thus possible to achieve both of the highly accurate information presentation and the cost reduction.

[First Modification Example of Time Management]

Next, a first modification example of the time management in the broadcasting system of the present embodiment will be described below.

In the configuration of the first modification example, in order to improve the accuracy of time management by the NTP-based time management function that has already been described with reference to FIG. 7C, information related to an estimated delay time in time information transmission from a time management server (not shown) or the broadcast station server 300 to the broadcast receiving apparatus 100 is included in a broadcasting signal to be transmitted, and the information related to the estimated delay time is used to correct a system clock for the NTP-based time management function in the broadcast receiving apparatus 100.

At this time, the information related to the estimated delay time may be included in a TMCC (Transmission and Multiplexing Configuration Control) region outside the TLV multiplexing stream instead of the TLV multiplexing stream shown in FIG. 3(A). By transmitting the information in the TMCC region, the information related to the estimated delay time can be extracted without performing a process of separating the TLV multiplexing stream (demultiplexing process) in the broadcast receiving apparatus 100. Namely, the information acquisition that is less likely to be affected by the delay in the separating process in the broadcast receiving apparatus 100 is possible, and thus a highly accurate correcting process of the system clock can be performed. An example of the data structure of time information transmitted in the TMCC signal will be described with reference to FIG. 13C. For example, the time information is preferably stored in a TMCC extension information region to be transmitted. In the time information in the TMCC extension information region of FIG. 13C, a "delta" parameter expresses the estimated value of transmission delay from a time management server that distributes the UTC or a server device that generates a TMCC signal to a general broadcast receiving apparatus, in the form of a 32-bit signed fixed-point value. Note that the 16 high-order bits thereof represent an integer part and 16 low-order bits thereof represent a decimal fraction. A "transmit_timestamp" parameter is a transmission timestamp, and expresses a time at which the TMCC signal is transmitted from the server device, in the NTP timestamp-length format. The 32 high-order bits thereof represent an integer part, and the 32 low-order bits thereof represent a decimal fraction.

In the first modification example, the broadcast receiving apparatus 100 of the present embodiment can correct more accurately the system clock for the NTP-based time management function, which is used for the process of synchronizing contents data of broadcasting signals, by using the information related to the estimated delay time (e.g., the "delta" parameter and/or the "transmit_timestamp" parameter) described in the time information stored and transmitted in the TMCC extension information region.

[Second Modification Example of Time Management]

Next, a second modification example of the time management in the broadcasting system of the present embodiment will be described below.

As describe above, the broadcast receiving apparatus 100 of the present embodiment has the time management function of managing the time by acquiring the current date and the Japan Standard Time from the information transmitted in the MH-TOT. The current date and the Japan Standard Time acquired from the information transmitted in the MH-TOT are superposed on video information, application information, and others in the video synthesizing unit 161 of the broadcast receiving apparatus 100, and are offered to the user by outputting them to the monitor unit 162 and video output unit 163. As described above, the MH-TOT has the data structure shown in FIG. 11A, and the broadcast receiving apparatus 100 can acquire the current date and the current time from the "JST_time" parameter in the MH-TOT.

However, since the "JST_time" parameter uses only the 16 low-order bits of the MJD coded data, calculation for determining a date of "Apr. 22, 2038" ends up in arithmetic overflow, and the above-described predetermined calculation cannot express the date following "Apr. 23, 2038". To deal with this problem, in the second modification example of the present embodiment, the calculation method is switched depending on whether the value of the MJD is equal to or larger than a given value or the value is smaller than the given value so that the date following "Apr. 23, 2038" can be expressed.

FIG. 12 shows a first calculation method that is used when the value of the MJD is equal to or larger than the given value and a second calculation method that is used when the value of the MJD is smaller than the given value. For example, when the given value is set to "32768 (0x8000)", the current date is calculated by using the first calculation method in the case where the value of the MJD is equal to or larger than "32768", and is calculated by using the second calculation method in the case where the value of the MJD is smaller than "32768". Note that the case in which the value of the MJD is smaller than "32768" is equivalent to the case in which the most significant bit of the 16-bit data of the MJD is "0". In this manner, the broadcast receiving apparatus 100 of the present embodiment can express the date following "Apr. 23, 2038". However, the given value can be determined arbitrarily, and it may be set to, for example, "16384 (0x4000)" or "49152 (0xC000)". The condition for switching the calculation method may be set to the case where the 2 high-order bits of the 16-bit data of the MJD are "00" or the case where the 2 high-order bits of the 16-bit data of the MJD are not "11". Note that, when the given value is set to "32768" and the above-described method is used, a date preceding "Sep. 4, 1948" cannot be expressed, but it does not pose a specific problem regarding the practical use of the television receiver.

Alternatively, the first calculation method and the second calculation method may be switched depending on a flag that replaces a part or the whole of a "reserved" parameter in the data structure of the MH-TOT of FIG. 11A or depending on a newly added flag, instead of switching the first calculation method and the second calculation method depending on the result of comparison between the MJD and the given value. For example, in the case where the most significant bit of the 16-bit coded data of the MJD is "0", the flag is set to "1" when the MJD value represents the date following "Apr. 23, 2038", and the flag is set to "0" when the MJD value does not represent the date following "Apr. 23, 2038". Then, when the flag is "1", the second calculation method shown in FIG. 12 is used, while when the flag is "0", the first calculation method is used. Alternatively, a descriptor having the same meaning as the above-mentioned flag may be newly prepared and added to the MH-TOT.

As described above, in the broadcasting system of the present embodiment, absolute time data in the NTP format is transmitted, and the broadcast receiving apparatus 100 of the present embodiment has the NTP-based time management function. In addition, the broadcast receiving apparatus 100 of the present embodiment controls the decoding timing and presentation timing of video and audio signals in units of presentation by referring to NTP timestamps and others described in MPU timestamp descriptors set in units of MPU. As described above, the time information in the NTP format has the configuration shown in FIG. 13A. Further, the MPU timestamp descriptor has the configuration shown in FIG. 13B.

Accordingly, the broadcast receiving apparatus 100 of the present embodiment may select either the first calculation method or the second calculation method in accordance with the value of time data and others obtained by referring to the "reference_tiemstamp" parameter, the "transmit_time-stamp" parameter, or the "mpu_presentation_time" parameter. Specifically, for example, when the most significant bit of the 64-bit time data in the NTP-length format is "0", the second calculation method is used, and when the most significant bit is not "0", the first calculation method is used.

By any of the above methods, the broadcast receiving apparatus 100 of the present embodiment can express the date following "Apr. 23, 2038".

[Channel Selection Process (Initial Scan) in Broadcast Receiving Apparatus]

The AMT of the broadcasting system of the present embodiment provides a list of IP packet multicast groups that is used to receive IP packets transmitted by the TLV multiplexing method without distinguishing them from IP packets transmitted through the communication line as much as possible. A plurality of IP multicast groups can be listed for one service identification. In addition, in order to describe a series of IP addresses efficiently, an address mask can be used.

In the broadcast receiving apparatus 100 of the present embodiment, a list of services acquired from the TLV-NIT can be stored in a non-volatile memory such as the ROM 103 and the storage unit 110 at the time of channel scan in the initial setting or rescan for the setting change, and a list of IP multicast groups corresponding to the services can be associated with the services as IP-related information and stored in the non-volatile memory. The list of services and IP-related information are stored in the non-volatile memory to be referred to constantly, so that a need of acquiring the TLV-NIT or AMT at the time of channel switching and others is eliminated, and thus the broadcasting contents can be efficiently acquired.

Figure 14:
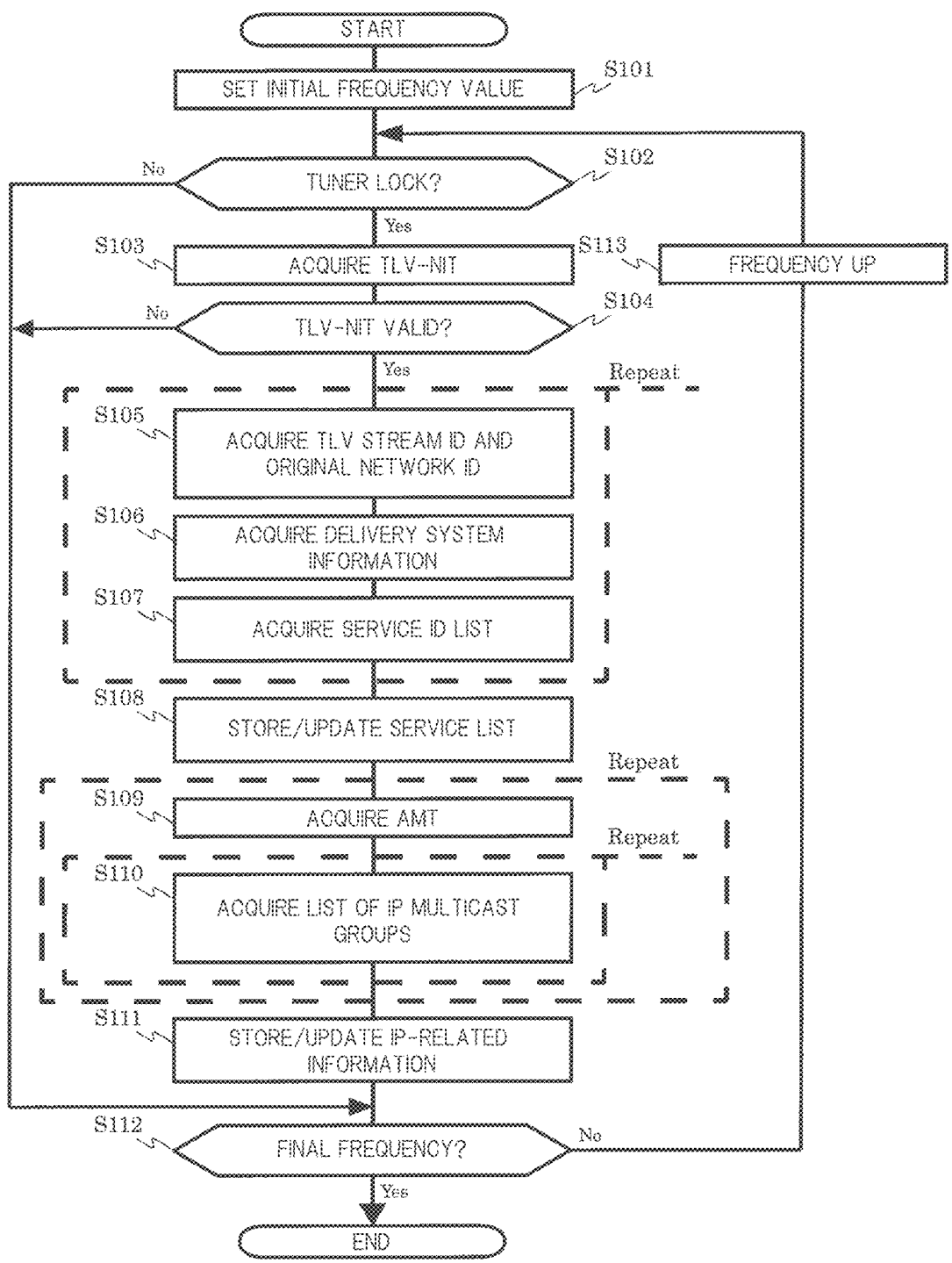
FIG. 14 is an operation sequence diagram at the time of channel scanning of the broadcast receiving apparatus according to the first embodiment.

FIG. 14 is a diagram showing an example of an operation sequence at the time of channel scan (rescan) in the broadcast receiving apparatus 100 of the present embodiment.

When the channel scan starts, the receiving function executing unit 1102 sets an initial frequency value for the tuner/demodulating unit 131 and instructs the tuner/demodulating unit 131 to tune to the frequency value (S101). When the tuner/demodulating unit 131 succeeds in locking to the set frequency value (S102: Yes), the receiving function executing unit 1102 acquires the TLV-NIT from a received signal (S103).

When the TLV-NIT acquired in the process of S103 is valid data (S104: Yes), the receiving function executing unit 1102 acquires information of a TLV stream ID, an original network ID, and the like from the acquired TLV-NIT (S105). FIG. 15A shows an example of the data structure of the TLV-NIT. The information of the TLV stream ID and the information of the original network ID can be acquired from a "tiv_stream_id" parameter and an "original_network_id" parameter, respectively. Furthermore, delivery system information related to physical conditions for the broadcast transmission path corresponding to the TLV stream ID and the original network ID is acquired from a delivery system descriptor (S106), and a service ID list is acquired from a service list descriptor (S107). FIG. 15B shows an example of the data structure of a satellite delivery system descriptor. FIG. 15C shows an example of the data structure of a service list descriptor. Note that, when the TLV-NIT has a plurality of different pieces of data such as the TLV stream ID, the original network ID, the delivery system information, and the service ID list, the processes of S105 to S107 are repeated. Subsequently, the receiving function executing unit 1102 creates a service list based on data acquired in the processes of S105 to S107 such as the TLV stream ID, the original network ID, the delivery system information, and the service ID list, and stores the created service list in the ROM 103 or the storage unit 110 (updates the service list at the time of rescan) (S108).

Next, the receiving function executing unit 1102 then acquires an AMT from the received signal (S109), and further acquires a list of IP multicast groups related to each service ID stored in the service list (S110). FIG. 15D shows an example of the data structure of the AMT. Note that, when the AMT has lists of IP multicast groups related to a plurality of service IDs, the process of S110 is repeated. When there is a plurality of AMTs having lists of IP multicast groups related to different service IDs, the processes of S109 and S110 are repeated. Next, the receiving function executing unit 1102 then associates the list of IP multicast groups acquired in the process of S110 with the service ID as IP-related information, and stores the IP-related information in the ROM 103 or the storage unit 110 (updates the IP-related information at the time of rescan) (S111).

When the tuner/demodulating unit 131 fails in locking to the set frequency value in the process of S102 (S102: No) and when the TLV-NIT acquired in the process of S103 is not valid data (S104: No), the processes of S105 to S111 are not performed.

After finishing the process of S111, when finding that the frequency value set for the tuner/demodulating unit 131 is a final frequency value in a channel scan range (S112: Yes), the receiving function executing unit 1102 ends the operation sequence. On the other hand, when finding that the set frequency value is not the final frequency value in the channel scan range (S112: No), the receiving function executing unit 1102 increases the frequency value set for the tuner/demodulating unit 131 (S113) and repeats the processes of S102 to S111. Note that, if the service IDs for all services making up the broadcasting network can be acquired from one TLV-NIT and an AMT having lists of IP multicast groups related to the service IDs can be acquired, the processes of S112 and S113 are unnecessary.

Through the series of processes described above, when performing the channel scan for initial setting or the rescan for setting change, the broadcast receiving apparatus 100 of the present embodiment can create/update a list of services making up the broadcasting network (service list), and at the same time, create/update a list of IP multicast groups corresponding to each service (IP-related information) and store the created service list and IP-related information in a non-volatile memory such as the ROM 103 and the storage unit 110.

Note that the rescan for setting change may be automatically performed when a change in the information in the table is detected by referring to respective "version_number" parameters of the TLV-NIT and AMT. When a change in the "version_number" parameter of either the TLV-NIT or AMT is detected, only the information related to the table in which the change in parameter is detected may be automatically updated. However, when the above-described automatic updating is performed, execution of the automatic rescan should preferably be reported to the user. Alternatively, the change in the information in the table may be reported to the user so that the user makes a decision on whether or not to perform the rescan.

[Channel Selection Process (Channel Switching) in Broadcast Receiving Apparatus]

FIG. 16 is a diagram showing an example of an operation sequence at the time of channel selection (channel switching) in the broadcast receiving apparatus 100 of the present embodiment.

When the user gives a command to switch a channel by operating a remote controller and others (not shown), the receiving function executing unit 1102 interprets the command transmitted from the remote controller and specifies a service ID of an intended service (S201). Next, the receiving function executing unit 1102 then starts to acquire an AMT from the signal received from the tuner/demodulating unit 131. When succeeding in acquiring the AMT within a given time (S202: Yes), the receiving function executing unit 1102 acquires information related to a list of IP multicast groups corresponding to the service ID, from the acquired AMT (S204). When failing to acquire the AMT within the given time (S202: No), the receiving function executing unit 1102 refers to the IP-related information stored in the ROM 103 or the storage unit 110 (S203), thereby acquiring information related to the list of IP multicast groups corresponding to the service ID (S204). Note that the receiving function executing unit 1102 may always refer to the IP-related information stored in the ROM 103 or the storage unit 110 without performing the determination process of S202.

Subsequently, the receiving function executing unit 1102 starts to acquire the TLV-NIT from the signal received from the tuner/demodulating unit 131. When succeeding in acquiring the TLV-NIT within a given time (S205: Yes), the receiving function executing unit 1102 acquires delivery system information for acquiring an IP data flow corresponding to the service ID, from the acquired TLV-NIT (S207). When failing to acquire the TLV-NIT within the given time (S205: No), the receiving function executing unit 1102 refers to the service list stored in the ROM 103 or the storage unit 110 (S206), thereby acquiring the delivery system information for acquiring the IP data flow corresponding to the service ID (S207). Note that the receiving function executing unit 1102 may always refer to the service list stored in the ROM 103 or the storage unit 110 without performing the determination process of S205. When the delivery system information has been acquired in the process of S207, the receiving function executing unit 1102 then controls the tuner/demodulating unit 131 with the frequency value specified by the acquired delivery system information, receives the IP data flow corresponding to the service ID (S208), extracts an MMT data string from the received IP data flow, and outputs the MMT data string to the separating unit 132.

In the separating unit 132, the transport processing unit 1102a acquires an MMTP packet with a packet ID "0", from the input MMT data string (S209), and further acquires an MPT from the acquired MMTP packet (S210). Next, the transport processing unit 1102a then refers to an "MMT_package_id_byte" parameter included in the acquired MPT, and checks whether the 16 low-order bits of the "MMT_package_id_byte" parameter have the same value as the service ID. When the 16 low-order bits of the "MMT_package_id_byte" parameter have the same value as the service ID in the example of the data structure of the MPT shown in FIG. 17 (S211: Yes), it is determined that the MMTP packet with the packet ID "0" is an MMTP packet having the data of the program corresponding to the service ID, and acquisition of an MFU is executed based on information included in the acquired MPT (S216).

On the other hand, when the 16 low-order bits of the "MMT_package_id_byte" parameter do not have the same value as the service ID (S211: No), it is determined that the MMTP packet with the packet ID "0" is not the MMTP packet having data of the program corresponding to the service ID. In this case, the transport processing unit 1102a newly acquires a PLT (S212), and checks the acquired PLT to confirm a packet ID (x in this case) of an MMTP packet that transmits an MPT having the "MMT_package_id_byte" parameter corresponding to the service ID (S213). Further, the transport processing unit 1102a then acquires an MMTP packet with a packet ID "x" from the above-mentioned input MMT data string (S214), and acquires an MPT from the acquired MMTP packet (S215). Further, the transport processing unit 1102a then acquires an MFU based on information included in the acquired MPT (S216).

Note that the transport processing unit 1102a may always perform the processes of S212 to S215 without performing the processes of S209 to S211. In this case, the process time can be reduced when the data of the program corresponding to the service ID is stored in an MMTP packet other than the MMTP packet with the packet ID "0".

After the MFU is acquired in the process of S216, the transport processing unit 1102a extracts coded video data, coded audio data, and the like from the acquired MFU, and outputs the coded video data, the coded audio data, and the like to the video decoder 141, the audio decoder 143, and the like. Thereafter, a video and audio decoding process under the control by the AV decode processing unit 1102b and a presentation process under the control by the presentation processing unit 1102h are performed, but these processes are known to the public and detailed descriptions thereof are omitted.

Through the series of processes described above, the broadcast receiving apparatus 100 of the present embodiment can execute a channel selection (channel switching) operation. In particular, as described above with reference to FIGS. 14 and 16, a service list and IP-related information are created and are stored in a non-volatile memory such as the ROM 103 and the storage unit 110 so as to be referred to constantly at the time of channel scan for initial setting or rescan for setting change, and the service list and IP-related information stored in a non-volatile memory such as the ROM 103 and the storage unit 110 are referred to at the time of channel selection (channel switching), so that the efficiency of the channel selection (channel switching) operation can be improved. Namely, the time taken from the start to end of the channel selection (channel switching) can be reduced, compared to a case where the AMT and TLV-NIT are acquired again at the time of channel selection (channel switching).

[Screen Layout Control of Broadcast Receiving Apparatus]

The broadcast receiving apparatus 100 of the present embodiment can control the screen layout based on the description of an LCT. FIG. 18 shows an example of the data structure of the LCT.

In FIG. 18, a "left_top_pos_x" parameter and a "right_down_pos_x" parameter indicate a horizontal position on the top left of a region and a horizontal position on the bottom right of the region in terms of the ratio of the number of pixels to the total number of pixels arranged in the horizontal direction, respectively, when the left side of the full-screen display is defined as "0" and the right side of the same is defined as "100". A "left_top_pos_y" parameter and a "right_down_pos_y" parameter indicate a vertical position on the top left of the region and a vertical position on the bottom right of the region in terms of the ratio of the number of pixels to the total number of pixels arranged in the vertical direction, respectively, when the top side of the full-screen display is defined as "0" and the bottom side of the same is defined as "100". Further, a "layer_order" parameter indicates a relative position in the depth direction of the region.

Examples of layout assignment to layout numbers based on the parameter settings are shown in FIGS. 19A to 19D together with set values for the parameters.

Figure 19A:
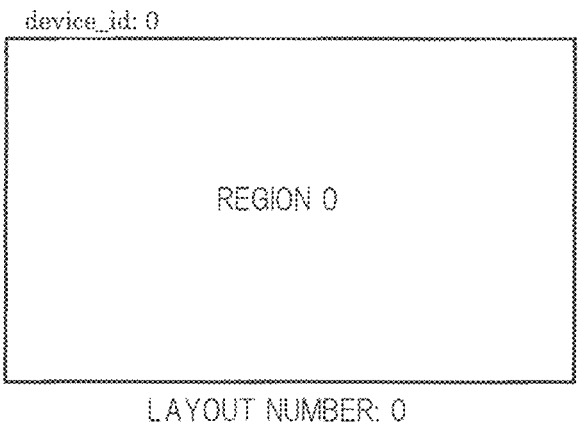
FIG. 19A is a diagram showing an example of layout assignment to a layout number based on the LCT.
Figure 19B:
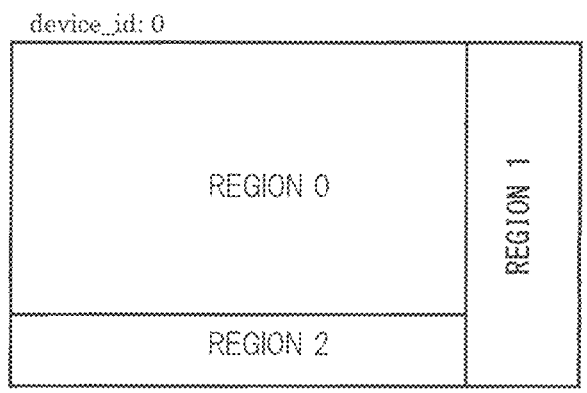
FIG. 19B is a diagram showing another example of layout assignment to a layout number based on the LCT.

FIG. 19A shows default layout setting of the broadcast receiving apparatus 100 of the present embodiment, and shows an example in which one region is set for the full-screen. FIG. 19B shows an example in which the full-screen is divided into three regions, and the respective regions are defined as "region 0", "region 1" and "region 2". For example, when the full-screen is made up of 7680 horizontal pixels×4320 vertical pixels, the "region 0" is set within a range of (0, 0)-(6143, 3455) because the "left_top_pos_x" parameter is "0", the "left_top_pos_y" parameter is "0", the "right_down_pos_x" parameter is "80", and the "right_down_pos_y" parameter is "80". In the same manner, the "region 1" is set within a range of (6144, 0) to (7679, 4319), and the "region 2" is set within a range of (0, 3456) to (6143, 4319).

FIG. 19C shows an example in which three regions are set like the example of FIG. 19B. In the example of FIG. 19C, however, the "region 0" is set within a range of (0, 0) to (7679, 4319), and the "region 1" and "region 2" are set within the same ranges of the "region 1" and "region 2" described above and are located in front of the "region 0" in accordance with the setting of the "layer_order" parameter. FIG. 19D shows an example in which the "region 0" is set in a device 0 (default device: broadcast receiving apparatus 100 in the present embodiment) and the "region 1" is set in a device 1 (portable information terminal 700 in the present embodiment).

As described above, in the broadcasting system of the present embodiment, screen layout control for displaying multimedia services on the receiver in a manner intended by the service provider can be performed by using the LCT.

Note that decimal fractions that are generated when the screen is divided in accordance with the setting values of the "left_top_pos_x" parameter and others are rounded up or down, or rounded off (or in the case of binary numbers, "0" is rounded down while "1" is rounded up). For example, when the full-screen is made up of 7680 horizontal pixels× 4320 vertical pixels and the "left_top_pos_x" parameter of the "region 0" is "0", the "left_top_pos_y" parameter is "0", the "right_down_pos_x" parameter is "51", and the "right_down_pos_y" parameter is "51", the "region 0" may be set within a range of (0, 0)-(3916, 2203) by rounding up decimal fractions or may be set within a range of (0, 0)-(3915, 2202) by rounding down decimal fractions. Alternatively, decimal fractions may be rounded up or down in units of 8-pixel blocks or 16-pixel blocks in consideration of macro-blocks at the time of an image compression process. Through the process described above, region setting based on the LCT and conversion of the resolution of multimedia contents in the above region can be performed efficiently.

[Exceptional Process of Screen Layout Control of Broadcast Receiving Apparatus]

Figure 20A:
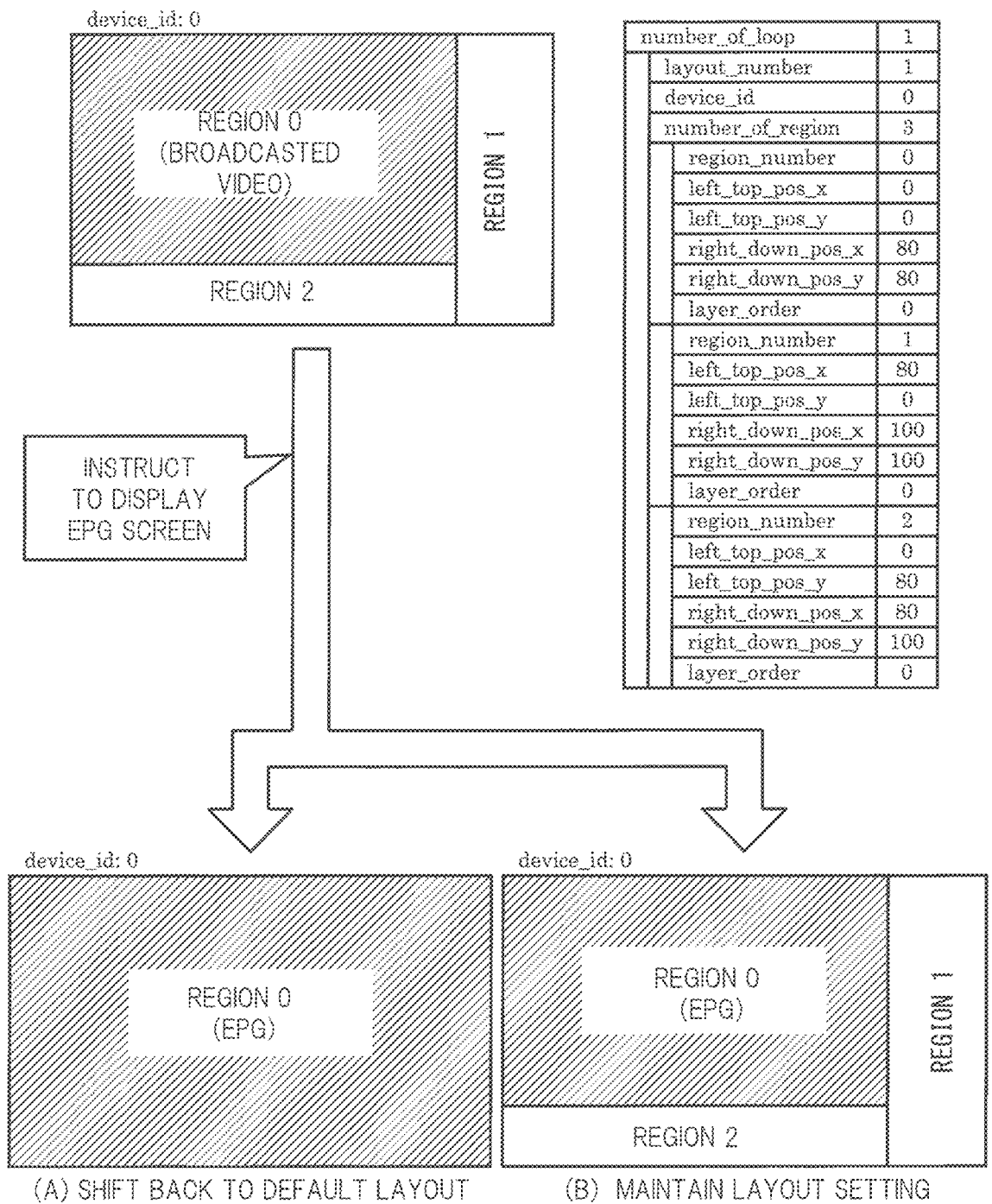
FIG. 20A is an explanatory diagram of an operation of an exceptional process of screen layout control based on the LCT.

Even when the control of the screen layout region is performed based on the LCT in the broadcast receiving apparatus 100 of the present embodiment, if the user gives an instruction to display an EPG screen, the broadcast receiving apparatus 100 of the present embodiment can perform the screen layout control in which the descriptive contents of the LCT is left out of account, as an exceptional process. FIG. 20A shows an example of an operation of the exceptional process of the screen layout control based on the LCT.

When the screen layout control similar to that shown in FIG. 19B is performed based on the descriptive contents of the LCT, a video of broadcasting program is displayed in the "region 0", and broadcasting contents such as program-cooperation data cooperated with the broadcasting program are displayed in the "region 1" and the "region 2", if the user gives an instruction to display an EPG screen with the remote controller (not shown), the broadcast receiving apparatus 100 of the present embodiment shifts the screen layout setting back to the default setting (i.e., a state in which the screen layout control similar to that shown in FIG. 19A is performed) as shown in FIG. 20A(A) regardless of the descriptive contents of the LCT, and controls the screen layout to display the EPG screen on the entire screen. Further, when the user gives an instruction to end the display of the EPG screen, the broadcast receiving apparatus 100 executes again the screen layout control in accordance with the descriptive contents of the LCT.

By performing the control described above, the EPG screen can be displayed in a large size and easiness to see the EPG screen can be improved, compared to the case where the EPG screen is displayed while maintaining the control of screen layout region as shown in FIG. 20A(B).

Figure 20B:
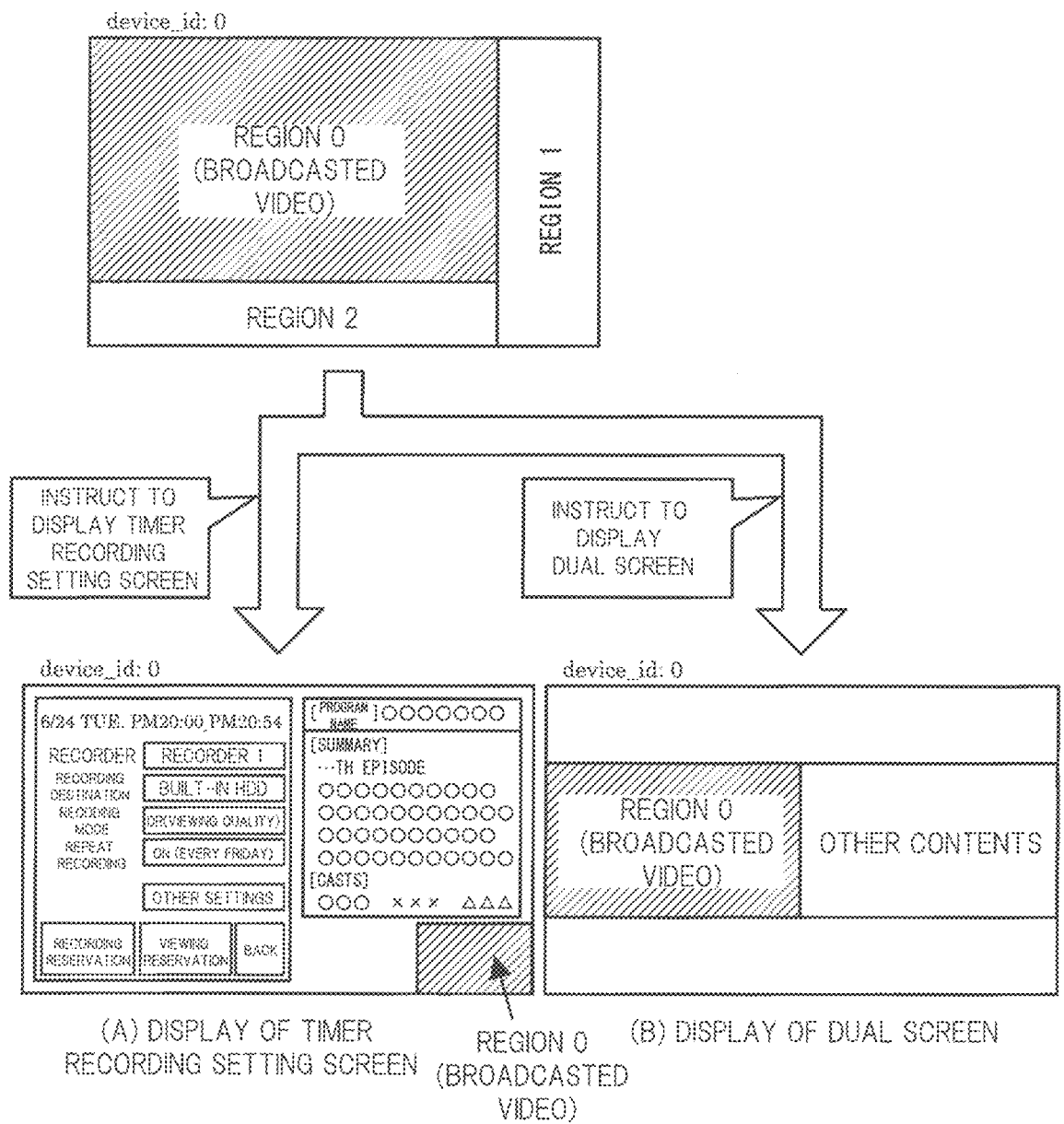
FIG. 20B is an explanatory diagram of an operation of an exceptional process of screen layout control based on the LCT.

Note that the exceptional process of the screen layout control is applied not only to the case of displaying the EPG screen but also to the case of displaying sub-screens of various setting screens (timer recording setting screen in the example of FIG. 20B(A)) or displaying dual screens in the broadcast receiving apparatus 100, as shown in FIG. 20B.

In the case of the timer recording setting screen shown in (A) of FIG. 20B, a display area of broadcasting contents is shifted from the full-screen region to a sub-screen region on the right bottom corner of the screen. In the case of the dual screen display shown in (B) of FIG. 20B, the display area of broadcasting contents is shifted from the full-screen region to a divided screen region in the middle left side of the screen. In both cases, since the display area for displaying broadcasting contents is narrowed, compared to the case of using the entire screen, it is not preferable to maintain the control of screen layout region in the display area (that is, a plurality of broadcasting contents is kept displayed simultaneously in divided regions) from the viewpoint of offering fine visibility. For this reason, in the above-described situation, the broadcast receiving apparatus 100 of the present embodiment selects the broadcasting contents of the "region 0" and displays only the selected contents in the display area. Note that the broadcasting contents of the "region 1" or "region 2" may be selected and displayed depending on a region selection state right before the selection.

By performing the control described above, the easiness to see the broadcasting contents can be improved, compared to the case where various broadcasting contents are displayed while maintaining the control of screen layout region. The same applies also to the cases of displaying a sub-screen for a timer recording program list, displaying internet contents on a browser, and others.

[Display of EPG in Broadcast Receiving Apparatus]

In the broadcasting system of the present embodiment, time-series information related to events (so-called programs) included in services making up the broadcasting network is transmitted in the form of MH-EIT. FIG. 21 shows an example of the data structure of the MH-EIT of the present embodiment. The MH-EIT is classified into two classes by a table ID (corresponding to a "table_id" parameter in FIG. 21), and can provide information of the current and next events in its own TLV stream and schedule information of events in its own TLV stream. The broadcast receiving apparatus 100 of the present embodiment refers to the MH-EIT and others to identity a service with a service ID (corresponding to a "service_id" parameter in FIG. 21), thereby acquiring information of the start time, broadcasting time, and the like of each event to create an EPG screen. Further, the broadcast receiving apparatus 100 can display the created EPG screen on the monitor unit 162 by superposing it on video information and others in the video synthesizing unit 161.

Figure 22A:
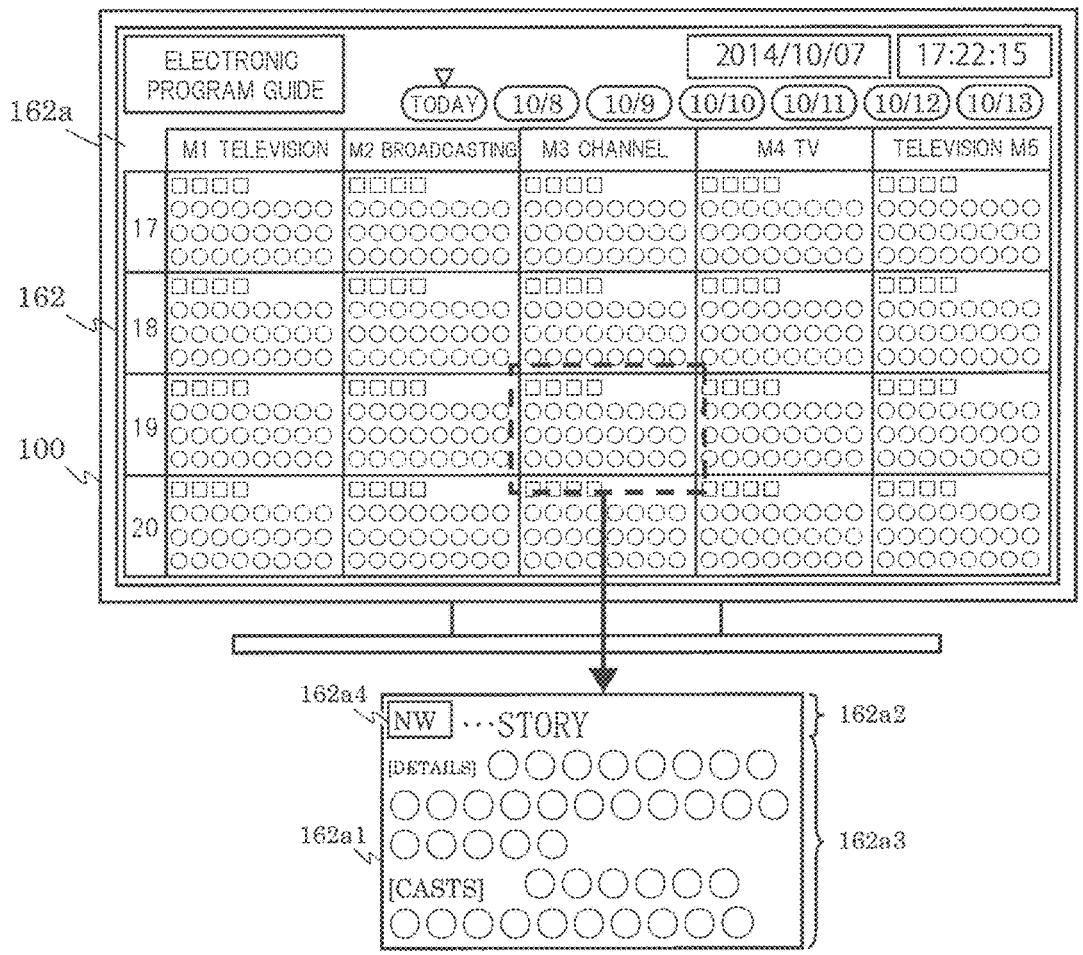
FIG. 22A is a screen display diagram of an EPG screen of the broadcast receiving apparatus according to the first embodiment.

FIG. 22A is a diagram showing an example of an EPG screen in the broadcast receiving apparatus 100 of the present embodiment. An EPG screen 162a has a matrix form with the vertical axis representing time and the horizontal axis representing service IDs (channels), and displays detailed information of broadcasting programs to be broadcasted in each channel in each time zone. Further, detailed information 162a1 of each broadcasting program is composed mainly of a title region 162a2 and a detail description region 162a3.

In the title region 162a2, symbols and others expressing the title and properties of the broadcasting program are displayed. The symbols and others expressing the properties of the broadcasting program are, for example, symbols/characters indicating that the broadcasting program is a new program or rerun program, or may be a mark or the like standing for "data" indicating that the program supports data broadcasting by a broadcasting service, or may be a mark 162a4 or the like standing for "NetWork" indicating that contents, applications, and others related to the broadcasting program can be acquired through the network. In addition, the symbols and others expressing the properties of the broadcasting program may be substituted by differentiating the background color of the detailed information 162a1 from others or enclosing the display region of the detailed information 162a1 with a thick line.

Note that, even when control information (messages, tables, descriptors, etc.) in the broadcasting system of the present embodiment indicates that contents, applications, and others related to the broadcasting program can be acquired through the network, if access to server devices on the network cannot be made for such a reason that a LAN cable is not connected to the LAN communication unit 121 of the broadcast receiving apparatus 100, the screen may be controlled so as not to display the mark 162a4 or the like standing for "NetWork".

Figure 22B:
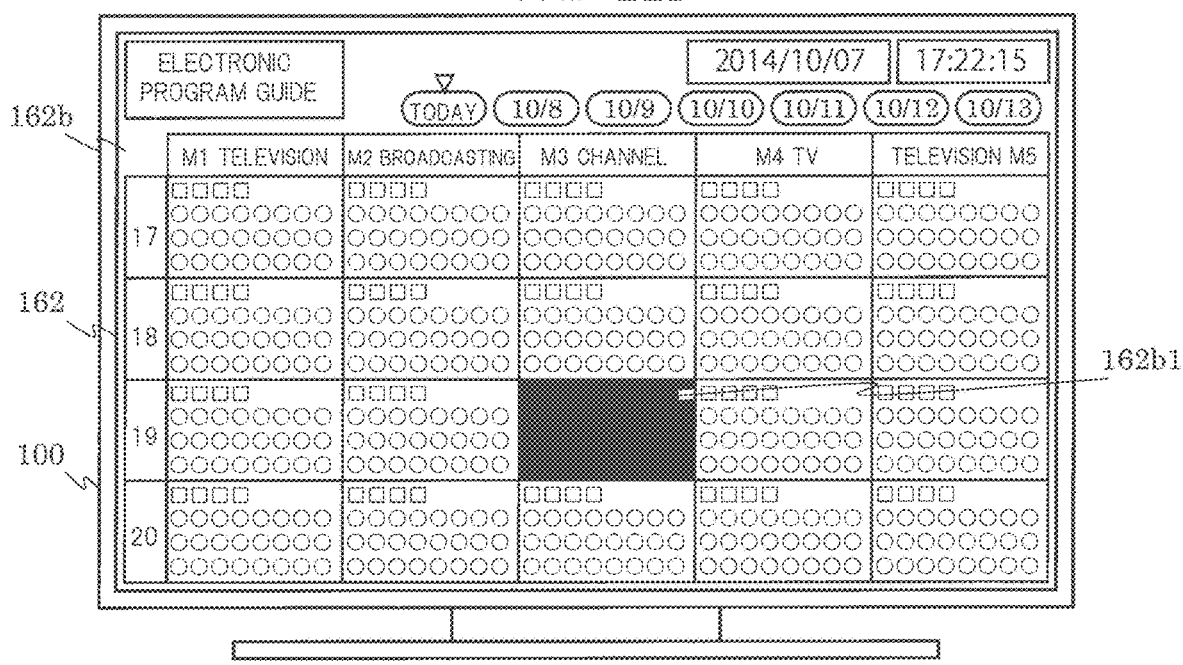
FIG. 22B is a screen display diagram of an EPG screen of the broadcast receiving apparatus according to the first embodiment.

In addition, when the broadcasting program is a network-distribution program distributed through the Internet 200 and therefore cannot be acquired from broadcast waves, and further the broadcast receiving apparatus 100 cannot access server devices on the network like in the case described above, the screen may be controlled so that a region of detailed information 162b1 displayed on an EPG screen 162b is grayed out as shown in FIG. 22B. Namely, the screen is controlled so as not to display detailed information of a network-distribution program that the user is not allowed to view. Alternatively, the gray-out process may be substituted by differentiating the background color of the detailed information 162b1 from others. It is also possible to notify the user that the broadcast receiving apparatus 100 is incapable of accessing server devices on the network or the user is not allowed to view a network-distribution program associated with the detailed information 162b1, by a popup message or the like when the user operates the remote controller (not shown) to select the detailed information 162b1.

Through the control described above, the broadcast receiving apparatus 100 can provide the user with information of broadcasting programs in a form that does not give any sense of discomfort to the user in accordance with the network connection state.

Figure 22C:
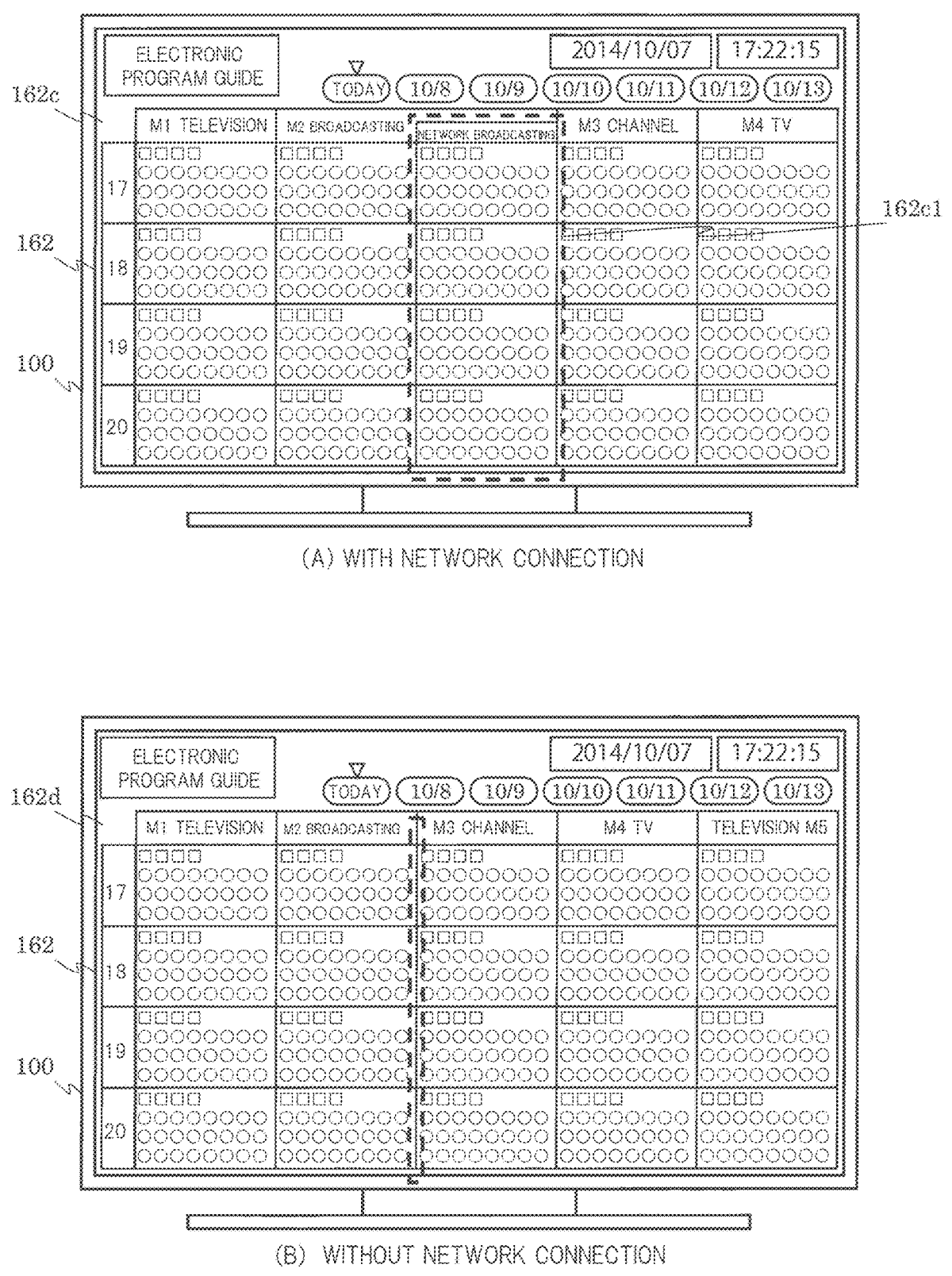

FIG. 22C is a diagram showing another example of the EPG screen in the broadcast receiving apparatus 100 of the present embodiment. In FIG. 22C, "M1 television", "M2 broadcasting", "M3 channel", "M4 TV", "Television M5", and others are the names of broadcast stations of respective channels, and the "M2 broadcasting" station provides broadcasting programs distributed through broadcast waves as well as network-distribution programs (information 162c1 indicated in a column of "network broadcasting" in FIG. 22C) distributed through the Internet 200 at the same time.

As shown in FIG. 22C, when a channel that provides only the network-distribution programs distributed through the Internet 200 is present, the screen is usually controlled to display the information of all the channels (including the information 162c1) as shown by an EPG screen 162c in FIG. 22C(A). Meanwhile, in the case where the broadcast receiving apparatus 100 cannot access server devices on the network or the like, the screen may be controlled so as not to display information of the channel of "M2 broadcasting (network broadcasting)" that provides only the network-distribution programs distributed through the Internet 200 (information 162c1 in FIG. 22C(A)) as shown by an EPG screen 162d in FIG. 22C(B).

Through the control described above, it becomes unnecessary for the user of the broadcast receiving apparatus 100 to check the information of a channel that provides programs that the user is not allowed to view.

[Display of Emergency Warning Broadcasting in Broadcast Receiving Apparatus]

The broadcast receiving apparatus 100 of the present embodiment can perform a process of receiving emergency warning broadcasting when an emergency warning broadcasting start control signal bit of a TMCC signal, which is included in transmission data including a TLV stream, changes from "0" to "1".

The emergency warning broadcasting may be provided as an application that displays a warning message on the full-screen scale or may be provided as character information in the form of a caption message. It is preferable that the character information in the form of a caption message is displayed regardless of the condition of the broadcast receiving apparatus 100 just before reception of the emergency warning broadcasting in a case where the emergency warning broadcasting is provided as character information in the form of a caption message. Namely, as shown in FIG. 23, when the broadcast receiving apparatus 100 receives emergency warning broadcasting in a state where the user views a regular broadcasting program by watching a program screen 162e of the broadcasting program displayed on the monitor unit 162, character information 162e1 by the emergency warning broadcasting is superposed and displayed on the program screen 162e. In the same manner, when the broadcast receiving apparatus 100 receives emergency warning broadcasting in a state where an EPG screen 162f is displayed on the monitor unit 162 in accordance with an instruction given by the user to display the EPG screen, character information 162f1 by the emergency warning broadcasting is superposed and displayed on the EPG screen 162f.

Through the control described above, even when the user selects an EPG screen, a setting screen, a timer recording program list screen, or an internet browser screen and causes the broadcast receiving apparatus 100 to display such a screen, it is possible to avoid overlooking important character information based on the received emergency warning broadcasting. Note that this control may be performed for the character information of an ordinary caption other than the emergency warning broadcasting.

[Various Exceptional Processes]

When failing to acquire data of a transmission path other than a TLV stream in the same package, the broadcast receiving apparatus 100 of the present embodiment may perform, for example, the following exceptional processes.

As described above with reference to FIG. 6E, in the broadcasting system compatible with the broadcast receiving apparatus 100 of the present embodiment, data acquired from a TLV stream and data acquired from a transmission path other than the TLV stream can be included in the same package, based on location information (corresponding to the "MMT_general_location_info( )" in FIG. 17) stored in the MPT. However, the data transmission path other than the TLV stream that is indicated by the location information (e.g., IPv4 data flow, IPv6 data flow, MPEG2-TS of broadcasting, etc.) is a receiving function different from a receiving function of TLV/MMT streams. For this reason, even when the broadcast receiving apparatus 100 is in operation, the data may not be acquired from such a data transmission path in a situation where the receiving function of the data transmission path is not working, a situation where the receiving function is working but a relay device and others are not operating, a situation where a wired or wireless connection of the transmission path is not established, and a situation where the broadcast receiving apparatus 100 is placed in an environment in which the data transmission path cannot be connected.

In such situations, when the broadcast receiving apparatus 100 of the present embodiment receives an event in which the location information stored in the MPT indicates that the data acquired from the TLV stream and the data acquired from the transmission path other than the TLV stream are correlated to be included in the same package, the broadcast receiving apparatus 100 may perform the following operations.

For example, when an LCT specifies a plurality of regions on the screen as shown in FIGS. 19B and 19C, and video included in the TLV stream and data acquired from a transmission path other than the TLV stream are correlated so that the video is displayed in the "region 0" and the data is displayed in the "region 1" and "region 2", but the data from the transmission path other than the TLV stream to be displayed in the "region 1" and "region 2" cannot be acquired, the layout display of a plurality of regions specified by the LCT may be forbidden. Specifically, even when the LCT is received, the video contents received from the TLV stream is kept displayed in the "region 0" in the default layout display shown in FIG. 19A, and this layout is prevented from shifting to the layout display of a plurality of regions shown in FIGS. 19B and 19C. Further, even if an instruction to make a layout change from the default layout to the layout specified by the LCT is inputted to the operation input unit 170 of FIG. 7A in this state, a shift to the layout display of a plurality of regions of FIGS. 19B and 19C may be prevented by maintaining the default layout of FIG. 19A or shifting the screen to a different data broadcasting screen.

As another operation example when an LCT specifies a plurality of regions on the screen as shown in FIGS. 19B and 19C, and video included in the TLV stream and data acquired from a transmission path other than the TLV stream are correlated so that the video is displayed in the "region 0" and the data is displayed in the "region 1" and "region 2", but the data from the transmission path other than the TLV stream to be displayed in the "region 1" and "region 2" cannot be acquired, a display frame for the plurality of regions of FIGS. 19B and 19C specified by the LCT is displayed temporarily to display a background color or a given still image in the "region 1" and "region 2", and if the data from the transmission path other than the TLV stream indicated by the location information of the MPT cannot be acquired after an elapse of a given time, the display layout is shifted back to the default layout display shown in FIG. 19A. In this case, it is preferable that the screen is controlled so that the program video included in the TLV stream is kept displayed in the "region 0" even in the layout change shown in FIGS. 19A, 19B, and 19C because the program video itself for the user continues.

Further, even in a state where the video contents received in the TLV stream are displayed in the "region 0" in the default layout display of FIG. 19A because the data from the transmission path other than the TLV stream to be displayed in the "region 1" and "region 2" cannot be acquired, operations of various communication functions and receiving functions of the broadcast receiving apparatus 100 of the present embodiment are started or communication environment and communication state of the various communication functions and reception environment and reception state of the various receiving functions are changed in some cases, with the result that it becomes possible to acquire the data from the transmission path other than the TLV stream to be displayed in the "region 1" and "region 2". In such a case, the broadcast receiving apparatus 100 of the present embodiment may immediately shift the display layout from the default layout display of FIG. 19A to the layout of a plurality of regions of FIGS. 19B and 19C specified by the LCT so that the video contents received from the TLV stream are displayed in the "region 0" and the data acquired from the transmission path other than the TLV stream is displayed in the "region 1" and "region 2". Alternatively, the layout change may be performed after an instruction to make a layout change from the default layout to the layout specified by the LCT is inputted to the operation input unit 170, instead of performing the layout change immediately.

[Copy Right Protection Function]

In the digital broadcasting system compatible with the broadcast receiving apparatus 100 of the present embodiment, the copy control information may be included in the MPT so that the copy control information is transmitted to indicate copy control states of contents that the MPT refers to, and the copy control states includes "freely copiable" (which may be divided into two types such as "freely copiable and requiring encoding process upon storage and output" and "freely copiable and not requiring encoding process upon storage and output"), "copiable only for one generation", "copiable given times" (e.g., a so-called "dubbing 10" if copiable nine times+allowing move once), and "copy prohibited". In this case, the broadcast receiving apparatus 100 of the present embodiment may be configured to control the processes of storing the contents in the storage (accumulation) unit 110, recoding the contents on a removable recording medium, outputting the contents to external equipment, copying the contents to external equipment, and moving the contents to external equipment in accordance with the copy control information. Note that data to be subjected to the storing process may include not only the data stored in the storage (accumulation) unit 110 in the broadcast receiving apparatus 100 but also a record that is protected by an encoding process or the like so as to be reproduced only by the broadcast receiving apparatus 100. Specifically, data to be subjected to the storing process includes the data recorded in an external recording device in the state of being reproduced only by the broadcast receiving apparatus 100.

Specific examples of processes based on the copy control information will be described below.

First, when the copy control information included in the MPT indicates "freely copiable", the broadcast receiving apparatus 100 of the present embodiment is allowed to perform the processes of storage to the storage (accumulation) unit 110, recoding on the removable recording medium, output to external equipment, copy to external equipment, and move to external equipment, without limitations. However, in the case where "freely copiable" is divided into "freely copiable and requiring encoding process upon storage and output" and "freely copiable and not requiring encoding process upon storage and output" and when the copy control information indicates "freely copiable and requiring encoding process upon storage and output", the broadcast receiving apparatus 100 is allowed to perform the processes of storage to the storage (accumulation) unit 110, recoding on the removable recording medium, output to external equipment, copy to external equipment, and move to external equipment any number of times without any limitation, but has to apply the encoding process in any cases.

Further, when the copy control information included in the MPT indicates "copiable only for one generation", the broadcast receiving apparatus 100 of the present embodiment is allowed to store encoded contents in the storage (accumulation) unit 110, but when the stored contents are to be outputted to external equipment for viewing, the broadcast receiving apparatus 100 has to output the contents after encoding the contents together with the copy control information indicating "copy prohibited". However, the broadcast receiving apparatus 100 is allowed to perform a so-called moving process to the external equipment (the process of copying the contents to the external equipment and disabling the reproduction of the contents in the storage (accumulation) unit 110 of the broadcast receiving apparatus 100 by, for example, deleting the contents).

Further, when the copy control information included in the MPT indicates "copiable given times", the broadcast receiving apparatus 100 of the present embodiment is allowed to store encoded contents in the storage (accumulation) unit 110, but when the stored contents are to be outputted to external equipment for viewing, the broadcast receiving apparatus 100 has to output the contents after encoding the contents together with the copy control information indicating "copy prohibited". However, the broadcast receiving apparatus 100 is allowed to perform the copying and move process of contents to the external equipment predetermined times. In the case of the so-called "dubbing 10", the broadcast receiving apparatus 100 is allowed to perform copying to the external equipment nine times and the moving process to the external equipment once.

Further, when the copy control information included in the MPT indicates "copy prohibited", the broadcast receiving apparatus 100 of the present embodiment is prohibited from copying to the storage (accumulation) unit 110. However, when the broadcast receiving apparatus 100 is configured to have a "temporary storage" mode in which storage to the storage (accumulation) unit 110 is allowed only for a predetermined given time or a given time specified by control information (e.g., the MH-Expire descriptor or the like shown in FIG. 6D) included in a broadcasting signal, the broadcast receiving apparatus 100 is allowed to store the contents temporarily in the storage (accumulation) unit 110 even when the copy control information included in the MPT indicates "copy prohibited". When the contents for which the copy control information included in the MPT indicates "copy prohibited" are to be outputted to external equipment for viewing, the broadcast receiving apparatus 100 has to output the contents after encoding the contents together with the copy control information indicating "copy prohibited".

Note that the output of the contents to the external equipment for viewing can be performed by the video output unit 163 and the audio output unit 166 or through the digital IF unit 125 and the LAN communication unit 121 of FIG. 7A. The copying or moving process to the external equipment can be performed through the digital IF unit 125 and the LAN communication unit 121 of FIG. 7A.

According to the processes described above, proper contents protection can be achieved in accordance with the copy control information correlated with contents.

Further, the copying process of the contents for which the copy control information indicates copy restriction such as "copiable only for one generation", "copiable given times", and "copy prohibited" to external equipment through the LAN communication unit 121 may be allowed only when the IP address of the external equipment which is the destination of a transmission packet sent from the broadcast receiving apparatus 100 is present in the same subnet as the IP address of the broadcast receiving apparatus 100, and may be prohibited when the IP address of the external equipment is outside the subnet in which the IP address of the broadcast receiving apparatus 100 is present. The same applies also to the case of the contents for which the copy control information indicates "freely copiable and requiring encoding process upon storage and output".

Similarly, the process of storing the contents for which the copy control information indicates copy restriction such as "copiable only for one generation", "copiable given times", and "freely copiable and requiring encoding process upon storage and output" temporarily in the storage (accumulation) unit 110 and then moving the contents to external equipment through the LAN communication unit 121 may be allowed only when the IP address of the external equipment which is the destination of a transmission packet sent from the broadcast receiving apparatus 100 is present in the same subnet as the IP address of the broadcast receiving apparatus 100, and may be prohibited when the IP address of the external equipment is outside the subnet in which the IP address of the broadcast receiving apparatus 100 is present.

Video and audio output for viewing contents stored in the storage (accumulation) unit 110 of the broadcast receiving apparatus 100 is allowed in principle only when the IP address of the external equipment which is the destination of a transmission packet sent from the broadcast receiving apparatus 100 is present in the same subnet as the IP address of the broadcast receiving apparatus 100, and the output is prohibited when the IP address of the external equipment is outside the subnet in which the IP address of the broadcast receiving apparatus 100 is present. However, when the external equipment is connected within a given period in the subnet in which the IP address of the broadcast receiving apparatus 100 is present and is registered (by paring) as equipment allowed to view the contents even outside the subnet in which the IP address of the broadcast receiving apparatus 100 is present, video and audio output for viewing the contents stored in the storage (accumulation) unit 110 of the broadcast receiving apparatus 100 to the external equipment may be allowed even when the IP address of the external equipment is outside the subnet in which the IP address of the broadcast receiving apparatus 100 is present. In this case, the video and audio output for viewing the contents is performed by encoding the contents.

According to the process described above, different processes are performed depending on whether the IP address of the external equipment is present in the same subnet as the IP address of the broadcast receiving apparatus 100 or is outside the same subnet, so that both of the user convenience and contents protection can be achieved.

Next, as described above with reference to FIG. 6E, in the digital broadcasting system compatible with the broadcast receiving apparatus 100 of the present embodiment, data that is acquired from a path (IPv4, IPv6, MPEG2-TS, URL, etc.) different from data that is acquired from a TLV stream of the broadcasting path may be included in the same package and the same event as the data that is acquired from the TLV stream based on the location information ("MMT_general_location_info( )" of FIG. 17) in the MTP. The contents protection that is performed when copy control information is included in the MPT in this case will be described.

First, when copy control information is included in the MPT, data that is included in the same package and the same event based on the location information may be controlled in accordance with the copy control information included in the TLV stream even if the data is acquired from a path (IPv4, IPv6, MPEG2-TS, URL, etc.) different from data that is acquired from a TLV stream of the broadcasting path. As described above, the copy control states of contents specified by the copy control information include "freely copiable" (which may be divided into two types such as "freely copiable and requiring encoding process upon storage and output" and "freely copiable and not requiring encoding process upon storage and output"), "copiable only for one generation", "copiable given times" (e.g., a so-called "dubbing 10" if copiable nine times+allowing move once), and "copy prohibited".

Herein, if data location indicated by the location information includes MPEG2-TS data transmitted by a different digital broadcasting signal, the transmitted MPEG2-TS data is correlated with copy control information also in the different digital broadcasting signal. Accordingly, a problem arises as to in what way and in accordance with which information the copy control of the MPEG2-TS data should be performed (which of the copy control information included in the TLV/MMT stream and the copy control information included in the MPEG2-TS should be referred to in performing copy control).

In the digital broadcasting system of the present embodiment, this problem can be solved by performing any one of the following operations in the broadcast receiving apparatus 100.

First Operation Example

In a first operation example, when copy control information is included in the MPT and data that is included in the same package and the same event based on the location information includes MPEG2-TS data transmitted by a different digital broadcasting signal, priority is given to a copy control state indicated by the copy control information included in the TLV stream over a copy control state indicated by the copy control information included in the MPEG2-TS in performing copy control.

For example, when the copy control state indicated by the copy control information included in the TLV stream is "copiable only for one generation" while the copy control state indicated by the copy control information included in the MPEG2-TS is "copiable given times", even the data acquired from a path (digital broadcasting in the MPEG2-TS transmission format) different from the data acquired from the TLV stream may be subjected to copy control as the data contents of "copiable only for one generation". For example, when the copy control state indicated by the copy control information included in the TLV stream is "freely copiable" while the copy control state indicated by the copy control information included in the MPEG2-TS is "copiable given times", even the data acquired from a path (digital broadcasting in the MPEG2-TS transmission format) different from the data acquired from the TLV stream may be subjected to copy control as the data contents of "freely copiable".

By this operation, data acquired from a path other than the TLV stream can also be put in a copy control state desired in the broadcasting system compatible with the broadcast receiving apparatus 100 of the present embodiment.

Second Operation Example

In a second operation example, when copy control information is included in the MPT and data that is included in the same package and the same event based on the location information includes MPEG2-TS data transmitted by a different digital broadcasting signal, a copy control state indicated by the copy control information included in the TLV stream is compared with a copy control state indicated by the copy control information included in the MPEG2-TS, and if the copy control state indicated by the copy control information included in the MPEG2-TS is severer than the copy control state indicated by the copy control information included in the TLV stream, the MPEG2-TS data is excluded from contents to be processed when performing the storing process to the storage (accumulation) unit 110, recording process on the removable recoding medium, or outputting process from the digital interface.

By this operation, with respect to the data acquired from the path other than the TLV stream, the original copy control information of the data set in the broadcasting system in which the data is transmitted is taken into account, and also the redundant copy control states on the broadcast receiving apparatus 100 of the present embodiment can be eliminated.

Further, if the copy control state indicated by the copy control information included in the MPEG2-TS is identical to or less severe than the copy control state indicated by the copy control information included in the TLV stream as a result of the above comparison, the MPEG2-TS data that is included in the same package and the same event based on the location information may be subjected to copy control as contents in the copy control state indicated by the copy control information included in the TLV stream.

By this operation, with respect to the data acquired from the path other than the TLV stream, the original copy control information of the data set in the broadcasting system in which the data is transmitted is taken into account, and the redundant copy control states on the broadcast receiving apparatus 100 of the present embodiment can be eliminated.

The copy right protection function of the broadcast receiving apparatus 100 of the present embodiment has been described as being performed based on the copy control information included in the MPT. However, the MPT is not the only table including the copy control information. The copy control information may be included also in tables other than the MPT such as the MH-service description table (MH-SDT), the MH-event information table (MH-EIT), or other tables shown in FIG. 6B, and the broadcast receiving apparatus 100 can perform the copy right protection process in accordance with the copy control information transmitted in these tables.

According to the above-described embodiment, it is possible to provide the broadcasting receiver supporting MMT digital broadcasting.

Second Embodiment

A second embodiment of the present invention will be described below. Constituent elements, processes, effects and the like of the second embodiment are the same as those of the first embodiment unless otherwise specified. For this reason, in the following description, differences between the first embodiment and the second embodiment are mainly described, and description of the matters common to both embodiments is omitted as much as possible in order to avoid redundant description. Further, the following description will be made based on the assumption that a broadcast receiving apparatus of the second embodiment is a television receiver that supports both of MMT method and MPEG2-TS method as the media transport method.

[Hardware Configuration of Broadcast Receiving Apparatus]

Figure 24:
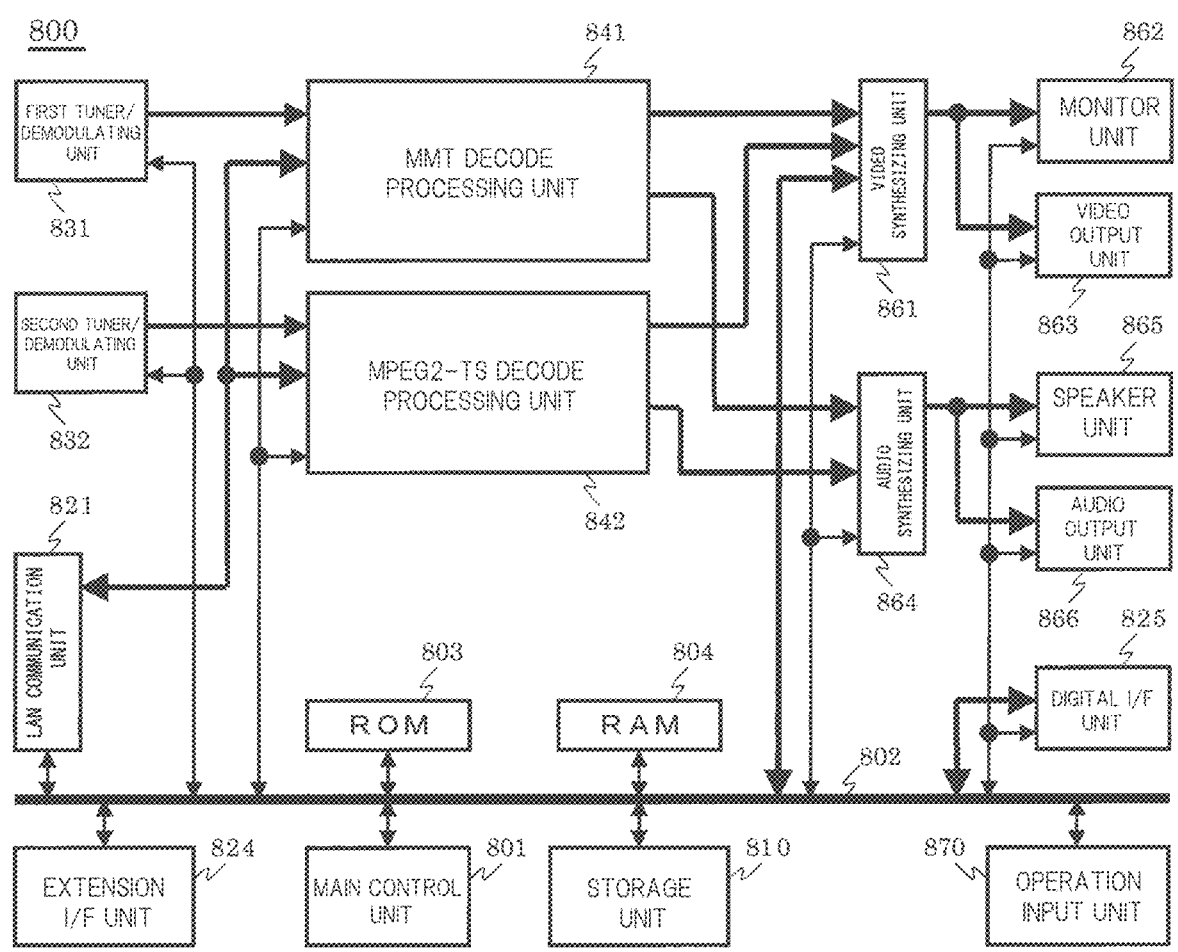
FIG. 24 is a block diagram of a broadcast receiving apparatus according to a second embodiment.

FIG. 24 is a block diagram showing an example of an internal configuration of a broadcast receiving apparatus 800. The broadcast receiving apparatus 800 includes a main control unit 801, a system bus 802, a ROM 803, a RAM 804, a storage unit 810, a LAN communication unit 821, an extension interface unit 824, a digital interface unit 825, a first tuner/demodulating unit 831, a second tuner/demodulating unit 832, an MMT decode processing unit 841, an MPEG2-TS decode processing unit 842, a video synthesizing unit 861, a monitor unit 862, a video output unit 863, an audio synthesizing unit 864, a speaker unit 865, an audio output unit 866, and an operation input unit 870.

The main control unit 801, the system bus 802, the ROM 803, the RAM 804, the storage unit 810, the extension interface unit 824, the digital interface unit 825, the monitor unit 862, the video output unit 863, the speaker unit 865, the audio output unit 866, the operation input unit 870, and the like have functions equivalent to those of the main control unit 101, the system bus 102, the ROM 103, the RAM 104, the storage (accumulation) unit 110, the extension interface unit 124, the digital interface unit 125, the monitor unit 162, the video output unit 163, the speaker unit 165, the audio output unit 166, the operation input unit 170, and the like in the broadcast receiving apparatus 100 of the first embodiment, respectively, and detailed descriptions thereof are omitted.

The first tuner/demodulating unit 831 receives broadcast waves of a broadcasting service adopting the MMT method as the media transport method via an antenna (not shown), and tunes to (selects) a channel giving a service that the user wishes to have, under the control by the main control unit 801. Further, the first tuner/demodulating unit 831 demodulates a received broadcasting signal to acquire an MMT data string, and outputs the MMT data string to the MMT decode processing unit 841. The second tuner/demodulating unit 832 receives broadcast waves of a broadcasting service adopting the MPEG2-TS method as the media transport method via an antenna (not shown), and tunes to (selects) a channel giving a service that the user wishes to have, under the control by the main control unit 801. Further, the second tuner/demodulating unit 832 demodulates a received broadcasting signal to acquire an MPEG2-TS data string, and outputs the MPEG2-TS data string to the MPEG2-TS decode processing unit 842.

The MMT decode processing unit 841 receives the MMT data string output from the first tuner/demodulating unit 831, and performs processes of separating and decoding a video data string, an audio data string, a caption data string, a subtitle data string, and the like, which are real-time presentation elements, based on a control signal included in the MMT data string. The MMT decode processing unit 841 has the functions equivalent to those of the separating unit 132, the video decoder 141, the video color gamut conversion unit 142, the audio decoder 143, the caption decoder 144, the subtitle decoder 145, the subtitle synthesizing unit 146, the subtitle color gamut conversion unit 147, the data decoder 151, the cache unit 152, the application control unit 153, the browser unit 154, the application color gamut conversion unit 155, the sound source unit 156, and the like in the broadcast receiving apparatus 100 of the first embodiment. The MMT decode processing unit 841 is capable of performing the various processes described in the first embodiment. The details of the various processes have been described in the first embodiment, and further descriptions thereof are omitted.

The MPEG2-TS decode processing unit 842 receives the MPEG2-TS data string output from the second tuner/demodulating unit 832, and performs processes of separating and decoding a video data string, an audio data string, a caption data string, a subtitle data string, and the like, which are real-time presentation elements, based on a control signal included in the MPEG2-TS data string. The MPEG2-TS decode processing unit 842 has the function equivalent to that of an IRD (Integrated Reviver Decoder) of a conventional television receiver that receives broadcast waves of a broadcasting service adopting the MPEG2-TS method as the media transport method, and detailed descriptions thereof are omitted.

The video synthesizing unit 861 receives video information, subtitle information, and application information output from the MMT decode processing unit 841 and video information, subtitle information, and application information output from the MPEG2-TS decode processing unit 842, and properly performs a selection process and/or a superposition process. The video synthesizing unit 861 has a video RAM (not shown), and the monitor unit 862 and others are driven based on video information and others inputted to the video RAM. In addition, the video synthesizing unit 861 performs a scaling process, a superposing process of EPG screen information, and others under the control by the main control unit 801 when necessary. The audio synthesizing unit 864 receives audio information output from the MMT decode processing unit 841 and audio information output from the MPEG2-TS decode processing unit 842, and properly performs a selection process and/or a mixing process.

The LAN communication unit 821 is connected to the Internet 200 via the router device 200r, and transmits and receives data to and from server devices and other communication equipment on the Internet 200. Further, the LAN communication unit 821 acquires an MMT data string (or part of it) and an MPEG2-TS data string (or part of it) of a program transmitted through the communication line, and properly outputs them to the MMT decode processing unit 841 and the MPEG2-TS decode processing unit.

[Time Display in Broadcast Receiving Apparatus]

The broadcast receiving apparatus 800 of the present embodiment can display the current date and current time on the EPG screen and other various setting screens. Information related to the current date and current time is transmitted by an MH-TOT or the like in the case of a broadcasting service adopting the MMT method as the media transport method, and the information is transmitted by a TOT (Time Offset Table) or the like provided in SI (Service Information) defined in the MPEG-2 system in the case of a broadcasting service adopting the MPEG2-TS method as the media transport method. The broadcast receiving apparatus 800 can acquire the information related to the current date and current time by referring to the MH-TOT and the TOT.

In general, when the video synthesizing unit 861 mainly selects video information and others output from the MMT decode processing unit 841, the video synthesizing unit 861 superposes the information related to the current date and current time acquired from the MH-TOT on the video information and others, and when the video synthesizing unit 861 mainly selects video information and others output from the MPEG2-TS decode processing unit 842, the video synthesizing unit 861 superposes the information related to the current date and current time acquired from the TOT on the video information and others.

However, since the broadcasting service adopting the MMT method as the media transport method is different from the broadcasting service adopting the MPEG2-TS method as the media transport method in coding/decoding processes, transmission paths, and the like, there is a possibility that inconsistency occurs in current time display between the case of selecting the broadcasting service adopting the MMT method as the media transport method and the case of selecting the broadcasting service adopting the MPEG2-TS method as the media transport method. For example, when an EPG screen 162g displaying channel information of the broadcasting service adopting the MMT method as the media transport method is switched to an EPG screen 162h displaying channel information of the broadcasting service adopting the MPEG2-TS method as the media transport method as shown in FIG. 25, the inconsistency caused when the display of current time is switched from a current time display 162g1 to a current time display 162h1 may give the user a feeling of visual discomfort.

In order to prevent the user from having such a feeling of visual discomfort, the broadcast receiving apparatus 800 of the present embodiment performs control to superpose the information related to the current date and current time acquired from the TOT on the video information and others even when the video synthesizing unit 861 mainly selects the video information and others output from the MMT decode processing unit 841. Namely, the broadcast receiving apparatus 800 of the present embodiment performs control to superpose current time information provided by the broadcasting service adopting the MPEG2-TS method as the media transport method, on the contents of the broadcasting service adopting the MMT method as the media transport method.

Through the control described above, the broadcast receiving apparatus 800 of the present embodiment always displays the current time information that is acquired by referring to the TOT. Thus, even when the broadcasting service adopting the MMT method as the media transport method and the broadcasting service adopting the MPEG2-TS method as the media transport method are switched to each other, it is possible to prevent the user from having such a feeling of visual discomfort due to inconsistency in the display of current time.

FIG. 26A shows an example of selection control of a reference source of current time information in accordance with the reception state of broadcasting services in the broadcast receiving apparatus 800 of the present embodiment. The broadcast receiving apparatus 800 of the present embodiment always refers to the TOT to acquire current time information when the broadcast receiving apparatus 800 is in a condition in which it can receive the broadcasting service adopting the MPEG2-TS method as the media transport method, and refers to the MH-TOT to acquire current time information only when the broadcast receiving apparatus 800 is in a condition in which it cannot receive the broadcasting service adopting the MPEG2-TS method as the media transport method but can receive the broadcasting service adopting the MMT method as the media transport method.

In addition, the above-mentioned effect can be achieved also by performing control to superpose current time information provided by the broadcasting service adopting the MMT method as the media transport method on contents of the broadcasting service adopting the MPEG2-TS method as the media transport method contrary to the above control.

In both of the case of control in which current time information provided by the broadcasting service adopting the MPEG2-TS method as the media transport method is superposed on contents of the broadcasting service adopting the MMT method as the media transport method and the case of control in which current time information provided by the broadcasting service adopting the MMT method as the media transport method is superposed on contents of the broadcasting service adopting the MPEG2-TS method as the media transport method, the current time information can be corrected by referring to the "delta" parameter of the time information in the TMCC extension information region as described above in [Time Management of Broadcast Receiving Apparatus] of the first embodiment.

Further, in both cases of the broadcasting service in which the MMT method is adopted as the media transport method and the broadcasting service in which the MPEG2-TS method is adopted as the media transport method, there is a possibility that the MH-TOT or TOT transmitted by respective broadcasting services making up the network has an error due to the fault of the transmission system or the transmission failure. As the measures for the error of the MH-TOT or TOT described above, the broadcast receiving apparatus 800 of the present embodiment has a function of performing an update process of time information of a built-in clock by acquiring an MH-TOT or TOT from a different broadcasting service in the same network or an arbitrary broadcasting service in another network and referring to current time information of the acquired MH-TOT or TOT when it is determined that the MH-TOT or TOT acquired from the service being received at present has an error.

FIG. 26B shows an example of an update process of current time information in the case where the broadcasting service adopting the MPEG2-TS method as the media transport method is received in the broadcast receiving apparatus 800 of the present embodiment. Note that the process similar to that shown in FIG. 26B is possible even when the broadcasting service adopting the MMT method as the media transport method is received.

When the time information of the built-in clock is updated in the broadcast receiving apparatus 800 of the present embodiment, first, the receiving function executing unit 1102 acquires the TOT from the MPEG2-TS data string of the currently received broadcasting service (broadcasting serving adopting the MPEG2-TS method as the media transport method) (S301), and then acquires the current time information by referring to the acquired TOT (S302). Next, the receiving function executing unit 1102 performs the process of comparing the current time information acquired in the process of S302 and the time information of the built-in clock.

When the difference between the current time information acquired in the process of S302 and the time information of the built-in clock is within a given value (e.g., within 3 minutes) as a result of the comparison process (S303: Yes), the receiving function executing unit 1102 updates the time information of the built-in clock based on the current time information acquired in the process of S302 (S306). Meanwhile, when the difference between the current time information acquired in the process of S302 and the time information of the built-in clock is not within the given value as a result of the comparison process (S303: No) or the TOT acquired in S301 has a flag or the like indicating that an error is present in the data, the receiving function executing unit 1102 acquires a TOT from an MPEG2-TS data string of a different broadcasting service in the same network or acquires an MH-TOT from an MMT data string of an arbitrary broadcasting service (broadcasting serving adopting the MMT method as the media transport method) in another network (S304), and further acquires current time information from the acquired TOT or MH-TOT (S305). The receiving function executing unit 1102 can perform the comparison process of S303 again based on the current time information acquired in the process of S305.

Through the process described above, the broadcast receiving apparatus 800 of the present embodiment can perform the update process of the time information of the built-in clock by acquiring an MH-TOT or TOT from a different broadcasting service in the same network or an arbitrary broadcasting service in another network and referring to current time information of the acquired MH-TOT or TOT when it is determined that the MH-TOT or TOT acquired from the service being received at present has an error.

When the current time information whose difference from the time information of the built-in clock falls within a given range cannot be acquired even by the repetition of S304 and S305 like in the initial setting after the product shipment, the time information of the built-in clock may be set newly based on the current time information acquired in the process of S302. In this manner, it is possible to deal with the case where the time information of the built-in clock of the broadcast receiving apparatus 800 of the present embodiment has an error.

[Display of EPG in Broadcast Receiving Apparatus]

Event schedule information of the broadcasting service adopting the MMT method as the media transport method is transmitted by MH-EIT or the like. Meanwhile, event schedule information of the broadcasting service adopting the MPEG2-TS method as the media transport method is transmitted by EIT (Event Information Table) or the like included in SI defined in the MPEG-2 system. Therefore, in general, when video information or the like provided by the broadcasting service adopting the MMT method as the media transport method is displayed, the event schedule information (MH-EIT) of the broadcasting service adopting the MMT method can be acquired, and when video information or the like provided by the broadcasting service adopting the MPEG2-TS method as the media transport method is displayed, the event schedule information (EIT) of the broadcasting service adopting the MPEG2-TS method can be acquired.

However, the broadcast receiving apparatus 800 of the present embodiment can acquire both MH-EIT and EIT when displaying video information or the like provided by the broadcasting service adopting the MMT method as the media transport method as well as when displaying video information or the like provided by the broadcasting service adopting the MPEG2-TS method as the media transport method, and thus the user friendliness can be improved.

FIG. 27A shows an example of the EPG screen in the broadcast receiving apparatus 800 of the present embodiment. In FIG. 27A, an EPG screen 162*i* is an EPG screen that is created based on the MH-EIT of the broadcasting service adopting the MMT method as the media transport method, and "M1 television", "M2 broadcasting", "M3 channel", "M4 TV", "television M5" and the like are the names of broadcast stations that provide the broadcasting service adopting the MMT method as the media transport method. Further, an EPG screen 162*j* is an EPG screen that is created based on the EIT of the broadcasting service adopting the MPEG2-TS method as the media transport method, and "T6 television", "T7 broadcasting", "T8 channel", "T9 TV", "television TA" and others are the names of broadcast stations that provide the broadcasting service adopting the MPEG2-TS method as the media transport method.

For example, when the user who is watching a broadcasting program provided by the broadcasting service adopting the MMT method as the media transport method gives an instruction to display the EPG screen by operating the remote controller (not shown), an initial EPG screen (not shown) appears. The initial EPG screen is an EPG screen that is created based on the MH-EIT of the broadcasting service adopting the MMT method as the media transport method, and shows detailed information of broadcasting programs of respective channels in a time zone of "from 17:00 (around current time)" on "Oct. 7, 2014 (today)". Then, if the user wishes to check detailed information of broadcasting programs of respective channels in a time zone of "from 20:00" on "Oct. 9, 2014" and gives an instruction to update the EPG screen by operating the remote controller (not shown), the EPG screen 162*i* appears.

Subsequently, if the user wishes to check detailed information of broadcasting programs provided by the broadcasting service adopting the MPEG2-TS method as the media transport method and gives a network switching instruction by operating the remote controller (not shown), the EPG screen 162*j* appears. At this time, the broadcast receiving apparatus 800 of the present embodiment controls the screen to display detailed information of broadcasting programs of the respective channels in the same time zone on the same date (i.e., "from 20:00" on "Oct. 9, 2014") as those of the EPG screen 162*i* displayed just before the network switching, instead of the initial EPG screen that is created based on the EIT of the broadcasting service adopting the MPEG2-TS method as the media transport method (i.e., detailed information of broadcasting programs of the respective channels in the time zone of "from 17:00" on "Oct. 7, 2014").

Through the control described above, the user can consecutively check detailed information of broadcasting programs provided in the same time zone on the same date by a plurality of networks with different media transport methods by a simple operation. Namely, the user friendliness of the broadcast receiving apparatus 800 can be improved.

Figure 27B:
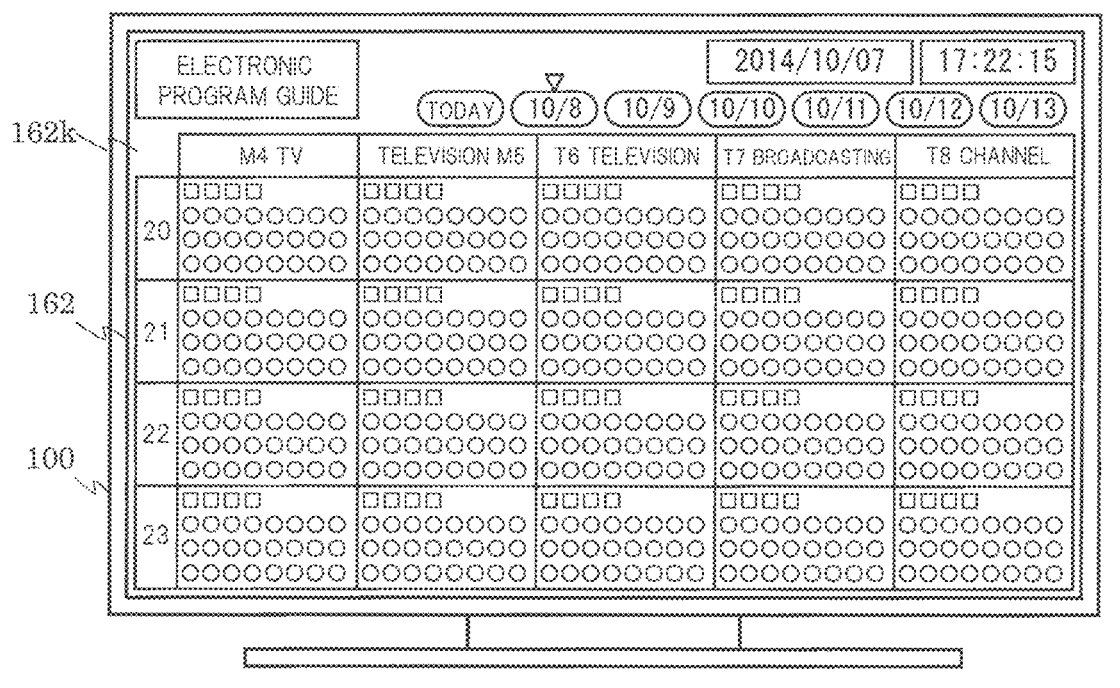

FIG. 27B is a diagram showing an example of the EPG screen in the broadcast receiving apparatus 800 of the present embodiment that is different from the example mentioned above. An EPG screen 162k shows a state obtained by scrolling the EPG screen 162i of FIG. 27A in the direction of arrangement of the channels (horizontal direction) by the operation of the remote controller (not shown). Namely, in the example of FIG. 27B, by scrolling the EPG screen in the direction of arrangement of the channels (horizontal direction), the channel information that is created based on the MH-EIT of the broadcasting service adopting the MMT method as the media transport method and the channel information that is created based on the EIT of the broadcasting service adopting the MPEG2-TS method as the media transport method are displayed on the same time axis in a seamless manner.

Accordingly, even when the user wishes to check the channel information that is created based on the EIT of the broadcasting service adopting the MPEG2-TS method as the media transport method while checking the channel information that is created based on the MH-EIT of the broadcasting service adopting the MMT method as the media transport method, the user does not need to give a network switching instruction or the like by the operation of the remote controller (not shown). In addition, the user is allowed to collectively check detailed information of broadcasting programs provided in the same time zone on the same date by a plurality of networks with different media transport methods. Namely, the user friendliness of the broadcast receiving apparatus 800 can be improved.

Third Embodiment

Hereinafter, a third embodiment of the present invention will be described. Constituent elements, effects and the like of the third embodiment are the same as those of the first embodiment unless otherwise specified. For this reason, in the following description, differences between the first embodiment and the third embodiment are mainly described, and description of the matters common to both embodiments is omitted as much as possible in order to avoid redundant description.

A broadcast receiving apparatus 100 according to the present embodiment can deal with an HDR (High Dynamic Range) and enlargement of color gamut. The HDR is a technique to enlarge a luminance range of color that video contents have. Further, in an MMT that is a media transport method with which the broadcast receiving apparatus 100 according to the present embodiment deals, in order to allow video to be reproduced on a monitor device (the broadcast receiving apparatus 100 according to the present embodiment, and the like) used by a user as intended by a contents manufacturer, contents information on the HDR and the enlargement of color gamut can be transmitted together with encoded data of program contents.

[System Configuration]

Figure 28:
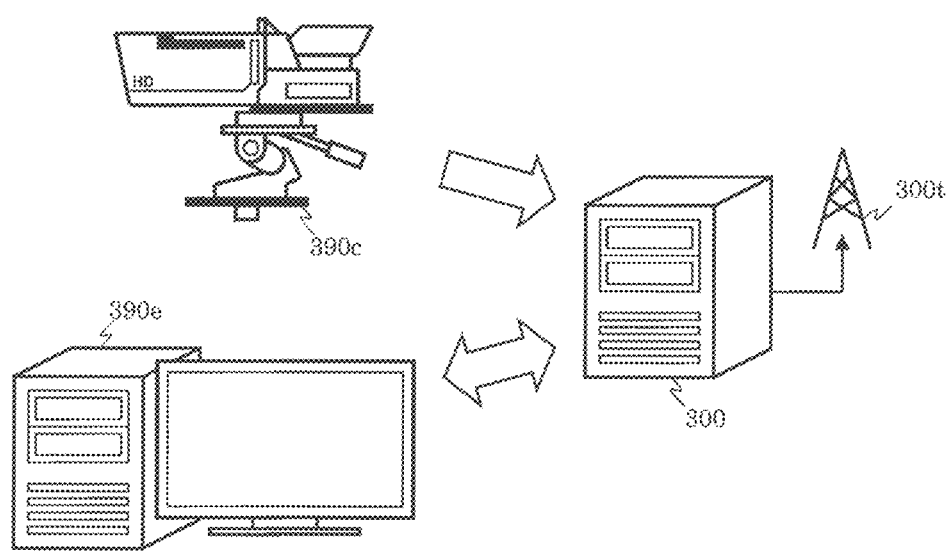
FIG. 28 is a system configuration diagram of a broadcast communication system according to a third embodiment.

A system configuration of the present embodiment is basically similar to the system configuration shown in FIG. 1. As shown in FIG. 28, encoded data of program contents contained in broadcast waves transmitted from a radio tower 300t may be ones that are transmitted after being subjected to a coding process, a modulating process and the like appropriately without executing a temporary storing process in which contents data outputted from a photographing equipment 390c are stored in a broadcast station server 300. Alternatively, they may be ones that are transmitted after executing a storing process of the contents data outputted from the photographing equipment 390c to the broadcast station server 300, subjecting editing processing of various kinds of videos/audios to the contents data for which the storing process was executed in an editing equipment 390e, and further subjecting the coding process, the modulating process and the like appropriately.

Further, in addition to the encoded data and character information of the program contents, other application, versatile data, and the like, contents information descriptors that describe information regarding luminance information of the program contents, color reproduction performance and the like of equipment (the photographing equipment 390c, a monitor device of the editing equipment 390e, and the like) used when to create or edit the program contents are transmitted to the broadcast waves as control information (the contents information) regarding the program contents together with messages, tables, or descriptors of the MMT-SI described above.

[Data Structure of Contents Information Descriptor]

FIG. 29A shows one example of a data structure of the contents information descriptor. Note that the contents information descriptor may be placed in an MPT or MH-EIT. Each of parameters in the data structure of the contents information descriptor has a corresponding function explained below.

"descriptor_tag (descriptor tag)"

A descriptor tag has a function to uniquely identify each descriptor by a field with 16 bits.

"descriptor_length (descriptor length)"

A descriptor length indicates the total number of data bytes of each parameter that follows after this field.

"component_tag (component tag)"

A component tag is a label for uniquely identifying a component stream, and is described by a field with 16 bits. The component tag has the same value as a component tag described in an MH-stream identifying descriptor.

"content_type (content type)"

As content types, types of video contents contained in the component stream are expressed in accordance with FIG. 29B. In a case where this parameter is "0", it indicates that video contents are one that is subjected to editing processing of video by the editing equipment 390e (recorded program, and the like). In a case where this parameter is "1", it indicates that video contents are one that is subjected to the editing processing of video by the editing equipment 390e (recorded program, and the like) and these contents correspond to the HDR. In a case where this parameter is "2", it indicates that video contents are contents data (live broadcasting program, and the like) outputted from the photographing equipment 390c. In a case where this parameter is "3", it indicates that video contents are contents data (live broadcasting program, and the like) outputted from the photographing equipment 390c and these contents correspond to the HDR. Moreover, other classification may be executed by using this parameter.

"source_primaries_rx (source equipment primary color chromaticity coordinate (Rx))"

"source_primaries_ry (source equipment primary color chromaticity coordinate (Ry))"

"source_primaries_gx (source equipment primary color chromaticity coordinate (Gx))"

"source_primaries_gy (source equipment primary color chromaticity coordinate (Gy))"

"source_primaries_bx (source equipment primary color chromaticity coordinate (Bx))"

"source_primaries_by (source equipment primary color chromaticity coordinate (By))"

A source equipment primary color chromaticity coordinate is a parameter that indicates information regarding color reproduction performance and the like of the source equipment, and indicates color gamut with which the source equipment can deal by a coordinate value on a CIE chromaticity diagram (CIE x, y chromaticity diagram) of each primary color of R (red)/G (green)/B (blue). Note that the source equipment is the monitor device of the editing equipment 390e in a case where the "content_type" parameter is "0" or "1". In this case, the source equipment primary color chromaticity coordinate indicates a chromaticity coordinate value of color gamut that can be displayed by the monitor device of the editing equipment 390e. Further, in a case where the "content_type" parameter is "2" or "3", the source equipment is the photographing equipment 390c. In this case, the source equipment primary color chromaticity coordinate indicates a chromaticity coordinate value of color gamut that can be outputted by the photographing equipment 390c.

Figure 29C:
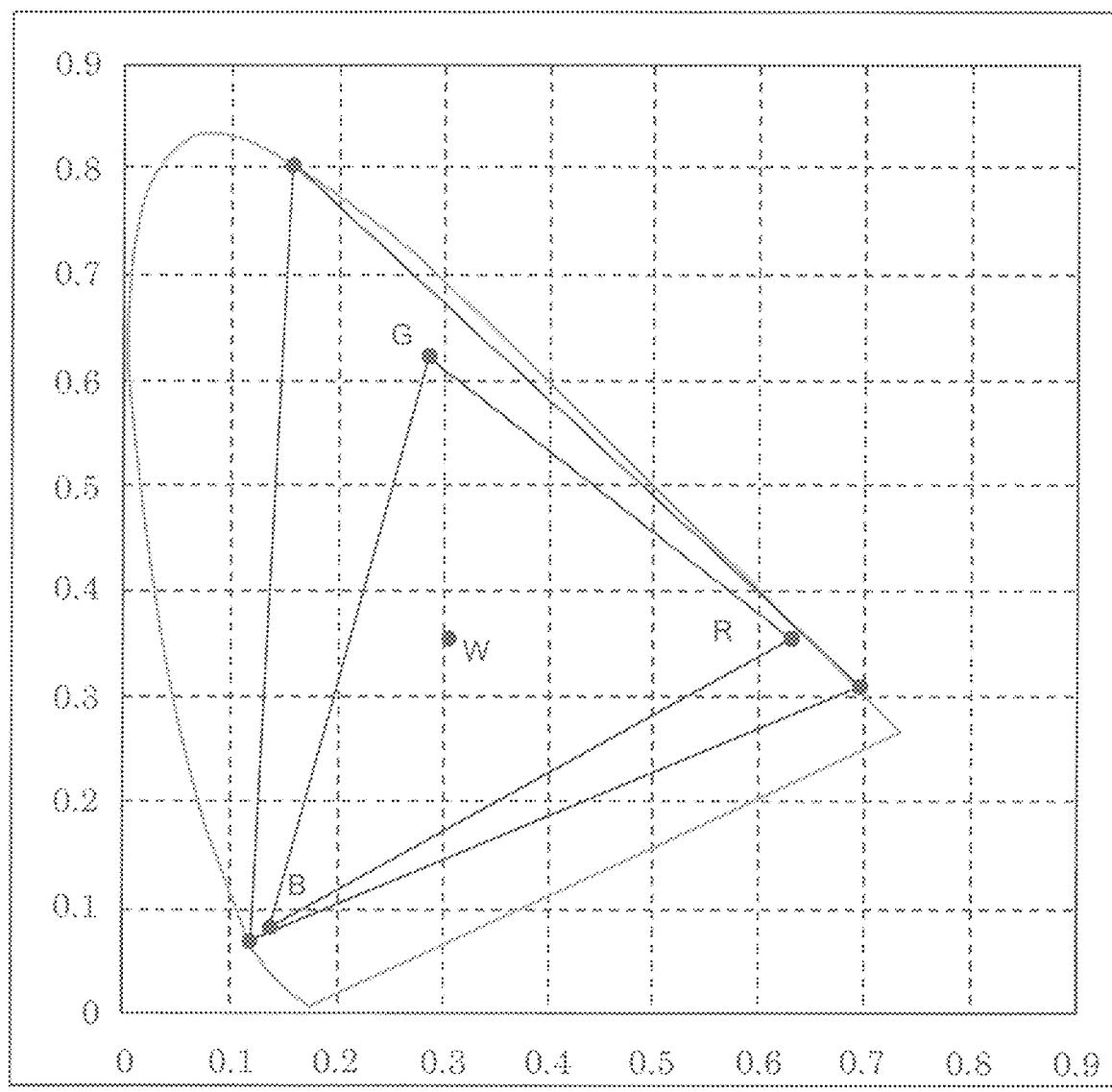
FIG. 29C is an explanatory diagram of meaning of source equipment primary color chromaticity coordinates and source equipment white chromaticity coordinates in the contents information descriptor of the broadcasting system.

Each of the coordinate values on the CIE chromaticity diagram is indicated by a value in a range from "0.000" to "1.000", and is described by a field with 10 bits in a range from "0000000000b" to "1111101000b". For example, as shown in FIG. 29C, in a case where it is a chromaticity coordinate value of R (red) in a BT.709 standard, "x=0.640 (1010000000b)", and "y=0.330 (0101001010b)". In a case where it is a chromaticity coordinate value of G (green) in a BT.2020 standard, "x=0.170 (0010101010b)", and "y=0.797 (1100011101b)".

"source_white_point_x (source equipment white chromaticity coordinate (x))"

"source_white_point_y (source equipment white chromaticity coordinate (y))"

A source equipment white chromaticity coordinate is a parameter that indicates information regarding the color reproduction performance and the like of the source equipment, and indicates a coordinate value of a white reference point on the CIE chromaticity diagram, with which the source equipment can deal. Note that the source equipment is the monitor device of the editing equipment 390e in a case where the "content_type" parameter is "0" or "1". In this case, the source equipment white chromaticity coordinate indicates a chromaticity coordinate value of the white reference point in the monitor device of the editing equipment 390e. Further, in a case where the "content_type" parameter is "2" or "3", the source equipment is the photographing equipment 390c. In this case, the source equipment white chromaticity coordinate indicates a chromaticity coordinate value of the white reference point that the photographing equipment 390c can output.

Each of the coordinate values on the CIE chromaticity diagram is indicated by a value in a range from "0.0000" to "1.0000", and is described by a field with 14 bits in a range from "00000000000000b" to "10011100010000b". For example, as shown in FIG. 29C, in a case where it is a chromaticity coordinate value of the white reference point in the BT.709 standard or the BT.2020 standard, "x=0.3127 (00110000110111b)", and "y=0.3290 (00110011011010b)".

"source_luminance_max (source equipment maximum luminance)"

"source_luminance_min (source equipment minimum luminance)"

The source equipment maximum luminance and the source equipment minimum luminance are parameters that respectively indicate information regarding the maximum luminance and the minimum luminance, with which the source equipment can deal. Note that the source equipment is the monitor device of the editing equipment 390e in a case where the "content_type" parameter is "0" or "1". In this case, the source equipment maximum luminance and the source equipment minimum luminance respectively indicate the maximum value and the minimum value of the luminance that can be displayed by the monitor device of the editing equipment 390e. Further, in a case where the "content_type" parameter is "2" or "3", the source equipment is the photographing equipment 390c. In this case, the source equipment maximum luminance and the source equipment minimum luminance respectively indicate the maximum value and the minimum value of luminance that the photographing equipment 390c can output.

The source equipment maximum luminance is specified by a value in a range from "1 ($cd/m^2$: candela/square meter)" to "65535 ($cd/m^2$)", and is described in a range from "0000h" to "FFFFh" by a field with 16 bits. The source equipment minimum luminance is indicated by a value in a range from "0.0001 ($cd/m^2$)" to "65535 ($cd/m^2$)", and is described in a range from "0000h" to "FFFFh" by the field with 16 bits.

"num_of_scene (the number of scenes)"

The number of scenes indicates the number of scenes (which may also be referred to as a "chapter" or the like), which constitute video contents contained in the component stream. In a case where the number of scenes is "1", description of this parameter may be omitted.

"scene_start_time (scene starting time)"

A scene starting time indicates a start time of the scene (or chapter) by a field with 40 bits. High 16 bits of this field indicates low 16 bits of modified Julian date (MJD), and low 24 bits indicates hour, minute and second of Japan Standard Time (JST) by a BCD code with six digits. In a case where the number of scenes is "1", description of this parameter may be omitted.

"scene_duration (scene duration time)"

A scene duration time indicates a duration time of the scene (or chapter) by a field with 24 bits. This field indicates hour, minute and second of the duration time by a BCD code with six digits. In a case where the number of scenes is "1", description of this parameter may be omitted.

"max_light_level_of_content (contents maximum light level)"

The contents maximum light level indicates the maximum light level in each of the scenes (or chapters) by a field with 16 bits. In a case where the number of scenes is "1", this parameter indicates the maximum value of a light level through the whole contents. The contents maximum light level is indicated by a value in a range from "1 ($cd/m^2$)" to "65535 ($cd/m^2$)", and is described in a range from "0000h" to "FFFFh" by the field with 16 bits.

"max_frame_ave_light_level (the maximum frame average light level)"

The maximum frame average light level indicates the maximum value of frame average light level in each of the scenes (or chapters) by a field with 16 bits. In a case where the number of scenes is "1", this parameter indicates the maximum value of the frame average light level through the whole contents. The maximum frame average light level is indicated by a value in a range from "1 ($cd/m^2$)" to "65535 ($cd/m^2$)", and is described in a range from "0000h" to "FFFFh" by the field with 16 bits.

"max_light_level_of_frame (the maximum light level of frame)"

The maximum light level of frame indicates the maximum light level of each frame by a field with 16 bits. The maximum light level of frame is indicated by a value in a range from "1 $(cd/m^2)$" to "65535 $(cd/m^2)$", and is described in a range from "0000h" to "FFFFh" by the field with 16 bits.

"frame_average_light_level (average light level of frame)"

An average light level of frame indicates an average light level of each frame by a field with 16 bits. The average light level of frame is indicated by a value in a range from "1 $(cd/m^2)$" to "65535 $(cd/m^2)$", and is described in a range from "0000h" to "FFFFh" by the field with 16 bits.

"EOTF_identification (EOTF identification)"

Figures 29D, 30:
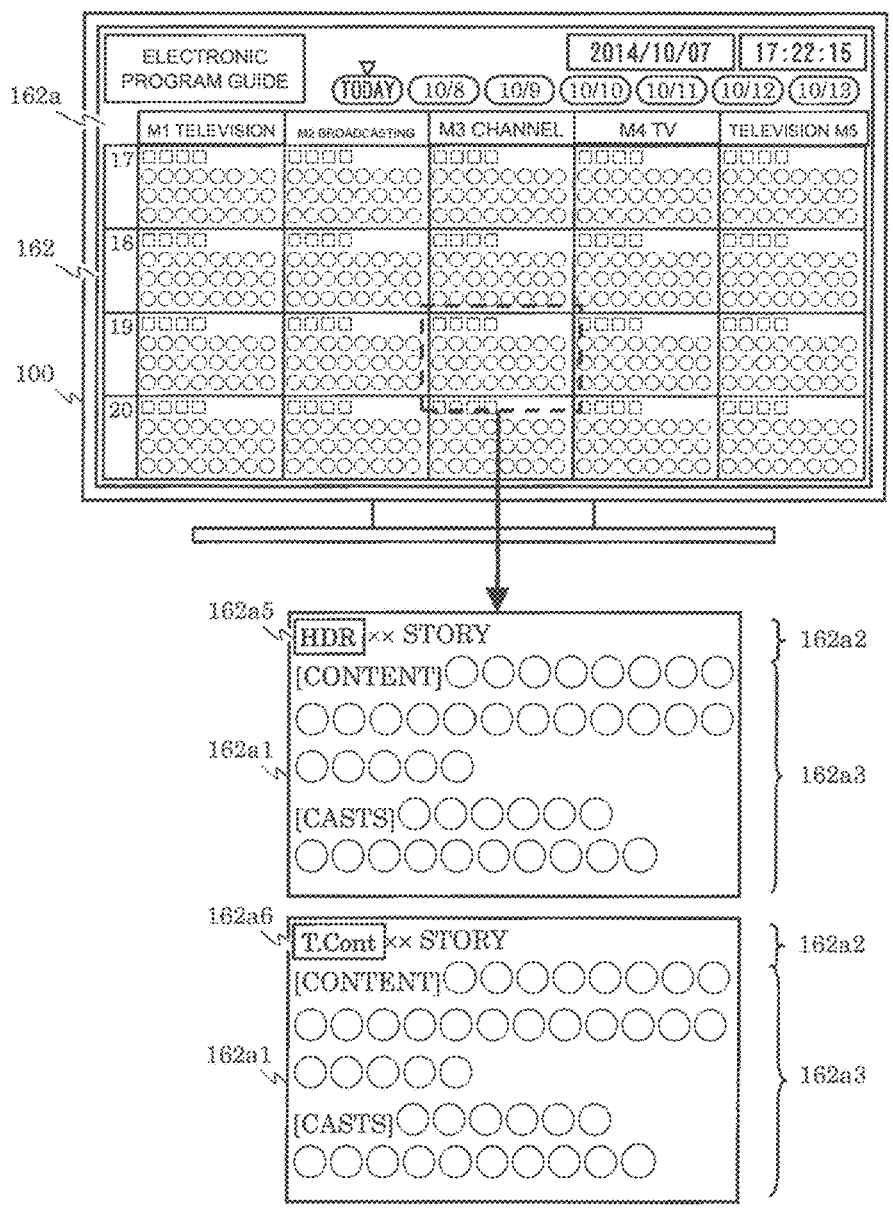
FIG. 29D is an explanatory diagram of meaning of EOTF identification in the contents information descriptor of the broadcasting system.
FIG. 30 is a screen display diagram of an EPG screen in a broadcast receiving apparatus according to the third embodiment.

EOTF (Electro-Optical Transfer Function) identification identifies a type of conversion characteristics (transmission characteristics) between an electric signal and an optical signal, such as gamma correction to which a video signal of the video contents contained in the component stream is subjected. For example, in the example shown in FIG. 29D, in a case where this parameter is "0", the video contents indicate that gamma correction suitable for a monitor device with a display property compliant with BT.709 is subjected thereto. Further, in a case where this parameter is "2", the video contents indicate that gamma correction of a 10-bit process suitable for a monitor device with a display property compliant with BT.2020 is subjected thereto. Further, in a case where this parameter is "3", the video contents indicate that gamma correction of a 12-bit process suitable for a monitor device with a display property compliant with BT.2020 is subjected thereto. Further, in a case where this parameter is "4", the video contents indicate that gamma correction suitable for a monitor device with a display property compliant with SMPTE2084 is subjected thereto. Moreover, the other classification may be executed by using this parameter. Further, a type of colorimetry and the like may be identified by an "EOTF identification" parameter. Note that the types of conversion characteristics (transmission characteristics) between the electric signal and the optical signal, which are shown in FIG. 29D, are one example, and a process of the other conversion characteristics (transmission characteristics) between the electric signal and the optical signal may be subjected to the video signal of the video contents to identify its characteristic by the "EOTF identification" parameter.

Here, the broadcast receiving apparatus 100 that receives the video contents and the "EOTF identification" parameter refers to the "EOTF identification" parameter associated with the video contents, further refers to the display property of the monitor device that displays the video contents, and executes appropriate processes such as electric-optic conversion on the basis of the two, whereby it becomes possible to display each of the video contents by the monitor device at a suitable state. For example, in a case where the transmission characteristics identified by the "EOTF identification" parameter associated with the video contents correspond to the display property of the monitor device that displays the video contents, the electric-optic conversion identified by the "EOTF identification" parameter may be executed in the displaying process as it is. Further, in a case where the transmission characteristics identified by the "EOTF identification" parameter associated with the video contents is not compatible with the display property of the monitor device on which the video contents are displayed, electric-optic conversion identified by the "EOTF identification" parameter is not used as it is. A displaying process of executing electric-optic conversion compatible with the display property of the monitor device may be executed after a converting process of converting a video signal, to which the converting process between the electric signal and the optical signal according to identification of the "EOTF identification" parameter is subjected, into a video signal suitable for a process of electric-optic conversion compatible with the display property of the monitor device.

The converting process of converting the video signal to which the converting process described above between the electric signal and the optical signal according to identification of the "EOTF identification" parameter is subjected into the video signal suitable for the electric-optic converting process corresponding to the display property of the monitor device will be described below. Hereinafter, the process described above is referred to as a "transmission characteristics converting process".

Note that video contents that have a value of "2", "3", or "4" in the "EOTF identification" parameter are HDR video contents in which a range of light and dark, color gamut and the like that can be expressed are broad. In contrast, the video contents that have a value of "0" in the "EOTF identification" parameter are SDR (Standard Dynamic Range) video contents in which the range of light and dark, color gamut and the like that can be expressed are narrower than those of the HDR video contents.

Further, the display device with the display property compliant with BT.2020 and the display device with the display property compliant with SMPTE2084 can be referred to as an "HDR-compatible display device". In contrast, the display device with the display property compliant with BT.709 can be referred to as an "SDR-compatible display device". Moreover, the display device with the display property compliant with BT.709 and incompatible with the display property of the HDR such as BT.2020 or SMPTE2084 may be referred to as a "display device compatible with the SDR (a display device incompatible with the HDR)" as a subordinate concept of the SDR-compatible display device.

Here, in a case where the HDR video contents are displayed on the display device compatible with the SDR (display device incompatible with the HDR) such as the monitor device with the display property compliant with BT.709 and the transmission characteristics converting process is not executed, the range of broad light and dark, the color gamut and the like that the HDR video contents have cannot be expressed by the monitor device, and it becomes a hardly-viewed display image with luminance collapse or color collapse. Namely, in this case, in the transmission characteristics converting process, a process of converting so that the range of broad light and dark, the color gamut and the like that the HDR video contents have fall within the range of light and dark, color gamut and the like that can be expressed by the monitor device may be executed. The process may be expressed as dynamic range reduction conversion of light and dark or color gamut reduction conversion. Further, since it is a process of converting the HDR video contents in which the range of light and dark, color gamut and the like that can be expressed are broad into the SDR video contents in which the range of light and dark, color gamut and the like that can be expressed is narrow, the process may be expressed as an HDR-SDR converting process.

On the other hand, video contents that have a value of "0" in the "EOTF identification" parameter are SDR video contents in which the range of light and dark, color gamut and the like that can be expressed are narrow. In a case where the SDR video contents are displayed on the HDR-compatible display device such as the monitor device with the display property compliant with BT.2020 and the transmission characteristics converting process is not executed, display performance of broad light and dark and display performance of color gamut that the monitor device has cannot be exhibited sufficiently. Namely, in this case, in the transmission characteristics converting process, the converting process for the SDR video contents may be executed so that the display performance of broad light and dark and the display performance of color gamut that the monitor device has can be exhibited sufficiently. The process may be expressed as dynamic range enlargement conversion of light and dark or color gamut enlargement conversion. Further, it is the process of converting the SDR video contents in which the range of light and dark, color gamut and the like that can be expressed are narrow into the HDR video contents in which the range of light and dark, color gamut and the like that can be expressed are broad. Thus, the process may be expressed as an SDR-HDR converting process. Note that the SDR-HDR converting process is not necessarily required, and the SDR-HDR converting process may not be executed when the SDR video contents are displayed on the HDR-compatible display device such as the monitor device with the display property compliant with BT.2020. In this case, the display performance of light and dark and display performance of color gamut remain in the range of the display property of the SDR, but there is no problem because it does not become a hardly-viewed display image with luminance collapse or color collapse.

As an example of processes in a case where the "EOTF identification" parameter is not associated with the video contents received by the broadcast receiving apparatus 100 and cannot be acquired (in a case where they are not transmitted from the beginning) or in a case where a value of the "EOTF identification" parameter associated with the video contents received by the broadcast receiving apparatus 100 cannot be acquired due to a transmission error or the like and cannot be determined, the following processes may be executed.

As a first process example, the value of the "EOTF identification" parameter in the received video contents may be dealt with as "2" or "3", for example. Namely, in a case where a value of the "EOTF identification" parameter cannot be identified, the video contents may be dealt with as the HDR video contents. In this manner, in a case where the monitor device is the HDR-compatible display device such as the monitor device with the display property compliant with BT.2020, the transmission characteristics converting process is not executed. However, in a case where actual contents are the HDR video contents, appropriate display is made. Even in a case where the actual contents are the SDR video contents, the display performance of light and dark and display performance of color gamut remain in the range of the display property of the SDR, but it does not become a hardly-viewed display image with luminance collapse or color collapse. Further, in a case where the monitor device is the display device compatible with the SDR (display device incompatible with the HDR) such as the monitor device with the display property compliant with BT.709, by dealing with the video contents as the HDR video contents, the transmission characteristics converting process is executed. In a case where the actual contents are the HDR video contents, the HDR-SDR converting process is made appropriately to display the contents. Even in a case where the actual contents are the SDR video contents, the display performance of light and dark and display performance of color gamut are more restricted than the range of the display property of the SDR, but it is at least avoided to become a hardly-viewed display video with luminance collapse or color collapse, which cannot express the range of light and dark, color gamut and the like that the video contents have. (In a case where the actual contents are the HDR video contents and the SDR-HDR converting process is executed, or in a case where the actual contents are the HDR video contents and are displayed on the display device compatible with the SDR (display device incompatible with the HDR) as they are without executing the HDR-SDR convert, a possibility to display such a hardly-viewed display video with luminance collapse or color collapse is generated, but it is possible to avoid this situation in the first process example.)

According to the first process example described above, in a case where the value of the "EOTF identification" parameter cannot be identified, the video contents are dealt with as the HDR video contents. Therefore, even in a case where the monitor device is the HDR-compatible display device or the display device compatible with the SDR (display device incompatible with the HDR), and even in a case where the actual contents are the HDR video contents or the SDR video contents, video display with little problem for the user becomes possible.

Further, as another second process example of the process in a case where the value of the "EOTF identification" parameter cannot be acquired (including the case where it is not transmitted, the case where a transmission error or the like occurs, the case where it is an invalid value), it may be determined whether to deal with it as the HDR video contents or the SDR video contents by referring to a parameter regarding resolution of a video signal that a video component descriptor or the like has.

For example, in a case where the parameter regarding the resolution of the video signal indicates that it is high resolution contents so that resolution of the video contents is 3840×2160 pixels or 7680×4320 pixels even though the value of the "EOTF identification" parameter cannot be identified, it may be determined that the video contents are the HDR video contents. Specifically, it may be interpreted that the value of the "EOTF identification" parameter is "2" or "3". It is expected that operations in which the high resolution contents with 3840×2160 pixels or 7680×4320 pixels are prepared as the HDR video contents will be increased in the future. For this reason, stochastically appropriate display is executed easily by such a process.

Further, in a case where the parameter regarding the resolution of the video signal indicates that resolution of the video contents is 1920×1080 pixels or less even though the value of the "EOTF identification" parameter cannot be identified, it may be determined that the video contents are the SDR video contents. Specifically, it may be interpreted that the value of the "EOTF identification" parameter is "0". As contents with resolution of 1920×1080 pixels or less, many existing SDR contents exist. For this reason, stochastically appropriate display is executed easily by such a process.

According to the second process example described above, in a case where the value of the "EOTF identification" parameter cannot be identified, by referring to the parameter regarding the resolution to determine, stochastically appropriate display is executed easily.

Next, a process in a case where a value of the "EOTF identification" parameter associated with the video contents received by the broadcast receiving apparatus 100 is a value for which a relationship with the display property is not prepared in a table of FIG. 29D will be described. Here, the value for which the relationship with the display property is not prepared in the table of FIG. 29D is the case where values reserved for future and values that are not supposed, such as "1", "5" to "15", are stored as the value of the "EOTF identification" parameter in the table of FIG. 29D. These values may be expressed as invalid values. In a case of such invalid values (a value for which a relationship with the display property is not prepared), the respective similar effects can be obtained by executing any of the first process example and the second process example described above.

In the configuration diagram of FIG. 7A, the various kinds of video processing according to the "EOTF identification" parameter as described above may be executed by a video color gamut conversion unit 142 controlled by means of a control of a main control unit 101 on the basis of data separated by a separating unit 132.

Here, in a case where video contents to be displayed are switched between the HDR video contents and the SDR video contents at a change of programs or switching of channels, it is ideal that timing to switch decoded video from a video decoder 141 shown in FIG. 7A between the HDR video contents and the SDR video contents matches with timing to switch video processing of the video color gamut conversion unit 142 between a process for the HDR video contents and a process for the SDR video contents. However, it is thought that a gap of timing is somewhat generated actually.

In the HDR-compatible display device that executes the SDR-HDR converting process for the SDR video contents, in a case where timing to switch the video processing of the video color gamut conversion unit 142 becomes earlier than timing to switch the decoded video from the video decoder 141 when to switch from the HDR video contents to the SDR video contents, a time to execute the SDR-HDR converting process is generated for the HDR video contents, and a possibility to display a hardly-viewed display video with luminance collapse or color collapse is generated. Therefore, when to switch from the HDR video contents to the SDR video contents, the main control unit 101 may control processing timing of the video decoder 141 and the video color gamut conversion unit 142 so that switching timing of the video processing of the video color gamut conversion unit 142 becomes later than switching timing of the decoded video from the video decoder 141. Alternatively, it may be controlled so that the video is set to a video mute state such as black display before the process of switching the two and the video mute state such as black display of the video is released after switching of the two is completed.

Further, in the HDR-compatible display device that executes the SDR-HDR converting process for the SDR video contents, in a case where timing to switch the video processing of the video color gamut conversion unit 142 becomes later than timing to switch the decoded video from the video decoder 141 when to switch from the SDR video contents to the HDR video contents, a time to execute the SDR-HDR converting process is generated for the HDR video contents, and a possibility to display a hardly-viewed display video with luminance collapse or color collapse is generated. Therefore, when to switch from the SDR video contents to the HDR video contents, the main control unit 101 may control processing timing of the video decoder 141 and the video color gamut conversion unit 142 so that switching timing of the video processing of the video color gamut conversion unit 142 becomes earlier than switching timing of the decoded video from the video decoder 141. Alternatively, it may be controlled so that the video is set to a video mute state such as black display before the process of switching the two and the video mute state such as black display of the video is released after switching of the two is completed.

In the SDR-compatible display device that executes the HDR-SDR converting process for the HDR video contents but does not execute the transmission characteristics converting process for the SDR video contents to display them, in a case where timing to switch the video processing of the video color gamut conversion unit 142 becomes earlier than timing to switch the decoded video from the video decoder 141 when to switch from the HDR video contents to the SDR video contents, a time to display the HDR video contents on the SDR-compatible display device without executing the transmission characteristics converting process is generated, and a possibility to display a hardly-viewed display video with luminance collapse or color collapse is generated. Therefore, when to switch from the HDR video contents to the SDR video contents, the main control unit 101 may control processing timing of the video decoder 141 and the video color gamut conversion unit 142 so that switching timing of the video processing of the video color gamut conversion unit 142 becomes later than switching timing of the decoded video from the video decoder 141. Alternatively, it may be controlled so that the video is set to a video mute state such as black display before the process of switching the two and the video mute state such as black display of the video is released after switching of the two is completed.

In the SDR-compatible display device that executes the HDR-SDR converting process for the HDR video contents but does not execute the transmission characteristics converting process for the SDR video contents to display them, in a case where timing to switch the video processing of the video color gamut conversion unit 142 becomes later than timing to switch the decoded video from the video decoder 141 when to switch from the SDR video contents to the HDR video contents, a time to display the HDR video contents on the SDR-compatible display device without executing the transmission characteristics converting process is generated, and a possibility to display a hardly-viewed display video with luminance collapse or color collapse is generated. Therefore, when to switch from the SDR video contents to the HDR video contents, the main control unit 101 may control processing timing of the video decoder 141 and the video color gamut conversion unit 142 so that switching timing of the video processing of the video color gamut conversion unit 142 becomes earlier than switching timing of the decoded video from the video decoder 141. Alternatively, it may be controlled so that the video is set to a video mute state such as black display before the process of switching the two and the video mute state such as black display of the video is released after switching of the two is completed.

As explained above, by executing the processes regarding the switching timing of the decoded video and switching timing of the transmission characteristics converting process, it becomes possible to avoid presenting a hardly-viewed display video with luminance collapse or color collapse to the user.

In place of an identifying process using an "EOTF_identification" parameter in the contents information descriptor explained above and various types of video processing, or in addition to these, an identifying process of inserting a flag, by which identification similar to that of the "EOTF_identification" parameter described above is possible, in an encoded video stream to use the inserted flag and various types of video processing may be executed. The identifying process when to use an "EOTF_identification" flag as the flag in the encoded video stream and the various types of video processing may be executed by referring to the "EOTF_identification" flag inserted in the encoded video stream in the explanation of the identifying process when to use the "EOTF_identification" parameter in the contents information descriptor described above and the various types of video processing in place of referring to the "EOTF_identification" parameter in the contents information descriptor. Thus, detailed explanation will be omitted.

However, by inserting the "EOTF_identification" flag as the flag in the encoded video stream into the encoded video stream by frame unit, GOP unit or the like, for example, it becomes possible to realize switching of the HDR video contents and the SDR video contents and switching of the various types of video processing corresponding to the respective video contents by fine time unit compared with the case where the "EOTF_identification" parameter in the contents information descriptor, which is set by asset unit or program unit, is used. Namely, the video decoder 141 can grasp switching of the HDR video contents and the SDR video contents by frame unit, GOP unit or the like. Moreover, the video color gamut conversion unit 142 provided at a latter part can refer to identification information of the HDR video contents and the SDR video contents by frame unit, GOP unit or the like. Therefore, there is an effect that it is possible to improve synchronization accuracy of switching timing of the video processing in the video color gamut conversion unit 142 compared with the case where the "EOTF_identification" parameter in the contents information descriptor is used.

Further, in a case where transmission of the "EOTF_identification" flag in the encoded video stream and transmission of the "EOTF_identification" parameter in the contents information descriptor are used together, the identifying process using the "EOTF_identification" flag in the encoded video stream is used to switch video processing of the video color gamut conversion unit 142, and the "EOTF_identification" parameter in the contents information descriptor is used for display of program guide by program unit or for display of program information to inform the user of whether the program is the HDR video contents program or the SDR video contents program and the like, for example. Therefore, it is possible to properly use the identification information of the two more suitably.

Further, as a process in a case where transmission of the "EOTF_identification" flag in the encoded video stream and transmission of the "EOTF_identification" parameter in the contents information descriptor are used together and there is inconsistency in the identification information of the two, the following process is thought. As the first process example, there is an example that the "EOTF_identification" flag in the encoded video stream is used preferentially. In this case, there is an advantage that switching between the HDR video contents and the SDR video contents as described above can be synchronized with timing of switching the corresponding video processing with high accuracy. As the second process example, there is an example that the "EOTF_identification" parameter in the contents information descriptor is used preferentially. In this case, there is an advantage that it is possible to identify the transmission characteristics and the like quickly without referring to the encoded video stream.

Note that the contents information descriptor described above may have a data structure different from that shown in FIG. 29A. For example, each of the parameters and another different parameter may further be provided, or all of the parameters may not be provided. Further, each of the parameters may use a different name. Further, there is no need to describe each of the parameters in one descriptor. For example, they may be described so as to be divided into two different descriptors. Further, each of the parameters may be described in a descriptor and placed in a table, or may be described directly in the table.

[Display of EPG in Broadcast Receiving Apparatus]

Similar to the first embodiment, the broadcast receiving apparatus 100 according to the present embodiment refers to the MH-EIT and the like to execute identification by a service ID, whereby it is possible to acquire information on a start time, a broadcasting time and the like of each event (broadcasting program) to create an EPG screen. It is possible to superimpose the created EPG on video information and the like by a video synthesizing unit 161 to display it on the monitor unit 162.

Moreover, the broadcast receiving apparatus 100 according to the present embodiment may be configured to refer to the "content_type" parameter and the like of the contents information descriptor, and display a symbol or the like, which expresses an attribute indicating that the broadcasting program is a program compatible with the HDR, as shown in FIG. 30, in a case where the type of the video contents of each broadcasting program is "1" or "3". For example, the symbol or the like that expresses the attribute may be a symbol or characters indicating that it is a broadcasting program compatible with the HDR, or may be a mark 162a5 obtained by symbolizing the "HDR" that means a broadcasting program compatible with the HDR. The symbol or the like that expresses the attribute may be displayed in a title region 162a2 of detailed information 162a1. Alternatively, in a case where a cursor is positioned on the detailed information 162a1, the symbol or the like may be displayed by pop-up. The symbol or the like may be displayed in other methods.

Further, in a case where the contents information descriptor separately has "HDR_flag" or the like, which is a parameter that indicates whether the video contents of the broadcasting program is compatible with the HDR, whether the symbol or the like, which expresses the attribute indicating that the broadcasting program is a program compatible with the HDR, is to be displayed or not may be controlled by referring to an "HDR_flag" parameter. Note that the name of the "HDR_flag" parameter is one example and a different name may be used.

Further, in a case where all or any of a "source_luminance_max" parameter, a "max_light_level_of_content" parameter, a "max_light_level_of_frame" parameter and the like of the contents information descriptor exceeds a predetermined value (for example, "100 (cd/m$^2$)" or the like), it may be controlled so as to display the symbol or the like that expresses the attribute indicating that the broadcasting program is a program compatible with the HDR.

By referring to the "content_type" parameter and the like of the contents information descriptor, even in a case where the type of the video contents of each of the broadcasting programs is "1" or "3", or even in a case where all or any of the "source_luminance_max" parameter, the "max_light_level_of_content" parameter, the "max_light_level_of_frame" parameter and the like of the contents information descriptor exceeds the predetermined value (for example, "100 (cd/m$^2$)" or the like), it may be controlled so as not to display symbols or characters indicating that it is a broadcasting program compatible with the HDR or the mark 162*a*5 obtained by symbolizing the "HDR", which means a broadcasting program compatible with the HDR, so long as the monitor unit 162 of the broadcast receiving apparatus 100 is compatible with the HDR.

Further, the broadcast receiving apparatus 100 according to the present embodiment refers to the "EOTF_identification" parameter of the contents information descriptor. In a case where the type of gamma correction subjected to the video contents of each broadcasting program is a type with which the broadcast receiving apparatus 100 can deal on the basis of the display property of the monitor unit 162, the symbol or the like that expresses the attribute indicating that the broadcasting program is a program that can be displayed with correct luminance representation may be displayed. For example, the symbol or the like that expresses the attribute may be symbols or characters indicating that it is a program that can be displayed with correct luminance representation, or may be a mark 162*a*6 obtained by symbolizing "True Contrast", which means the program that can be displayed with correct luminance representation. Note that the case where the type of gamma correction subjected to the video contents of each broadcasting program is a type with which the broadcast receiving apparatus 100 can deal on the basis of the display property of the monitor unit 162 as described above is the case where the "EOTF_identification" parameter for the video contents is "0" and a display property of the monitor unit 162 of the broadcast receiving apparatus 100 is compliant with BT.709, and the like, for example.

By displaying the symbol or the like that expresses the attribute as described above in the detailed information 162*a*1 of an EPG screen 162*a*, the user can easily grasp whether each broadcasting program displayed on the EPG screen 162*a* is compatible with the HDR or not, whether it is a program that can be displayed with correct luminance representation or not, and the like.

[Color Gamut Converting Process of Broadcast Receiving Apparatus]

In the present embodiment, the video contents that are a timer recording program are subjected to the editing processing of video/audio by the editing equipment 390*e*, as shown in FIG. 28. Namely, a provider for the video contents carries out the editing processing of the video contents while confirming it by the monitor device of the editing equipment 390*e*. Therefore, it is likely to execute suitable display of the video contents under color reproduction performance that the monitor device of the editing equipment 390*e* has. On the other hand, it is common that the monitor unit 162 of the broadcast receiving apparatus 100, which is a monitor device used to view the video contents by the user, has different color reproduction performance for each manufacturer or each model type. In this case, in a case where the color reproduction performance that the monitor device of the editing equipment 390*e* has is greatly different from color reproduction performance that the monitor unit 162 of the broadcast receiving apparatus 100 has, it is thought a possibility that a problem, in which video expression intended by the provider of the video contents is not executed correctly, occurs when the video contents are displayed on the monitor unit 162 of the broadcast receiving apparatus 100.

Namely, as described above, in the broadcasting system according to the present embodiment, transmission of the contents information descriptor is executed as a descriptor in the MMT-SI. As parameters that indicate information regarding the color reproduction performance of the source equipment, each primary color of R/G/B of color gamut with which the source equipment can deal and a coordinate value on the CIE chromaticity diagram for the white reference point are indicated in this contents information descriptor.

Figure 31A:
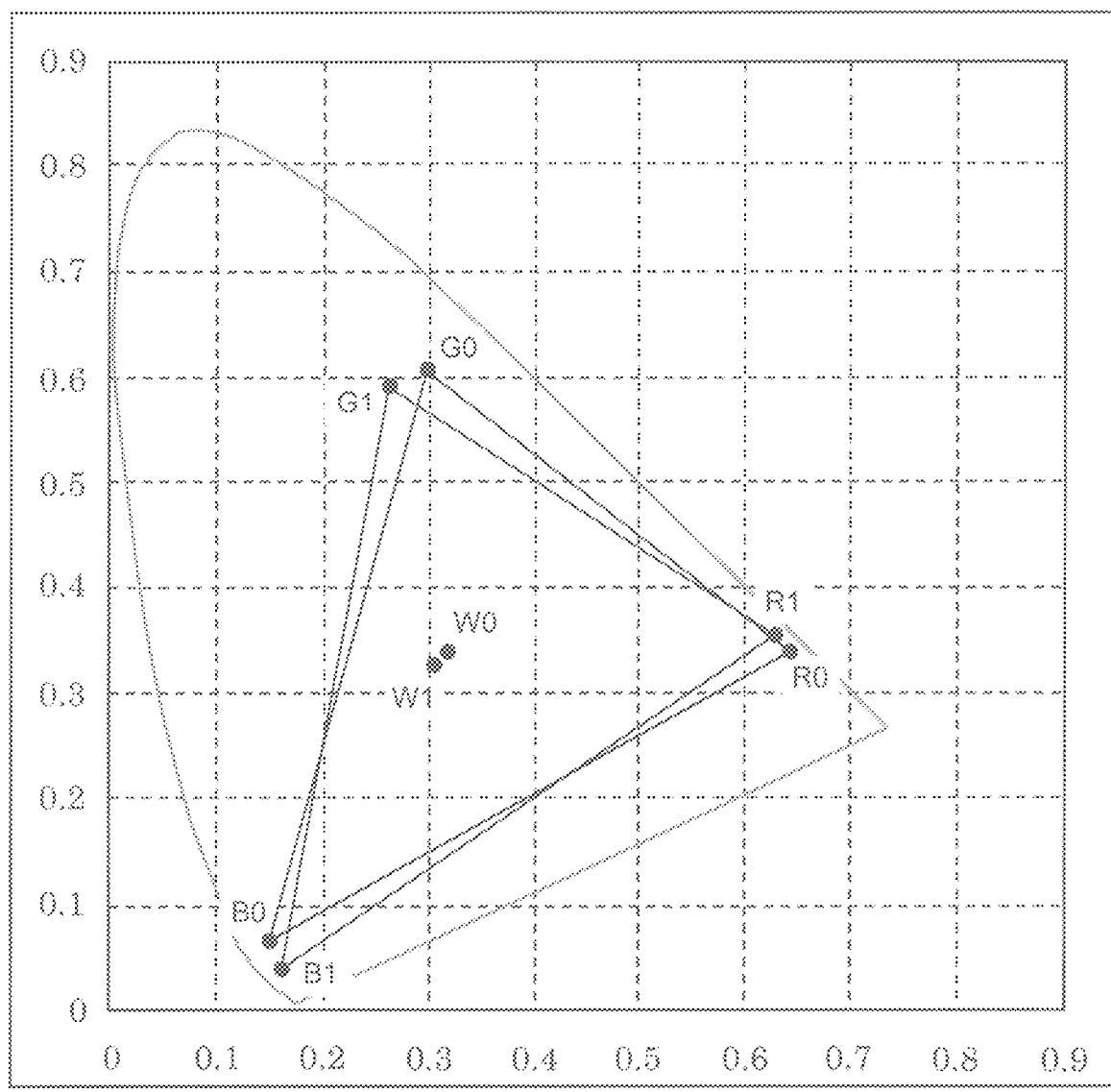
FIG. 31A is an explanatory diagram of a shift of color gamut between source equipment and a monitor device.

Further, the broadcast receiving apparatus 100 according to the present embodiment stores, as parameters that indicate information regarding the color reproduction performance of the monitor unit 162, each primary color of R/G/B of color gamut with which the monitor unit 162 can deal and the coordinate value on the CIE chromaticity diagram for the white reference point in various information memory region of the storage unit 110. In the situation, as shown in FIG. 31A, in a case where each primary color of R/G/B of color gamut with which the source equipment can deal and coordinates of the white reference point, which are described in the contents information descriptor, are respectively R0/G0/B0 and W0 and each primary color of R/G/B of color gamut with which the monitor unit 162 can deal and coordinates of the white reference point, which are stored in the various information memory region of the storage unit 110, are respectively R1/G1/B1 and W1, a portion that is not overlapped on a region configured by R1/G1/B1 that is color gamut with which the monitor unit 162 can deal of a region configured by R0/G0/B0 that is color gamut with which the source equipment can deal is particularly a region that has a possibility that the region is not displayed correctly on the monitor unit 162.

In order to solve the problem described above, the broadcast receiving apparatus 100 according to the present embodiment includes a color gamut converting process function configured to convert video data of the video contents into video data suitable for display on the monitor unit 162 in a case where there is a gap between color gamut with which the source equipment can deal, which is described in the contents information descriptor, and color gamut with which the monitor unit 162 can deal, which is stored in the various information memory region of the storage unit 110. Hereinafter, the color gamut convert function included in the broadcast receiving apparatus 100 will be described.

Namely, the color gamut converting process function included in the broadcast receiving apparatus 100 according to the present embodiment is a function to convert color gamut that the video data have (which is equivalent to the region shown in FIG. 31A configured by R0/G0/B0 that is color gamut with which the source equipment can deal) into color gamut based on the color reproduction performance of the monitor unit 162 (the region shown in FIG. 31A configured by R1/G1/B1) so as to be compatible with each other.

The function of the color gamut converting process with which the broadcast receiving apparatus 100 according to the present embodiment is provided may refer to a coordinate value of each primary color of R/G/B of color gamut with which the source equipment can deal, which is described in the contents information descriptor, and a coordinate value of each primary color of R/G/B of color gamut with which the monitor unit 162 can deal, which is stored in the various information memory region of the storage unit 110, thereby converting color gamut that the video data have so that correct color reproduction on the monitor unit 162 is possible.

By referring to only the coordinate value of the primary color of R/G in color gamut with which the source equipment can deal and the coordinate value of the primary color of R/G in the color gamut with which the monitor unit 162 can deal, the color gamut converting process may be executed on a line segment R0/G0 (or in a region in the vicinity thereof). By referring to only the coordinate value of the primary color of G/B in the color gamut with which the source equipment can deal and the coordinate value of the primary color of G/B in the color gamut with which the monitor unit 162 can deal, the color gamut converting process may be executed on a line segment G0/B0 (or in the region in the vicinity thereof). By referring to only the coordinate value of the primary color of R/B in the color gamut with which the source equipment can deal and the coordinate value of the primary color of R/B in the color gamut with which the monitor unit 162 can deal, the color gamut converting process may be executed on a line segment R0/B0 (or in the region in the vicinity thereof).

Figure 31B:
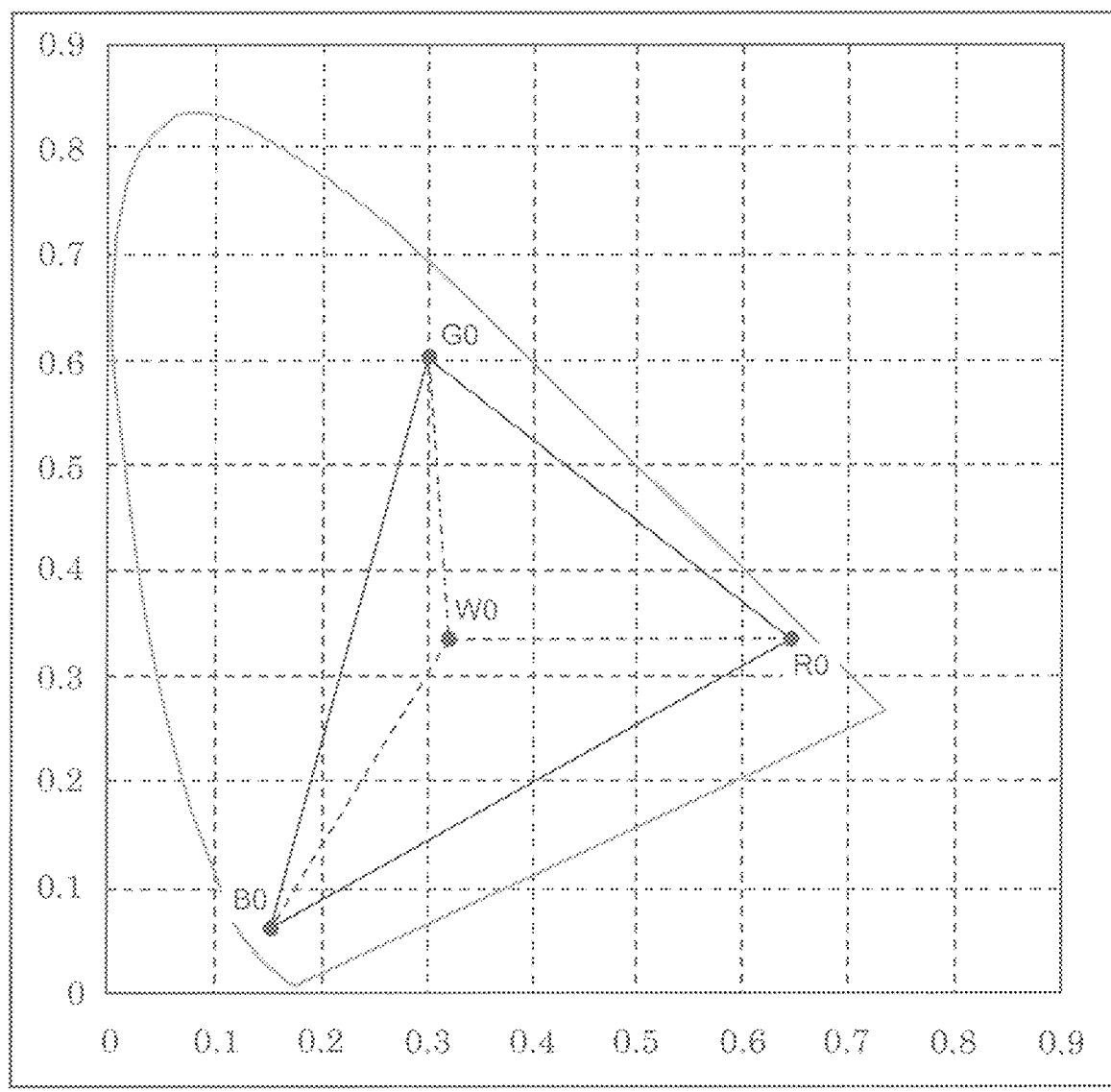
FIG. 31B is an explanatory diagram of a color gamut converting process of the broadcast receiving apparatus according to the third embodiment.

Alternatively, as shown in FIG. 31B, the color gamut that the video data have may be divided into three regions, and the color gamut converting process may be differentiated for each divided region. For example, in a region configured by R0/G0/W0 of the color gamut that the video data have, by referring the coordinate values of each primary color of R/G and the white reference point in the color gamut with which the source equipment can deal and the coordinate values of each primary color of R/G and the white reference point in the color gamut with which the monitor unit 162 can deal, the color gamut converting process is executed. In a region configured by G0/B0/W0 of the color gamut that the video data have, by referring to the coordinate values of each primary color of G/B and the white reference point in the color gamut with which the source equipment can deal and the coordinate values of each primary color of G/B and the white reference point in the color gamut with which the monitor unit 162 can deal, the color gamut converting process is executed. In a region configured by R0/B0/W0 of the color gamut that the video data have, by referring to the coordinate values of each primary color of R/B and the white reference point in the color gamut with which the source equipment can deal and the coordinate values of each primary color of R/B and the white reference point in the color gamut with which the monitor unit 162 can deal, the color gamut converting process is executed.

Further, in a case where the color gamut converting process is differentiated for each divided region, by further referring to only the coordinate values of the primary color of R and the white reference point in the color gamut with which the source equipment can deal and the coordinate values of the primary color of R and the white reference point in the color gamut with which the monitor unit 162 can deal, the color gamut converting process may be executed on a line segment R0/W0 (or in the region in the vicinity thereof). By referring to only the coordinate values of the primary color of G and the white reference point in the color gamut with which the source equipment can deal and the coordinate values of the primary color of G and the white reference point in the color gamut with which the monitor unit 162 can deal, the color gamut converting process may be executed on a line segment G0/W0 (or in the region in the vicinity thereof). By referring to only the coordinate values of the primary color of B and the white reference point in the color gamut with which the source equipment can deal and the coordinate values of the primary color of B and the white reference point in the color gamut with which the monitor unit 162 can deal, the color gamut converting process may be executed on a line segment B0/W0 (or in the region in the vicinity thereof).

Figure 31C:
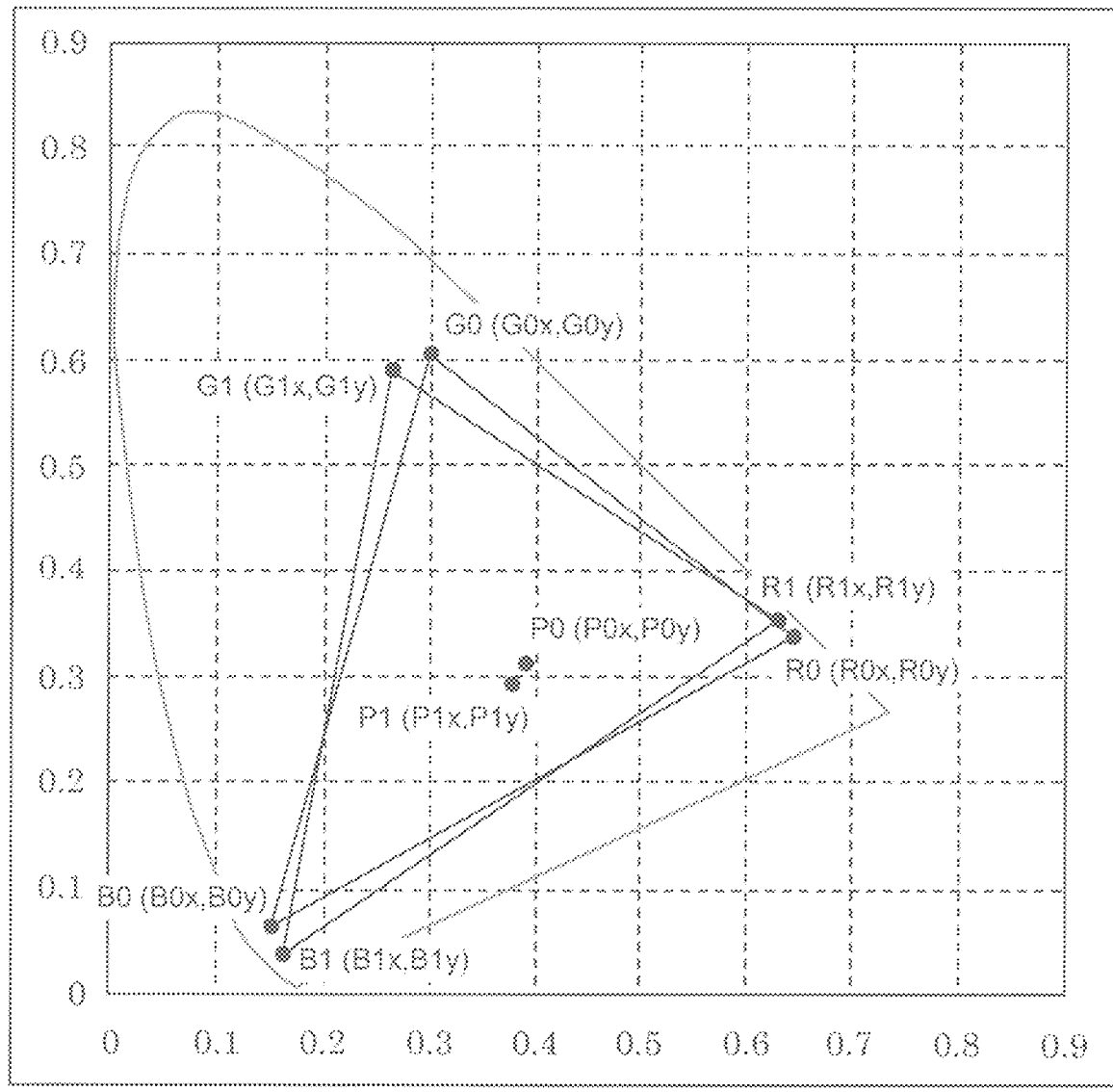
FIG. 31C is an explanatory diagram of the color gamut converting process of the broadcast receiving apparatus according to the third embodiment.

One example of the color gamut converting process will be described by using FIG. 31C. In FIG. 31C, R0, G0, and B0 are coordinates of the respective primary colors of R/G/B in the color gamut with which the source equipment can deal, which are described in the contents information descriptor, and respectively have coordinate values of (R0x, R0y), (G0x, G0y), and (B0x, B0y). Further, R1, G1, and B1 are coordinates of the respective primary colors of R/G/B in the color gamut with which the monitor unit 162 can deal, which are stored in the various information memory region of the storage unit 110, and respectively have coordinate values of (R1x, R1y), (G1x, G1y), and (B1x, B1y). Further, P0 is predetermined color gamut data of the video contents, and has a coordinate value of (P0x, P0y). In this case, the color gamut data of the P0 are converted into color gamut data shown in P1 by the color gamut converting process. Note that the P1 has a coordinate value of (P1x, P1y), and is calculated by an arithmetic expression of the color gamut converting process, whose one example is shown below.

<Example of Arithmetic Expression of Color Gamut Converting Process>

$$P1=\alpha R1+\beta G1+\gamma B1$$

herein,
$\alpha=\{(G0y-B0y)(P0x-B0x)+(B0x-G0x)(P0y-B0y)\}/\{(G0y-B0y)(R0x-B0x)+(B0x-G0x)(R0y-B0y)\}$
$\beta=\{(B0y-R0y)(P0x-B0x)+(R0x-B0x)(P0y-B0y)\}/\{(G0y-B0y)(R0x-B0x)+(B0x-G0x)(R0y-B0y)\}$
$\gamma=1-\alpha-\beta$ The arithmetic expression is an example in a case where the color gamut converting process of all color gamut data in the region of color gamut that the video contents have is executed by referring to the coordinate values of the respective primary colors of R/G/B in the color gamut with which the source equipment can deal, which are described in the contents information descriptor, and the coordinate values of the respective primary colors of R/G/B in the color gamut with which the monitor unit 162 can deal, which are stored in the various information memory region of the storage unit 110. Even in a case where color gamut that the video data have is divided into three regions and the color gamut converting process is differentiated for each divided region, the similar arithmetic operation is possible (however, parameters to be referred to are different). Further, the arithmetic expression is a known arithmetic expression using a barycentric coordinate system. For this reason, detained explanation for derivation of the arithmetic expression is omitted. Further, the arithmetic expression is merely one example, and the coordinate value of the P1 may be calculated by using a different arithmetic expression.

Further, in a case where all regions of color gamut that the video contents have are contained in a region of color gamut with which the monitor device (the broadcast receiving apparatus 100 or the like) can deal, the color gamut converting process may not be executed. For example, in a case where color gamut that the video contents have is equivalent to color gamut of BT.709 system shown in FIG. 29C and color gamut with which the monitor device (the broadcast receiving apparatus 100 or the like) can deal is equivalent to color gamut of BT.2020 system shown in FIG. 29C, all regions of color gamut of the BT.709 system are contained in a region of color gamut of the BT.2020 system. For this reason, there is no need to execute the color gamut converting process. Namely, this is because the monitor device (the broadcast receiving apparatus 100 or the like) can display all of the color gamut data contained in the video contents.

As explained above, according to the color gamut converting process function of the broadcast receiving apparatus 100 of the present embodiment, even in a case where the color reproduction performance that the source equipment has is different from the color reproduction performance that the monitor unit 162 of the broadcast receiving apparatus 100 has, it becomes possible to suitably display the video contents when to display the video contents on the monitor unit 162 of the broadcast receiving apparatus 100.

[Process of Adjusting Luminance of Broadcast Receiving Apparatus]

The broadcast receiving apparatus 100 according to the present embodiment includes image quality adjustment items as shown in FIG. 32. Each of the image quality adjustment items can be adjusted in accordance with taste of the user by means of an operation of the user. On the other hand, automatic luminance adjustment may be possible for an item regarding luminance adjustment of the image quality adjustment items by referring to description of the contents information descriptor. Hereinafter, a process of the automatic luminance adjustment will be described.

The broadcast receiving apparatus 100 according to the present embodiment is allowed to (1) refer to the "source_luminance_max" parameter and the "source_luminance_min" parameter of the contents information descriptor to execute the automatic luminance adjustment, (2) refer to the "max_light_level_of_content" parameter and the "source_luminance_min" parameter to execute the automatic luminance adjustment, and (3) refer to only the "max_light_level_of_content" parameter to the automatic luminance adjustment.

The broadcast receiving apparatus 100 according to the present embodiment stores, as a parameter that indicates information regarding luminance display performance of the monitor unit 162, the maximum value and the minimum value of luminance that can be displayed by the monitor unit 162 in the various information memory region of the storage unit 110.

The automatic luminance adjustment of the (1) method is executed by referring to the "source_luminance_max" parameter and the "source_luminance_min" parameter described in the contents information descriptor, and the maximum value and the minimum value of luminance that are stored in the various information memory region of the storage unit 110 and can be displayed by the monitor unit 162.

Namely, as shown in FIG. 33A, a converting process of a luminance representation range of the video contents is executed so that a luminance level indicated by the "source_luminance_max" parameter substantially corresponds with a luminance level of the maximum value of luminance that can be displayed by the monitor unit 162 and a luminance level indicated by the "source_luminance_min" parameter substantially corresponds with a luminance level of the minimum value of luminance that can be displayed by the monitor unit 162. By executing the converting process of the luminance representation range, the user is allowed to view the video contents, for which the similar luminance representation to that of the monitor device of the editing equipment 390e that a contents provider used for the editing processing of the contents is made, in the monitor unit 162 of the broadcast receiving apparatus 100.

Figure 33B:
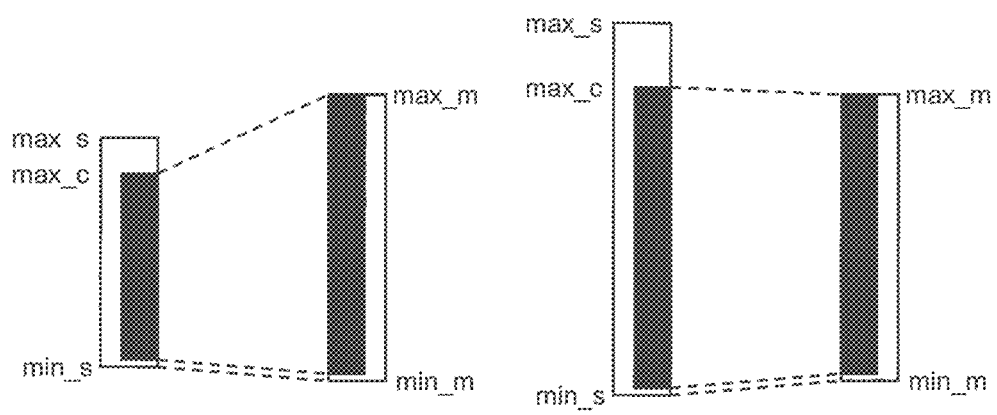
FIG. 33B is an explanatory diagram of the converting process of luminance levels of the broadcast receiving apparatus according to the third embodiment.

The automatic luminance adjustment of the (2) method a
Namely, as shown in FIG. 33B, the converting process of the luminance representation range of the video contents is executed so that a luminance level indicated by the "max_light_level_of_content" parameter substantially corresponds with a luminance level of the maximum value of luminance that can be displayed by the monitor unit 162 and a luminance level indicated by the "source_luminance_min" parameter substantially corresponds with a luminance level of the minimum value of luminance that can be displayed by the monitor unit 162. By executing the converting process of the luminance representation range, the user is allowed to view the video contents while taking full advantage of contrast performance that the monitor unit 162 of the broadcast receiving apparatus 100 has.

In a case where the contents information descriptor further has a parameter that indicates the minimum luminance in each scene (or chapter) (for example, "min_light_level_of_content (contents minimum luminance)" or the like), by referring to the "min_light_level_of_content" parameter in place of the "source_luminance_min" parameter, it is possible to further utilize the contrast performance had by the monitor unit 162 of the broadcast receiving apparatus 100 effectively.

Further, the converting process of the luminance representation range in the (2) method may be executed so that a parameter to be referred is changed for each scene (or chapter) in a case where a "num_of_scene" parameter is not "1". In this case, it becomes possible to secure suitable contrast performance on the monitor unit 162 of the broadcast receiving apparatus 100 for each scene (or chapter).

The automatic luminance adjustment of the (3) method is executed by referring to the "max_light_level_of_content" parameter described in the contents information descriptor and the maximum value of luminance that are stored in the various information memory region of the storage unit 110 and can be displayed by the monitor unit 162. The minimum value side of luminance respectively uses "0 (cd/m$^2$)" as the standard. In this case, it is possible to obtain the similar effects to those of the automatic luminance adjustment of the (2) method. Moreover, it becomes possible to execute the converting process of the luminance representation range on the basis of a simple arithmetic operation by reference with a few parameters.

Further, each of the converting processes of the luminance representation range may be executed only in a case where the "source_luminance_max" parameter and/or the "max_light_level_of_content" parameter described in the contents information descriptor is larger than the maximum value of luminance that is stored in the various information memory region of the storage unit 110 and can be displayed on the monitor unit 162.

Namely, this is because, in a case where the "source_luminance_max" parameter or the "max_light_level_of_content" parameter described in the contents information descriptor is larger than the maximum value of luminance that is stored in the various information memory region of the storage unit 110 and can be displayed by the monitor unit 162, there is a possibility that luminance collapse occurs in a case where the received video contents are displayed on the monitor unit of the broadcast receiving apparatus 100 as they are; but in an opposite case, there is not possibility that luminance collapse occurs.

As explained above, according to the processes of the automatic luminance adjustment by the broadcast receiving apparatus 100 of the present embodiment, by referring to the contents information descriptor, the user is allowed to view the video contents with suitable luminance representation on the monitor unit 162 of the broadcast receiving apparatus 100.

According to the present embodiment, by referring to the contents information that is attached to the program contents contained in the broadcast waves, it is possible to provide a more useful broadcast receiving apparatus compatible with the MMT, which can deal with each of the processes described above corresponding to the HDR and the enlargement of color gamut.

Fourth Embodiment

Hereinafter, a fourth embodiment of the present invention will be described. Constituent elements, effects and the like of the fourth embodiment are the same as those of the third embodiment unless otherwise specified. For this reason, in the following description, differences between the third embodiment and the fourth embodiment are mainly described, and description of the matters common to both embodiments is omitted as much as possible in order to avoid redundant description.

[System Configuration]

Figure 34:
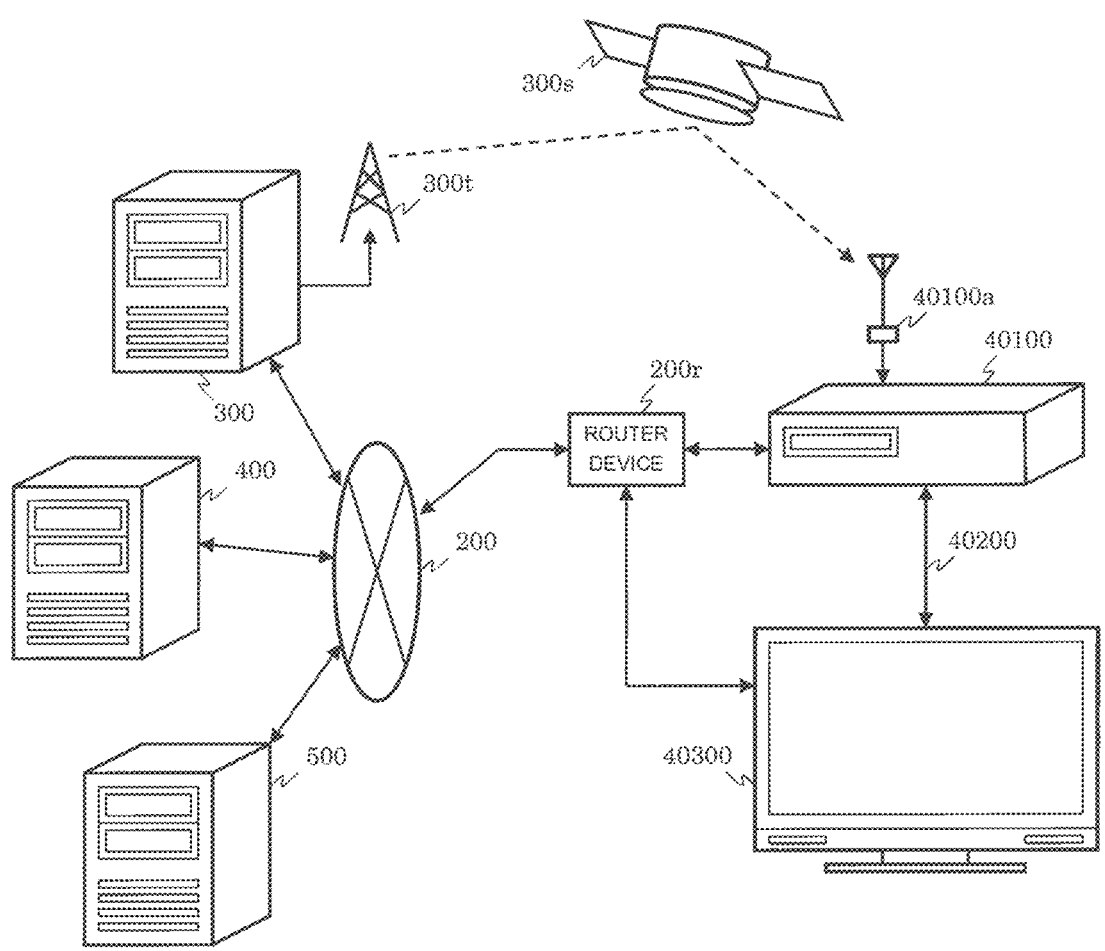
FIG. 34 is a system configuration diagram of a broadcast communication system according to a fourth embodiment.

FIG. 34 is a system configuration diagram showing one example of a broadcast communication system, which includes a broadcast receiving apparatus according to the present embodiment. The broadcast communication system according to the present embodiment is configured by a broadcast receiving apparatus 40100, an antenna 40100a, a connection cable 40200, a monitor device 40300, a broadband network such as the Internet 200, a router device 200r, a radio tower 300t and a broadcast satellite (or communication satellite) 300s of a broadcast station, a broadcast station server 300, a service provider server 400, and other application server 500. Although it is not shown in the drawings, the broadcast communication system of the present embodiment may further include an access point 200a, a mobile phone communication server 600, abase station 600b for a mobile phone communication network, and a portable information terminal 700 by the similar connection in the system configuration diagram (see FIG. 1) of the broadcast communication system according to the first embodiment. Further, in such a case, the portable information terminal 700 may communicate directly with the broadcast receiving apparatus 40100 without passing through the router device 200r or the like.

Further, as shown in FIG. 28, encoded data of program contents contained in broadcast waves transmitted from the radio tower 300t may be ones that are outputted from a photographing equipment 390c, or may be ones that are subjected to editing processing of various kinds of videos and audios by means of an editing equipment 390e.

The broadcast receiving apparatus 40100 receives the broadcast waves transmitted from the radio tower 300t via the broadcast satellite (or communication satellite) 300s and the antenna 40100a. Alternatively, the broadcast receiving apparatus 40100 may receive the broadcast waves transmitted from the radio tower 300t directly from the antenna 40100a without passing through the broadcast satellite (or communication satellite) 300s. In addition, the broadcast receiving apparatus 40100 can be connected to the Internet 200 via the router device 200r, and thus can perform data transmission and reception through communication with each of server devices and other communication equipment on the Internet 200.

The connection cable 40200 is a communication cable that connects the broadcast receiving apparatus 40100 and the monitor device 40300, and coded video and audio data and the like outputted from the broadcast receiving apparatus 40100 are transmitted therethrough. The monitor device 40300 is a video display device that offers video information and audio information, which is acquired by subjecting the coded video and audio data and the like received through the connection cable 20200 to predetermined signal processing, to a user via a display device such as a liquid crystal panel and a speaker.

Further, the monitor device 40300 is allowed to be connected to the Internet 200 via the router device 200r, and may be allowed to transmit and receive data by communication with each of the server devices and other communication equipment on the Internet 200. Further, the monitor device 40300 may be allowed to receive the broadcast waves transmitted from the radio tower 300t via an antenna 40300a (not shown).

[Hardware Configuration of Broadcast Receiving Apparatus]

Figure 35A:
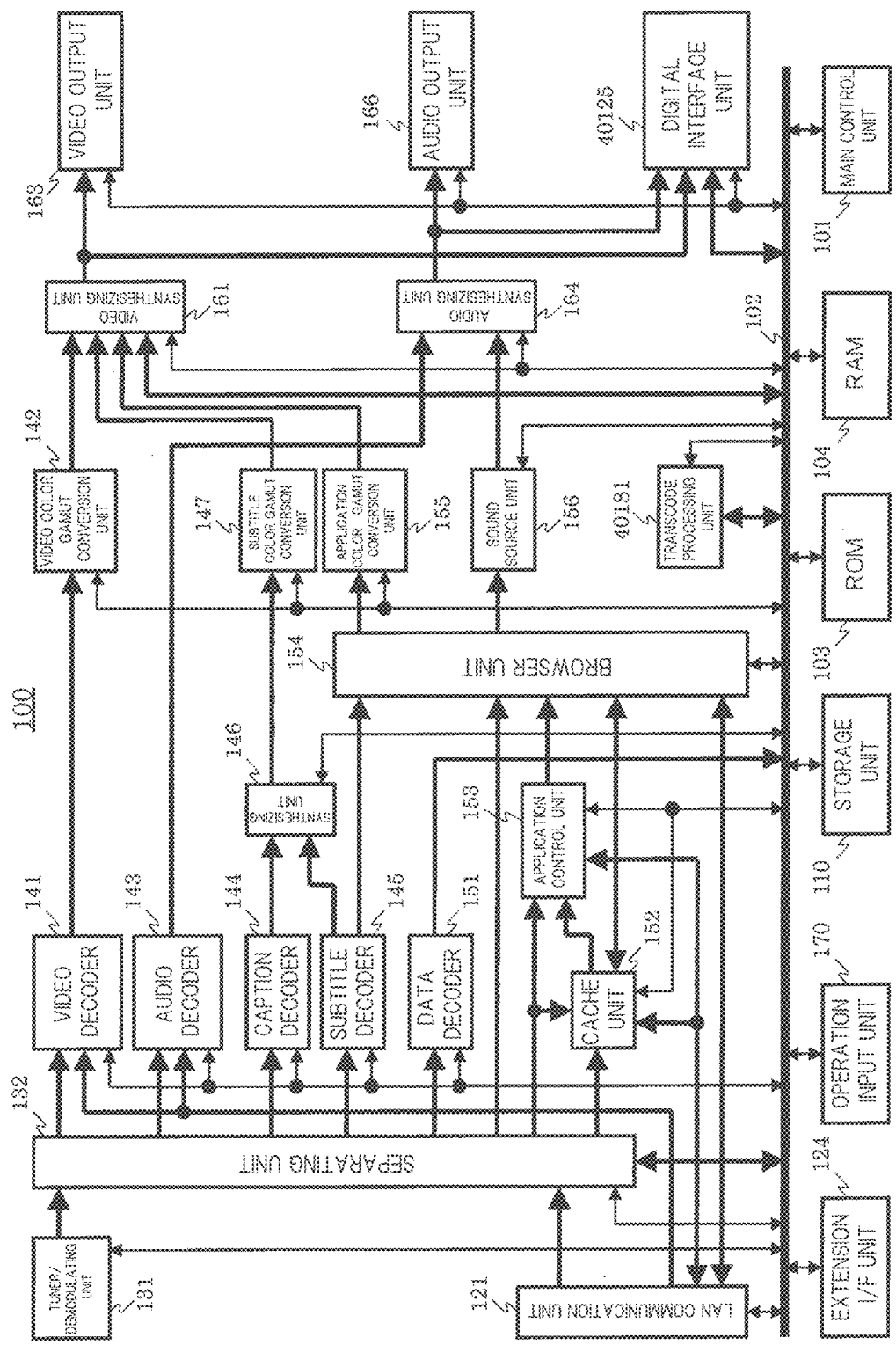
FIG. 35A is a block diagram of the broadcast receiving apparatus according to the fourth embodiment.

FIG. 35A is a block diagram showing one example of an internal configuration of the broadcast receiving apparatus 40100. The broadcast receiving apparatus 40100 includes a main control unit 101, a system bus 102, a ROM 103, a RAM 104, a storage (accumulation) unit 110, a LAN communication unit 121, an extension interface unit 124, a digital interface unit 40125, a tuner/demodulating unit 131, a separating unit 132, a video decoder 141, a video color gamut conversion unit 142, an audio decoder 143, a caption decoder 144, a subtitle decoder 145, a subtitle synthesizing unit 146, a subtitle color gamut conversion unit 147, a data decoder 151, a cache unit 152, an application control unit 153, a browser unit 154, an application color gamut conversion unit 155, a sound source unit 156, a video synthesizing unit 161, a video output unit 163, an audio synthesizing unit 164, an audio output unit 166, an operation input unit 170, and a transcode processing unit 40181.

The broadcast receiving apparatus 40100 of the present embodiment is provided as an optical disc drive recorder such as a DVD recorder or a BD recorder, a magnetic disk drive recorder such as an HDD recorder, an STB, or the like. Namely, compared with the broadcast receiving apparatus 100 according to the first embodiment, the monitor unit 162 and the speaker unit 165 may be omitted in the broadcast receiving apparatus 40100.

The digital interface unit 40125 is an interface by which encoded digital video data and/or encoded digital audio data are outputted or inputted. The digital interface unit 40125 can output an MMT data string obtained by demodulation in the tuner/demodulating unit 131, an MMT data string obtained via the LAN communication unit 121, or mixed data of the respective MMT data strings as it is. Further, it may be controlled so that the MMT data string inputted from the digital interface unit 40125 is inputted into the separating unit 132.

Output of digital contents stored in the storage (accumulation) unit 110 or storage of digital contents to the storage (accumulation) unit 110 may be executed via the digital interface unit 40125. Further, the digital interface unit 40125 may be a DVI terminal, an HDMI (registered trademark) terminal, a Display Port (registered trademark) terminal, or the like, and may be controlled so as to output video data, audio data and the like outputted from the video synthesizing unit 161 and the audio synthesizing unit 164 in a form compliant with DVI specifications, HDMI specifications, Display Port specifications and the like.

The transcode processing unit 40181 is a signal processing unit that performs a transcode computation process of converting a coding method, a bit rate, a media transport method, and the like of each of the components making up the contents. For example, the transcode processing unit 40181 can convert an MMT data string of broadcasting program contents, which contain a video component in an MPEG-H HEVC format that are outputted from the separating unit 132, into an MPEG2-TS data string (or an MPEG2-PS data string) of program contents, which include a video component in an MPEFG-2 format or MPEG-4 AVC (Advanced Video Coding) format.

Further, a process of changing only a bit rate without changing an encoding form of the component or the media transport method is possible. Note that the program contents subjected to the transcode computation process can be stored as recorded contents in the storage (accumulation) unit 110, or can be output and supplied from the digital interface unit 40125 or the like to an external monitor device or the like.

[Software Configuration of Broadcast Receiving Apparatus]

Figure 35B:
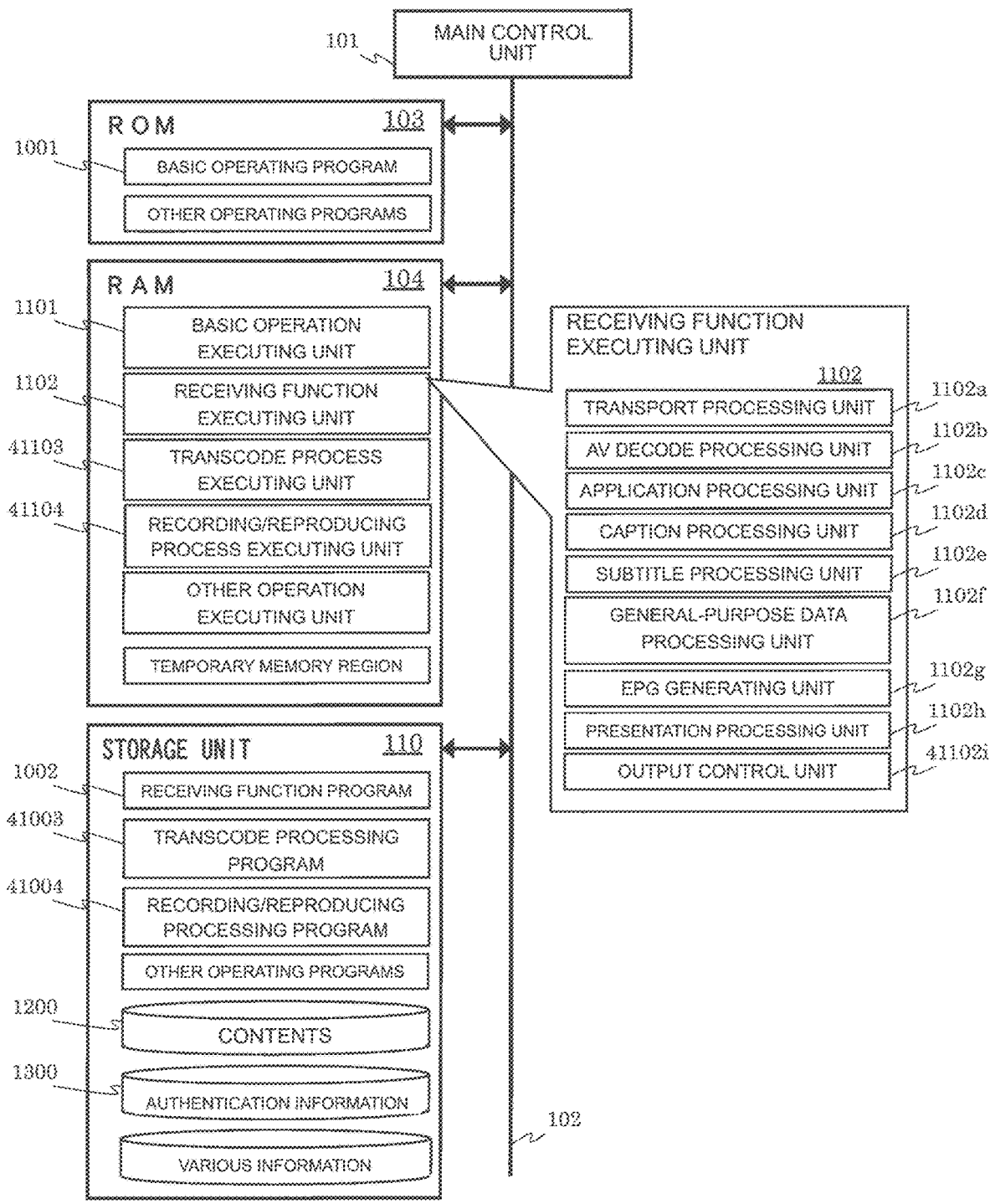
FIG. 35B is a software configuration diagram of the broadcast receiving apparatus according to the fourth embodiment.

FIG. 35B is a software configuration diagram of the broadcast receiving apparatus 40100 according to the present embodiment, and shows a configuration of software in respective software configurations of the ROM 103, the RAM 104, and the storage (accumulation) unit 110. Compared with the software configuration diagram of the broadcast receiving apparatus 100 according to the first embodiment (see FIG. 7D), a transcode processing program 41003 and a recording/reproducing processing program 41004 are added to the storage (accumulation) unit 110.

Each of the transcode processing program 41003 and the recording/reproducing processing program 41004, which are stored in the storage (accumulation) unit 110, is loaded onto the RAM 104, and the main control unit 101 further executes the loaded transcode processing program and recording/reproducing processing program, whereby a transcode processing executing unit 41103 and a recording/reproducing processing executing unit 41104 are respectively configured. The transcode processing executing unit 41103 mainly controls a transcode computation process in the transcode processing unit 40181. The recording/reproducing processing executing unit 41104 mainly controls a recording process into a contents memory region 1200 of contents of a broadcasting program and a reproducing process of recorded contents from the contents memory region 1200.

Further, a receiving function executing unit 1102 loaded onto the RAM 104 further includes an output control unit 41102*i*. The output control unit 41102*i* of the receiving function executing unit 1102 executes control of each process related to data output from each of the video output unit 163, the audio output unit 166, and the digital interface unit 40125.

Note that the software configuration shown in FIG. 35B is merely described by means of example. In the present embodiment, the software configuration may not be provided with all of the programs and executing units shown in FIG. 35B.

[Interface Configuration between Broadcast Receiving Apparatus and Monitor Device]

Figures 36, 37:
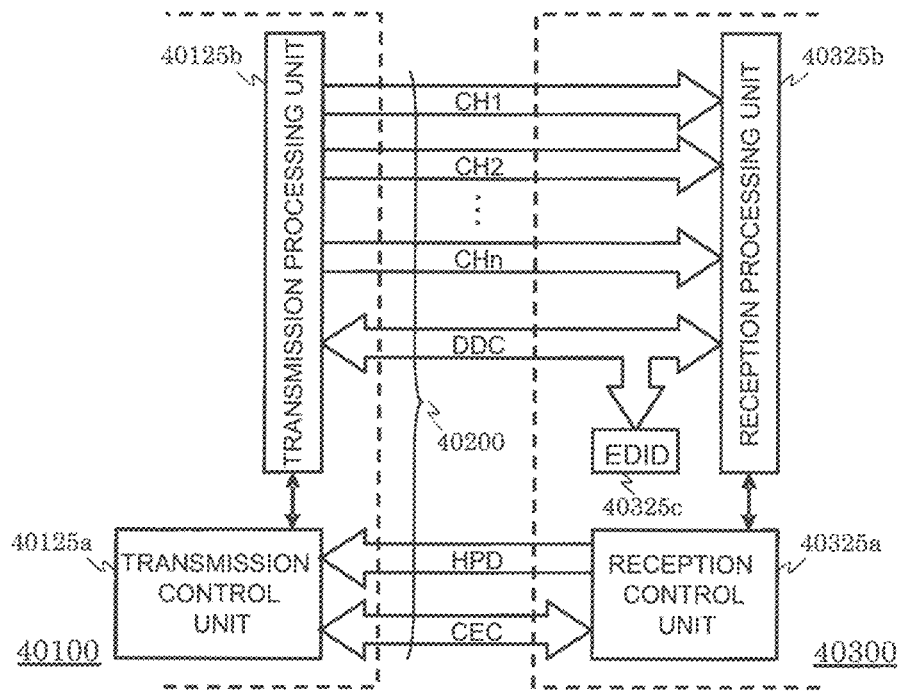
FIG. 36 is an interface configuration diagram between the broadcast receiving apparatus according to the fourth embodiment and the monitor device.
FIG. 37 is an explanatory diagram of mastering information that the broadcast receiving apparatus according to the fourth embodiment outputs.

FIG. 36 is a system configuration diagram showing one example of an interface configuration between the broadcast receiving apparatus 40100 and the monitor device 40300. In the present embodiment, the case where a connecting terminal (not shown) of the digital interface unit 40125 at the broadcast receiving apparatus 40100 side is connected to a connecting terminal (not shown) of a digital interface unit at the monitor device 40300 side via the connection cable 40200 will be described. Note that the monitor device 40300 may have the similar configuration of the broadcast receiving apparatus 100 shown in FIG. 7A. In this case, a digital interface unit 125 corresponds to the digital interface unit at the monitor device 40300 side described above, and the connection cable 40200 is connected to the connecting terminal.

As shown in FIG. 36, the connection cable 40200 is made up of n pairs of differential transmission lanes CH1 to CHn, a DDC (Display Data Channel) line standardized by the VESA (Video Electronics Standard Association), an HPD (Hot Plug Detect) line, a CEC (Consumer Electronics Control) line, and the like. Note that the differential transmission lane may be referred to as a differential transmission line.

The n pairs of differential transmission lanes may be one pair of clock lanes and (n–1) pairs of data lanes. For example, in a case where the n is 4, they may be one pair of clock lanes and three pairs of data lanes. In a case where the n is 2, they may be one pair of clock lanes and one pair of data lanes. Further, all of the n pairs of differential transmission lanes may be data lanes for transmitting data onto which the clock is superimposed. For example, in a case where the n is 4, they may be four pairs of data lanes. Note that the clock lane and the data lane may respectively be referred to as a clock line and a data line.

A digital video (R/G/B/Vsync/Hsync, Y/Pb (Cb)/Pr(Cr), and the like)/audio signal, other control signals, and the like may be outputted to the data lane in a predetermined format from the video synthesizing unit 161 or the audio synthesizing unit 164 via a transmission processing unit 40125*b* of the digital interface unit 40125 at the broadcast receiving apparatus 40100 side. The predetermined format may be compliant with the specifications such as an HDMI (registered trademark), and detailed description will be omitted. The digital video/audio signal, the other control signal, and the like are received by a reception processing unit 40325*b* of the digital interface unit at the monitor device 40300 side; necessary processes such as image quality adjustment and volume adjustment are appropriately performed by a video processing unit and an audio processing unit (not shown); and they are outputted from a display unit and a speaker of the monitor device 40300.

Further, although it is not shown in the drawings, the connection cable 40200 may further include a power source line, a GND line, and a spare line. The n pairs of differential transmission lanes, the communication line and the like may be shielded by the GND line. All or a part of the spare line, a DDC line, an HPD line and a CEC line may be shared as a part of the communication line for executing the network communication. For example, the spare line and the HPD line may constitute one transmitting line and one receiving line of the communication line or one pair of transmitting/receiving lines. The CEC line or the like may be omitted. The DDC line may be used as an I2C (I-squared-C) communication line between the main control unit 101 of the broadcast receiving apparatus 40100 and a main control unit (not shown) of the monitor device 40300.

The transmission processing unit 40125*b* of the digital interface unit 40125 at the broadcast receiving apparatus 40100 side can communicate with the reception processing unit 40325*b* of the digital interface unit at the monitor device 40300 side via the DDC line, and further read out EDID (Extended Display Identification Data) from an EDID storage unit 40325*c*. Namely, the broadcast receiving apparatus 40100 can grasp display performance of the monitor device 40300 by obtaining the EDID.

Note that in the present embodiment, the display performance is items such as input resolution and a frame rate that the monitor device 40300 can deal with, a video standard, whether it is compatible with 3D video display or not, or whether the monitor device 40300 can execute processes corresponding to increase in the HDR and the color gamut or not.

Further, in the present embodiment, a process of obtaining the EDID as means for grasping the display performance of the monitor device 40300 by the broadcast receiving apparatus 40100 will be described below as an example. However, the information to be obtained is not limited to the EDID. For example, information different from the EDID, such as performance identification information for identifying the display performance and the function of the monitor device 40300 may be obtained. Further, the display performance of the monitor device 40300 may be grasped by means other than the means for obtaining the performance identification information.

Further, the transmission control unit 40125*a* of the digital interface unit 40125 at the broadcast receiving apparatus 40100 side can control the transmission processing unit 40125*b*, and detect whether the monitor device 40300 is connected or not, whether a power source for the monitor device 40300 is turned on or not, and the like via the HPD line. Further, the transmission control unit 40125*a* of the digital interface unit 40125 at the broadcast receiving apparatus 40100 side can execute a process of turning the power source of the monitor device 40300 on via the CEC line. Further, the reception control unit 40325*a* of the digital interface unit at the monitor device 40300 side controls the reception processing unit 40325*b*.

Note that each of the configuration of the connection cable 40200, the internal configuration of the digital interface unit 40125 of the broadcast receiving apparatus 40100, and the internal configuration of the digital interface unit of the monitor device 40300, which are shown in FIG. 36, is only one example, and it may have a different configuration.

[Each Parameter of Mastering Information]

Similar to the third embodiment, in the present embodiment, a contents information descriptor shown in FIG. 29A is transmitted as control information regarding the program contents together with messages, tables, and descriptors of the MMT-SI described above. On the other hand, the broadcast receiving apparatus 40100 according to the present embodiment does not include a monitor unit and a speaker unit, via which a video signal and an audio signal are finally provided to the user. The broadcast receiving apparatus 40100 transmits encoded video and audio data and the like to the monitor device 40300 via the connection cable 40200, and causes the monitor device 40300 to provide the video signal and the audio signal to the user therefrom. Namely, processes that have been explained in the third embodiment, such as the color gamut converting process and the luminance adjusting process, are executed at the monitor device 40300 side in accordance with the display performance of the display unit in the monitor device 40300.

In order to allow each of the processes at the monitor device 40300 side, the broadcast receiving apparatus 40100 according to the present embodiment has a function to receive the contents information descriptor from the broadcast waves; a function to appropriately select each of parameters described in the received contents information descriptor; and a function to transmit it to the monitor device 40300 via the connection cable 40200 as mastering information with a predetermined form. For example, in a case where the connection cable 40200 is an HDMI (registered trademark) cable and each of video data, audio data, other control signal and the like, which are outputted from the digital interface unit 40125, has a form compliant with the HDMI (registered trademark) specifications, the mastering information may be outputted as a part of the other control signals and the like.

FIG. 37 shows a list of the respective parameters that the broadcast receiving apparatus 40100 according to the present embodiment transmits to the monitor device 40300 as the mastering information.

"Source_primaries_R[x,y]", "source_primaries_G[x,y]", and "source_primaries_B[x,y]" are parameters each indicating information regarding color reproduction performance of source equipment, and respectively indicate color gamut with which the source equipment can deal by coordinate values on a CIE chromaticity diagram of primary colors of R (red), G (green), and B (blue). Each parameter of "source_primaries_rx", "source_primaries_ry", "source_primaries_gx", "source_primaries_gy", "source_primaries_bx", and "source_primaries_by" described in the contents information descriptor may be selected to output them as "source_primaries_R[x,y]", "source_primaries_G[x,y]", and "source_primaries_B[x,y]" parameter as the mastering information.

"White_point_x,y" is a parameter that indicates information regarding the color reproduction performance and the like of the source equipment, and indicates a coordinate value on the CIE chromaticity diagram for a white reference point, with which the source equipment can deal. "Source_white_point_x" and "source_white_point_y" parameters described in the contents information descriptor may be selected to output them as a "white_point_x,y" parameter of the mastering information.

"Max_source_mastering_luminance" is a parameter that indicates information regarding the maximum luminance with which the source equipment can deal. It is indicated by a value in a range from "1 (cd/m$^2$: candela/square meter)" to "65535 (cd/m$^2$)". A "source_luminance_max" parameter described in the contents information descriptor may be selected to output it as a "max_source_mastering_luminance" parameter of the mastering information.

"Min_source_mastering_luminance" is a parameter that indicates information regarding the minimum luminance with which the source equipment can deal. It is indicated by a value in a range from "0.0001 (cd/m$^2$)" to "65535 (cd/m$^2$)". A "source_luminance_min" parameter described in the contents information descriptor may be selected to output it as a "min_source_mastering_luminance" parameter of the mastering information.

"Maximum_Content_Light_Level" is a parameter that indicates the maximum luminance in the contents. It is indicated by a value in a range from "1 (cd/m$^2$)" to "65535 (cd/m$^2$)". A "max_light_level_of_content" parameter described in the contents information descriptor may be selected to output it as a "Maximum_Content_Light_Level" parameter of the mastering information.

"Maximum_Frame-average_Light_Level" is a parameter that indicates the maximum value of frame average luminance in the contents. It is indicated by a value in a range from "1 (cd/m$^2$)" to "65535 (cd/m$^2$)". A "max_frame_ave_light_level" parameter described in the contents information descriptor may be selected to output it as a "Maximum_Frame-average_Light_Level" parameter of the mastering information.

"Light Level Status" is a flag signal with two bits, and expresses a status of each of the "Maximum_Content_Light_Level" parameter and the "Maximum_Frame-average_Light_Level" parameter.

In a case where the value of this flag is "00b", the "Maximum_Content_Light_Level" parameter and the "Maximum_Frame-average_Light_Level" parameter respectively indicate the maximum luminance through the whole contents and the maximum value of the frame average luminance. In a case where the value of this flag is "01b", the "Maximum_Content_Light_Level" parameter and the "Maximum_Frame-average_Light_Level" parameter respectively indicate the maximum luminance for each scene (or chapter) and the maximum value of the frame average luminance.

In a case where the value of this flag is "10b", it indicates that the "Maximum_Content_Light_Level" parameter and the "Maximum_Frame-average_Light_Level" parameter are omitted. Instead of setting the value of this flag to "10b", each of the values of the "Maximum_Content_Light_Level" parameter and the "Maximum_Frame-average_Light_Level" parameter may be set to "0".

The broadcast receiving apparatus 40100 according to the present embodiment transmits, as the mastering information, each of the parameters, which have been described above, to the monitor device 40300 via the connection cable 40200, whereby the monitor device 40300 can subject the processes such as the color gamut converting process and the luminance adjusting process according to the display performance that the display unit of the monitor device 40300 has to the encoded video and audio data and the like transmitted from the broadcast receiving apparatus 40100. Note that the parameters of the mastering information described above may further include other parameters than the respective parameters shown in FIG. 37, or may not include all of the respective parameter. Further, a different name may be used for each of the parameters.

[Mastering Information Generating Process of Broadcast Receiving Apparatus]

In the present embodiment, in a case where a "content_type" parameter of the contents information descriptor is "2" or "3", video contents are contents data (live broadcasting program, and the like) outputted from the photographing equipment 390c, and the contents information descriptor does not have the "max_light_level_of_content" parameter and the "max_frame_ave_light_level" parameter. Namely, this is because in live broadcasting program and the like, the maximum luminance through the whole contents to a terminal end of the program contents and the maximum value of the frame average luminance are not determined.

In this case, the broadcast receiving apparatus 40100 according to the present embodiment sets the value of each of the "Maximum_Content_Light_Level" parameter and the "Maximum_Frame-average_Light_Level" parameter to "0", and executes output of the mastering information. Alternatively, a "max_light_level_of_frame" parameter and a "frame_average_light_level" parameter of the contents information descriptor may be used as alternatives of the "Maximum_Content_Light_Level" parameter and the "Maximum_Frame-average_Light_Level" parameter.

On the other hand, in a case where the video contents are recorded in the contents memory region 1200 of the storage (accumulation) unit 110, the broadcast receiving apparatus 40100 may create the "Maximum_Content_Light_Level" parameter and the "Maximum_Frame-average_Light_Level" parameter. Namely, this is because by executing the recording process of the video contents, the broadcast receiving apparatus 40100 can scan the video contents from a starting end to the terminal end, and therefore, it can determine the maximum luminance through the whole contents and the maximum value of the average luminance.

Further, in a case where the video contents recorded in the contents memory region 1200 of the storage (accumulation) unit 110 by the recording process are outputted from the digital interface unit 40125 to the monitor device 40300 via the connection cable 40200 by the reproducing process, it may be controlled so that the maximum luminance through the whole contents and the maximum value of the average luminance, which the broadcast receiving apparatus 40100 created by scanning the video contents from the starting end to the terminal end, is outputted as the "Maximum_Content_Light_Level" parameter and the "Maximum_Frame-average_Light_Level" parameter. Namely, in a case of the video contents that was subjected to the recording process once, it is possible to output all parameters of the mastering information to the monitor device 40300 regardless of a value of the "content_type" parameter of the contents information descriptor.

[Mastering Information Output Control of Broadcast Receiving Apparatus]

Each of the parameters of the mastering information described above may always be outputted to the monitor device 40300 that is connected thereto via the connection cable 40200. Alternatively, the transmission processing unit 40125b of the digital interface unit 40125 at the broadcast receiving apparatus 40100 side refers to the EDID acquired from the EDID storage unit 40325c of the monitor device 40300. Only in a case where it grasps that the monitor device 40300 can execute a process corresponding to the HDR or enlargement of the color gamut, each of the parameters of the mastering information may be outputted to the monitor device 40300 via the connection cable 40200. Alternatively, only in a case where the contents information descriptor indicates that the video contents of the broadcasting program is a program compatible with the HDR, each of the parameters of the mastering information may be outputted to the monitor device 40300 via the connection cable 40200.

Note that the case where the contents information descriptor described above indicates that the video contents of the broadcasting program is a program compatible with the HDR is the case where the "content_type" parameter of the contents information descriptor is "1" or "3", the case where an "HDR_flag" parameter of the contents information descriptor indicates HDR compliance of the video contents of the broadcasting program, the case where all or any of the "source_luminance_max" parameter, the "max_light_level_of_content" parameter, the "max_light_level_of_frame" parameter, and the like of the contents information descriptor exceeds a predetermined value (for example, "100 (cd/m$^2$)" or the like), and the like.

Further, output of each of the parameters of the mastering information may be controlled in accordance with an interface type of the digital interface unit 40125. For example, in a case where the interface type of the digital interface unit 40125 is an HDMI interface, it is controlled so as to output each of the parameters of the mastering information. In a case where the interface type of the digital interface unit 40125 is a DVI interface, it is controlled so as not to output each of the parameters of the mastering information.

Alternatively, the output of each of the parameters of the mastering information may be controlled in accordance with the interface type of the digital interface unit 40125 at the broadcast receiving apparatus 40100 side and an interface type of the digital interface unit at the monitor device 40300 side. For example, in a case where both of the interface type of the digital interface unit 40125 at the broadcast receiving apparatus 40100 side and the interface type of the digital interface unit at the monitor device 40300 side are HDMI interfaces, it is controlled so as to output each of the parameters of the mastering information. In a case where the interface type of the digital interface unit 40125 at the broadcast receiving apparatus 40100 side is an HDMI interface but the interface type of the digital interface unit at the monitor device 40300 side is not an HDMI interface (for example, in a case where it is a DVI interface, a Display Port interface or the like, that is, in a case where the connection cable 40200 is an interface conversion cable), it is controlled so as not to output each of the parameters of the mastering information.

Further, in a case where the digital interface unit 40125 is configured by a first digital interface terminal and a second digital interface terminal, it may be controlled so as to differentiate a form of data to be outputted in accordance with whether data output is executed from any terminal of the first digital interface terminal and the second digital interface terminal. In this case, each of the digital interface terminals has the configuration shown in FIG. 36 or another configuration.

For example, in a case where the first digital interface terminal is an HDMI interface and the second digital interface is not an HDMI interface, a generating process of output data and a data outputting process may be controlled so that: when to execute the data output from the first digital interface terminal, output data that contain a video signal, an audio signal and the mastering information are generated to execute the data output from the first digital interface terminal; and when to execute the data output from the second digital interface terminal, output data that contain the video signal and the audio signal but does not contain the mastering information are generated to execute the data output from the second digital interface terminal.

As described above, according to the broadcast receiving apparatus 40100 of the present embodiment, by transmitting the mastering information together with the encoded video and audio data to the monitor device 40300, it becomes possible to suitably execute the color gamut converting process, the luminance adjusting process and the like at the monitor device 40300 side. Namely, it is possible to provide a broadcast receiving apparatus capable of executing a function with a higher added value.

Fifth Embodiment

Hereinafter, a fifth embodiment of the present invention will be described. Constituent elements, effects and the like of the fifth embodiment are the same as those of the fourth embodiment unless otherwise specified. For this reason, in the following description, differences between the fourth embodiment and the fifth embodiment are mainly described, and description of the matters common to both embodiments is omitted as much as possible in order to avoid redundant description.

[System Configuration]

FIG. 38 is a system configuration diagram showing one example of a broadcast communication system that includes a broadcast receiving apparatus according to the present embodiment. The broadcast communication system shown in FIG. 38 has the same configuration as that of the broadcast communication system shown in FIG. 34. However, a destination to which the broadcast receiving apparatus 40100 outputs contents is set to an external video processing apparatus 50300 in place of a monitor device 40300. This means that a video reproducing apparatus such as a recorder is included in the destination of the contents in addition to a display device. Moreover, in the broadcast communication system that includes the broadcast receiving apparatus according to the present embodiment, control information that is transmitted together with the contents, which are received by the broadcast receiving apparatus 40100 via a radio tower 300*t* and a broadcast satellite (or communication satellite) 300*s* of a broadcast station and a broadcast station server 300, is referred to as "reception control information". This contains the various types of control information that have been explained in the first embodiment and control information that will be explained additionally in the present embodiment. Moreover, in the broadcast communication system that includes the broadcast receiving apparatus according to the present embodiment, control information that is transmitted together with the contents when the broadcast receiving apparatus 40100 outputs the contents to the external video processing apparatus 50300 via a network through the router device 200*r* is referred to as "output control information".

A hardware configuration of the broadcast receiving apparatus, a software configuration of the broadcast receiving apparatus, an interface configuration between the broadcast receiving apparatus and the monitor device, and the like are similar to those in the fourth embodiment. For this reason, explanation thereof will be omitted.

By configuring a digital interface unit 40125 by using hardware of a LAN communication unit 121 in FIG. 35A, it is possible to execute output from the digital interface unit 40125 to the destination on the network. Here, the output from the digital interface unit 40125 is not limited to an MMT data string. It may be a MPEG2-TS data string (or MPEG2-PS data string) obtained by transcoding the MMT data string in a transcode processing unit 40181 or the like. This is an example of the case where it is configured as an "IP interface" that has been explained in the first embodiment.

Here, in the broadcast communication system shown in FIG. 38, the case where the broadcast receiving apparatus 40100 outputs the contents to the external video processing apparatus 50300 via the network through the router device 200*r* means the case where the broadcast receiving apparatus 40100 outputs the contents to the external video processing apparatus 50300 via the IP interface.

As has been explained in the third embodiment and the fourth embodiment according to the present invention, in the broadcast communication system according to the present embodiment, it is possible to transmit not only SDR video contents whose resolution is 1920×1080 pixels or less, but also contents with high quality such as contents whose resolution is over 1920×1080 pixels and HDR video contents. Here, as contents protection when a receiver re-outputs these video contents with high quality, which are broadcasted by the broadcast communication system, to external equipment via an interface, higher contents protection than that for the contents of the SDR video whose resolution is 1920×1080 pixels or less is required.

In order to realize this, as an interface transmission technique, contents protection by DTCP2 (which is described in Reference Document 1 below), which is a more advanced contents protection system than DTCP-IP, has been developed.

[Reference Document 1: Digital Transmission Licensing Administrator DTCP2 Presentation to CPTWG Jan. 27, 2016]

Specifically, four flags ("L2-Only" Flag, "EI" Flag, "HDR" Flag, and "SDO" Flag) shown in FIG. 39 are newly prepared in the DTCP2. For example, "0" of the "L2-Only" Flag in FIG. 39 indicates "any contents protection of DTCP-IP (L1 level contents protection) or DTCP2 (L2 level contents protection) can be applied", and "1" thereof indicates "contents protection (for example, L2 level contents protection such as DTCP2) with higher level than that of DTCP-IP (L1 level contents protection) is required". In the following explanation, DTCP-IP (L1 level contents protection) is referred to as "DTCP1" in order to distinguish it from "DTCP2". Further, in a case where the "EI" Flag is "0", it indicates that "contents are 'Non-Enhanced Image'". In a case where the "EI" Flag is "1", it indicates that "contents are 'Enhanced Image'". Here, the "Enhanced Image" means contents that have video in which pixel number exceeds 1920×1080 or which has a color space (for example, the HDR such as BT.2020 and SMPTE2084) exceeding a color space of an HD level (the SDR such as BT.709). Further, the "Non-Enhanced Image" means contents that have video with HD video image quality or less (for example, video whose pixel number is 1920×1080 or less and that has the color space of the HD level (the SDR such as BT.709) and the like). Further, in a case where the "HDR" Flag is "0", it indicates "contents of video that may be converted from the HDR to the SDR". In a case where the "HDR" Flag is "1", it indicates "contents of video for which conversion from the HDR to the SDR is prohibited". Further, in a case where the "SDO" Flag is "0", it indicates that "in a case of an 'Enhanced Image', it is possible to re-output the contents only with L2 level contents protection; but in a case where the 'Enhanced Image' is converted into a 'Non-Enhanced Image', it is possible to re-output the contents with L1 level contents protection". In a case where the "SDO" Flag is "1", it indicates that "it is possible to re-output even in a case where contents are any of "Enhanced Image" and "Non-Enhanced Image" and even in a case of any of L2 level contents protection and L1 level contents protection".

In a case where the contents protection by DTCP2 that has been explained above is applied to an IP interface output according to the present embodiment, what flag is attached to what contents as output control information 50200 shown in FIG. 38 becomes a problem. For example, there may be a way of thinking that flags that substantially correspond to the four flags shown in FIG. 39 are prepared at reception control information 50100 side shown in FIG. 38. By configuring them in this manner, a server of the broadcast station can substantially become a Sink apparatus of DTCP2. However, each of the four flags has one bit. In a case where a broadcast station side or contents production side can freely set these flags with their intention, there are $2^4$ ways, that is, 16 ways of protection states for contents in view of all combinations of the four flags, and this becomes extremely complicated. This is to say that it is not suitable for "broadcast" technology in which a large number of viewers receives contents at the same time and start and end of a program are repeated in a selected service. The number of viewers whom the "broadcast" technology set as a target is enormous, and monitors and the like that the viewers have are various ones. For example, a situation that in a case where a monitor that each of a part of the viewers has does not correspond to the HDR, these viewers cannot view the contents completely due to contents protection control by the flag should be avoided in the "broadcast" technology as much as possible. Further, for the sake of the spread of receiving equipment, it is necessary for contents transmitted in the "broadcast" technology to have a simple system for types that a large number of viewers can understand easily.

Further, in a case where a new flag is prepared for the reception control information 50100, facilities of the contents production side also becomes complicated.

By taking the above into consideration, in the broadcast communication system according to the present embodiment, flags substantially corresponding to the four flags of DTCP2 described above is not introduced into the reception control information 50100 shown in FIG. 38. In addition, at the IP interface output from the broadcast receiving apparatus 40100, the flags of the DTCP2 are utilized as the output control information 50200 to execute more suitable contents protection. Specifically, in the broadcast communication system according to the present embodiment, information on resolution of video of contents, control information regarding digital copy of the contents, control information regarding storage and output of the contents, and the EOTF identification information (transmission characteristics identification information) that has been explained in the third and fourth embodiments are used as the reception control information 50100, and the broadcast receiving apparatus 40100 determines output protection for each of contents together with addition of a flag of DTCP2 thereto in accordance with these types of information at the IP interface output.

Here, the information on resolution of video of contents, which is used as one type of the reception control information 50100, will be described. As the information on resolution of video of contents, plural kinds of information are transmitted in the broadcast communication system according to the present embodiment. The broadcast receiving apparatus 40100 may use any of these plural kinds of information to determine resolution of video of contents (pixel numbers). For example, the broadcast receiving apparatus 40100 may acquire an encoded parameter stored in an HEVC encoded stream, which is a video encoded method for contents of the broadcasting system according to the present embodiment, to determine it. Alternatively, the broadcast receiving apparatus 40100 may acquire an encoded parameter placed in an MPT and described in an MH-HEVC video descriptor to determine it. Alternatively, the broadcast receiving apparatus 40100 may acquire video resolution information described in a video component descriptor to determine it.

Next, control information regarding digital copy of contents and control information regarding storage and output of the contents, which are used as one of the reception control information 50100, will be described. FIG. 40 shows descriptors of control information regarding digital copy of contents that are transmitted in the broadcast communication system according to the present embodiment and the control information regarding storage and output of the contents. Here, information indicating control information regarding digital copy of contents or the maximum transmission rate, and the like are stored in a contents copy control descriptor. Further, information in which the control information regarding storage and output of the contents is described is stored in a contents usage control descriptor. For example, the contents copy control descriptor and the contents usage control descriptor are placed in the MPT to be transmitted.

FIG. 41A shows one example of a data structure of the contents copy control descriptor in the broadcasting system according to the present embodiment. A "digital_recording_control_data" parameter in FIG. 41A is digital copy control information, and indicates information for controlling copy generation of the contents. Further, FIG. 41B shows one example of parameter value and meaning thereof of the digital copy control information. For example, in a case where the parameter is "00", it indicates "copiable (copy permission) without any constraint condition (synonymous with "copiable without restriction")". In a case where the parameter is "01", it indicates that definition by a provider is available. In a case where the parameter is "10", it indicates "copiable only for one generation". In a case where the parameter is "11", it indicates "copy prohibition". Only in a case where the parameter is "00" that indicates "copiable without any constraint condition", it can be said a state where protection by the digital copy control information is not specified. In a case where the parameter is "01", "10", or "11", it can be said a state where some kind of protection by the digital copy control information is specified.

Further, FIG. 42 shows one example of a data structure of the contents usage control descriptor in the broadcasting system according to the present embodiment. A "copy_restriction_mode" parameter in FIG. 42 is a copy limited mode, and indicates whether the number of copies can be restricted or not (which corresponds to "copiable given times" in the first embodiment). A value of an "encryption_mode" parameter in the contents usage control descriptor shown in FIG. 42 is used to control protection (encryption) at the time of IP interface output. In a case where the value of the "encryption_mode" parameter is "0" to indicate that protection is required (encryption required), an encoding process (or encryption process) is executed when contents are outputted. In a case where the value is "1" to indicate that protection is not required (encryption is not required), protection (the encoding process) may not be executed and outputted when contents are outputted.

A combination of the "digital_recording_control_data" parameter of the contents copy control descriptor, the "encryption_mode" parameter of the contents usage control descriptor, and the "copy_restriction_mode" parameter of the contents usage control descriptor, which have been explained above, is a concrete configuration example of the "copy control information" that has been explained in the first embodiment.

The broadcast receiving apparatus 40100 according to the present embodiment may acquire the "digital_recording_control_data" parameter of the contents copy control descriptor, the "copy_restriction_mode" parameter of the contents usage control descriptor, and the like, which are described above, to use them to determine whether to execute the output protection for contents of the IP interface output or not.

Next, the EOTF identification information used as one of the reception control information 50100 has already been explained in detail in the third and fourth embodiments. For this reason, explanation thereof will be omitted. Moreover, the broadcast receiving apparatus 40100 according to the present embodiment may use not only the EOTF identification information as the reception control information 50100, but also presence or absence and a result of a resolution converting process for video of contents, presence or absence and a result of a transmission characteristics converting process that has been explained in the third and fourth embodiments, presence or absence of a storing process for the contents, or a state after accumulation in the broadcast receiving apparatus 40100 to determine the output protection for the contents of the IP interface output.

[Process of Determining Output Protection for Contents of IP Interface Output in Broadcast Receiving Apparatus]

One example of a process of determining output protection for contents of an IP interface output in the broadcast receiving apparatus is shown using FIG. 43, FIG. 44, and FIGS. 45A-45D.

First, FIG. 43 shows a determining process of output protection for contents in a case where the broadcast receiving apparatus 40100 receives contents together with the reception control information 50100, and executes IP interface output without executing the resolution converting process and the transmission characteristics converting process for video of the contents.

In FIG. 43, a main control unit 101 of the broadcast receiving apparatus 40100 according to the present embodiment executes determination of output protection for contents when to execute the IP interface output on the basis of information contained in the reception control information 50100. Specifically, determination of output protection for contents when to execute the IP interface output is executed on the basis of a combination of the "digital_recording_control_data" parameter of the contents copy control descriptor, the "encryption_mode" parameter of the contents usage control descriptor, resolution of video of the received contents, and transmission characteristics (EOTF) identification information. Hereinafter, a determination example in each combination will be described.

[Combination 1 in FIG. 43]

In an example of Combination 1 in FIG. 43, the "digital_recording_control_data" parameter of the contents copy control descriptor indicates "copiable without any constraint condition", and the "encryption_mode" parameter of the contents usage control descriptor indicates that a protection state at the time of the IP interface output is "not protected". Namely, in this case, it can be said that copy restriction and output protection for contents are not specified by any of the parameters.

In this case, output protection for contents when to execute the IP interface output is not required even for contents in which resolution of video exceeds horizontal 1920×vertical 1080 pixels (contents whose horizontal or vertical pixels exceed the corresponding pixel number; hereinafter, referred to as "contents with over 2K") and contents having horizontal 1920×vertical 1080 pixels or less (contents whose horizontal and vertical pixels are the corresponding pixel number or less; hereinafter, referred to as "contents with 2K or less"). Further, even in a case where the transmission characteristics identification information indicates the HDR or the SDR, the output protection for the contents when to execute the IP interface output is not required. Copy control at the time of output is also not required (substantial Copy Free), and encryption at the time of output is also not required. There is naturally no need to add the output control information of DTCP2 thereto. However, protection of DTCP1 ("DTCP-IP" described above) or DTCP2 may be executed for the contents to output them. In such a case, the copy control state at the time of output may be set to "Copy Free", and an encryption state may be set to "None". Moreover, in a case where protection of DTCP2 is executed to output contents, the output control information may be determined as follows. The "L2-Only" Flag is set to "0". The "EI" Flag is set to "0" in a case where transmission characteristics by the contents with 2K or less is the SDR. The "EI" Flag is set to "1" in a case where it is other contents. The "HDR" Flag is set to "0". The "SDO" Flag is set to "1". Namely, a protection level for DTCP of the IP interface output may be either L1 level or L2 level; the copy control is set to Copy Free; transmission characteristics conversion is not prohibited; and contents are outputted in a re-outputtable state by any protection state of L1 level and L2 level regardless of states of the resolution and the transmission characteristics. This means that the contents are outputted at the lowest protection state of the output control states in the IP interface output according to the present embodiment.

[Combinations 2 to 5 in FIG. 43]

In an example of each of Combinations 2 to 5 in FIG. 43, the "digital recording control data" parameter of the contents copy control descriptor indicates "copiable without any constraint condition", and the "encryption_mode" parameter of the contents usage control descriptor indicates that the protection state at the time of the IP interface output is "protected".

In this case, since the "encryption_mode" parameter of the contents usage control descriptor specifies that protection is executed at the time of the IP interface output, the output protection by any of DTCP2 and DTCP1 is executed in any of Combinations. Any of the copy control states in such cases is set to "EPN" that indicates a state where copy restriction is not required but encryption is required, and an encryption protection process is executed. Here, whether to execute an output protection process of any level of DTCP2 or DTCP1 is determined in accordance with a combination of the resolution of video of the received contents and the transmission characteristics (EOTF) identification information.

For example, in Combination 5, resolution of video of the received contents is contents with 2K or less, and the transmission characteristics (EOTF) identification information is the SDR. This is so-called HD image quality contents. Therefore, output protection of a conventional level is enough, and output protection using DTCP1 is executed. In this case, the output control information of DTCP2 is not naturally added.

Further, in Combinations 2, 3, and 4, they satisfy any condition of whether the resolution of video of the received contents is contents with over 2K or not and whether the transmission characteristics (EOTF) identification information is the HDR or not. In this case, the contents are contents that have image quality exceeding the HD image quality. Thus, the contents protection is executed by using DTCP2 that is output protection with a higher level than that of DTCP1. In this case, the output control information of DTCP2 to be added to the output contents is determined as follows.

Here, with respect to the "L2-Only" Flag, in any of Combinations 2, 3, and 4, the "L2-Only" Flag is set to "0". Here, when the "L2-Only" Flag is set to "1", the contents cannot be re-outputted so long as contents protection with L2 level such as DTCP2 is executed, even though equipment of the destination executes pixel number conversion or the transmission characteristics converting process to reduce the image quality to the HD image quality. There is a possibility that the contents cannot be viewed depending upon equipment owned by a viewer (in a case where the equipment owned by the viewer is incompatible with DTCP2, or the like), and this situation is undesirable as protection of "broadcast" contents that a large number of viewers receives at the same time. The above is a reason why the "L2-Only" Flag is set to "0". In any determination of output control information of DTCP2 in the following explanation of the present embodiment, the "L2-Only" Flag is set to "0" in principle due to the similar reason. However, as a modification example, in a case where broadcasting contents or broadcasting service is divided into "free broadcast" and "pay-per-view broadcast" and this can be identified by the broadcast receiving apparatus 40100, the "L2-Only" Flag may be set to 0 for the "free broadcast" and the "L2-Only" Flag may be set to 1 for the "pay-per-view broadcast". This is because viewers of the "pay-per-view broadcast" are limited and a high protection level is especially required for contents of the "pay-per-view broadcast".

Further, with respect to the "EI" Flag, in any of Combinations 2, 3, and 4, the "EI" Flag is set to "1". This is because any condition of whether the resolution of video of the received contents is contents with over 2K or not and whether the transmission characteristics (EOTF) identification information is the HDR or not is satisfied.

Further, with respect to the "HDR" Flag, in Combinations 2 and 3, the "HDR" Flag is set to "0". In these Combinations, the transmission characteristics (EOTF) identification information is the HDR. In a case where contents are outputted as they are, transmission characteristics of the contents at the time of the IP interface output is also the HDR. Here, in a case where the "HDR" Flag is set to "1", the equipment of the destination cannot execute the transmission characteristics converting process to be converted into SDR contents. In this case, there is a possibility that the contents cannot be viewed depending upon the equipment owned by the viewer (in a case where the equipment owned by the viewer is incompatible with HDR contents, or the like). This situation is undesirable as protection of the "broadcast" contents that a large number of viewers receives at the same time. The above is a reason why the "HDR" Flag is set to "0". In any determination of output control information of DTCP2 in the following explanation of the present embodiment, the "HDR" Flag is set to "0" in principle due to the similar reason. However, as a modification example, in a case where broadcasting contents or broadcasting service is divided into "free broadcast" and "pay-per-view broadcast" and this can be identified by the broadcast receiving apparatus 40100, the "HDR" Flag may be set to 0 with respect to the "free broadcast", and the "HDR" Flag may be set to 1 with respect to the "pay-per-view broadcast". This is because viewers of the "pay-per-view broadcast" are limited and a service provider, which thinks that it is worth to view contents of the "pay-per-view broadcast" as they have HDR image quality with high image quality, exists.

Further, with respect to the "HDR" Flag, in Combination 4, the transmission characteristics (EOTF) identification information is the SDR. In a case where contents are outputted as they are, transmission characteristics of the contents at the time of the IP interface output is also the SDR. For that reason, there is no need to add the "HDR" Flag indicating whether to execute the transmission characteristics converting process from the HDR contents into the SDR.

Further, with respect to the "SDO" Flag, in any of Combinations 2, 3, and 4, the "SDO" Flag is set to "0". So long as the "encryption mode" parameter of the contents usage control descriptor specifies protection at the time of the IP interface output, it is desirable that contents whose resolution is contents with over 2K or whose transmission characteristics are the HDR are to be protected with a higher protection level. On the other hand, in the "broadcast" technology that assumes a large number of viewers receives at the same time, a situation that a part of viewers who use equipment incompatible with contents protection with L2 level cannot view contents completely is avoided as much as possible. Here, by setting the "SDO" Flag to 0, the higher contents protection with L2 level can be applied to the contents whose resolution is contents with over 2K or whose transmission characteristics are the HDR. However, in a case where the quality of the contents is reduced to the HD image quality by the resolution converting process or the transmission characteristics converting process, contents protection with a conventional DTCP-IP level (L1 level) with which a large number of equipment can be compatible is permitted. For this reason, it has high consistency with these two requirements that the output protection process for the contents received by the "broadcast" technology is required. The above is a reason why the "SDO" Flag is set to "0". In any determination of output control information of DTCP2 in the following explanation of the present embodiment, in a case where copy restriction or output protection of contents is specified by the "digital_recording_control_data" parameter of the contents copy control descriptor or the "encryption_mode" parameter of the contents usage control descriptor, or in a case where a state of the storing process for the contents indicates the copy restriction or the contents output protection, the "SDO" Flag is set to "0" due to the similar reason.

[Combinations 6 to 9 in FIG. 43]

In an example of each of Combinations 6 to 9 in FIG. 43, the "digital_recording_control_data" parameter of the contents copy control descriptor indicates "copiable only for one generation". In this case, it is specified that there is copy restriction. For this reason, it is desirable that the contents protection is also executed at the time of the IP interface output even in a case where the "encryption_mode" parameter of the contents usage control descriptor indicates any value. Therefore, the output protection by any of DTCP2 and DTCP1 is executed. Any of copy control states in such a case is set to "Copy One Generation" that indicates copiable only for one generation, and the encryption protection process is executed.

Here, (1) whether the output protection process for any level of DTCP2 and DTCP1 is executed, and (2) determination of the output control information in a case where the output protection process is executed by DTCP2 are determined in accordance with the combination of the resolution of video of the received contents and the transmission characteristics (EOTF) identification information. However, since these determining methods for Combinations 6, 7, 8, and 9 in FIG. 43 are respectively similar to those for Combinations 2, 3, 4, and 5 in FIG. 43, explanation thereof will be omitted.

[Combinations 10 to 13 in FIG. 43]

In each of examples of Combinations 10 to 13 in FIG. 43, the "digital_recording_control_data" parameter of the contents copy control descriptor indicates "copy prohibition". In this case, since it is specified that there is the copy restriction, it is desirable that the contents protection is executed at the time of the IP interface output even in a case where the "encryption_mode" parameter of the contents usage control descriptor indicates any value. Therefore, the output protection is executed by any of DTCP2 and DTCP1. Any of copy control states in such a case is set to "Copy Never" that indicates copy prohibition, and the encryption protection process is executed.

Here, (1) whether the output protection process of any level of DTCP2 and DTCP1 is executed, and (2) determination of the output control information in a case where the output protection process is executed by DTCP2 are determined in accordance with the combination of the resolution of video of the received contents and the transmission characteristics (EOTF) identification information. However, since these determining methods for Combinations 10, 11, 12, and 13 in FIG. 43 are respectively similar to those for Combinations 2, 3, 4, and 5 in FIG. 43, explanation thereof will be omitted.

[Exception Process Example of Process in FIG. 43]

As described above, one example of the determining process for the output protection of the contents in a case where the IP interface output is executed has been explained with reference to FIG. 43.

However, there is a possibility that it is necessary to execute some exception processes that have not been described in FIG. 43. These exception processes will be described below.

For example, in a case where the contents copy control descriptor itself or the "digital_recording_control_data" parameter of the contents copy control descriptor was not transmitted as the reception control information 50100 due to any cause or reason such as a transmission error, the broadcast receiving apparatus 40100 cannot acquire the "digital_recording_control_data" parameter. In such a case, the broadcast receiving apparatus 40100 may consider the same state as the case where the "digital_recording_control_data" parameter of the contents copy control descriptor indicates "copiable without any constraint condition", and execute the determining process of FIG. 43. Specifically, the broadcast receiving apparatus 40100 determines one process from the processes of Combinations 1 to 5 in FIG. 43 in view of other reception control information 50100.

Further, in a case where the contents usage control descriptor itself or the "encryption_mode" parameter of the contents usage control descriptor was not transmitted as the reception control information 50100 due to any cause or reason such as a transmission error, the broadcast receiving apparatus 40100 cannot acquire the "encryption_mode" parameter. In such a case, the broadcast receiving apparatus 40100 may consider the same state as the case where the "encryption_mode" parameter of the contents usage control descriptor indicates "not protected", execute the determining process of FIG. 43. Specifically, the broadcast receiving apparatus 40100 determines one process from the processes of Combinations 1, and 6 to 13 in FIG. 43 in view of other reception control information 50100.

Further, in a case where the transmission characteristics (EOTF) identification information was not transmitted as the reception control information 50100 due to any cause or reason such as a transmission error, the broadcast receiving apparatus 40100 cannot acquire the transmission characteristics (EOTF) identification information. In such a case, the broadcast receiving apparatus 40100 may execute determination based on whether a video format of the contents is an HDR or an SDR when the contents are to be outputted by the IP interface output in place of determination based on the transmission characteristics (EOTF) identification information to be received. Specifically, description in a column for the transmission characteristics (EOTF) identification information in FIG. 43 may be replaced by meaning of whether the video format is the HDR or the SDR when the contents are outputted by the IP interface output, and execute the determining process for output protection of the contents in a case where the IP interface output is executed.

[Modification Example of Process in FIG. 43]

In the example of FIG. 43, in a case where protection by DTCP2 is applied to the HDR contents and the contents are subjected to the IP interface output (Combinations 2, 3, 6, 7, 10, and 11), the "HDR" Flag is set to "0" and the contents are then outputted. However, since the "SDO" Flag is in a state where "0" is indicated in each of these Combinations, it is assumed that contents can be converted from the HDR to the SDR. Thus, in each of Combinations 2, 3, 6, 7, 10, and 11 in FIG. 43, it may be controlled so that the "HDR" Flag is not outputted as the output control information of DTCP2. In this case, since the "HDR" Flag is also not outputted in any of Combinations, the control of the IP interface output of the broadcast receiving apparatus 40100 becomes simple.

Further, in the example of FIG. 43, in a case where the contents are to be outputted by protection of DTCP2, a control in which the "L2-Only" Flag is set to "0" as the output control information of DTCP2 and the contents are outputted is illustrated. As described above, this allows output by a contents protection method of L1 level such as DTCP1 by executing the resolution converting process or the transmission characteristics converting process in DTCP2 compatible equipment in view of a case where equipment of a destination is the DTCP2 compatible equipment and the contents are further outputted to other equipment ahead of the DTCP2 compatible equipment to convert the contents into contents with 2K or less whose transmission characteristics are SDR. However, as a modification example of FIG. 43, the control may be replaced by a control in which the "L2-Only" Flag is set to "1" as the output control information of DTCP2 and the contents are outputted in each of Combinations (Combinations 10, 11, and 12) in which the "digital_recording_control_data" parameter of the contents copy control descriptor indicates "copy prohibited" and the contents are outputted as "Copy Never" by the protection of DTCP2. In this example, contents protection is further strengthened by regarding contents whose "digital_recording_control_data" parameter of the contents copy control descriptor indicates "copy prohibited" as contents with higher necessity of contents protection by a contents provider. Specifically, in a case where the "L2-Only" Flag is set to "1" and the contents are outputted, in a case where the contents are to be outputted to the other equipment ahead of the DTCP2 compatible equipment of the destination, or in a case where the other equipment ahead of the DTCP2 compatible equipment of the destination is incompatible with a contents protection method of L2 level such as DTCP2 even though the resolution converting process or the transmission characteristics converting process is executed, it becomes impossible to output the contents. Namely, contents protection of L2 level is always applied to the contents after the contents are outputted from the IP interface of the broadcast receiving apparatus 40100.

According to the determining process of output protection for contents in a case where the IP interface output of FIG. 43 is executed, which has been explained above, the contents are received together with the reception control information 50100. In a case where the IP interface output for video of contents is executed without executing the resolution converting process and the transmission characteristics converting process, it is possible to realize well-balanced contents output protection in both points of view of a point of view of output protection for image quality of video of contents and a point of view of convenience for viewers of broadcasting contents.

Next, FIG. 44 shows a determining process of output protection for contents in a case where the broadcast receiving apparatus 40100 receives contents together with the reception control information 50100, and executes a resolution converting process and a transmission characteristics converting process for video of the contents to execute the IP interface output.

In the example of FIG. 44, the broadcast receiving apparatus 40100 according to the present embodiment executes the resolution converting process and/or the transmission characteristics converting process for video of the received contents. A resolution processing unit may be provided between the video decoder 141 and the video color gamut conversion unit 142 of the broadcast receiving apparatus 40100 shown in FIG. 35A, and the resolution converting process may be executed by the resolution processing unit. The transmission characteristics converting process may be executed by the video color gamut conversion unit 142 as have been explained in the third and fourth embodiments.

Here, in the example of FIG. 44, the resolution converting process and/or the transmission characteristics converting process for video of the contents are executed before executing the IP interface output. For this reason, appropriate output protection for the contents cannot be determined on the basis of only information contained in the reception control information 50100.

Thus, the determination of the output protection for the contents when to execute the IP interface output is executed by taking into consideration resolution of video after the resolution converting process and/or transmission characteristics after the transmission characteristics converting process in addition to information contained in the reception control information 50100. Specifically, an item of "video resolution at the time of output" of "state at the time of output" is provided in place of the "video resolution" of the "reception control information" in FIG. 43, and an item of "transmission characteristics at the time of output" of the "state at the time of output" is provided in place of "transmission characteristics identification information (ETOF)" of the "reception control information". Here, the main control unit 101 of the reception control information 50100 determines, on the basis of the following determination, the "video resolution at the time of output" of the "state at the time of output" and the "transmission characteristics at the time of output" of the "state at the time of output".

First, in a case where the broadcast receiving apparatus 40100 according to the present embodiment executes the resolution converting process for video of the received contents but does not execute the transmission characteristics converting process, the broadcast receiving apparatus 40100 may determine resolution of video after the resolution converting process as the "video resolution at the time of output" of the "state at the time of output", and determine the transmission characteristics indicated by the "transmission characteristics identification information (ETOF)" of the "reception control information" as the "transmission characteristics at the time of output" of the "state at the time of output".

Further, in a case where the broadcast receiving apparatus 40100 according to the present embodiment does not execute the resolution converting process for video of the received contents but executes the transmission characteristics converting process, the broadcast receiving apparatus 40100 may determine the "video resolution" of the "reception control information" as the "video resolution at the time of output" of the "state at the time of output", and determine the transmission characteristics after the transmission characteristics converting process as the "transmission characteristics at the time of output" of the "state at the time of output".

Further, in a case where the broadcast receiving apparatus 40100 according to the present embodiment executes both of the resolution converting process for video of the received contents and the transmission characteristics converting process, the broadcast receiving apparatus 40100 may determine the resolution of video after the resolution converting process as the "video resolution at the time of output" of the "state at the time of output", and determine the transmission characteristics after the transmission characteristics converting process as the "transmission characteristics at the time of output" of the "state at the time of output".

In the example shown in FIG. 44, the broadcast receiving apparatus 40100 according to the present embodiment executes the determining process of the output protection for the contents in a case where the IP interface output shown in FIG. 44 is executed by using the "video resolution at the time of output" of the "state at the time of output" and the "transmission characteristics at the time of output" of the "state at the time of output", which are determined as described above. However, in a case where the "video resolution" of the "reception control information" is replaced by the "video resolution at the time of output" of the "state at the time of output" and the "transmission characteristics identification information (ETOF)" of the "reception control information" is replaced by the "transmission characteristics at the time of output" of the "state at the time of output" in FIG. 43 that has already been explained, it becomes the similar control to that of the example in FIG. 44. Therefore, the "digital_recording_control_data" parameter of the contents copy control descriptor and the "encryption mode" parameter of the contents usage control descriptor in the "reception control information" of FIG. 44, and the IP interface output control in each of Combinations 1 to 13 of the "video resolution at the time of output" and "transmission characteristics at the time of output" of the "state at the time of output" are respectively similar to the "digital_recording_control_data" parameter of the contents copy control descriptor and the "encryption mode" parameter of the contents usage control descriptor in the "reception control information" of FIG. 43, and the IP interface output control in each of Combinations 1 to 13 of the "video resolution" and the "transmission characteristics identification information (ETOF)". For this reason, explanation thereof will be omitted.

[Exception Process Example of Process in FIG. 44]

As described above, one example of the determining process for the output protection of the contents in a case where the IP interface output is executed has been explained with reference to FIG. 44.

However, there is a possibility that it is necessary to execute some exception processes that have not been described in FIG. 44. These exception processes will be described below.

For example, in a case where the contents copy control descriptor itself or the "digital_recording_control_data" parameter of the contents copy control descriptor was not transmitted as the reception control information 50100 due to any cause or reason such as a transmission error, the broadcast receiving apparatus 40100 cannot acquire the "digital_recording_control_data" parameter. In such a case, the broadcast receiving apparatus 40100 may consider the same state as the case where the "digital_recording_control_data" parameter of the contents copy control descriptor indicates "copiable without any constraint condition", and execute the determining process of FIG. 44. Specifically, the broadcast receiving apparatus 40100 determines one process from the processes of Combinations 1 to 5 in FIG. 44 in view of other reception control information 50100 and an in-receiver converting process.

Further, in a case where the contents usage control descriptor itself or the "encryption_mode" parameter of the contents usage control descriptor was not transmitted as the reception control information 50100 due to any cause or reason such as a transmission error, the broadcast receiving apparatus 40100 cannot acquire the "encryption_mode" parameter. In such a case, the broadcast receiving apparatus 40100 may consider the same state as the case where the "encryption_mode" parameter of the contents usage control descriptor indicates "not protected", execute the determining process of FIG. 44. Specifically, the broadcast receiving apparatus 40100 determines one process from the processes of Combinations 1, and 6 to 13 in FIG. 44 in view of other reception control information 50100 and the in-receiver converting process.

Further, in a case where the transmission characteristics (EOTF) identification information was not transmitted as the reception control information 50100 due to any cause or reason such as a transmission error, the broadcast receiving apparatus 40100 cannot acquire the transmission characteristics (EOTF) identification information. In such a case, in the example of FIG. 44, determination based on whether the contents after the in-receiver converting process are the HDR or the SDR may also be executed. Therefore, there is no need for any exception process in this point particularly.

[Modification Example of Process in FIG. 44]

In the example of FIG. 44, in a case where protection by DTCP2 is applied to the HDR contents and the contents are subjected to the IP interface output (Combinations 2, 3, 6, 7, 10, and 11), the "HDR" Flag is set to "0" and the contents are then outputted. However, since the "SDO" Flag is in a state where "0" is indicated in each of these Combinations, it is assumed that contents can be converted from the HDR to the SDR. Thus, in each of Combinations 2, 3, 6, 7, 10, and 11 in FIG. 44, it may be controlled that the "HDR" Flag is not outputted as the output control information of DTCP2. In this case, since the "HDR" Flag is also not outputted in any of Combinations, the control of the IP interface output of the broadcast receiving apparatus 40100 becomes simple.

Further, in a case where the contents are to be outputted by protection of DTCP2, a control in which the "L2-Only" Flag is set to "0" as the output control information of DTCP2 and the contents are outputted is illustrated. As described above, this allows output by a contents protection method of L1 level such as DTCP1 by executing the resolution converting process or the transmission characteristics converting process in DTCP2 compatible equipment in view of a case where equipment of a destination is the DTCP2 compatible equipment and the contents are further outputted to other equipment ahead of the DTCP2 compatible equipment to convert the contents into contents with 2K or less whose transmission characteristics are SDR. However, as a modification example of FIG. 44, the control may be replaced by a control in which the "L2-Only" Flag is set to "1" as the output control information of DTCP2 and the contents are outputted in each of Combinations (Combinations 10, 11, and 12) in which the "digital_recording_control_data" parameter of the contents copy control descriptor indicates "copy prohibited" and the contents are to be outputted as "Copy Never" by the protection of DTCP2. In this example, contents protection is further strengthened by regarding the contents whose "digital_recording_control_data" parameter of the contents copy control descriptor indicates "copy prohibited" as contents with higher necessity of contents protection by a contents provider. Specifically, in a case where the "L2-Only" Flag is set to "1" and the contents are outputted, in a case where the contents are to be outputted to the other equipment ahead of the DTCP2 compatible equipment of the destination, or in a case where the other equipment ahead of the DTCP2 compatible equipment of the destination is incompatible with a contents protection method of L2 level such as DTCP2 even though the resolution converting process or the transmission characteristics converting process is executed, it becomes impossible to output the contents. Namely, contents protection of L2 level is always applied to the contents after the contents are outputted from the IP interface of the broadcast receiving apparatus 40100.

According to the determining process of output protection for contents in a case where the IP interface output of FIG. 44 is executed, which has been explained above, the contents are received together with the reception control information 50100. In a case where the IP interface output for video of contents is executed by executing the resolution converting process and/or the transmission characteristics converting process, it is possible to realize well-balanced contents output protection in both points of view of a point of view of output protection for image quality of video of contents and a point of view of convenience for viewers of broadcasting contents.

Next, FIGS. 45A-45D show a determining process of output protection for contents in a case where the broadcast receiving apparatus 40100 receives the contents together with the reception control information 50100, executes a storing process for the contents, and then executes the IP interface output. Since the outline of the storing process has already been explained in the first embodiment, explanation thereof will be omitted.

The broadcast receiving apparatus 40100 first determines an accumulation control state of contents as an accumulation target by using the "digital_recording_control_data" parameter of the contents copy control descriptor, the "encryption_mode" parameter of the contents usage control descriptor, and the "copy_restriction_mode" parameter of the contents usage control descriptor, which are contained in the reception control information 50100.

Here, in a case where the "digital_recording_control_data" parameter of the contents copy control descriptor indicates "copiable without any constraint condition" and the "encryption_mode" parameter of the contents usage control descriptor indicates "not protect" (an example of Combination 1 in FIG. 45A), it is set to an accumulation control state of "accumulate without restriction of copy and not protect encryption_mode" regardless of a value of a parameter of the "copy_restriction_mode" of the contents usage control descriptor.

Further, in a case where the "digital_recording_control_data" parameter of the contents copy control descriptor indicates "copiable without any constraint condition" and the "encryption_mode" parameter of the contents usage control descriptor indicates "protect" (examples of Combinations 2 to 5 in FIG. 45A), it is set to an accumulation control state of "accumulate without restriction of copy and protect encryption_mode" regardless of the value of the parameter of the "copy_restriction_mode" of the contents usage control descriptor.

Further, in a case where the "digital_recording_control_data" parameter of the contents copy control descriptor indicates "copiable only for one generation" and the "copy_restriction_mode" parameter of the contents usage control descriptor indicates "copiable only for one generation" (examples of Combinations 6 to 9 in FIG. 45B), it is set to an accumulation control state of "re-copy prohibition" even when the "encryption_mode" parameter of the contents usage control descriptor indicates any value.

Further, in a case where the "digital_recording_control_data" parameter of the contents copy control descriptor indicates "copiable only for one generation" and the "copy_restriction_mode" parameter of the contents usage control descriptor indicates "copiable for restricted number" (examples of Combinations 10 to 13 in FIG. 45C), it may be set to an accumulation control state of "copiable for restricted number" even when the "encryption_mode" parameter of the contents usage control descriptor indicates any value.

Further, in a case where the "digital_recording_control_data" parameter of the contents copy control descriptor indicates "copy prohibition" (examples of Combinations 14 to 17 in FIG. 45D), a state that the contents can be accumulated is limited to an accumulation control state of "temporarily accumulate" even in a case where the "digital_recording_control_data" parameter of the contents copy control descriptor and the "copy_restriction_mode" parameter of the contents usage control descriptor indicate any value. Since the outline of "temporarily accumulate" has already been explained in the first embodiment, explanation thereof will be omitted.

As explained above, the broadcast receiving apparatus 40100 determines the accumulation control state of the contents as the accumulation target by using the "digital_recording_control_data" parameter of the contents copy control descriptor, the "encryption_mode" parameter of the contents usage control descriptor, and the "copy_restriction_mode" parameter of the contents usage control descriptor, which are contained in the reception control information 50100.

Next, when the accumulated contents are outputted from the IP interface, the broadcast receiving apparatus 40100 determines the output protection for the contents of the IP interface output in accordance with the accumulation control state of the contents, the "video resolution at the time of output" when the contents are outputted, and the "transmission characteristics at the time of output". Here, in the example of FIGS. 45A-45D, there is a possibility that the resolution converting process and/or the transmission characteristics converting process for video of contents are executed before or after the storing process for the contents. This is common to the example of FIG. 44 in terms of a possibility that the resolution converting process and/or the transmission characteristics converting process is executed before the broadcast receiving apparatus 40100 receives the contents to output the same from the IP interface. Therefore, since the determination of the "video resolution at the time of output" and the "transmission characteristics at the time of output" in the broadcast receiving apparatus 40100 may be executed in the similar manner to that of the example of FIG. 44, explanation thereof will be omitted.

Next, determination of output protection for contents when the IP interface output in each of Combinations in FIGS. 45A-45D is executed will be described.

[Combination 1 in FIG. 45A]

In the example of Combination 1 shown in FIG. 45A, that is, in a case where contents in the accumulation control state of the "accumulate without restriction of copy and not protect encryption_mode" are outputted from the IP interface, the output control for the contents similar to that in Combination 1 of FIG. 44 may be executed. Since the explanation is repeated, explanation thereof will be omitted.

[Combinations 2 to 5 in FIG. 45A]

In the example of each of Combinations 2 to 5 shown in FIG. 45A, that is, in a case where the IP interface output for contents in the accumulation control state of the "accumulate without restriction of copy and protect encryption_mode" is executed, the output control for the contents similar to that in each of Combinations 2 to 5 of FIG. 44 may be executed. Since the explanation is repeated, explanation thereof will be omitted.

[Combinations 6 to 9 in FIG. 45B]

In the example of each of Combinations 6 to 9 shown in FIG. 45B, that is, in a case where the contents in the accumulation control state of the "re-copy prohibition" are outputted from the IP interface, a copy control state at the time of output is different depending upon whether the output process is viewing output for viewing by equipment of a destination, or Move (or movement) of contents to the equipment of the destination. Specifically, in a case where the IP interface output is the viewing output, the copy control state is set to "No More Copies" that indicates re-copy prohibition to output the contents. In a case where the IP interface output is the Move, the copy control state is set to "Move" to output the contents. In each of Combinations 6, 7, 8, and 9 shown in FIG. 45B, the other contents protection control in the IP interface output is respectively similar to that in each of Combinations 6, 7, 8, and 9 shown in FIG. 44. For this reason, explanation thereof will be omitted.

[Combinations 10 to 13 in FIG. 45C]

In the example of each of combinations 10, 11, 12, and 13 in FIG. 45C, that is, the contents protection control in a case where the contents in the accumulation control state of the "copiable for restricted number" are outputted from the IP interface is substantially similar to that in the example of each of Combinations 6, 7, 8, and 9 of FIG. 45B. Differences are as follows. In a case where the contents in the accumulation control state of the "re-copy prohibition" are outputted from the IP interface to execute a Move process once, it needs to disable the broadcast receiving apparatus 40100 to reproduce the contents (Note that the viewing output is possible many times until it is disabled to reproduce the contents). In contrast, the accumulation control state of the "copiable for restricted number" allows a copy process to equipment of the destination via the IP interface output plural times and a Move process once finally. For example, as one example, the copy process can be executed nine times, and the Move process can finally be executed once. At the time of the final Move process, it needs to disable the broadcast receiving apparatus 40100 to reproduce the contents. Here, the broadcast receiving apparatus 40100 deals with each of copy processes as a copy process, but the contents of each of the copy processes are outputted while the copy control state thereof is set to "Move" in a protection process of the IP interface output.

Namely, in the copy process for the contents in the accumulation control state of the "copiable for restricted number", the broadcast receiving apparatus 40100 virtually sets a state that plural pieces of contents are accumulated in advance, and executes a process of moving each of the plural pieces of contents thus accumulated so as to Move it via the IP interface output. Here, when plural pieces of same contents are actually accumulated, capacity of the storage unit becomes an inefficient accumulation state. Therefore, only one piece of the contents may actually be accumulated, and accumulation number information thereof may be stored in the storage unit or a memory unit and managed as management information. This is meaning of the above explanation for "virtually".

The contents protection control in a case of executing the IP interface output in the example of each of Combinations 10, 11, 12, and 13 in FIG. 45C is respectively similar to that of the example of each of Combinations 6, 7, 8, and 9 in FIG. 45B except for the points described above. For this reason, explanation thereof will be omitted.

[Combinations 14 to 17 in FIG. 45D]

In the example of each of Combinations 14, 15, 16, and 17 in FIG. 45D, that is, the contents protection control in a case where the contents in the accumulation control state of the "temporarily accumulate" are outputted from the IP interface is substantially similar to that in the example of each of Combinations 6, 7, 8, and 9 of FIG. 45B. A difference is a point that the contents in the accumulation control state of the "temporarily accumulate" cannot be Moved to other equipment (Move impossible). The other points of the contents protection control in a case of executing the IP interface output are similar to those in the example of each of Combinations 6, 7, 8, and 9 of FIG. 45B. For this reason, explanation thereof will be omitted.

As described above, according to the determining process of the output protection for the contents in a case where the IP interface output shown in FIGS. 45A-45D is executed, the contents are received together with the reception control information 50100. In a case where the IP interface output is executed by executing accumulation of the contents, it is possible to realize well-balanced contents output protection in both points of view of a point of view of output protection for image quality of video of contents and a point of view of convenience for viewers of broadcasting contents.

[Exception Process Example of Process in FIGS. 45A-45D]

As described above, one example of the determining process for the output protection of the contents in a case where the IP interface output is executed has been explained with reference to FIGS. 45A-45D.

However, there is a possibility that it is necessary to execute some exception processes that have not been described in FIGS. 45A-45D. These exception processes will be described below.

For example, in a case where the contents copy control descriptor itself or the "digital_recording_control_data" parameter of the contents copy control descriptor was not transmitted as the reception control information 50100 due to any cause or reason such as a transmission error, the broadcast receiving apparatus 40100 cannot acquire the "digital_recording_control_data" parameter. In such a case, the broadcast receiving apparatus 40100 may consider the same state as the case where the "digital_recording_control_data" parameter of the contents copy control descriptor indicates "copiable without any constraint condition", and execute the determining process of the accumulation control state and the output protection of the contents of FIGS. 45A-45D. Specifically, the broadcast receiving apparatus 40100 determines one process from the processes of Combinations 1 to 5 in FIG. 45A in view of other reception control information 50100.

Further, in a case where the contents usage control descriptor itself or the "encryption_mode" parameter of the contents usage control descriptor was not transmitted as the reception control information 50100 due to any cause or reason such as a transmission error, the broadcast receiving apparatus 40100 cannot acquire the "encryption_mode" parameter. In such a case, the broadcast receiving apparatus 40100 may consider the same state as the case where the "encryption_mode" parameter of the contents usage control descriptor indicates "not protected", execute the determining process of the accumulation control state and the output protection of the contents of FIGS. 45A-45D. Specifically, the broadcast receiving apparatus 40100 determines one process from the processes of Combinations 1, and 6 to 17 in FIGS. 45A-45D in view of other reception control information 50100.

Further, in a case where the transmission characteristics (EOTF) identification information was not transmitted as the reception control information 50100 due to any cause or reason such as a transmission error, the broadcast receiving apparatus 40100 cannot acquire the transmission characteristics (EOTF) identification information. In such a case, in the example of FIGS. 45A-45D, determination based on whether the contents are the HDR or the SDR may also be executed at the time of output after the accumulation control. Therefore, there is no need for any exception process in this point particularly.

[Modification Example of Process in FIGS. 45A-45D]

In the example of FIGS. 45A-45D, in a case where protection by DTCP2 is applied to the HDR contents and the contents are subjected to the IP interface output (Combinations 2, 3, 6, 7, 10, 11, 14, and 15), the "HDR" Flag is set to "0" and the contents are then outputted. However, since the "SDO" Flag is in a state where "0" is indicated in each of these Combinations, it is assumed that contents can be converted from the HDR to the SDR. Thus, in each of Combinations 2, 3, 6, 7, 10, 11, 14, and 15 in FIGS. 45A-45D, it may be controlled so that the "HDR" Flag is not outputted as the output control information of DTCP2. In this case, since the "HDR" Flag is also not outputted in any of Combinations, the control of the IP interface output of the broadcast receiving apparatus 40100 becomes simple.

Further, in the example of FIGS. 45A-45D, in a case where the contents are to be outputted by protection of DTCP2, a control in which the "L2-Only" Flag is set to "0" as the output control information of DTCP2 and the contents are outputted is illustrated. As described above, this allows output by a contents protection method of L1 level such as DTCP1 by executing the resolution converting process or the transmission characteristics converting process in DTCP2 compatible equipment in view of a case where equipment of a destination is the DTCP2 compatible equipment and the contents are further outputted to other equipment ahead of the DTCP2 compatible equipment to convert the contents into contents with 2K or less whose transmission characteristics are SDR. However, as a modification example of FIGS. 45A-45D, the control may be replaced by a control in which the "L2-Only" Flag is set to "1" as the output control information of DTCP2 and the contents are outputted in each of Combinations (Combinations 6, 7, 8, 10, 11, 12, 14, 15, and 16) in which the contents are to be outputted as "No More Copies" by the protection of DTCP2. In this example, contents protection is further strengthened by regarding the contents with "No More Copies" by the protection of DTCP2 as contents with higher necessity of contents protection by a contents provider. Specifically, in a case where the "L2-Only" Flag is set to "1" and the contents are outputted, in a case where the contents are to be outputted to the other equipment ahead of the DTCP2 compatible equipment of the destination, or in a case where the other equipment ahead of the DTCP2 compatible equipment of the destination is incompatible with a contents protection method of L2 level such as DTCP2 even though the resolution converting process or the transmission characteristics converting process is executed, it becomes impossible to output the contents. Namely, contents protection of L2 level is always applied to the contents after the contents are outputted from the IP interface of the broadcast receiving apparatus 40100.

As described above, according to the broadcast communication system and the broadcast receiving apparatus 40100 of the present embodiment, it is possible to control well-balanced contents output protection in both points of view of a point of view of output protection for image quality of video of contents and a point of view of convenience for viewers of broadcasting contents in accordance with the control information regarding digital copy of contents and the control information regarding storage and output of the contents, or the accumulation state of the contents, and the resolution of video of the contents and the transmission characteristics of video of the contents, and the like. Namely, according to the broadcast communication system and the broadcast receiving apparatus 40100 of the present embodiment, it is possible to execute more suitable contents output protection control.

As described above, the examples of the embodiments according to the present invention have been explained using the first to fifth embodiments. However, the configurations for achieving the technique of the present invention are not limited to those embodiments, and may be modified in various ways. For example, some constituent elements of an embodiment may be replaced with those of another embodiment, and a constituent element of an embodiment may be added to a constituent element of another embodiment. These modifications are all within the scope of the present invention. In addition, numerical values, messages, and others in the specification and drawings are described by way of example, and the effects of the present invention are not impaired even when values, messages, and others different from those are used.

A part or all of the functions and the like of the present invention described above may be achieved by means of hardware, for example, by designing such functions with integrated circuits. Alternatively, it may be achieved by means of software by causing a microprocessor unit or the like to interpret and execute operating programs for achieving respective functions. It is also possible to use hardware and software in combination.

Note that the software that controls the broadcast receiving apparatus 100 may be stored in advance in a ROM 103 and/or a storage (accumulation) unit 110 of the broadcast receiving apparatus 100 at the time of product shipment. The software may be acquired from the other application server 500 or the like on the Internet 200 through the LAN communication unit 121 after the product shipment. Alternatively, the software stored in a memory card, optical disc, or the like may be acquired through the extension interface unit 124.

Further, control lines and data lines considered to be necessary for the description are shown in the drawings, and all the control lines and data lines included in the product are not always shown in the drawings. Actually, it is presumable that almost all constituent elements are connected with each other.

REFERENCE SINGS LIST 100, 800, 40100 . . . broadcast receiving apparatus, 100a, 40100a . . . antenna, 101, 801 . . . main control unit, 102, 802 . . . system bus, 103, 803 . . . ROM, 104, 804 . . . RAM, 110, 810 . . . storage unit, 121, 821 . . . LAN communication unit, 124, 824 . . . extension interface unit, 125, 825, . . . 40125 digital interface unit, 131, 831, 832 . . . tuner/demodulating unit, 132 . . . separating unit, 141 . . . video decoder, 142 . . . video color gamut conversion unit, 143 . . . audio decoder, 144 . . . caption decoder, 145 . . . subtitle decoder, 146 . . . subtitle synthesizing unit, 147 . . . subtitle color gamut conversion unit, 151 . . . data decoder, 152 . . . cache unit, 153 . . . application control unit, 154 . . . browser unit, 155 . . . application color gamut conversion unit, 156 . . . sound source unit, 161, 861 . . . video synthesizing unit, 162, 862 . . . monitor unit, 163, 863 . . . video output unit, 164, 864 . . . audio synthesizing unit, 165, 865 . . . speaker unit, 166, 866 . . . audio output unit, 170, 870 . . . operation input unit, 40181 . . . transcode processing unit, 841 . . . MMT decode processing unit, 842 . . . MPEG2-TS decode processing unit, 200 . . . Internet, 200r . . . router device, 200a . . . access point, 300t . . . radio tower, 300s . . . broadcast satellite (or communication satellite), 300 . . . broadcast station server, 390c . . . photographing equipment, 390e . . . editing equipment, 400 . . . service provider server, 500 . . . other application server, 600 . . . mobile phone communication server, 600b . . . base station, 700 . . . portable information terminal, 40200 . . . connection cable, 40300 . . . monitor device.

The invention claimed is:

1. A broadcast receiving apparatus configured to receive contents, the broadcast receiving apparatus comprising:
   a receiver configured to receive the contents via broadcast;
   a LAN interface through which the contents received by the receiver are outputted;
   an infrared communication interface; and
   a controller configured to control an output state of the contents from the LAN interface,
   wherein the receiver is configured to receive the contents via the broadcast without receiving any of an L2-Only flag of DTCP2 content protection, an HDR flag of DTCP2 content protection, and an SDO flag of DTCP2 content protection via the broadcast,
   wherein the controller is configured to determine an output state of the contents from the LAN interface including an output state of each of an L2-Only flag of DTCP2 content protection, an EI flag of DTCP2 content protection, an HDR flag of DTCP2 content protection, and an SDO flag of DTCP2 content protection for the contents in accordance with a combination of control information indicating a copy control state of the contents, control information for specifying whether protection is required or not when the contents are to be outputted, information indicating resolution of video of the contents, and information indicating transmission characteristics of the video of the contents, which are received by the receiver together with the contents,
   wherein the controller is configured to execute a control to apply output protection to the contents when the contents are outputted from the LAN interface in a case where the control information indicating the copy control state of the contents indicates that there is copy restriction or in a case where the control information for specifying whether protection is required or not when the contents are to be outputted indicates that protection is required on output,
   wherein the controller is configured to change a level of the output protection in accordance with a combination of the information indicating resolution of the video of the contents and the information indicating transmission characteristics of the video of the contents,
   wherein each of the L2-Only flag of DTCP2 content protection, the EI flag of DTCP2 content protection, the HDR flag of DTCP2 content protection, and the SDO flag of DTCP2 content protection outputted from the LAN interface is a 1 bit flag,
   wherein the controller is configured to determine combinations of values indicated by the respective bits of the L2-Only flag of DTCP2 content protection, the EI flag of DTCP2 content protection, the HDR flag of DTCP2 content protection, and the SDO flag of DTCP2 content protection used for the contents outputted from the LAN interface of the broadcast receiving apparatus, the number of the combinations used by the broadcast receiving apparatus is less than 16 combinations by keeping a value of the HDR flag of DTCP2 content protection set to 0 for all the contents protected by DTCP2 content protection including contents having a resolution of the video that is over 1920×1080 pixels and contents having a resolution of the video that is 1920×1080 pixels or less, and
   wherein the LAN interface is configured to be connected to a local area network.

2. The broadcast receiving apparatus according to claim 1, wherein the LAN interface is a wireless LAN interface.

3. The broadcast receiving apparatus according to claim 1, wherein the controller is configured to execute an output of the contents from the LAN interface to an external device, an IP address of which is present in a same subnet as an IP address of the broadcast receiving apparatus.

4. The broadcast receiving apparatus according to claim 1, further comprising:
   a storage configured to store the contents received by the receiver.

5. The broadcast receiving apparatus according to claim 4, wherein the LAN interface is configured to output the contents stored in the storage.

6. A broadcast receiving apparatus configured to receive contents, the broadcast receiving apparatus comprising:
   a receiver configured to receive the contents via broadcast;
   a LAN interface through which the contents received by the receiver are outputted;
   an infrared communication interface; and
   a controller configured to control an output state of the contents from the LAN interface,
   wherein the receiver is configured to receive the contents via the broadcast without receiving any of an L2-Only flag of DTCP2 content protection, an HDR flag of DTCP2 content protection, and an SDO flag of DTCP2 content protection via the broadcast,
   wherein the controller is configured to determine an output state of the contents from the LAN interface including an output state of each of an L2-Only flag of DTCP2 content protection, an EI flag of DTCP2 content protection, an HDR flag of DTCP2 content protection, and an SDO flag of DTCP2 content protection for the contents,
   wherein each of the L2-Only flag of DTCP2 content protection, the EI flag of DTCP2 content protection, the HDR flag of DTCP2 content protection, and the SDO flag of DTCP2 content protection outputted from the LAN interface is 1 bit flag,
   wherein the controller is configured to determine combinations of values indicated by the bits of the L2-Only flag of DTCP2 content protection, the EI flag of DTCP2 content protection, the HDR flag of DTCP2 content protection, and the SDO flag of DTCP2 content protection used for the contents outputted from the LAN interface of the broadcast receiving apparatus, the number of the combinations used by the broadcast receiving apparatus is less than 16 combinations by keeping a value of the HDR flag of DTCP2 content protection set to 0 for all the contents protected by DTCP2 content protection including contents having a resolution of the video that is over 1920×1080 pixels and contents having a resolution of the video that is 1920×1080 pixels or less, and
   wherein the LAN interface is configured to be connected to a local area network.

7. The broadcast receiving apparatus according to claim 6, wherein the LAN interface is a wireless LAN interface.

8. The broadcast receiving apparatus according to claim 6, wherein the controller is configured to execute an output of the contents from the LAN interface to an external device, an IP address of which is present in a same subnet as an IP address of the broadcast receiving apparatus.

9. The broadcast receiving apparatus according to claim 6, further comprising:
a storage configured to store the contents received by the receiver.

10. The broadcast receiving apparatus according to claim 9,
wherein the LAN interface is configured to output the contents stored in the storage.

11. A broadcast receiving apparatus configured to receive contents, the broadcast receiving apparatus comprising:
a tuner configured to receive a broadcast signal;
a demodulator configured to demodulate the broadcast signal received by the tuner and to acquire data strings;
a separator configured to separate the data strings;
a video decoder configured to decode a video data from the separator and to generate video contents;
a video output interface configured to output the video contents;
a LAN interface through which the contents acquired based on data from the separator are outputted;
an infrared communication interface; and
a controller circuitry configured to control an output state of the contents from the LAN interface,
wherein the receiver is configured to receive the contents via the broadcast without receiving any of an L2-Only flag of DTCP2 content protection, an HDR flag of DTCP2 content protection, and an SDO flag of DTCP2 content protection via the broadcast,
wherein the controller circuitry is configured to determine an output state of the contents from the LAN interface including an output state of each of an L2-Only flag of DTCP2 content protection, an EI flag of DTCP2 content protection, an HDR flag of DTCP2 content protection, and an SDO flag of DTCP2 content protection for the contents,
wherein each of the L2-Only flag of DTCP2 content protection, the EI flag of DTCP2 content protection, the HDR flag of DTCP2 content protection, and the SDO flag of DTCP2 content protection outputted from the LAN interface is 1 bit flag,
wherein the controller circuitry is configured to determine combinations of values indicated by the bits of the L2-Only flag of DTCP2 content protection, the EI flag of DTCP2 content protection, the HDR flag of DTCP2 content protection, and the SDO flag of DTCP2 content protection used for the contents outputted from the LAN interface of the broadcast receiving apparatus, the number of the combinations used by the broadcast receiving apparatus is less than 16 combinations by keeping a value of the HDR flag of DTCP2 content protection set to 0 for all the contents protected by DTCP2 content protection including contents having a resolution of the video that is over 1920×1080 pixels and contents having a resolution of the video that is 1920×1080 pixels or less, and
wherein the LAN interface is configured to be connected to a local area network.

12. The broadcast receiving apparatus according to claim 11,
wherein the LAN interface is a wireless LAN interface.

13. The broadcast receiving apparatus according to claim 11,
wherein the controller is configured to execute an output of the contents from the LAN interface to an external device, an IP address of which is present in a same subnet as an IP address of the broadcast receiving apparatus.

14. The broadcast receiving apparatus according to claim 11, further comprising:
a storage configured to store the contents acquired based on data from the separator.

15. The broadcast receiving apparatus according to claim 14,
wherein the LAN interface is configured to output the contents stored in the storage.

\* \* \* \* \*